US012032325B2

(12) United States Patent
Matsumaru et al.

(10) Patent No.: US 12,032,325 B2
(45) **Date of Patent: *Jul. 9, 2024**

(54) CARTRIDGE AND IMAGE FORMING APPARATUS

(71) Applicant: CANON KABUSHIKI KAISHA, Tokyo (JP)

(72) Inventors: Naoki Matsumaru, Suntou-gun (JP); Ryuta Murakami, Suntou-gun (JP); Tadashi Horikawa, Numazu (JP); Akihiro Fujiwara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,469

(22) Filed: Aug. 24, 2023

(65) Prior Publication Data

US 2023/0400809 A1 Dec. 14, 2023

Related U.S. Application Data

(60) Division of application No. 18/124,107, filed on Mar. 21, 2023, which is a division of application No. (Continued)

(30) Foreign Application Priority Data

Dec. 13, 2017 (JP) ................................ 2017-238454
Mar. 30, 2018 (JP) ................................ 2018-068246
Apr. 18, 2018 (JP) ................................ 2018-080112

(51) Int. Cl.

| | |
|---|---|
| ***G03G 21/16*** | (2006.01) |
| ***G03G 15/00*** | (2006.01) |
| ***G03G 21/18*** | (2006.01) |

(52) U.S. Cl.
CPC ....... *G03G 21/1647* (2013.01); *G03G 15/757* (2013.01); *G03G 21/1652* (2013.01); (Continued)

(58) Field of Classification Search
CPC ............ G03G 15/757; G03G 21/1647; G03G 21/1652; G03G 21/1671; G03G 21/1676; (Continued)

(56) References Cited

U.S. PATENT DOCUMENTS 5,499,112 A 3/1996 Kawai et al.
5,602,623 A 2/1997 Nishibata
(Continued)

FOREIGN PATENT DOCUMENTS

AU 2007200914 A 3/2007
AU 2009261109 A 12/2009
(Continued)

OTHER PUBLICATIONS

Aug. 17, 2023 Examination Report in European Patent Application No. 22 155 128.6.
(Continued)

*Primary Examiner* — Sophia S Chen
(74) *Attorney, Agent, or Firm* — Venable LLP

(57) ABSTRACT

A cartridge includes a photosensitive drum and a developing roller, with the developing roller being configured to develop a latent image formed on the photosensitive drum with toner. The cartridge also includes a first electrical contact electrically connected to the charging roller and the second electrical contact electrically connected to the developing roller. As viewed along the axis of the photosensitive drum, the first electrical contact and the second electrical contact are positioned on opposite sides with respect to a line that passes through an axis of the photosensitive drum and an axis of the developing roller.

30 Claims, 114 Drawing Sheets

Related U.S. Application Data

17/978,636, filed on Nov. 1, 2022, now Pat. No. 11,703,794, which is a division of application No. 16/896,339, filed on Jun. 9, 2020, which is a continuation of application No. PCT/JP2018/046670, filed on Dec. 12, 2018.

(52) U.S. Cl.
CPC ..... *G03G 21/1671* (2013.01); *G03G 21/1676* (2013.01); *G03G 21/186* (2013.01); *G03G 2221/1657* (2013.01)

(58) Field of Classification Search
CPC ............. G03G 21/186; G03G 21/1867; G03G 2221/1657; G03G 2221/166
See application file for complete search history.

(56) References Cited

U.S. PATENT DOCUMENTS

| | | | |
|---|---|---|---|
| 5,903,803 | A | 5/1999 | Kawai et al. |
| 5,905,583 | A | 5/1999 | Kawai et al. |
| 6,055,406 | A | 4/2000 | Kawai et al. |
| 6,115,567 | A | 9/2000 | Kawai et al. |
| 6,128,454 | A | 10/2000 | Kawai et al. |
| 6,163,665 | A | 12/2000 | Watanabe et al. |
| 6,175,706 | B1 | 1/2001 | Watanabe et al. |
| 6,226,478 | B1 | 5/2001 | Watanabe et al. |
| 6,240,266 | B1 | 5/2001 | Watanabe et al. |
| 6,289,189 | B1 | 9/2001 | Numagami et al. |
| 6,334,035 | B1 | 12/2001 | Abe et al. |
| 6,336,018 | B1 | 1/2002 | Kawai et al. |
| 6,349,188 | B1 | 2/2002 | Kawai et al. |
| 6,377,759 | B1 | 4/2002 | Abe et al. |
| 6,381,430 | B1 | 4/2002 | Yokomori et al. |
| 6,385,416 | B1 | 5/2002 | Horikawa et al. |
| 6,426,807 | B1 | 7/2002 | Kawai et al. |
| 6,463,225 | B1 | 10/2002 | Abe et al. |
| 6,463,232 | B1 | 10/2002 | Kawai et al. |
| 6,473,585 | B2 | 10/2002 | Abe et al. |
| 6,480,687 | B1 | 11/2002 | Kawai et al. |
| 6,496,667 | B2 | 12/2002 | Shiratori et al. |
| 6,501,926 | B1 | 12/2002 | Watanabe et al. |
| 6,501,927 | B1 | 12/2002 | Watanabe et al. |
| 6,505,008 | B2 | 1/2003 | Abe |
| 6,512,600 | B1 | 1/2003 | Kawai et al. |
| 6,535,699 | B1 | 3/2003 | Abe et al. |
| 6,553,189 | B2 | 4/2003 | Miyamoto et al. |
| 6,560,422 | B2 | 5/2003 | Kanno et al. |
| 6,681,088 | B2 | 1/2004 | Kanno et al. |
| 6,735,403 | B2 | 5/2004 | Kanno et al. |
| 6,735,405 | B2 | 5/2004 | Yokoi et al. |
| 6,738,588 | B2 | 5/2004 | Yokomori et al. |
| 6,823,155 | B2 | 11/2004 | Tsuda et al. |
| 6,836,639 | B2 | 12/2004 | Karakama et al. |
| 6,898,392 | B2 | 5/2005 | Karakama et al. |
| 6,934,485 | B2 | 8/2005 | Miyabe et al. |
| 6,947,686 | B2 | 9/2005 | Kawai et al. |
| 6,963,706 | B2 | 11/2005 | Morioka et al. |
| 6,968,142 | B2 | 11/2005 | Arimitsu et al. |
| 6,987,938 | B2 | 1/2006 | Murakami et al. |
| 6,993,264 | B2 | 1/2006 | Oguma et al. |
| 7,016,626 | B2 | 3/2006 | Yokomori et al. |
| 7,024,131 | B2 | 4/2006 | Komatsu et al. |
| 7,027,754 | B2 | 4/2006 | Harada et al. |
| 7,046,942 | B2 | 5/2006 | Arimitsu et al. |
| 7,057,778 | B2 | 6/2006 | Kawai et al. |
| 7,062,195 | B2 | 6/2006 | Kurihara et al. |
| 7,085,516 | B2 | 8/2006 | Kawai et al. |
| 7,130,560 | B2 | 10/2006 | Kawai et al. |
| 7,156,797 | B2 | 1/2007 | Komatsu et al. |
| 7,162,176 | B2 | 1/2007 | Oguma et al. |
| 7,203,442 | B2 | 4/2007 | Matsubara et al. |
| 7,206,534 | B2 | 4/2007 | Murakami |
| 7,233,752 | B2 | 6/2007 | Harada et al. |
| 7,242,885 | B2 | 7/2007 | Abe et al. |
| 7,257,353 | B2 | 8/2007 | Kawai et al. |
| 7,310,489 | B2 | 12/2007 | Kawai |
| 7,315,706 | B2 | 1/2008 | Oguma et al. |
| 7,366,440 | B2 | 4/2008 | Horikawa |
| 7,386,241 | B2 | 6/2008 | Mori et al. |
| 7,457,569 | B2 | 11/2008 | Kawai |
| 7,555,249 | B2 | 6/2009 | Kawai |
| 7,593,139 | B2 | 9/2009 | Kawai et al. |
| 7,720,412 | B2 | 5/2010 | Anan et al. |
| 7,848,684 | B2 | 12/2010 | Kawai |
| 7,933,534 | B2 | 4/2011 | Hoshi et al. |
| 8,045,899 | B2 | 10/2011 | Kawai |
| 8,135,304 | B2 | 3/2012 | Abe et al. |
| 8,139,972 | B2 | 3/2012 | Abe et al. |
| 8,180,262 | B2 | 5/2012 | Kawai |
| 8,238,784 | B2 | 8/2012 | Kusudo et al. |
| 8,249,485 | B2 | 8/2012 | Horikawa et al. |
| 8,311,449 | B2 | 11/2012 | Kusudo et al. |
| 8,472,840 | B2 | 6/2013 | Abe et al. |
| 8,494,409 | B2 | 7/2013 | Kawai et al. |
| 8,505,008 | B2 | 8/2013 | Yamazaki et al. |
| 8,515,306 | B2 | 8/2013 | Kawai et al. |
| 8,620,181 | B2 | 12/2013 | Murakami |
| 8,682,211 | B2 | 3/2014 | Hoshi et al. |
| 8,755,713 | B2 | 6/2014 | Kawai et al. |
| 8,879,954 | B2 | 11/2014 | Nonaka et al. |
| 9,052,638 | B2 | 6/2015 | Matsumaru et al. |
| 9,069,289 | B2 | 6/2015 | Batori et al. |
| 9,116,466 | B2 | 8/2015 | Makiguchi et al. |
| 9,164,424 | B2 | 10/2015 | Nakamura et al. |
| 9,164,430 | B2 | 10/2015 | Murakami et al. |
| 9,176,467 | B2 | 11/2015 | Gu et al. |
| 9,182,733 | B2 | 11/2015 | Horikawa et al. |
| 9,188,906 | B2 | 11/2015 | Batori et al. |
| 9,188,945 | B2 | 11/2015 | Anan et al. |
| 9,213,267 | B2 | 12/2015 | Hoshi et al. |
| 9,229,371 | B2 | 1/2016 | Murakami et al. |
| 9,342,047 | B2 | 5/2016 | Fujiwara et al. |
| 9,417,604 | B2 | 8/2016 | Matsumaru et al. |
| 9,465,318 | B2 | 10/2016 | Takeuchi et al. |
| 9,494,890 | B2 | 11/2016 | Komatsu et al. |
| 9,507,288 | B2 | 11/2016 | Yamashita et al. |
| 9,523,942 | B2 | 12/2016 | Takeuchi et al. |
| 9,599,932 | B2 | 3/2017 | Takeuchi et al. |
| 9,989,892 | B2 | 6/2018 | Takeuchi et al. |
| 10,007,225 | B2 | 6/2018 | Nosho et al. |
| 10,095,161 | B2 | 10/2018 | Takeuchi et al. |
| 10,095,180 | B2 | 10/2018 | Harada et al. |
| 10,452,016 | B2 | 10/2019 | Kamoshida et al. |
| 10,474,096 | B2 | 11/2019 | Hirayama et al. |
| 10,558,165 | B2 | 2/2020 | Hirayama et al. |
| 10,627,780 | B2 | 4/2020 | Fujiwara et al. |
| 10,671,013 | B2 | 6/2020 | Uesugi et al. |
| 10,678,184 | B2 | 6/2020 | Murakami et al. |
| 11,703,794 | B2 * | 7/2023 | Matsumaru ........ G03G 21/1647 399/119 |
| 2001/0043814 | A1 | 11/2001 | Abe |
| 2002/0025191 | A1 | 2/2002 | Kitayama |
| 2004/0028429 | A1 | 2/2004 | Matsumaru |
| 2005/0135831 | A1 | 6/2005 | Kawaguchi et al. |
| 2007/0160388 | A1 | 7/2007 | Yoshimura et al. |
| 2008/0015238 | A1 | 1/2008 | Stapper et al. |
| 2008/0138113 | A1 | 6/2008 | Murrell et al. |
| 2008/0138114 | A1 | 6/2008 | Chadani et al. |
| 2008/0138115 | A1 | 6/2008 | Chadani et al. |
| 2008/0152388 | A1 | 6/2008 | Ueno et al. |
| 2008/0159772 | A1 | 7/2008 | Koishi et al. |
| 2008/0170880 | A1 | 7/2008 | Hashimoto et al. |
| 2008/0240796 | A1 | 10/2008 | Morioka et al. |
| 2008/0260428 | A1 | 10/2008 | Ueno et al. |
| 2009/0003875 | A1 | 1/2009 | Toba et al. |
| 2009/0028597 | A1 | 1/2009 | Takigawa et al. |
| 2009/0284810 | A1 | 11/2009 | Kawai et al. |
| 2009/0317132 | A1 | 12/2009 | Asanuma et al. |
| 2010/0092210 | A1 | 4/2010 | Kawai et al. |
| 2010/0303503 | A1 | 12/2010 | Woo |
| 2011/0038649 | A1 | 2/2011 | Miyabe et al. |
| 2011/0097108 | A1 | 4/2011 | Chadani et al. |

(56) References Cited

U.S. PATENT DOCUMENTS

| | | | |
|---|---|---|---|
| 2011/0182623 | A1 | 7/2011 | Tomatsu |
| 2011/0229196 | A1 | 9/2011 | Kawai et al. |
| 2011/0236061 | A1 | 9/2011 | Miki et al. |
| 2012/0189343 | A1 | 7/2012 | Chadani et al. |
| 2012/0275824 | A1 | 11/2012 | Gu et al. |
| 2013/0317132 | A1 | 11/2013 | Scales et al. |
| 2013/0336674 | A1 | 12/2013 | Abe et al. |
| 2014/0003838 | A1 | 1/2014 | Kawai et al. |
| 2014/0178098 | A1 | 6/2014 | Sato |
| 2015/0117918 | A1 | 4/2015 | Suzuki |
| 2015/0177683 | A1 | 6/2015 | Gu et al. |
| 2016/0062311 | A1 | 3/2016 | Mori et al. |
| 2016/0091815 | A1 | 3/2016 | Morgan |
| 2016/0145061 | A1 | 5/2016 | Maruta |
| 2016/0169364 | A1 | 6/2016 | Kataoka |
| 2016/0370730 | A1 | 12/2016 | Tsukahara |
| 2016/0370757 | A1 | 12/2016 | Sato et al. |
| 2017/0248869 | A1 | 8/2017 | Matsumoto et al. |
| 2017/0248908 | A1 | 8/2017 | Tanabe et al. |
| 2017/0261926 | A1 | 9/2017 | Kashiide et al. |
| 2017/0261927 | A1 | 9/2017 | Sato et al. |
| 2017/0293255 | A1 | 10/2017 | Uratani et al. |
| 2017/0329279 | A1 | 11/2017 | Hirayama et al. |
| 2017/0351214 | A1 | 12/2017 | Uesugi et al. |
| 2018/0224794 | A1 | 8/2018 | Kamoshida et al. |
| 2019/0129356 | A1 | 5/2019 | Murakami et al. |
| 2020/0004192 | A1 | 1/2020 | Kamoshida et al. |
| 2020/0025191 | A1 | 1/2020 | van Boeyen et al. |
| 2020/0041953 | A1 | 2/2020 | Uesugi et al. |
| 2020/0050143 | A1 | 2/2020 | Hirayama et al. |
| 2020/0081396 | A1 | 3/2020 | Fujiwara et al. |
| 2020/0150582 | A1 | 5/2020 | Hirayama et al. |
| 2020/0174423 | A1 | 6/2020 | Ogawa et al. |
| 2020/0201245 | A1 | 6/2020 | Hirayama et al. |
| 2020/0201246 | A1 | 6/2020 | Hirayama et al. |
| 2020/0201247 | A1 | 6/2020 | Hirayama et al. |
| 2020/0201248 | A1 | 6/2020 | Hirayama et al. |
| 2020/0201249 | A1 | 6/2020 | Hirayama et al. |
| 2020/0209804 | A1 | 7/2020 | Kawakami et al. |
| 2020/0241468 | A1 | 7/2020 | Hirayama et al. |
| 2020/0272088 | A1 | 7/2020 | Sueshige et al. |
| 2020/0257238 | A1 | 8/2020 | Uesugi et al. |
| 2020/0257242 | A1 | 8/2020 | Murakami et al. |
| 2020/0333744 | A1 | 10/2020 | Hirayama et al. |
| 2020/0341427 | A1 | 10/2020 | Komatsu et al. |
| 2021/0088958 | A1 | 3/2021 | Kamoshida et al. |

FOREIGN PATENT DOCUMENTS

| | | | |
|---|---|---|---|
| CA | 2088237 | C | 6/2001 |
| CN | 1083228 | A | 3/1994 |
| CN | 1890612 | A | 1/2007 |
| CN | 101583910 | A | 11/2009 |
| CN | 102067044 | A | 5/2011 |
| CN | 102087494 | A1 | 6/2011 |
| CN | 102193472 | A | 9/2011 |
| CN | 102880034 | A | 1/2013 |
| CN | 103293896 | A | 9/2013 |
| CN | 204044515 | U | 12/2014 |
| CN | 105319934 | A | 2/2016 |
| CN | 105392720 | A | 3/2016 |
| CN | 105446108 | A | 3/2016 |
| CN | 105843008 | A | 8/2016 |
| CN | 205644019 | U | 8/2016 |
| CN | 205450565 | A | 10/2016 |
| CN | 106257345 | A | 12/2016 |
| CN | 106444316 | A | 2/2017 |
| CN | 107132747 | A | 9/2017 |
| CN | 107153336 | A | 9/2017 |
| CN | 107407898 | A | 11/2017 |
| CN | 107430376 | A | 12/2017 |
| EP | 2 595 004 | A2 | 5/2013 |
| JP | H09-171339 | A | 6/1997 |
| JP | H10-254327 | A | 9/1998 |
| JP | 2000-075765 | A | 3/2000 |
| JP | 2000-194249 | A | 7/2000 |
| JP | 2002-048148 | A | 2/2002 |
| JP | 2003-162149 | A | 6/2003 |
| JP | 2017-097355 | A | 6/2007 |
| JP | 2007-240007 | A | 9/2007 |
| JP | 2007-322873 | A | 12/2007 |
| JP | 2008-233867 | A | 10/2008 |
| JP | 2009-270594 | A | 11/2009 |
| JP | 2010-079295 | A | 4/2010 |
| JP | 2011-203348 | A | 10/2011 |
| JP | 2012-083441 | A | 4/2012 |
| JP | 2012-137794 | A | 7/2012 |
| JP | 2014-056012 | A | 3/2014 |
| JP | 2014-240991 | A | 12/2014 |
| JP | 2016-040625 | A | 3/2016 |
| JP | 2017-068266 | A | 4/2017 |
| JP | 2017-211435 | A | 11/2017 |
| JP | 2018-136580 | A | 8/2018 |
| KR | 10-2008-0078056 | A | 8/2008 |
| KR | 10-2009-0080120 | A | 7/2009 |
| KR | 10-2009-0105941 | A | 10/2009 |
| KR | 10-2011-0074599 | A | 6/2011 |
| RU | 2 431 171 | C2 | 10/2011 |
| RU | 2488869 | C | 7/2013 |
| RU | 2589393 | C | 7/2016 |
| RU | 2 597 669 | C1 | 9/2016 |
| TW | 201736990 | A | 6/2016 |
| TW | 201621484 | A | 10/2017 |
| TW | 201734678 | A | 10/2017 |
| WO | 2017/057781 | A1 | 4/2017 |

OTHER PUBLICATIONS

International Search Report and Written Opinion for International Patent Application No. PCT/JP2018/046670.

Dec. 27, 2019 Office Action in Taiwanese Patent Application No. 107144982.

Jul. 30, 2020 Office Action in Taiwanese Patent Application No. 107144982.

Nov. 26, 2020 Examination Report in Australian Patent Application No. 2018384358.

Jan. 14, 2021 Decision to Grant in Russian Patent Application No. 2020122702 (with English translation).

Feb. 8, 2021 Notice of Allowance in Korean Patent Application No. 10-2020-7019303.

Jun. 2, 2021 Examination Report in Indian Patent Application No. 202047028322.

Jul. 26, 2021 Extended Search Report in European Patent Application No. 18888533.9.

Jul. 23, 2021 Notice of Allowance in Russian Patent Application No. 2021106224 (with English translation).

Oct. 7, 2021 Office Action in Chilean Patent Application No. 202001574.

Oct. 21, 2021 Notice of Allowance in Korean Patent Application No. 10-2020-7019303.

Oct. 20, 2021 Office Action in Taiwanese Patent Application No. 110106916.

Apr. 14, 2022 Office Action in Chilean Patent Application No. 202001574.

Feb. 18, 2022 Notice of Allowance in Korean Patent Application No. 10-2022-7001733.

Mar. 10, 2022 Office Action in Chinese Patent Application No. 201880079414.4 (with English translation).

May 17, 2022 Decision on Grant in Russian Patent Application No. 2021130663 (with English translation).

Jun. 28, 2022 Notice of Allowance in Korean Patent Application No. 10-2022-7017225.

Aug. 1, 2022 Extended Search Report in European Patent Application No. 22 155 128.6.

Jul. 25, 2023 Notice of Allowance in Korean Patent Application No. 10-2023-7004525.

Sep. 27, 2022 Office Action in Japanese Patent Application No. 2021-174145.

Nov. 10, 2022 Notice of Allowance in Korean Patent Application No. 10-2022-7033952.

(56) References Cited

OTHER PUBLICATIONS

Nov. 14, 2022 Examination Report in Australian Patent Application No. 2021269369.
Information re Offer for Sale of Process Cartridge More Than One Year Before Dec. 13, 2017.
Mar. 8, 2022 Office Action in Taiwanese Patent Application No. 111127720.
Jun. 7, 2023 Office Action in Malaysia Patent Application No. PI2020002978.
Nov. 24, 2023 Notice of Allowance in Korean Patent Application Pub. No. 10-2023-7035607.
Information re Offer for Sale of Process Cartridge More Than One Year Before Dec. 17, 2017.
Nov. 7, 2023 Notice of Acceptance in Australian Patent Application No. 2021269369.
Dec. 5, 2023 Office Action in Indian Patent Application No. 202047028322.
Dec. 9, 2023 Search Report in United Arab Emirates Patent Application No. P6000865/2020.
Apr. 26, 2024 Office Action in Chinese Patent Application No. 202211135161.2 (with English translation).
Apr. 27, 2024 Offie Action in Chinese Patent Application No. 202211499207.9 (with English translation).

* cited by examiner (a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

CARTRIDGE AND IMAGE FORMING APPARATUS

TECHNICAL FIELD

The present invention relates to a cartridge and an image forming apparatus.

The cartridge is mountable to and dismountable from an apparatus main assembly (main assembly of image forming apparatus) of the image forming apparatus (electrophotographic image forming apparatus).

In addition, the image forming apparatus forms an image on a recording material using an electrophotographic image forming process. For example, there are an electrophotographic copying machine, an electrophotographic printer (LED printer, laser beam printer, etc), a facsimile machine, a word processor, and so on.

BACKGROUND OF THE INVENTION

In the electrophotographic image forming apparatus (hereinafter, also simply referred to as "image forming apparatus"), an electrophotographic photosensitive member, which is generally a drum type as an image bearing member, that is, a photosensitive drum (electrophotographic photosensitive drum), is uniformly charged. Then, the charged photosensitive drum is selectively exposed to form an electrostatic latent image (electrostatic image) on the photosensitive drum. Thereafter, the electrostatic latent image formed on the photosensitive drum is developed into a toner image with toner as a developer. Subsequently, the toner image formed on the photosensitive drum is transferred onto a recording material such as a recording sheet or a plastic sheet, and heat or pressure is applied to the toner image carried on the recording material to form the toner image on the recording material, thus performing a image recording operation.

Such an image forming apparatus generally requires toner replenishment and maintenance of various process means thereof. In order to facilitate the toner replenishment and maintenance, the photosensitive drum, charging means, a developing means, a cleaning means, and the like are collectively constituted into a cartridge that is detachably mountable to the image forming apparatus main assembly, and such a cartridge has been put into practical use.

With this cartridge system, a part of the maintenance of the device can be performed by the user without relying on the service person in charge of the after-sales service. Therefore, the operability of the apparatus can be significantly improved, and an image forming apparatus having excellent usability can be provided. Therefore, cartridge systems are widely used in image forming apparatuses.

A process cartridge is an example of the cartridge. The process cartridge is a cartridge in which an electrophotographic photosensitive drum and a process unit that are actable on the electrophotographic photosensitive drum are integrally formed into a cartridge, and the cartridge is dismountably mounted to the apparatus main assembly of the image forming apparatus.

In the above-described process cartridge, a structure in which a coupling member is provided at the free end of the photosensitive member drum to transmit the driving force from the apparatus main assembly to the photosensitive member drum is widely used. In JP 2016-40625 (FIG. 22), it is proposed that the coupling member is structured to be movable back and forth in the longitudinal direction, and a push rod arranged in the process cartridge is operated to provide a trigger for the moving back and forth of the coupling member. In addition, a structure has been proposed in which a tension cord fixed to the coupling member is penetrated through the drum to be exposed to the outside from the non-driving side, and the tension cord is placed in and out to effect forward and backward movement of the coupling member.

SUMMARY OF THE INVENTION

Problem to be Solved

It is an object of the present invention to further develop the above-mentioned prior art.

Means for Solving the Problem

A typical structure according to the present application is a cartridge detachably mountable to a main assembly of an image forming apparatus, the main assembly including an inclinable drive transmission member for transmitting a driving force in the cartridge, the cartridge comprising a photosensitive drum and a movable member movable relative to the photosensitive drum to control an inclination angle of the drive transmission member, the movable member being movable between (a) a first position for reducing the inclination angle of said drive transmission member relative to the photosensitive drum and (b) a second position retracted from the first position.

Effect of the Invention

The conventional technique can be further developed.

BRIEF DESCRIPTION OF THE DRAWINGS

FIG. 121 is a side view of the cartridge.

FIG. 122 is a perspective view of the cartridge.

FIG. 123 is an exploded perspective view of the coupling member.

FIG. 124 is an exploded perspective view of the coupling member.

DESCRIPTION OF THE EMBODIMENTS

Embodiment 1

Embodiment 1 will be described in detail with reference to the accompanying drawings.

Unless otherwise specified, a rotation axis direction of an electrophotographic photosensitive drum (photosensitive member, photosensitive drum) is simply referred to as a longitudinal direction. The rotation axis direction (axis direction) is a direction parallel to the axis (rotation axis line) of the photosensitive drum. The axis of the photosensitive drum is an imaginary straight line extending along the center of rotation of the photosensitive drum. The photosensitive member drum rotates about the rotation axis thereof.

In the longitudinal direction, a side where the electrophotographic photosensitive drum receives the driving force from the image forming apparatus main assembly is a driving side, and the opposite side is a non-driving side.

Figure 2:
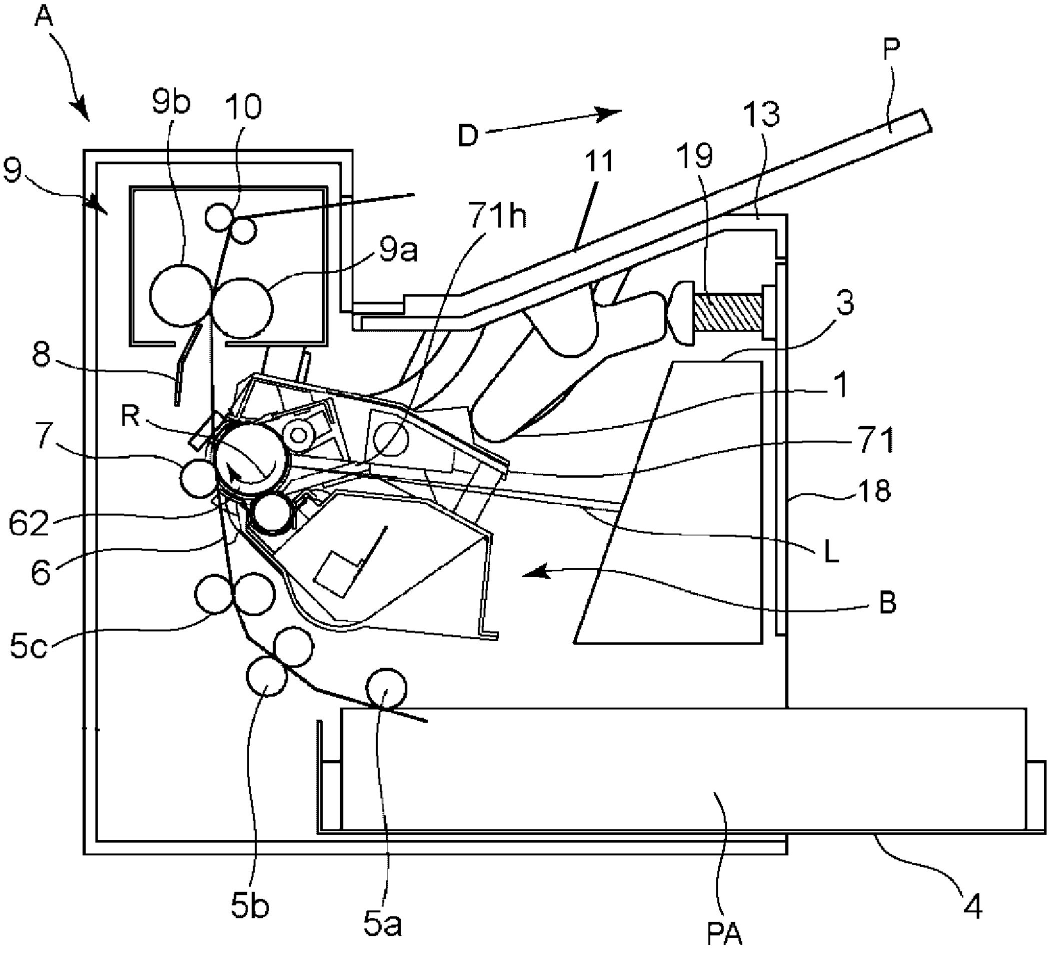
FIG. 2 is a cross-sectional view of a main assembly of an image forming apparatus and the process cartridge.
Figure 3:
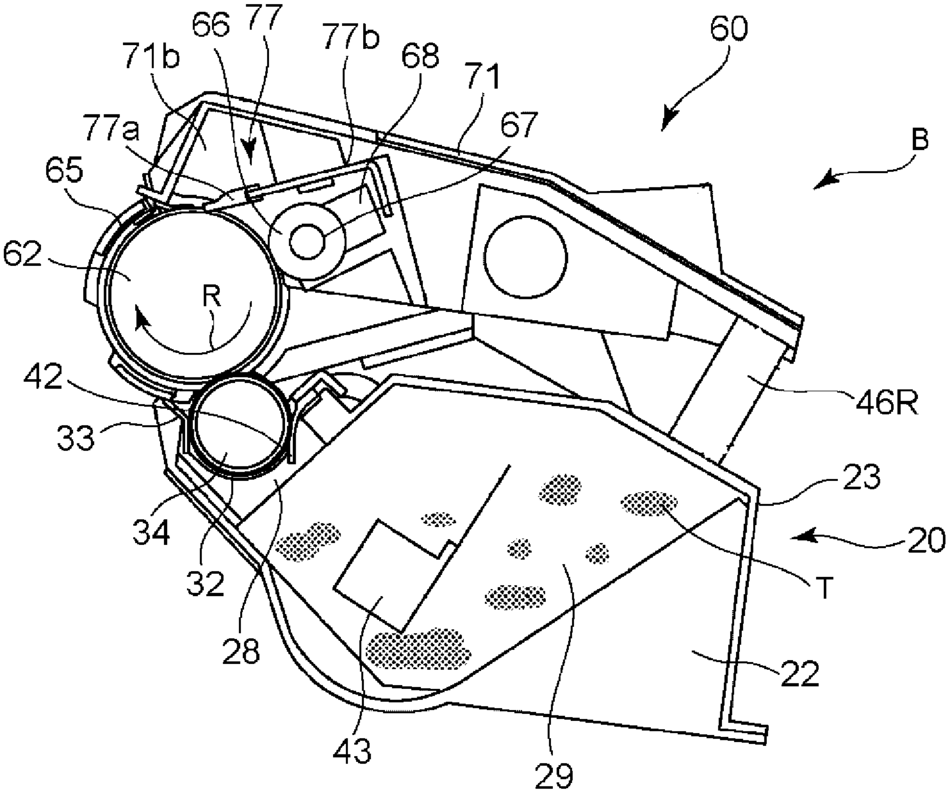
FIG. 3 is a sectional view of the process cartridge.

Referring to FIGS. 2 and 3, the overall structure and image forming process will be described.

FIG. 2 is a sectional view of an apparatus main assembly (electrophotographic image forming apparatus main assembly, image forming apparatus main assembly) A and a process cartridge (hereinafter referred to as a cartridge B) of the electrophotographic image forming apparatus.

FIG. 3 is a sectional view of the cartridge B.

Here, the apparatus main assembly A is a portion excluding the cartridge B from the electrophotographic image forming apparatus. The cartridge B can be mounted to and dismounted from the apparatus main assembly A.

<Overall Structure of Electrophotographic Image Forming Apparatus>

The electrophotographic image forming apparatus (image forming apparatus) shown in FIG. 2 is a laser beam printer using an electrophotographic technique in which a cartridge B is dismountably mounted to an apparatus main assembly A. When the cartridge B is mounted to the apparatus main assembly A, an exposure device 3 (laser scanner unit) for forming a latent image on the electrophotographic photosensitive drum 62 as an image bearing member of the cartridge B is arranged. In addition, below the cartridge B, a sheet tray 4 accommodating recording materials (hereinafter referred to as a sheet materials PA) as an image formation object is arranged. The electrophotographic photosensitive drum 62 is a photosensitive member (electrophotographic photosensitive member) used for electrophotographic image formation.

In the apparatus main assembly A, along a conveyance direction D of the sheet material PA, a pickup roller 5*a*, a feeding roller pair 5*b*, a conveyance roller pair 5*c*, a transfer guide 6, a transfer roller 7, a conveyance guide 8, a fixing device 9, a pair of discharge rollers 10 and a discharge tray 11 are sequentially arranged. The fixing device 9 comprises a heating roller 9*a* and a pressure roller 9*b*.

<Image Forming Process>

An outline of the image forming process will be described. In response to a print start signal, the electrophotographic photosensitive drum (hereinafter, referred to as photosensitive drum 62 or simply drum 62) is rotationally driven in a direction of arrow Rat a predetermined peripheral speed (process speed).

A charging roller (charging member) 66 to which a bias voltage is applied contacts an outer peripheral surface of the drum 62 and uniformly charges the outer peripheral surface of the drum 62. The charging roller 66 is a rotatable member (roller) capable of rotating while being in contact with the drum 62. The charging member is not limited to such a rotatable contact roller structure, and a charging member (charging device) fixed to the drum 62 with a space, such as a corona charging device, may be used.

The exposure device 3 outputs a laser beam L in accordance with image information. The laser beam L travels through a laser opening 71*h* provided in a cleaning frame 71 of the cartridge B and scans and exposes the outer peripheral surface of the drum 62. By this, an electrostatic latent image corresponding to the image information is formed on the outer peripheral surface of the drum 62.

On the other hand, as shown in FIG. 3, in a developing unit 20 as a developing device, the toner T in a toner chamber 29 is stirred and fed by the rotation of a feeding member (stirring member) 43, and the toner T is fed to a toner supply chamber 28.

The toner T is carried on a surface of a developing roller 32 by a magnetic force of a magnet roller 34 (fixed magnet). The developing roller 32 is a developer carrying member which carries the developer (toner T) on the surface thereof in order to develop the latent image (electrostatic latent image) formed on the drum 62. In this embodiment, a non-contact developing method is used, with which the latent image is developed with provision of a minute gap between the developing roller 32 and the drum 62. It is also possible to employ a contact developing system in which the latent image is developed while the developing roller 32 is in contact with the drum 62.

The toner T is triboelectrically charged by a developing blade 42, and a layer thickness on the peripheral surface of the developing roller 32 as a developer carrying member is regulated.

The toner T is supplied to the drum 62 in accordance with the electrostatic latent image to develop the latent image. By this, the latent image is visualized into a toner image. The drum 62 is an image bearing member which carries the latent image or the image (toner image, developer image) formed with toner (developer) on the surface thereof.

In addition, the drum 62 and the developing roller 32 are rotatable members (rotating members) which can rotate while carrying the developer (toner) on the surface thereof.

As shown in FIG. 2, the sheet material PA stored in the lower portion of the apparatus main assembly A is fed out of the sheet tray 4 by the pickup roller 5*a*, the feeding roller pair 5*b*, and the feeding roller pair 5*c* in timed relation with the output of the laser beam L. Then, the sheet material PA is fed to the transfer position between the drum 62 and the transfer roller 7 by way of of the transfer guide 6. At this transfer position, the toner image is sequentially transferred from the drum 62 onto the sheet material PA.

The sheet material PA on which the toner image has been transferred is separated from the drum 62 and fed to the fixing device 9 along the conveyance guide 8. Then, the sheet material PA passes through the nip portion between the heating roller 9*a* and the pressure roller 9*b* which form the fixing device 9. Pressure/heat fixing processing is performed in this nip portion to fix the toner image on the sheet material PA. The sheet material PA which has been subjected to the toner image fixing process is fed to the discharge roller pair 10 and discharged to the discharge tray 11.

On the other hand, as shown in FIG. 3, the residual toner on the outer peripheral surface of the drum 62 after the transfer is removed by the cleaning blade 77, and the drum 62 is used again in the next image forming process. The toner removed from the drum is stored in a waste toner chamber 71*b* of a toner cleaning unit 60. The cleaning unit 60 is a unit includes the photosensitive drum 62.

In the above-described structure, the charging roller 66, the developing roller 32, the transfer roller 7, and the cleaning blade 77 are process means (process members, acting members) which act on the drum 62.

<Structure of Entire Cartridge>

Figure 4:
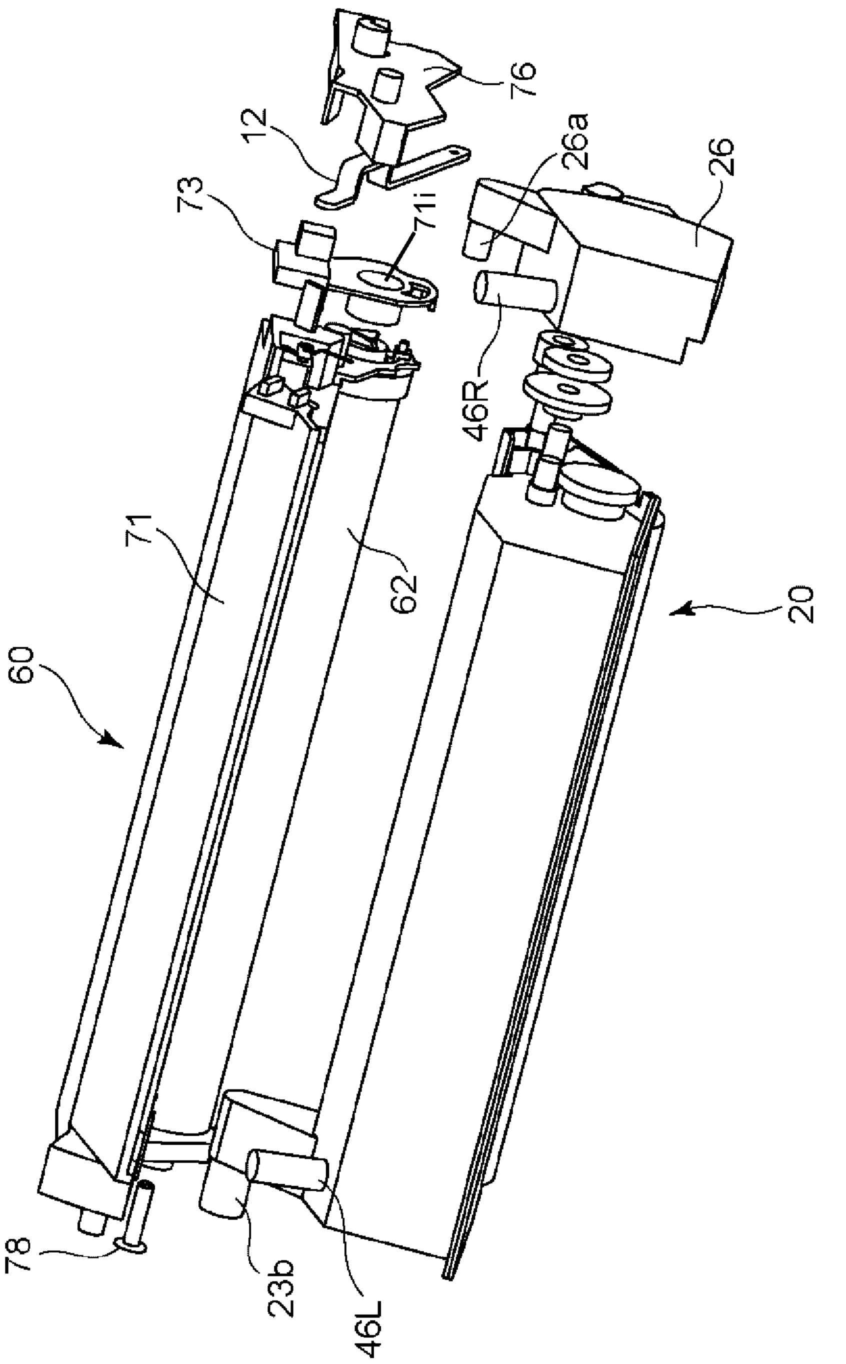
FIG. 4 is a perspective view of the apparatus main assembly and the process cartridge with an opening/closing door opened.
Figure 5:
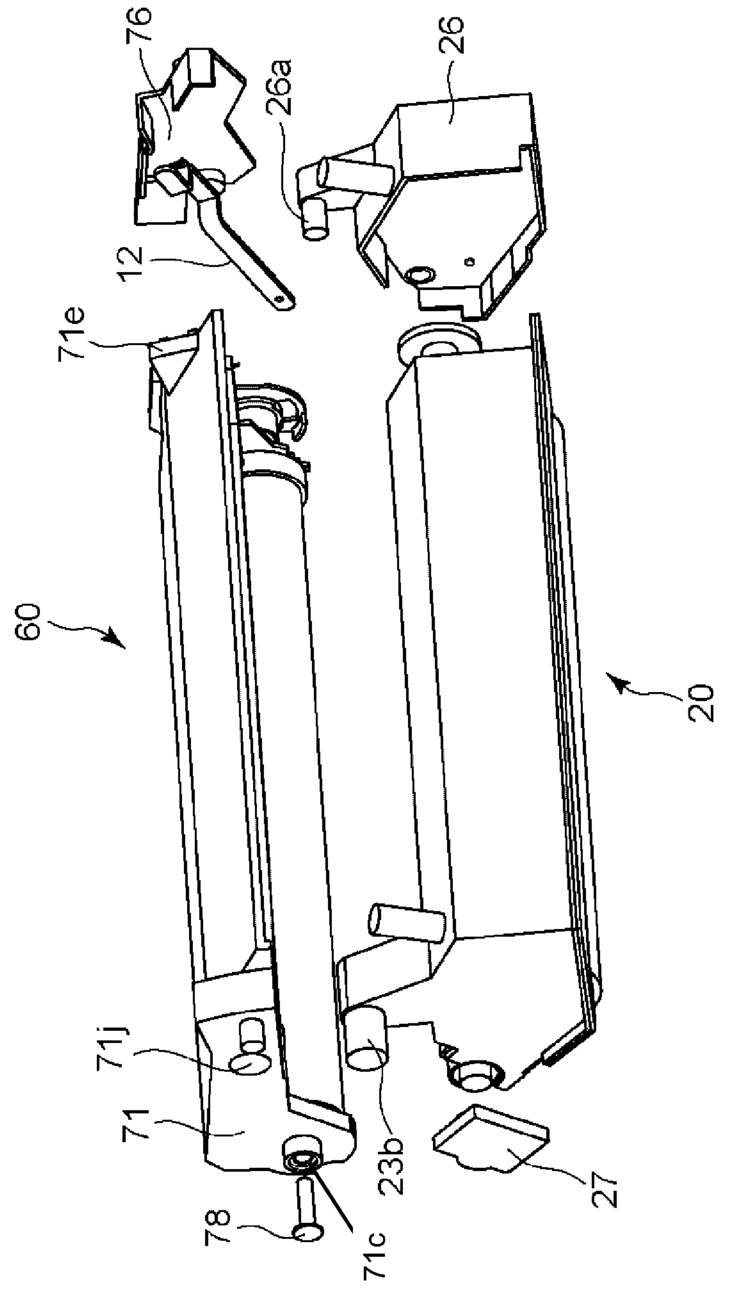
FIG. 5 is a perspective view of the process cartridge.

Referring to FIGS. 3, 4, and 5, the overall structure of the cartridge B will be described. FIG. 3 is a sectional view of the cartridge B, and FIGS. 4 and 5 are perspective views illustrating the structure of the cartridge B. In this embodiment, description will be made with screws for connecting the respective portions omitted.

The description of the actuating unit including the lever member will be omitted here because it will be described hereinafter.

The cartridge B includes the cleaning unit (photosensitive member holding unit, drum holding unit, image bearing member holding unit, first unit) 60 and a developing unit (developer carrying member holding unit, second unit) 20.

The cartridge B of this embodiment is a process cartridge. In general, a process cartridge is a cartridge in which an electrophotographic photosensitive member and at least one process means which acts on the electrophotographic photosensitive member are integrally formed as a cartridge and can be mounted to and dismounted from a main assembly (apparatus main assembly) of an electrophotographic image forming apparatus. Examples of process means include a charging means, a developing means, and a cleaning means.

As shown in FIG. 3, the cleaning unit 60 includes a drum 62, a charging roller 66, a cleaning member 77, and a cleaning frame 71 which supports these members. On the driving side of the drum 62, a driving side drum flange 63 provided on the driving side is rotatably supported through a hole 73*a* of the drum bearing 73. In a broad sense, a drum bearing 73, a side member 76, and the cleaning frame 71 can be collectively referred to as a cleaning frame. The drum bearing 73, the side member 76, and the cleaning frame 71 are all a portion of the frame which constitutes the cartridge. The drum bearing 73, the side member 76, and the cleaning frame 71 are a frame for supporting the photosensitive drum 62, and therefore, they may be called a drum frame.

On the non-driving side, as shown in FIG. 5, the structure is such that a hole (not shown) of the non-driving side drum flange is rotatably supported by a drum shaft 78 press-fitted into a hole 71*c* provided in the cleaning frame 71.

In the cleaning unit 60, the charging roller 66 and the cleaning member 77 are arranged in contact with the outer peripheral surface of the drum 62.

The cleaning member 77 includes a rubber blade 77*a*, which is a blade-shaped elastic member of rubber as an elastic material, and a support member 77*b* which supports the rubber blade. The rubber blade 77*a* is in contact with the drum 62 in the counter direction with respect to the rotational direction of the drum 62. That is, the rubber blade 77*a* is in contact with the drum 62 so that the surface of the free end faces toward the upstream side in the rotational direction of the drum 62.

As shown in FIG. 3, the waste toner removed from the surface of the drum 62 by the cleaning member 77 is stored in the waste toner chamber 71*b* formed by the cleaning frame 71 and the cleaning member 77.

In addition, as shown in FIG. 3, a scooping sheet 65 for preventing the waste toner from leaking from the cleaning frame 71 is provided at an edge of the cleaning frame 71 so as to contact the drum 62.

The charging roller 66 is rotatably mounted in the cleaning unit 60 by way of charging roller bearings (not shown) at opposite ends in the longitudinal direction of the cleaning frame 71.

The longitudinal direction of the cleaning frame 71 (longitudinal direction of the cartridge B) is substantially parallel with the direction in which the rotation axis of the drum 62 extends (axial direction). Hereinafter, unless otherwise noted, the longitudinal direction or the axial direction is intended to mean the axial direction of the drum 62 (direction parallel with the axis of the drum).

The charging roller 66 is pressed against the drum 62 by pressing charging roller bearings 67 toward the drum 62 by an urging member 68. The charging roller 66 is rotated by the rotation of the drum 62.

As shown in FIG. 3, the developing unit 20 includes a developing roller 32, a developing container 23 which supports the developing roller 32, a developing blade 42, and so on. The developing roller 32 is rotatably mounted in the developing container 23 by a bearing member 27 (FIG. 5) and a bearing member 37 (FIG. 4) provided at respective ends. The developing container 23, the bearing member 27, and the bearing member 37 are all parts of the frame of the cartridge. The developing container 23, the bearing member 27, and the bearing member 37 are a frame (frame which supports the developing roller 32) which constitutes the developing unit 20, and therefore, they may be collectively referred to as a developing frame.

A magnet roller 34 is provided inside the developing roller 32. In the developing unit 20, a developing blade 42 for regulating the toner layer on the developing roller 32 is arranged. A spacing member is mounted to the developing roller 32 at each of opposite ends of the developing roller 32, and the developing roller 32 is kept with a slight gap between the drum 62 by the spacing member and the drum 62 in contact with each other. In addition, as shown in FIG. 3, a blowout prevention sheet 33 for preventing the toner from leaking from the developing unit 20 is provided at an edge of a bottom member 22 so as to contact the developing roller 32. Further, a feeding member 43 is provided in the toner chamber 29 provided by the developing container 23 and the bottom member 22. The feeding member 43 stirs the toner contained in the toner chamber 29 and transports the toner to the toner supply chamber 28.

As shown in FIGS. 4 and 5, the cartridge B is constituted by combining the cleaning unit (first unit) 60 and the developing unit (second unit) 20.

When connecting the developing unit and the cleaning unit with each other, first, the center of the developing first supporting boss 26*a* of the side member 26 of the developing container 23 with respect to a driving-side first hanging hole 71*i* of the cleaning frame 71 and the center of the developing second support boss 23*b* with respect to a non-driving-side second hanging hole 71*j* are first aligned. Specifically, by moving the developing unit 20 in the direction of arrow G, the developing first supporting boss 26*a* and the developing second supporting boss 23*b* are fitted into the first hanging hole 71*i* and the second hanging hole 71*j*. By this, the developing unit 20 is movably connected with the cleaning unit 60. More specifically, the developing unit 20 is rotatably (pivotably) connected with the cleaning unit 60. Thereafter, the side member 76 is assembled to the cleaning unit 60, thus forming the cartridge B.

In this embodiment, the non-driving side urging member 46L (FIG. 4) and the non-driving side urging member 46R (FIG. 4) are compression springs. By the urging force of these springs, the developing unit 20 is urged by the cleaning unit 60, and the developing roller 32 is reliably pressed toward the drum 62. The developing roller 32 is kept at a predetermined distance from the drum 62 by the gap keeping members 38 mounted to the opposite ends of the developing roller 32.

<Advancing/Retracting Mechanism for Coupling Member>

The coupling member 64 and the advancing/retracting mechanism portion for advancing/retracting the coupling member will be described. The coupling member 64 is a member (drive input member, input coupling) for receiving a driving force (rotational force) for rotating the drum 62 and the developing roller 32 from the outside of the cartridge (that is, the image forming apparatus main assembly).

Figure 6:
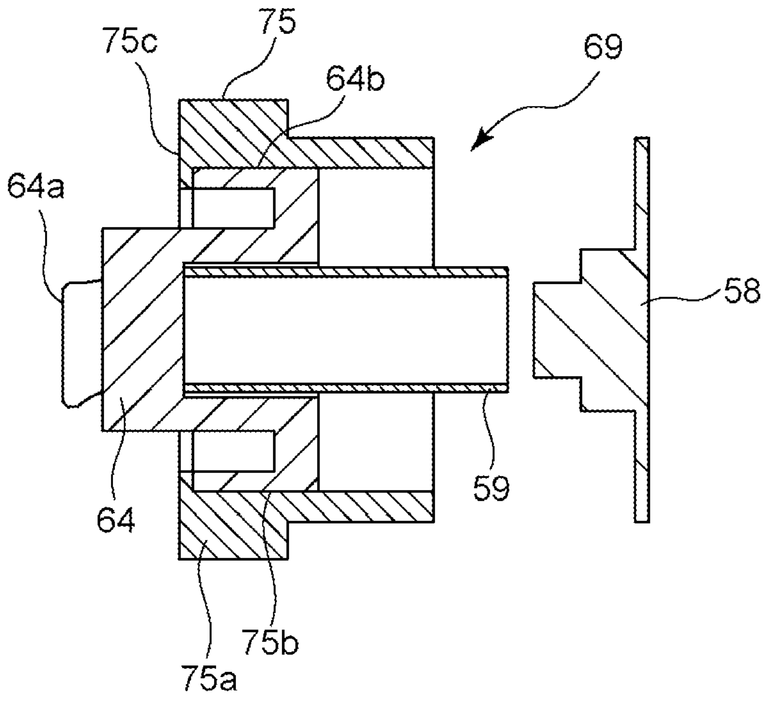
FIG. 6 is an illustration of the structure of a driving side flange unit.
Figure 25:
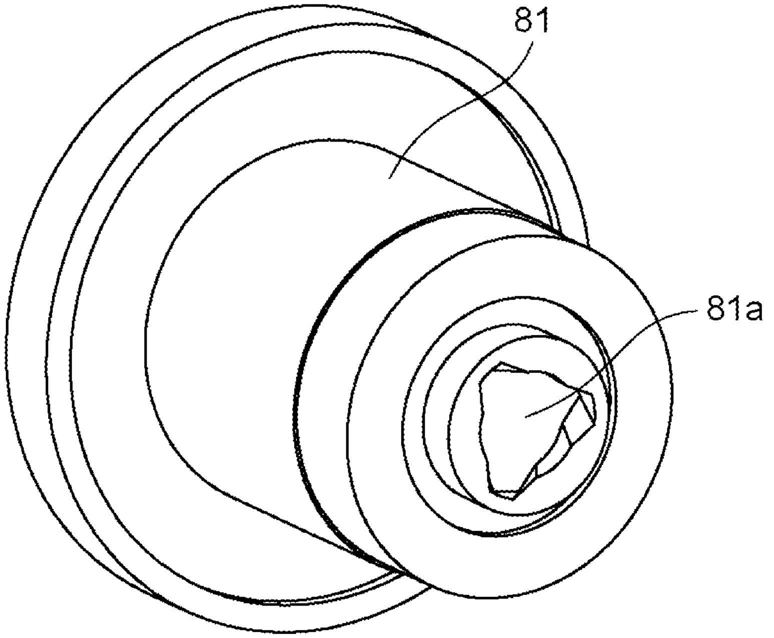
FIG. 25 is a perspective view of a main assembly drive transmission member.

FIG. 25 is a perspective view of the drive transmission member (drive output member) 81. As shown here, the drive transmission member 81 includes a recess (drive transmission portion 81*a*) having a substantially triangular shape. The driven transmission portion 64*a* of the coupling member 64 engages with the recess (drive transmission portion 81*a*), and the coupling member 64 receives the driving force. Referring to FIG. 6, the driving side flange unit 69 will be described.

The coupling member 64 is provided at the end of the photosensitive drum 62. That is, the coupling member 64 is movably supported by the flange member 75 fixed to the end of the photosensitive drum 62.

The driving side flange unit 69 according to this embodiment includes the coupling member 64, the driving side flange member 75, a lid member 58, and a first pressing member 59. The coupling member 64 includes a driven transmission portion (driving force receiving portion) 64*a* and a drive transmission portion 64*b*. The driving force is transmitted from the drive transmission member (drive output member) 81 (FIGS. 14 and 25) of the apparatus main assembly A to the driven transmission portion 64*a*. The drive transmission portion 64*b* is supported by the driving side flange member 75, and at the same time transmits drive to the driving side flange member 75.

The driving side flange member 75 includes a gear portion 75*a* that transmits drive to the gear member 36 (FIG. 27) provided at the end of the developing roller, a coupling support portion 75*b* (FIG. 26), and the like. After the coupling member 64 is inserted into the inner periphery (coupling support portion 75*b*) of the driving side flange member 75, the first pressing member 59 for urging the coupling member 64 toward the driving side is inserted. After that, the lid member 58 is fixed to the end portion 75*c* of the driving side flange member 75 by welding or the like to form the driving side flange unit 69.

Figure 26:
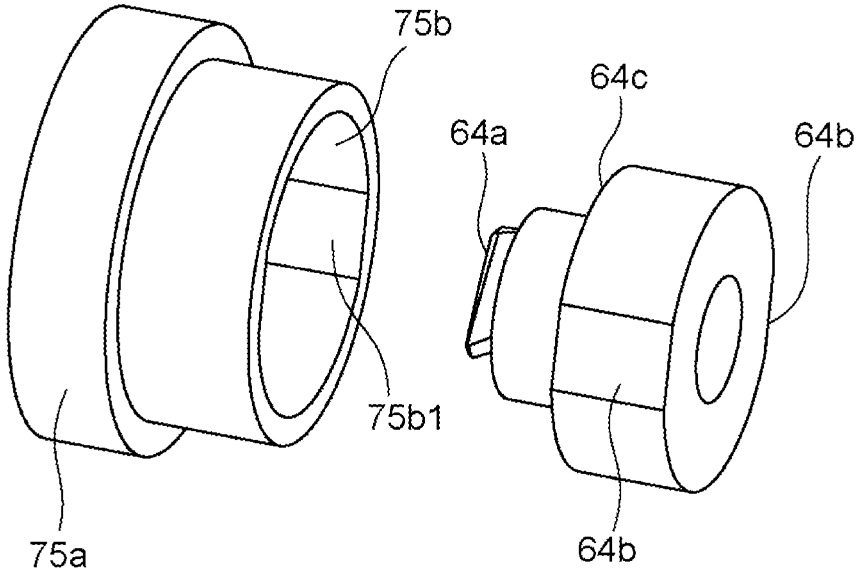
FIG. 26 is an illustration of a coupling structure between the coupling member and the driving side flange member.

FIG. 26 shows a perspective view of the driving side flange member 75 and the coupling member 64. The inner peripheral surface of the driving side flange member 75 serves as a coupling support portion 75*b*. The driving side flange member 75 supports the coupling member 64 by supporting the outer peripheral surface of the coupling member 64 on the inner peripheral surface (coupling support portion 75*b*). Then, of the outer peripheral surfaces of the coupling member 64, two surfaces symmetrically arranged with respect to the rotation axis are flat portions. This flat surface portion is the drive transmission portion 64*b* of the coupling member 64. The inner peripheral surface 75*b* of the flange member 75 is also provided with two flat surface portions 75*b*1 corresponding to the drive transmission portion 64*b*. The flat surface portion of the flange member 75 serves as the driven transmission portion 75*b*1 of the flange member 75. That is, the driving force is transmitted from the coupling member 64 to the flange member 75 by the drive transmission portion 64*b* of the coupling member 64 contacting the transmitted portion 75*b*1 of the flange member 75.

Figure 8:
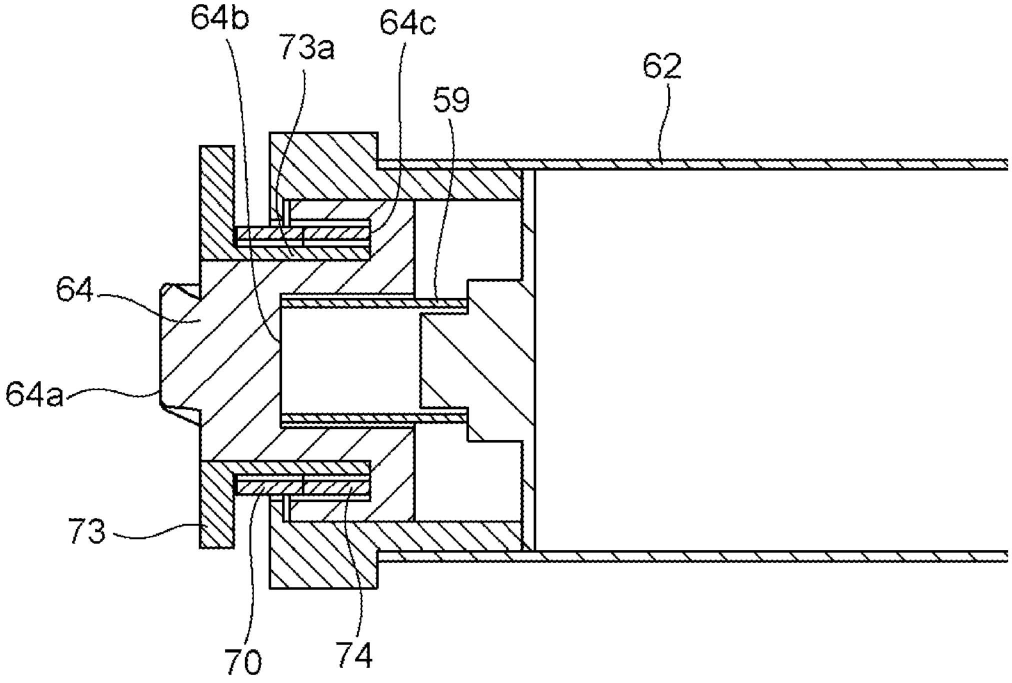
FIG. 8 is a longitudinal partial sectional view of a drive unit end of a drum unit.

The driving side flange 75 of the driving side flange unit 69 is fixed to the end portion of the photosensitive drum 62 by means such as press fitting or clamping (FIG. 8). By this, the driving force (rotational force) that the coupling member 64 receives from the drive transmission member 81 (FIGS. 14 and 25) is transmitted to the photosensitive drum 62 via the driving side flange 75. That is, the coupling member 64 is connected to the end portion of the photosensitive drum via the driving side flange member 75, and therefore, the coupling member 64 can transmit the drive toward the photosensitive drum 62. Next, FIG. 27 shows an exploded perspective view of the cartridge.

Figure 27:
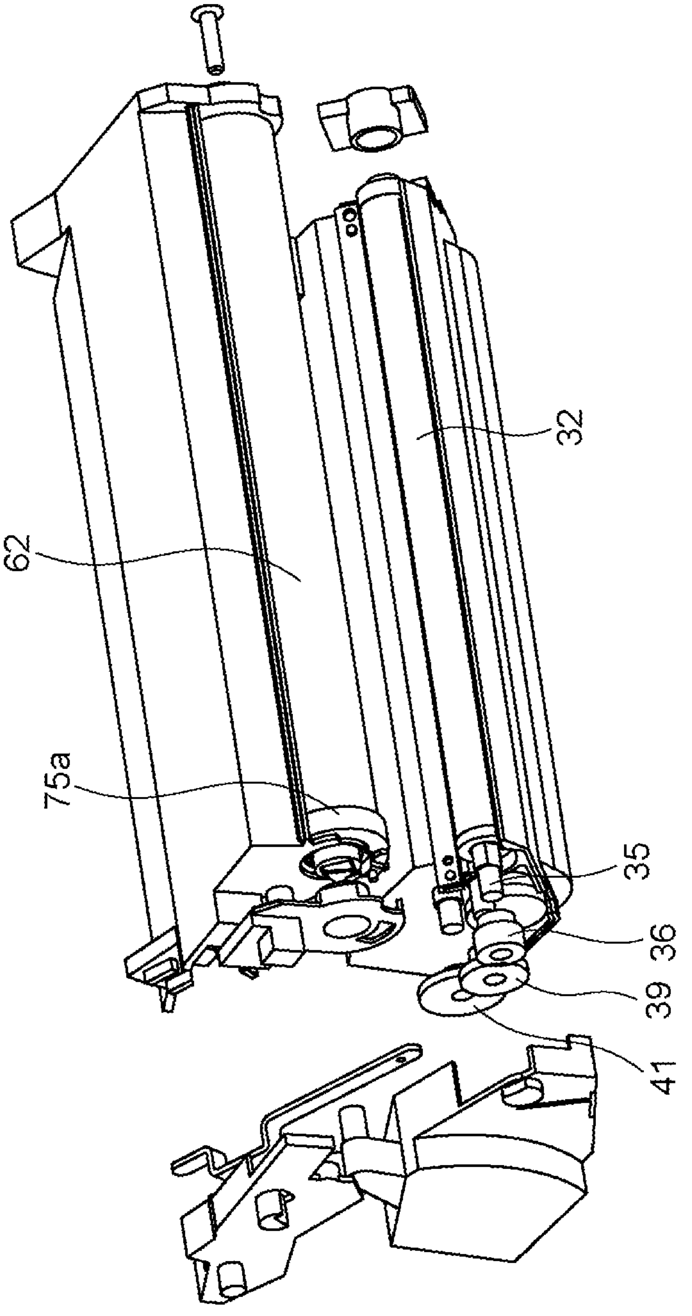
FIG. 27 is an exploded perspective view of the cartridge.

As shown in FIG. 27, the driving force (rotational force) is transmitted from the driving side flange 75 to the developing roller 32 via the gear 75*a*. That is, the gear 75*a* meshes with the developing roller gear 36 and transmits the rotation of the driving side flange 75 to the developing roller gear 36. The developing roller gear 36 is a gear provided on the developing roller 32, and more specifically, is engaged with a shaft portion of a developing roller flange 35 fixed to an end portion of the developing roller 32. Therefore, the rotation of the developing roller gear 36 is transmitted to the developing roller 32 via the developing roller flange 35. Further, the developing roller gear 36 also transmits the drive to the feeding member gear 41 via the idler gear 39. The feeding member gear 41 is a gear provided on the feeding member 43 (FIG. 3), and when the feeding member gear 41 rotates, the feeding member 43 also rotates.

That is, the driving side flange 75 is a drive transmission member (cartridge side drive transmission member) for transmitting drive from the coupling member 64 to the drum 62, the developing roller 32, the feeding member 43, and the like. In this embodiment, the driven transmission portion 64*a* of the coupling member 64 has a substantially triangular cross-section and a projection shape (projection). Specifically, a substantially triangular cross-section twisted counterclockwise with respect to the axis of the photosensitive member drum from the driving side to the non-driving side was employed. However, the driven transmission portion 64*a* is not limited to such a shape, and may be any shape that engages the driving transmission member 81 (FIG. 25) and can receive a driving force. In this embodiment, the drive transmission member 81 of the main assembly A of the apparatus is provided with a substantially triangular recess (drive transmission portion 81*a*; see FIG. 25) that can be engaged with the driven transmission portion 64*a*. Therefore, the driven transmission portion 64*a* has a projection shape that engages with the recess portion. This projection shape may be plural instead of one, and the shape is not limited to a triangle. In addition, the projection shape has a shape in which a triangle is twisted, but the triangle does not necessarily have to be twisted.

Figure 14:
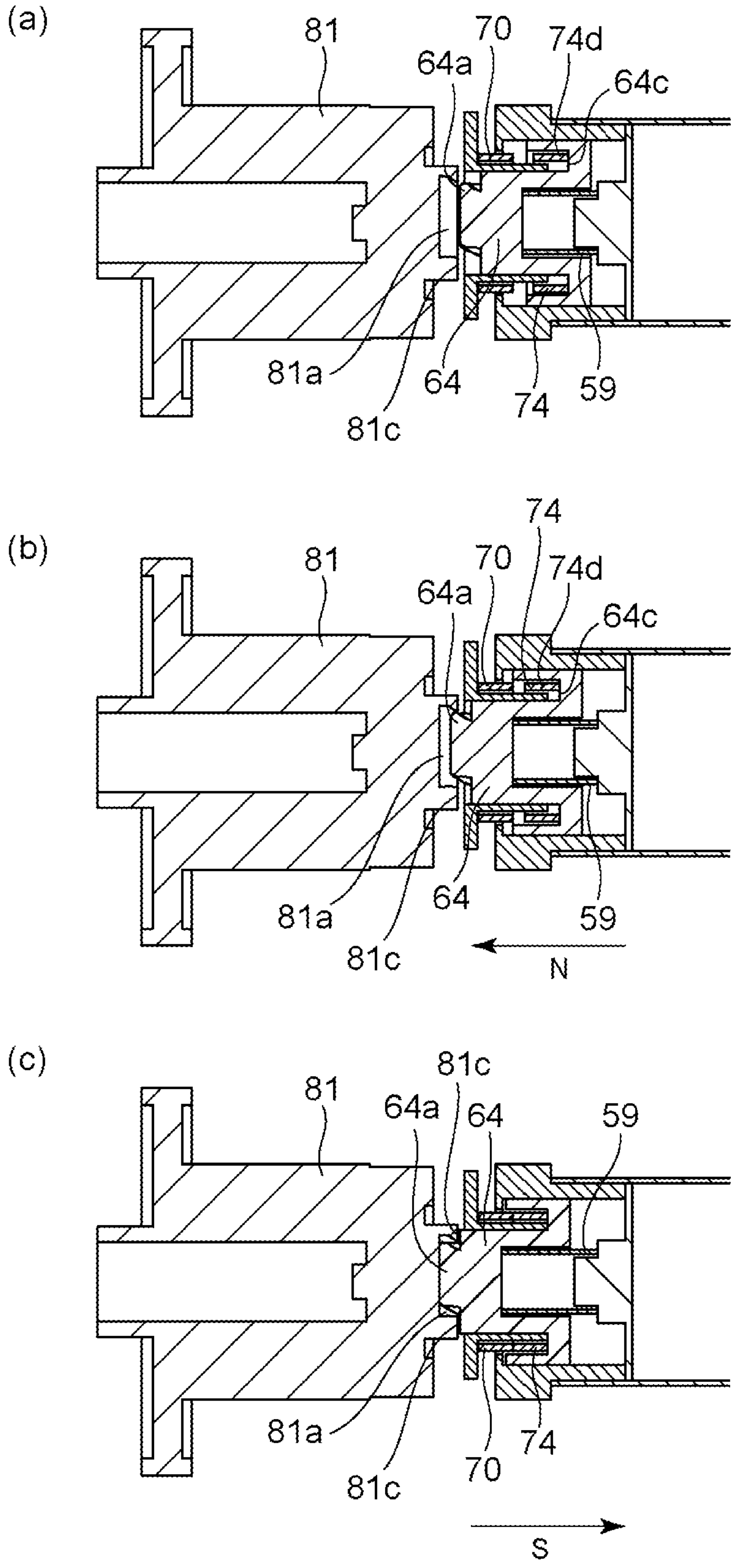
FIG. 14, parts (a), (b), and (c), is a longitudinal sectional view of a drive transmission member 81 and a coupling member 64 of the apparatus main assembly A.

As shown in FIG. 14, the coupling member 64 is structured to be movable back and forth along the longitudinal direction (axial direction). Part (a) of FIG. 14 shows a state in which the coupling member is retracted and disengaged from the drive transmission member 81. In part (c) of FIG. 14, the coupling member 64 is advanced and engaged with the drive transmission member 81. That is, FIG. 14(*c*) shows the state of matching. In addition, part (b) of FIG. 14 shows a state (a process of forward/backward movement) between part (a) of FIG. 14 and part (c) of FIG. 14.

Therefore, next, an operating unit (an operating mechanism, an advancing/retracting unit, an advancing/retracting mechanism) that enables such a longitudinal movement of the coupling member 64 will be described referring to FIGS. 7, 8, and 9.

Figure 7:
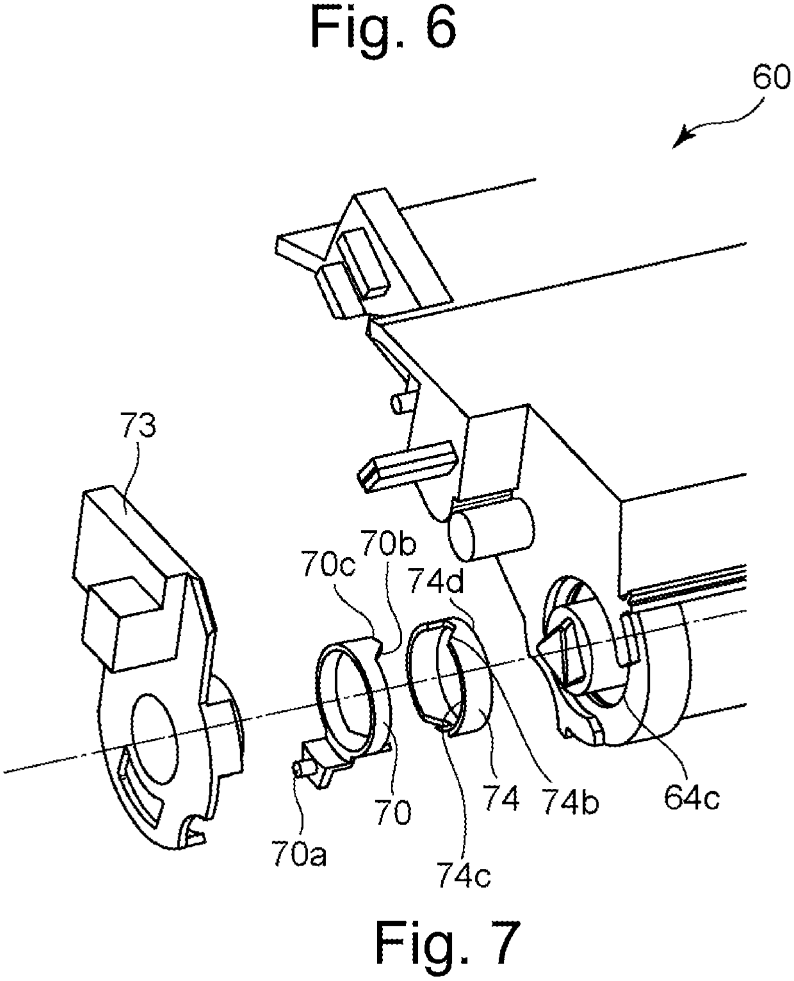
FIG. 7 is a partial perspective view of a cleaning unit including an operating unit.

FIG. 7 is a partial perspective view illustrating the structure of the operation unit provided in the cleaning unit 60 according to this embodiment.

FIG. 8 is a partial longitudinal cross-sectional view of the drive unit end of the drum unit according to this embodiment.

Figure 9:
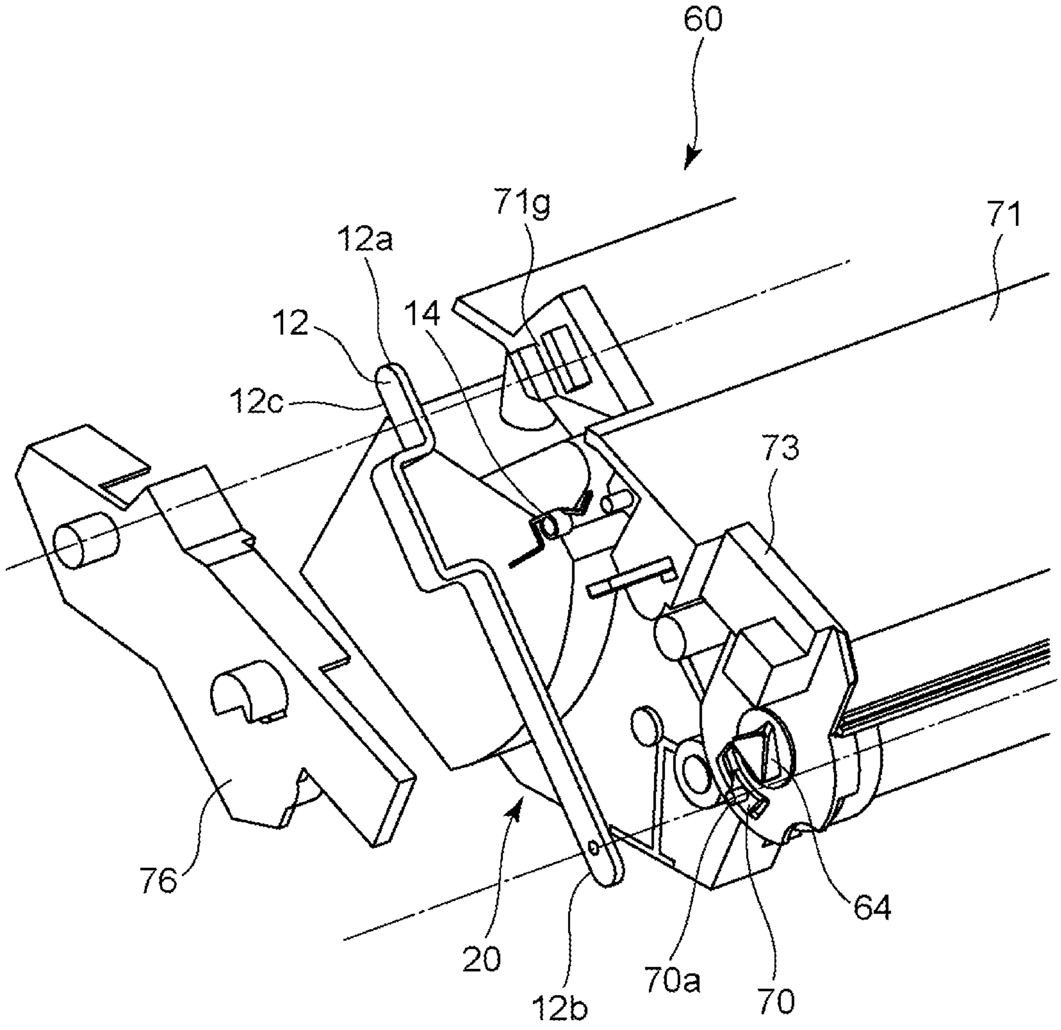
FIG. 9 is a partial perspective view of the cleaning unit including an operating unit.

FIG. 9 is a partial perspective view illustrating the operation unit according to the present embodiment similar to FIG. 7.

As shown in FIGS. 7 to 9, the operating unit includes an outer cylindrical cam member 70, an inner cylindrical cam member 74, a lever member 12, a second pressing member (elastic member, urging member) 14, and the like. The operating unit is a control mechanism (control unit) that is connected to the coupling member 64 and controls the movement (advancing/retracting movement) of the coupling member 64.

The outer cylindrical cam member 70 comprises a cylindrical cam portion 70*b* and a lever member engaging portion 70*a* for engaging the lever member 12. Similar to the outer cylindrical cam member 70, the inner cylindrical cam member 74 is provided with a longitudinal position regulating surface 74*d* which contacts the cylindrical cam portion 70*b* and the coupling member 64 to restrict the longitudinal position of the coupling member 64.

As shown in FIGS. 7 and 8, in this embodiment the outer cylindrical cam member 70 and the inner cylindrical cam member 74 are structured so as to be supported by the outer peripheral portion 73*a* of the drum bearing member 73. A lever member engaging portion 70*a* of the outer cylindrical cam member 70 is structured so as to be exposed to the outside of the drum bearing member 73 (FIG. 9).

After the developing unit 20 is supported by the cleaning unit 60, the lever member 12 engages with the lever member engaging portion 70*a* of the outer cylindrical cam member 70 at the engaged portion 12*b* provided at one end of the lever member 12. In addition, the lever member 12 is arranged such that the slide portion 12*c* at the other end is positioned between the slide ribs 71*g* provided on the cleaning frame 71. That is, the projection-shaped engaging portion 70*a* enters the hole-shaped engaged portion 12*b* to engage with each other, and the lever member 12 is connected to the outer cylindrical cam member 70.

After the lever member 12 is arranged, the second pressing member 14, which presses and urges the lever member 12, is arranged between the cleaning frame 71 and the lever member 12. In this embodiment, a torsion coil spring is used as the second pressing member (urging member) 14, but the present invention is not limited to this example, and as another example, an elastic member (spring) having a different structure such as a compression coil spring can also be preferably used.

By fixing the side member 76 to the cleaning frame 71, a process cartridge including the operation unit according to this embodiment is provided.

This operating unit is connected with the coupling member 64 at the inner cylindrical cam 74, and the coupling member 64 can be moved back and forth (moved) by operating the lever member 12. Although the detailed operation principle will be described hereinafter, the lever member 12 is connected the outer cylindrical cam member 70, and therefore the outer cylindrical cam 70 rotates as the lever member 12 moves substantially linearly. The outer cylindrical cam 70 is in contact with the inner cylindrical cam 74, and the rotational movement of the outer cylindrical cam 70 causes the inner cylindrical cam 74 to move back and forth in the longitudinal direction. The inner cylindrical cam 74 is in contact with the coupling member 62, and the forward/backward movement of the inner cylindrical cam 74 and the forward/backward movement of the coupling member 62 are interrelated with each other.

That is, the lever member 12 is functionally (indirectly and operatively) connected with the coupling member 64 by way of the outer cylindrical cam member 70 and the inner cylindrical cam member 74, so that the lever member 12 and the coupling member 64 move interrelatedly with each other.

Referring to FIGS. 1 and 10 to 14, the advancing and retracting movement of the coupling member 64 in interrelation with the movement of the lever member 12 will be described. The lever member 12 is structured to move by abutting to and separating from a cartridge pressing member (pressing force applying member) provided in the apparatus main assembly A.

Figure 1:
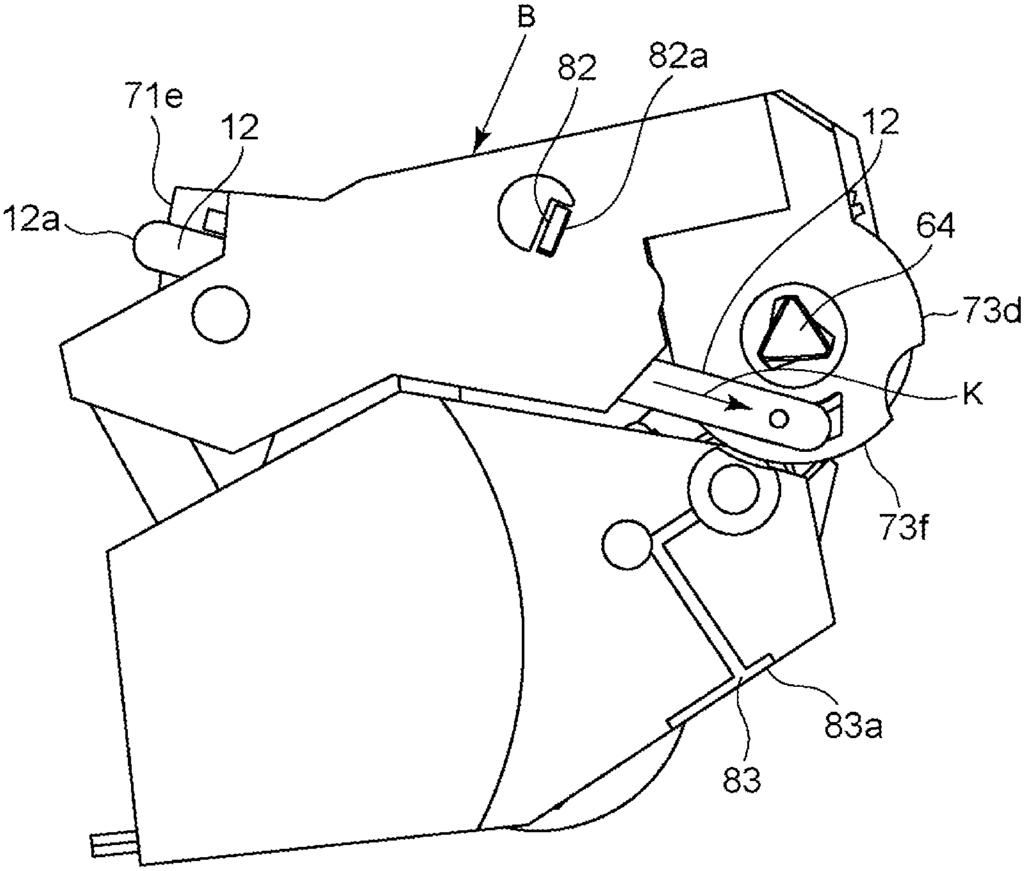
FIG. 1 is a side view of a process cartridge B.

FIG. 1 is a side view of the process cartridge B according to this embodiment.

Figure 10:
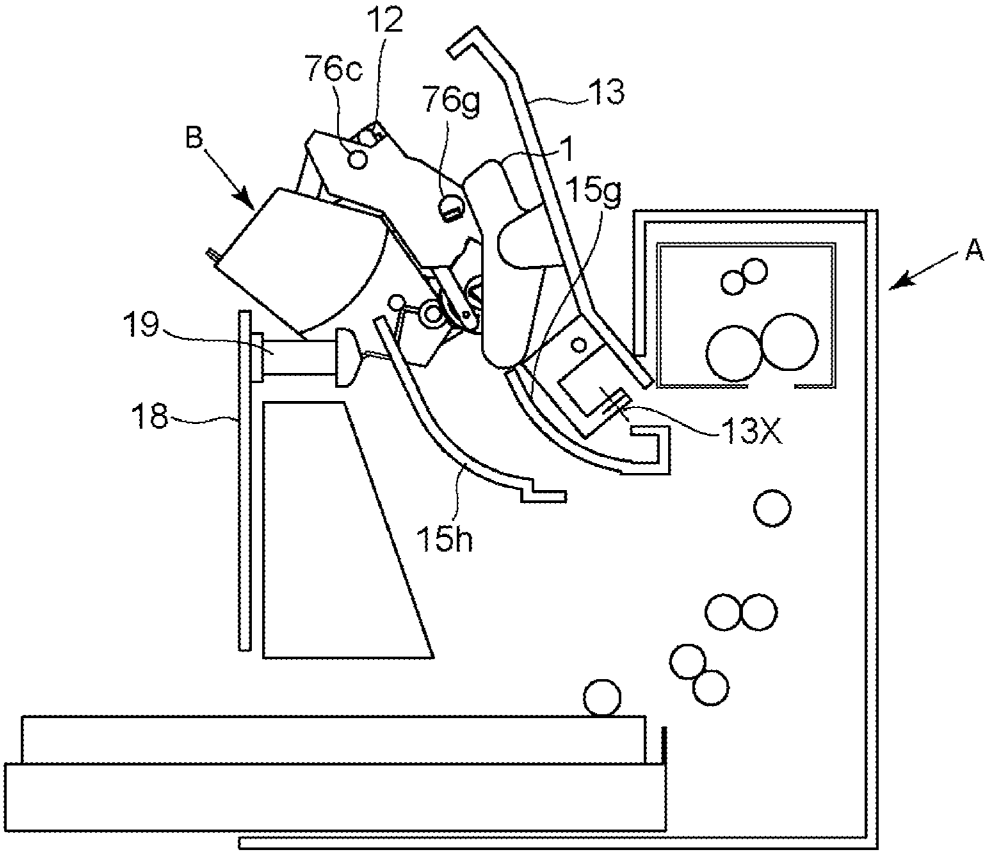
FIG. 10 is a sectional view of the image forming apparatus in a state before the opening/closing door 13 of the apparatus main assembly is opened and the process cartridge B is mounted to the apparatus main assembly A.

FIG. 10 is a sectional view of the image forming apparatus in a state before the opening/closing door 13 of the apparatus main assembly is opened and before the process cartridge B is mounted to the apparatus main assembly A.

Figure 11:
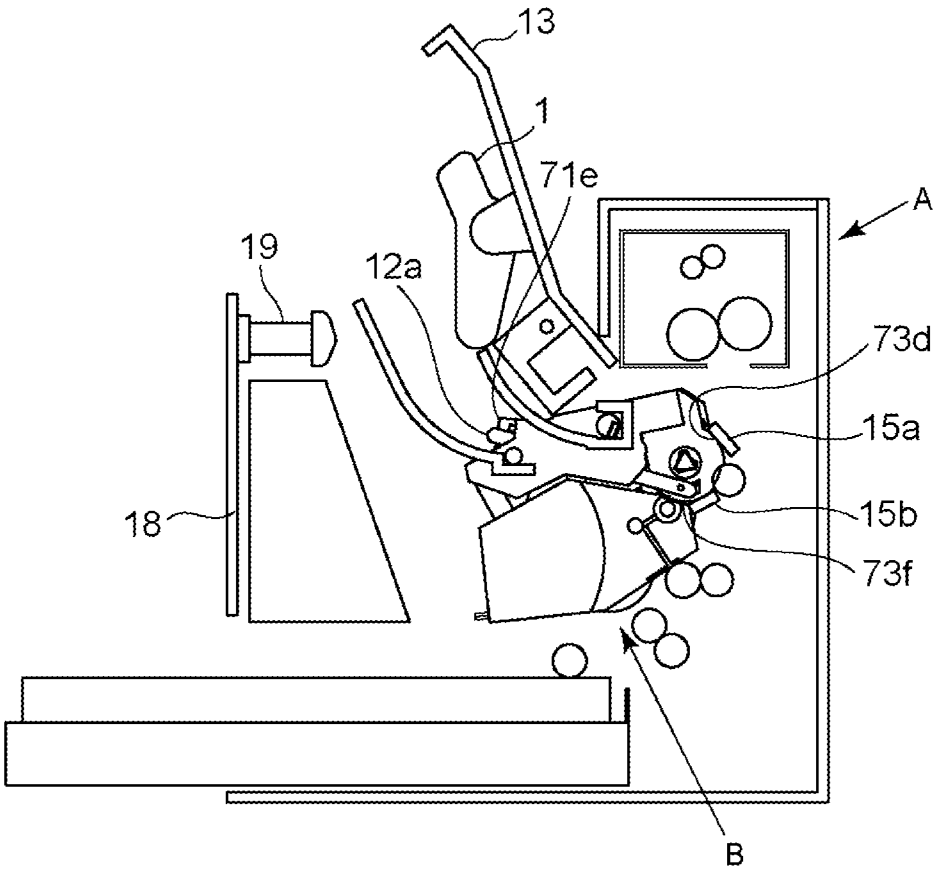
FIG. 11 is a cross-sectional view of the image forming apparatus in a state in which the process cartridge B is completely mounted to the apparatus main assembly A and the opening/closing door 13 is not closed.

FIG. 11 is a cross-sectional view of the image forming apparatus in a state where the process cartridge B is completely mounted to the apparatus main assembly A with the opening/closing door 13 not closed.

Figure 12:
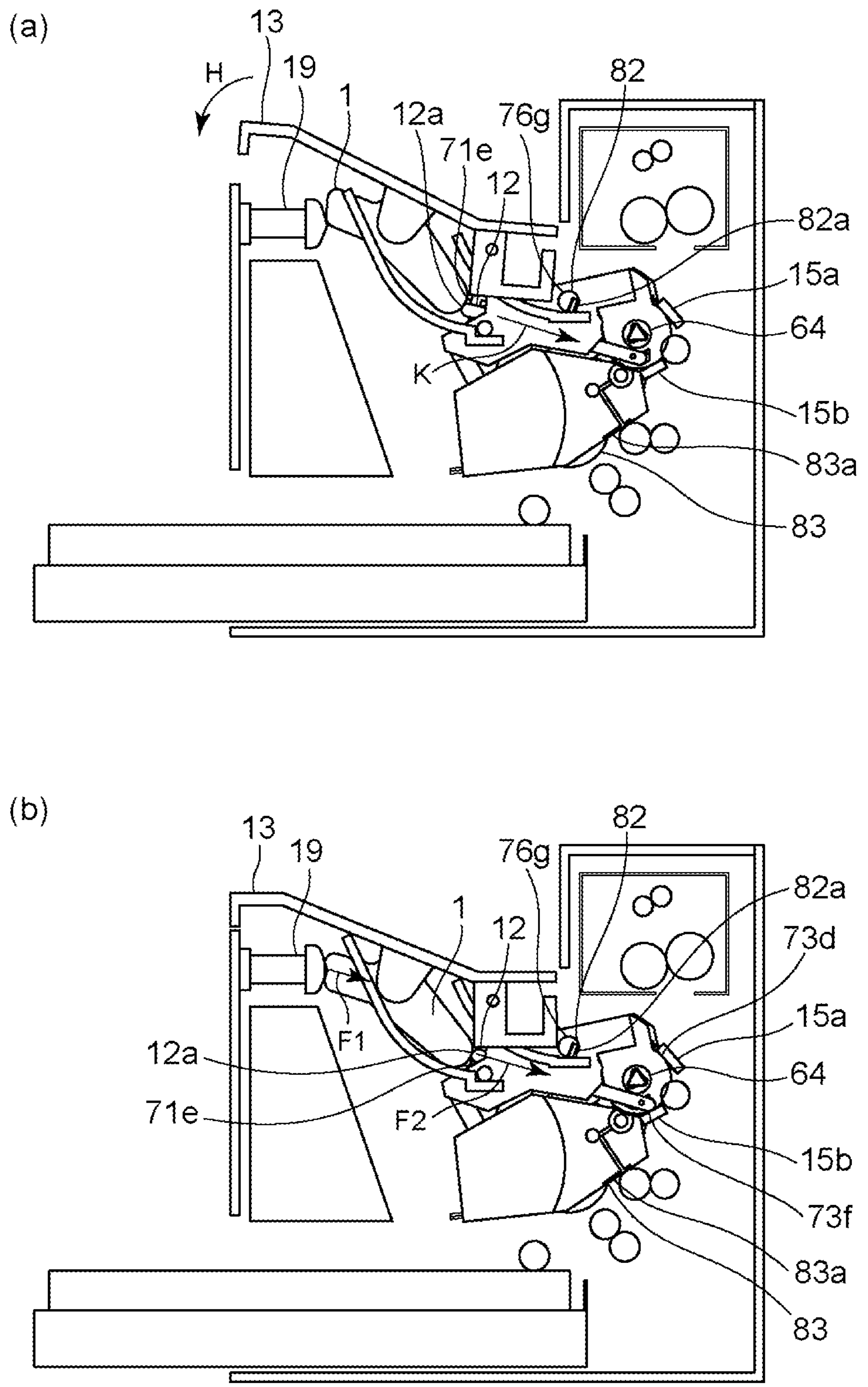
FIG. 12, parts (a) and (b), is a sectional view of the image forming apparatus for explaining the process in which the cartridge pressing member contacts the lever member according to this embodiment.

Part (a) of FIG. 12 is a cross-sectional view of the image forming apparatus in a state where the cartridge pressing member 1 starts to contact the pressed portion 12*a* of the lever member 12 in the process of closing the opening/closing door 13 of the apparatus main assembly A in the direction H in the drawing.

Part (b) of FIG. 12 is a sectional view of the image forming apparatus with the opening/closing door 13 of the apparatus main assembly A completely closed.

Figure 13:
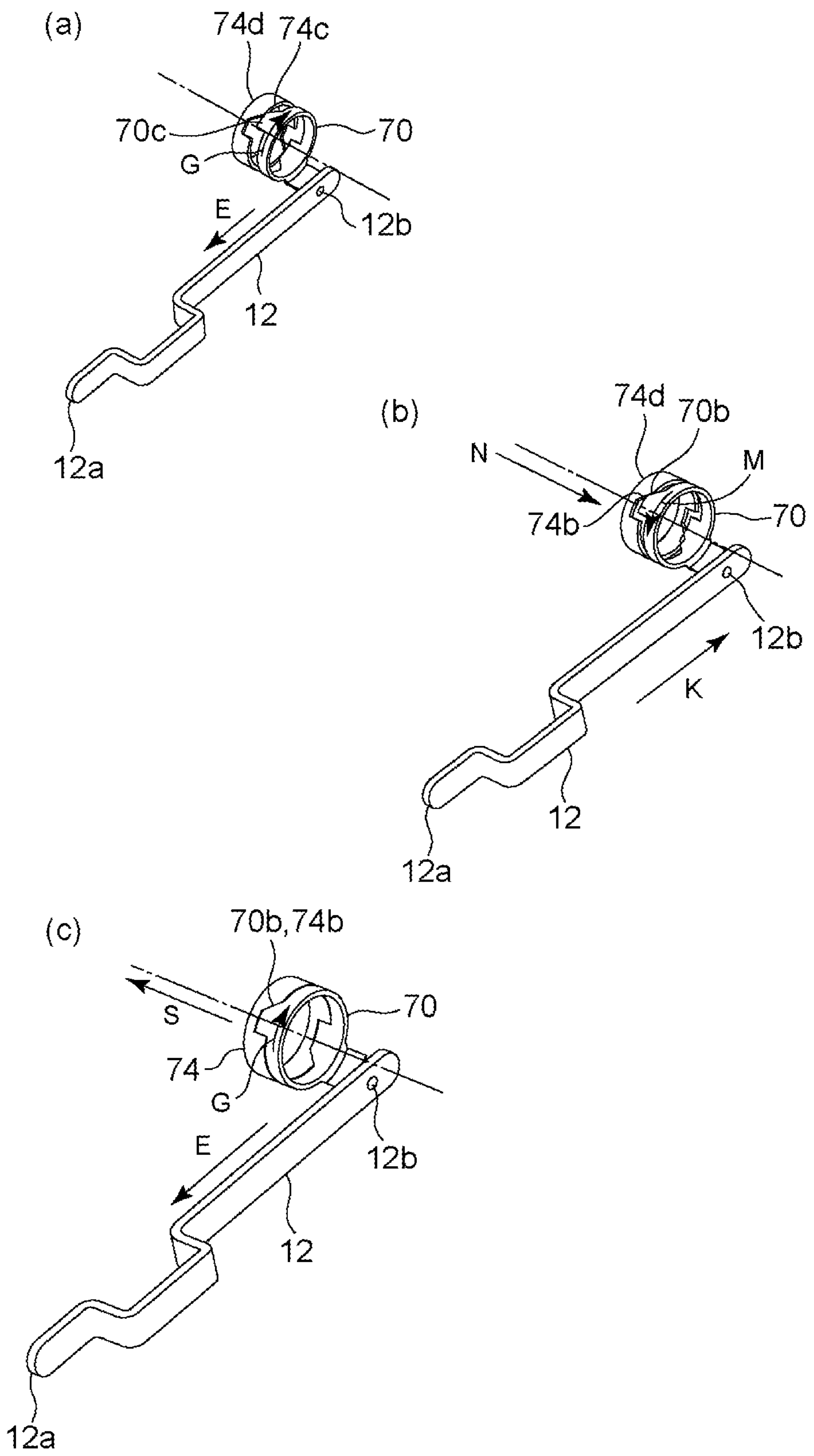
FIG. 13, parts (a), (b), and (c), is a perspective view of an outer cylindrical cam member, an inner cylindrical cam member, and a lever member.

FIG. 13 is a perspective view of the lever member 12, the outer cylindrical cam member 70, and the inner cylindrical cam member 74 according to this embodiment. Here, part (a) of FIG. 13 is a perspective view of the state (FIG. 10, FIG. 11, part (a) of FIG. 12) before the cartridge pressing member 1 comes into contact with the pressed portion 12*a* of the lever member 12. Part (c) of FIG. 13 is a perspective view in the state in which the opening/closing door 13 is completely closed, and a predetermined pressure is applied from the cartridge pressing spring 19 to the contact portion 12*a* of the lever member 12 (part (b) of FIG. 12). Part (b) of FIG. 13 is a perspective view in a state between the states of FIGS. 13(*a*) and 13(*c*) (part (a) of FIGS. 12 and 12(*b*)).

FIG. 14 is a longitudinal sectional view of the drive transmission member 81 and the coupling member 64 of the apparatus main assembly A according to this embodiment as described above. Here, similar to FIG. 13, part (a) of FIG. 14 is a longitudinal sectional view of a state (FIGS. 10, 11, and part (a) of FIG. 12) before the cartridge pressing member is brought into contact with the pressed portion 12*a* of the lever member 12. Part (c) of FIG. 14 is a longitudinal sectional view of a state in which the opening/closing door 13 is completely closed and a predetermined pressure from a force F1 of the cartridge pressing spring 19 is applied to the contact portion 12*a* of the lever member 12 (part (b) of FIG. 12). Part (b) of FIG. 14 is a longitudinal sectional view in a state (part (a) of FIGS. 12 to 12(*b*)) between the states of part (a) and part (c) of FIG. 14. As shown in FIG. 10, the process cartridge B is mounted to the apparatus main assembly A after the opening/closing door 13 of the apparatus main assembly A is opened by being rotated about the rotation center 13X. The opening/closing door 13 is an opening/closing member for opening and closing a cartridge mounting portion (space for mounting the cartridge) provided inside the apparatus main assembly A. Guide rails (guide members) 15*h*, 15*g* for guiding the guided portions 76*c*, 76*g* of the process cartridge B are provided in the mounting portion, and the cartridge B of the apparatus main assembly A is guided along the guide rails 15*h*, 15*g*, so that it is inserted into the mounting portion (only the driving side is shown). As shown in FIG. 11, the mounting of the process cartridge B is completed when positioned portions 73*d* and 73*f* provided on the drum bearing member 73 are brought into contact with the apparatus main assembly positioning portions 15*a* and 15*b* or inserted to the neighborhood thereof.

Two cartridge pressing members 1 are mounted to opposite ends of the opening/closing door 13 in the axial direction (FIG. 11). Each of the two cartridge pressing members 1 is movable with respect to the opening/closing door 13 within a predetermined range.

The two cartridge pressing springs 19 are mounted to opposite ends in the longitudinal direction of the front plate 18 provided in the main assembly A of the apparatus. The cleaning frame 71 is provided with cartridge pressed portions (portions-to-be-pressed in the cartridge) 71*e*, which function as urging force receiving portions of the cartridge pressing spring 19, at the opposite longitudinal ends. As will be described hereinafter, with the opening/closing door 13 being completely closed, a predetermined pressure F2 is applied from the cartridge pressing spring 19 to the cartridge pressed portion 71*e* and the lever member pressed portion 12*a*.

Next, the forward/backward movement of the coupling member 64 will be described. In the state before the cartridge pressing member 1 is brought into contact with the lever member 12 (FIGS. 10, 11, and part (a) of FIG. 12), the lever member 12 is urged by the second pressing member 14 (FIG. 9) in part (a) of FIG. 13 urged in the E direction.

The outer cylindrical cam member 70, which is engaged with the lever member 12 and is supported so as to be rotatable about the drum axis, is urged in the G direction in part (a) of FIG. 13. The projecting surface 70*c*, which is closest to the nondriving side, of the outer cylindrical cam member 70 contacts the innermost projecting surface 74*c* of the inner cylindrical cam member 74.

As shown in part (a) of FIG. 14, the coupling member 64 is urged toward the driving side by the first pressing member 59, and the coupling contact portion 64*c* is pressed against the coupling member longitudinal position restricting surface 74*d* of the inner cylindrical cam member 74. That is, the longitudinal position of the coupling member 64 is determined depending on the longitudinal position (position in the longitudinal direction) of the inner cylindrical cam member 74. The first pressing member 59 is used to operate the coupling member 64 on the driving side, and therefore, the first pressing member 59 can also be regarded as a portion of the above-mentioned operating unit. In this embodiment, the compression coil spring is used as the first pressing member 59 but it is also possible to urge the coupling member 64 by using an elastic member having another shape.

When the cartridge B is not mounted to the apparatus main assembly A, the inner cylindrical cam member 74 is arranged to retract the coupling member 64 into the drum against the elastic force of the first pressing member 59. That is, in the state in which the main assembly door 13 is released as shown in FIGS. 10 and 11, or in the state before the cartridge pressing member 1 abuts on the lever member 12, the coupling member 64 is located at the most non-driving side. The position in which the coupling member 64 is retracted to the non-driving side (that is, the inner side of the cartridge B) is referred to as a first position (retracted position, inner position, disengaged position, released position). As shown in part (a) of FIG. 14, the structure is such that when the coupling member 64 is at the first position, the driven transmission portion 64*a* of the coupling member 64 and the driving transmission portion 81*a* of the drive transmission member 81 do not overlap in the longitudinal direction. That is, the process cartridge B can be smoothly mounted and dismounted to and from the apparatus main assembly A without interference between the coupling member 64 and the drive transmission member 81 of the apparatus main assembly.

When the opening/closing door 13 is closed after the cartridge B is mounted to the apparatus main assembly A, the cartridge pressing member 1 provided on the opening/closing door 13 contacts the lever member 12. By being pressed by the pressing member 1, the movement of the lever member 12 is started. The coupling member 64 moves from the first position (retracted position) to the driving side in interrelation with the movement of the lever member 12. This movement will be described below.

As shown in part (a) of FIG. 12, when the mounting of the process cartridge B is completed and the opening/closing door 13 is closed in the direction H in the part (a) of FIG. 12, the contact between the cartridge pressing member 1 and the lever member 12 is started, so that the pressing force of the cartridge pressing spring 19 begins to act on the lever member 12. Due to this pressing force, the lever member 12 starts to move in the K direction in the Figure against the urging force (elastic force) of the second pressing member 14. As shown in part (b) of FIG. 13, when the lever member 12 moves in the K direction, the outer cylindrical cam member 70 engaged with the lever member 12 starts to rotate in the M direction in the Figure.

An inner cylindrical cam member 74 is adjacent to the outer cylindrical cam member 70. The inner cylindrical cam member 74 is structured not to be rotatable but movable only in the axial direction. By the rotation of the outer cylindrical cam member 70 in the M direction, the cylindrical cam portion 70*b* of the outer cylindrical cam member 70 and the cylindrical cam portion 74*b* of the inner cylindrical cam member 74 are contacted to each other at their slopes. Then, the inner cylindrical cam member 74 starts to move toward the driving side (N direction) along the longitudinal direction by the pressing force of the first pressing spring member 59. When the inner cylindrical cam member 74 moves in the N direction, the coupling member 64 pressed by the first pressing spring member 59 is also allowed to move in the longitudinal direction. By this movement of the coupling member 64, the coupling member 64 is advanced toward the driving side (that is, the outside of the cartridge B). Then, the driven transmission portion 64*a* of the coupling member 64 is in a relationship capable of engaging with the driving transmission portion 81*a* of the driving transmission member of the apparatus main assembly in the longitudinal direction (part (b) of FIG. 14). When the opening/closing door 13 is completely closed (state of part (b) of FIG. 12), the phases of the cylindrical cam portions of the outer cylindrical cam member 74 and the inner cylindrical cam member 70 align with each other, as shown in part (c) of FIG. 13. The structure is such that at this time, the inner cylindrical cam member 74 and the coupling member 64 are positioned on the most driving side by the urging force of the first pressing member 59. In this embodiment, the position in which the coupling member 64 advances toward the driving side is called the second displacement (advance position, outer position, engagement position, drive transmission position).

The coupling member 64 located at the second position (advance position) can be regarded as advancing toward outside of the photosensitive drum 62 (outside of the cartridge).

On the other hand, the coupling member 64 located at the above-described first position (withdrawal position) can be regarded as being withdrawn toward inside of the photosensitive drum 62 (inside of the cartridge).

In this embodiment, the coupling member 64 moves along the axis of the photosensitive member drum 62 substantially parallel with the axis. However, the structure is not limited to such a structure, and, for example, the coupling member 64 may be moved to the first position (retracted position) and to the second position (advanced position), by moving the coupling member 64 in a direction inclined with respect to the axis.

As shown in part (c) of FIG. 14, the structure is such that when the coupling member 64 is at the second position, the required amount of longitudinal engagement can be secured such that the driven transmission portion 64*a* of the coupling member 64 and the drive transmission portion 81*a* of the drive transmission member 81 are in stable drive transmission.

The position of the lever member 12 when the coupling member 64 is held at the second position (advance position) may also be referred to as the second position (second position of the lever member). The second position of the lever member 12 is a position (an operating position or an acting position position) in which the lever member 12 moves when a force is applied to the lever member 12 from outside of the cartridge B, and an acting position for acting on the coupling member 64. In addition, it is an engaging holding position and an advancement holding position for holding the advanced state of the coupling member 64 and for maintaining the engaged state of the coupling member 64 and the drive transmission member 81.

In addition, as described above, the driven transmission portion of the coupling member 64 according to this embodiment has a twisted triangular shape. Therefore, when the lever member 12 is operated to the second position, the triangular phases of the drive transmission portion 81*a* of the drive transmission member 81 of the apparatus main assembly and the driven transmission portion 64*a* of the coupling member 64 may be not aligned with each other. At this time, in the process in which the coupling member 64 moves to the driving side second position, the drive transmission portion 64*a* comes into contact with the end surface 81*c* of the drive transmission member 81 and stops there. In other words, the drive transmission portion 64*a* cannot engage with the drive transmission portion 81*a*, and therefore, the drive transmission member 81 and the coupling member 64 interfere with each other and the coupling member 64 cannot move to the second position. In this state, the first pressing member 59 is partially compressed.

Even in such a case, drive is input to the apparatus main assembly A and the drive transmission member 81 rotates, so that the phase difference between the drive transmission portion 81*a* and the driven transmission portion 64*a* falls within a certain range. Then, the drive transmission portion 81*a* and the driven transmission portion 64*a* become engageable with each other. At this time, the elastic deformation of the first pressing member 59 that has been compressed is partly eased so that the coupling member 64 can move to the second position. As described above, the first pressing member 59 compresses when the drive transmission member 81 and the coupling member 64 interfere with each other, so that the influence of the interference is imparted to the drive transmission member 81 and the coupling member 64. The first pressing member 59 is also a cushion member (buffer member, damper) for suppressing the influence of interference. When the process cartridge is pulled out by opening the main assembly door 13, the main assembly pressing member 1 separates from the lever member 12 in the process of opening the opening/closing door 13. Thereafter, the lever member 12 starts moving in the E direction from the state of part (c) of FIG. 13 by the urging force of the second pressing member 14 (FIG. 9). By this, the outer cylindrical cam member 70 rotates in the G direction, and the inner cylindrical cam member 74 and the coupling member 64 take the first positions by the shapes 70*b* and 74*b* of the outer and inner cylindrical cam portions. That is, by the lever member 12 moving in the E direction, the coupling member 64 is moved to the first position (retracted position). The position of the lever member 12 when the coupling member 64 is located at the first position may also be referred to as the first position. The first position of the lever member 12 is a position in which no external force is applied to the lever member 12 from the outside of the cartridge (normal position, non-acting position). In addition, the first position of the lever member 12 is a retracted holding position and a retractable position for holding and allowing the retracted state of the coupling member 12, and a mounting allowance position and a removal allowance position in which the cartridge B is mountable to and dismountable from the main assembly A of the apparatus.

Part (a) of FIGS. 13 and 14 show a state in which the lever member 12 and the coupling member 64 are in the first positions, respectively. Part (c) of FIGS. 13 and 14 show a state in which the lever member 12 and the coupling member 64 are in the second positions, respectively. Part (b) of FIG. 13 and part (b) of FIG. 14 respectively show the position (intermediate position) of the process in which the lever member 12 and the coupling member 64 move from the first position to the second position.

By moving the coupling member 64 to the first position (retracted position), the process cartridge B may be taken out from the apparatus main assembly A.

As described above, the lever member 12 is an operation member (moving member) which is operated and moved by a force from outside of the cartridge (that is, the apparatus main assembly A). Then, the movement of the lever member 12 is transmitted to the coupling member 64 by way of the two cam members 70 and 74, by which the coupling member 64 is moved between the first position (retracted position) and the second position (extended position). That is, the lever member 12 is operated to move the coupling member 64.

The two cam members (the outer cylindrical cam member 70 and the inner cylindrical cam member 74) provided in the actuation unit constitute a cam mechanism for interrelating the lever member 12 with the coupling member 64. The lever member 12 is structured to move in a crossing direction crossing the longitudinal direction (substantially perpendicular to the longitudinal direction). The movement of this cross direction is converted into the movement of the coupling member 64 along the longitudinal direction by the cam mechanism.

The first pressing member 59 is an urging member that urges the coupling member 64 toward a predetermined position (second position/advance position). The second pressing member 14 is an urging member that urges the lever member 12 to a predetermined position (first position/normal position).

Figure 28:
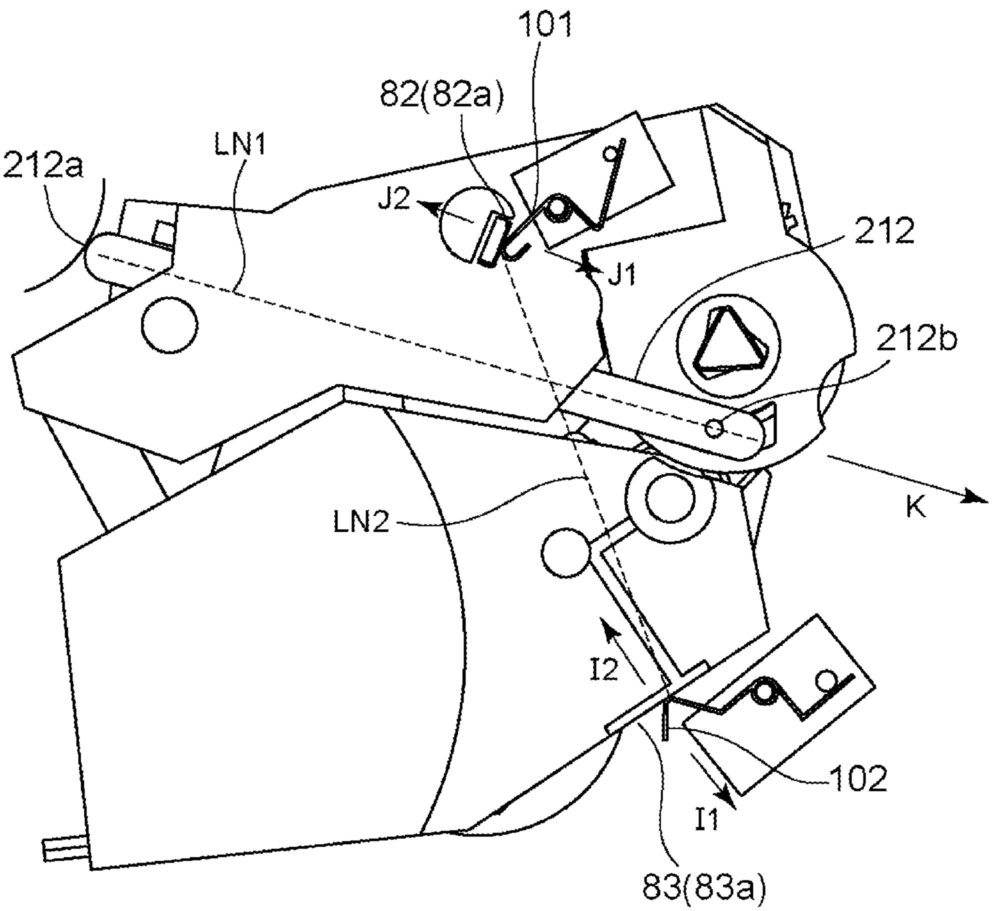
FIG. 28 is an illustration of a side surface of the cartridge and a contact member of the apparatus main assembly.

In this embodiment, as shown in FIG. 1, a contact surface 82*a* of the charging roller contact member 82 is directed toward a downstream side (the side indicated by the arrow K in the Figure) with respect to a movement direction of the lever member 12 from the first position (normal position) to the second position (acting position) That is, the contact surface 82*a* faces in the direction of arrow J1 in FIG. 28.

The charging roller contact member 82 is an electrical contact which is electrically connected to the charging roller 66 and is supplied with a voltage from the main assembly by contacting a charging bias application contact member (main assembly side electrical contact) provided in the apparatus main assembly A.

That is, the contact surface (exposed surface, exposed portion) 82*a* of the charging roller contact member 82 contacts the main assembly side contact member 101 shown in FIG. 28 at a predetermined charging contact pressure. By this, the charging bias voltage is applied from the apparatus main assembly A to the charging roller by way of the charging roller contact member 82. FIG. 28 is an illustration showing the electrical contacts (contact members) of the cartridge B and the apparatus main assembly A.

As shown in FIG. 1, the cartridge B is provided with a developing roller contact member 83 electrically connected to the developing roller 32. The developing roller contact member 83 is supplied with the voltage from the main assembly A column by contacting a developing bias voltage application contact member (electrical contact, FIG. 28) 102 provided in the main assembly A of the apparatus. That is, by the contact surface (exposed surface, exposed portion) 83*a* of the developing roller contact member 83 contacting the contact member 102 on the apparatus main assembly side, the developing bias voltage is applied from the apparatus main assembly A to the developing roller 32 by way of the developing roller contact member 83.

The contact surface 83*a* of the developing roller contact member is also structured to face the downstream side (K direction in the drawing) in the moving direction of the lever member 12. That is, the contact surface 83*a* faces in the direction of arrow I1 in FIG. 28.

When the opening/closing door 13 is closed and the cartridge pressing member 1 presses the lever member 12, the pressing force is added toward the downstream side (the side indicated by the arrow K) in the moving direction of the lever member 12. As described above, the charging roller contact member 82 (contact surface 82*a*) and the developing roller contact member 83 (contact surface 83*a*) also face the downstream side. Therefore, by using the pressing force (the force acting in the direction of arrow K) by the cartridge pressing member 1, the charging roller contact member 82 (contact surface 82*a*) and the developing roller contact member 83 (contact surface 83*a*) can be urged toward the corresponding main assembly contacts of the apparatus main assembly. By this, it is possible to stabilize the contact state between the contact members (82, 83) on the cartridge side contact member and the main assembly contact member.

In addition, the positioned portions 73*d* and 73*f* of the cartridge B can be reliably pressed against the positioning portions 15*a* and 15*b* (FIG. 12) of the apparatus main assembly by using the pressing force received by the lever member 12. That is, normally, when contacting the corresponding main assembly contact member on the main assembly side, each of the charging roller contact member 82 and the developing roller contact member 83, respectively receives contact pressure (contact pressure) in the direction perpendicular to the charging contact surface 82*a* and the developing contact surface 83*a* from the main assembly. In FIG. 28, the charging contact surface 82*a* receives a force in the arrow J2 direction, and the developing contact surface 83*a* receives a force in the arrow 12 direction. However, when the pressing force of the cartridge pressing member 1 applied to the cartridge B by way of the lever member 12 acts in the direction of the arrow K, it acts so as to cancel these contact pressures. Therefore, even if the charging contact surface 82*a* and the developing contact surface 83*a* receive a contact pressure (contact pressure), the attitude of the cartridge B is prevented from becoming unstable due to the contact pressure.

By the force of the cartridge pressing member 1, the positioned portions 73*d* and 73*f* of the cartridge B can be more surely pressed against the positioning portions 15*a* and 15*b* of the apparatus main assembly, and the cartridge can be mounted and positioned in the apparatus main assembly A in a stable attitude. As described above, the positioning accuracy of the cartridge in the apparatus main assembly is improved, and therefore, the coupling member 64 and the drive transmission member 81 of the apparatus main assembly can be stably engaged.

When the electrical contact (contact member) such as the charging roller contact member 82 or the developing roller contact member 83 faces the downstream side in the moving direction of the lever member 12 (the side indicated by the arrow K), the direction in which the electrical contact faces is not required to be parallel to the arrow K. If the direction in which the electrical contact faces is less than 90 degrees relative to the arrow K (that is, the angle is 0 degree or more and less than 90 degrees), the electrical contact is in the moving direction of the lever member 12, it can be regarded as facing the downstream side.

That is, in FIG. 28, the angle between the arrow K and the arrow J1 is less than 90 degrees, and the angle between the arrow K and the arrow I1 is less than 90 degrees.

In this embodiment, the lever member 12 is arranged on the same side of the cartridge as each electrical contact (charging roller contact member 82 and developing roller contact member 83) in the longitudinal direction (axial direction). That is, the lever member 12 and the electrical contacts 82 and 83 are both arranged on one end side (one side) of the cartridge in the longitudinal direction. The contact pressure received by each electrical contact 82 and 83 and the pressing force applied to the lever member 12 by the cartridge pressing member 1 both act on the same one end side of the cartridge. Therefore, it is easy to urge and position the cartridge B by the cartridge pressing member 1 against the contact pressure by the pressing force of the lever member 12.

When the cartridge has a plurality of electrical contacts, each electrical contact may be separately arranged on both ends of the cartridge. If the number of electrical contacts is odd, it is possible to arrange the lever member 12 on the side where more electrical contacts are arranged.

In this embodiment, one end of the cartridge in which the lever member 12 and the electrical contacts 82 and 83 are provided is the side (driving side) in which the coupling member 64 is provided. Even when vibration or the like is transmitted to the driving side of the cartridge B provided with the coupling member 64 when the coupling member 64 receives the rotational force, it is possible to suppress the influence of the vibration and the like, because the lever member 12 is urged on the driving side of the cartridge B.

In this embodiment, by using the pressing force of the lever member 12, both of the two electrical contacts 82 and 83 provided in the cartridge B are urged toward the main assembly side contact members 102 and 103 provided in the main assembly A of the apparatus. However, all of the plurality of electrical contacts do not have to be urged by using the pressing force with which the lever member 12 is pressed. If at least one of the plurality of electrical contacts of the cartridge B faces the downstream side in the moving direction of the lever, it is possible to urge these electrical contacts to the electrical contacts provided in the main assembly A by the pressing force received by the lever member 12.

In addition, in this embodiment, the apparatus main assembly A is provided with two cartridge pressing members 1. One 1 of the pressing members presses the lever member 12 on the driving side of the cartridge B, and the other pressing member 1 presses the frame of the cartridge B on the other end side (other side, non-driving side) of the cartridge B. As described above, the attitude of the cartridge B is stabilized by receiving the force at two points on both ends thereof, but the structure is not necessarily limited to such a structure, and the cartridge B may be structured to receive the force at one point. That is, it is sufficient that at least the lever member 12 receives the force by the pressing member 1.

Further, in this embodiment, the lever member 12 is arranged between the charging contact surface 82*a* and the developing contact surface 83*a* on the plane perpendicular to the axis of the drum. That is, as shown in FIG. 28, when the lever member 12 is in the first position, a line segment LN1 connecting both ends of the lever member 12 and a line segment LN2 connecting the charging contact surface 82*a* and the developing contact surface 83*a* on the above plane intersect.

With this arrangement, the pressing force received by the lever member 12 from the pressing member 1 can be distributed to the two electrical contacts 82, 83 in a well-balanced manner. That is, in the process of mounting the cartridge, as a force received by each of the electrical contacts 82 and 83 and a force received by the lever member 12 are applied to the cartridge B, the moment produced in the cartridge B is stabilized by these forces. Even if the lever member 12 receives a pressing force, the attitude of the cartridge B is unlikely to change.

As a result, the positioned portions 73*d* and 73*f* of the cartridge B are securely pressed in the positioning portions 15*a* and 15*b* (FIG. 12) of the apparatus main assembly, by using the force received by the lever member 12 against the contact pressure received from the plurality of electrical contacts. That is, the coupling member 64 and the drive transmission member 81 of the apparatus main assembly can be stably engaged with each other.

More specifically, the line segment connecting the contact portion 212*a* and the engaged portion 212*b* of the lever member 12 and the line segment LN2 intersect.

The lever member 12 has a shape extending along the moving direction (K direction) of the lever member. Therefore, as the lever member 12 is pressed by the pressing member 1 of the apparatus main assembly A and moves in the K direction, the force of the pressing member 1 is smoothly transmitted to the cartridge B via the lever member 12. Therefore, it is easy to bring the contact members 82 and 83 on the cartridge side into contact to the corresponding contact members on the main assembly side by using the force of the pressing member 1.

In addition, although the integrated lever member 12 is used as the operation member, the operation member may be structured by connecting a plurality of members.

The contact members (electrical contacts) may be referred to as a first contact member (first electrical contact), a second contact member (second electrical contact), and the like, respectively. In addition, in this embodiment, the charging roller contact member 82 and the developing roller contact member 83 are connected with the charging roller 67 and the developing roller 30. That is, each of the electrical contacts 82 and 83 is connected to the process member 6730 that acts on the photosensitive member, and the electrical contacts 82 and 83 are used to apply a voltage from the apparatus main assembly A to each of these process members. However, the electrical contacts (contact members) are not limited to those for applying voltage to such process members. For example, in the case that a memory chip storing information about the cartridge B is provided in the cartridge B, an electrical contact (contact member) electrically connected to the memory is provided in the cartridge B. This electrical contact is used for the apparatus main assembly A to read information from the memory or to write new information into the memory by contacting the electrical contact of the apparatus main assembly A. The present embodiment can be preferably applied to such electrical contacts for information communication.

As described above, in this embodiment, the cleaning frame 73 is provided with the pressed portion 71*e* which is pressed by the cartridge pressing member 1 in the apparatus main assembly. More particularly, the pressing member 1 presses the lever member 12 to move it from the first position to the second position, and then contacts the pressed portion 71*e* of the cleaning frame 73. Then, the pressing member 1 applies a pressing force to the cartridge B by way of the lever member 12 and the pressed portion 71*e*. However, the pressing member 1 does not necessarily have to contact with the cleaning frame 73, and the pressing member 1 contact only with an abutted portion 12*a* of the lever member so that a pressing force is applied to the cartridge B by way of only the lever member 12.

<Modification>

In addition, in the above description (FIG. 14), it is assumed that the rotation axes L2 and L1 are coaxial before the drive transmission member 81 and the coupling member 64 are engaged (part (a) of FIG. 14), but the structure is not limited to this. It is possible that the rotation axis of the drive transmission member 81 is inclined with respect to the rotation axis of the coupling member 64 before the drive transmission member 81 and the coupling member 64 are engaged with each other. However, since the coupling member 64 is structured to be movable back and forth, it is possible to engage the drive transmission member 81 and the coupling member 64 even in such a case. Hereinafter, a modified example in which the drive transmission portion 81 of the Embodiment 1 is structured to be pivotable (inclinable) will be described.

Figure 15:
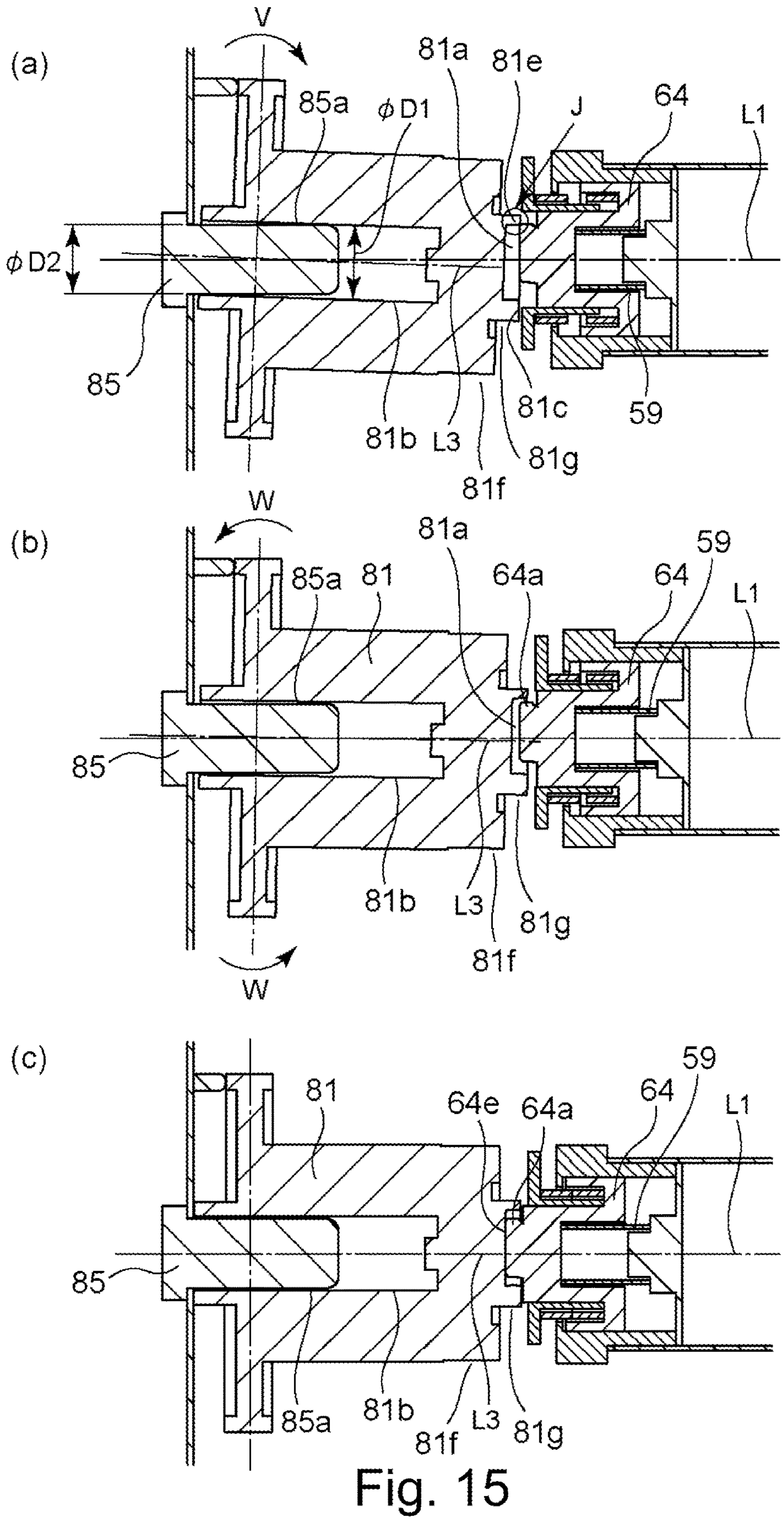
FIG. 15, parts (a), (b), and (c), is a longitudinal sectional view of the inclined drive transmission member 81 and the coupling member 64 of the main assembly A of the apparatus.

Referring to FIG. 15, in the case that the rotation axes L3 and L1 of the drive transmission member 81 and the coupling member 64 are not coaxial before the coupling member 64 is engaged, the description will be made as to how the coupling member 64 and the drive transmission member 81 are engaged with each other.

Here, part (a) of FIG. 15 is a longitudinal sectional view in a state in which the process cartridge is inserted into the apparatus main assembly A and the opening/closing door 13 is closed. The driving force is inputted to the apparatus main assembly A, the drive transmission member 81 starts to rotate, and the phase of the drive transmission portion 81*a* and the phase of the driven transmission portion 64*a* of the coupling member 64 fall within a predetermined range. Part (b) of FIG. 15 is a longitudinal cross-sectional view immediately after the operation. Part (c) of FIG. 15 is a longitudinal sectional view illustrating a state in which the drive transmission portion 81*a* of the drive transmission member 81 and the driven transmission portion 64*a* of the coupling member 64 are completely engaged. Parts (a), (b) and (c) of FIG. 15 shows the process of the coupling member 64 being brought into engagement with the drive transmission member 81 while decreasing the inclination angle, as the coupling member 64 moves to the second position (advance position).

Figure 16:
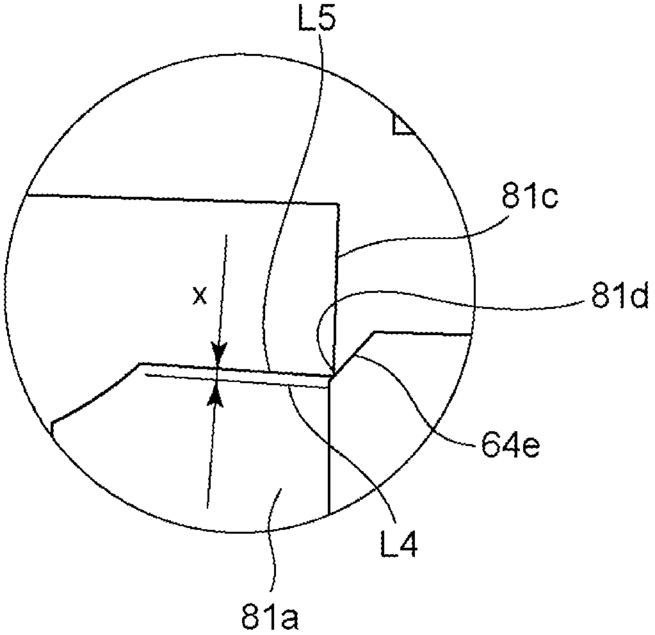
FIG. 16 is a partially enlarged view of a chamfered portion of the coupling member.
Figure 17:
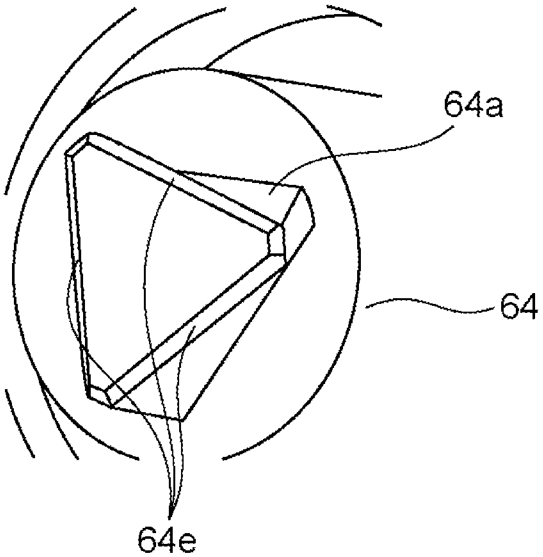
FIG. 17 is a perspective view illustrating a chamfered portion 64*e* provided on an end surface of a driven transmission portion 64*a* of the coupling member 64.

FIG. 16 is a partial detailed view illustrating an enlarged portion surrounded by a circle J in part (a) of FIG. 15, and FIG. 17 is a perspective view illustrating a chamfered portion 64*e* provided on the end surface of the driven transmission portion 64*a* of the coupling member 64.

As shown in part (a) of FIG. 15, in this modification, the structure is such that a diameter φD1 of the supported portion 81*b* of the drive transmission member 81 and a diameter φD2 of the support portion 85*a* of the drive transmission member support member 85 satisfy φD1>φD2.

Therefore, the drive transmission member 81 can move relative to the support member 85. When the drive transmission member 81 and the coupling member 64 are engaged with each other, the drive transmission member 81 can move so that its axis is aligned with the axis of the coupling member 64. That is, the rotation axis L3 of the drive transmission member 81 and the rotation axis L1 of the coupling member 64 can be accurately aligned.

More specifically, as shown in part (c) of FIG. 15, the drive transmission member 81 is supported by the driven transmission portion 64*a* of the coupling member 64. At this time, a gap is provided between the supported portion 81*b* of the drive transmission member 81 and the support portion 85*a* of the drive transmission member support member 85 because of the relationship of φD1>φD2. The drive transmission member 81 is movable within the range of this gap. By setting the size of this gap appropriately, when the drive transmission member 81 engages with the coupling member 64, the center position of the drive transmission member 81 at the free end side (the core position of the drive transmission member 81 at the free end side) can be aligned with the center position of the coupling member 64. As a result, the rotation axis L3 of the drive transmission member 81 can be accurately aligned with the rotation axis L1 of the coupling member 64.

On the other hand, the drive transmission member 81 before being engaged with the coupling member 64 is inclined by the own weight to in the V direction in the drawing, as shown in part (a) of FIG. 15, because of the relationship of φD1>φD2. As described above, when the rotatable door 13 of the main assembly A of the apparatus is completely closed, the coupling member 64 is supposed to be movable from the first position to the second position. However, in this modification, since the drive transmission member 81 is inclined in the V direction in the drawing, the driven transmission portion 64*a* of the coupling member 64 cannot immediately engage with the drive transmission portion 81*a* of the drive transmission member 81.

That is, the inclination angle of the drive transmission member 81 relative to the horizontal plane is required to reduce to such an extent that the drive transmission portion 81*a* of the drive transmission member 81 can be engaged with the driven transmission portion 64*a* of the coupling member 64

In this modification, by the coupling member 64 applying a force to the drive transmission member 81 in the process of moving the coupling transmission member 64 to the second position, the drive transmission member 81 is moved so as to reduce the inclination angle. Therefore, as shown in FIGS. 16 and 17, the chamfered portion (inclined portion, taper portion) 64*e* inclined relative to the axis of the coupling member 64 is provided on the triangular ridge line at the driving side end of the coupling member 64. The chamfered portion 64*e* is an acting portion for acting on the drive transmission member 81, and the drive transmission member 81 can be moved by contacting with the drive transmission member 81 under a specific condition.

As shown in FIG. 16, the chamfered portion 64*e* is structured such that when the drive transmission member 81 is inclined in the V direction (part (a) of FIG. 15), a portion of the chamfered portion 64*e* is inside the drive transmission portion 81*a* of the transmission member 81 in the radial direction. For detailed description, in FIG. 16, the position of the ridge line inside the chamfered portion 64*e* is indicated by L4, and the position of the edge (edge) of the recess serving as the drive transmission portion 81*a* is indicated by L5. As shown in FIG. 16, when the drive transmission member 81 rotates, if a state occurs in which L5 is located radially outside of L4, the inclined portion of the chamfered portion 64*e* contacts the edge of the drive transmission portion 81*a* (recessed portion). In FIG. 16, the edge (L5) of the drive transmission portion 81*a* is located radially outside the ridge line (L4) inside the chamfered portion 64*e* by the distance x.

The inclined chamfer 64*e* applies a force to the drive transmission member 81 in a direction perpendicular to the surface thereof. Therefore, when the chamfered portion 64*e* contacts the edge of the drive transmission portion 81*a*, the chamfered portion 64*e* applies a force to the drive transmission member 81 in the upper left direction in the Figure. Therefore, as shown in part (b) of FIG. 15, a moment is applied to the drive transmission member 81 in the arrow W direction with its fixed end as a fulcrum. By this, the drive transmission member 81 swings (pivots) in the arrow W direction.

When the drive transmission member 81 swings in the direction of the arrow W, the drive transmission portion 81*a* and the driven transmission portion 64*a* become engageable with each other, and therefore, the coupling member 64 moves toward the second position on the driving side, by which the engagement between the transmission portion 81*a* and the driven transmission portion 64*a* is completed. When the engagement between the coupling member 64 and the drive transmission member 81 is completed, the rotation axis L3 of the drive transmission member 81 is accurately aligned with the rotation axis L1 of the coupling member 64.

As described above, since the chamfered portion 64*e* is inclined relative to the advancing/retracting direction of the coupling member 64, the free end (free end side) of the drive transmission member 81 is raised in interrelation with the advancing movement of the coupling member 64. This makes it possible to reduce the angular difference between the drive transmission member 81 and the coupling member 64 (the angle formed by the rotational axes of them), so that the drive transmission member 81 and the coupling member 64 can be engaged with each other. The chamfered portion (inclined portion) 64*e* is an urging portion which urges the drive transmission drive transmission member 81, and is also an acting portion which acts on the drive transmission member 81. The chamfered portion (inclined portion) 64*e* is inclined in order to apply a force acting on the drive transmission member 81 in a direction to reduce the inclination angle of the drive transmission member 81.

As shown in FIG. 16, the chamfered portion 64*e* is an inclined surface (surface portion) disposed close to the free end of the coupling member 64. The chamfered portion 64*e* is inclined so that the distance from the axis of the coupling member 64 decreases as it goes toward the free end of the coupling member 64. In other words, the chamfered portion 64*e* is inclined so that the distance from the axis of the photosensitive member drum becomes less as it goes toward the free end of the coupling member 64.

The chamfered portion 64*e* shown in FIG. 16 will be described in detail as an example. The chamfered portion 64*e* is inclined so as to descend downward toward the left. The left end of the chamfered portion 64*e* is the free end of the coupling member 64. In addition, the axis of the coupling member 64 and the axis of the photosensitive drum are located below the chamfered portion 64*e*. That is, the chamfered portion 64*e* is closer to the axis of the coupling member 64 located below as it goes to the free end of the coupling member located to the left.

The coupling member 64 is a movable member movably provided in the cartridge B, to urge the drive transmission member 81 to reduce the inclination of the drive transmission member 81 with respect to the coupling member 64. By this, the drive transmission member 81 is aligned with the coupling member 64.

In addition, when the coupling member 64 moves to the second position, the phases of the drive transmission portion 81*a* and the driven transmission portion 64*a* may be significantly different from each other. In that case, the drive transmission portion 81*a* and the driven transmission portion 64*a* cannot be engaged with each other, and therefore, the coupling member 64 abuts to the drive transmission member 81 and stops once while the coupling member 64 moves to the second position. Even in that case, when drive is subsequently inputted to the apparatus main assembly, the phase of the driven transmission portion 64*a* of the coupling member 64 changes relative to the phase of the drive transmission portion 81*a* by the rotation of the drive transmission member 81. As a result, the phase difference between the drive transmission portion 81*a* and the driven transmission portion 64*a* decreases, and the triangular attitude of the drive transmission portion 81*a* and the triangular attitude of the driven transmission portion 64*a* of the coupling member 64 become closer to each other. As a result, the coupling member 64 is brought into a state in which it can engages with the drive transmission member 81 (part (b) of FIG. 15).

At this time, the coupling member 64 presses the drive transmission member 81 by the chamfered portion 64*e* to swing the drive transmission member 81 inclined in the V direction in the direction of decreasing the inclination angle (W direction in the drawing). That is, by bringing the chamfered portion 64*e* into contact with the drive transmission member 81, the center position of the free end of the drive transmission member 81 can be brought closer to the center position of the free end of the coupling member 64. In this state, the coupling member 64 itself moves to the driving side to complete the engagement with the drive transmission member 81 (part (c) of FIG. 15).

In the above description, the inclination direction (V direction) of the drive transmission member 81 is the gravity direction, but this inclination direction may be any direction.

In addition, the coupling member 64 and the drive transmission member 81 can engage with the drive transmission member 81 even if the rotation axes of the coupling member 64 and the drive transmission member 81 are parallel and not coaxial, before the engagement. That is, when the chamfered portion 64*a* contacts the drive transmission member 81, the center position of the free end of the drive transmission member 81 is moved so as to approach the center position of the free end of the coupling member 64, as in the above description. That is, in the case where the drive transmission member 81 is inclined, even if the axis of the drive transmission member 81 is offset in any direction, the drive transmission member 81 and the coupling member 64 can be engaged with each other.

In this embodiment, the position of the coupling member 64 retracted toward the inside of the photosensitive drum 62 (retracted position) is called the first position, and the position of the coupling member 64 advanced toward outside of the photosensitive drum (advanced position) is called the second position. This is for convenience, and the retracted position may be called the second position and the advanced position may be called the first position. Similarly, in this embodiment, the normal position of the lever member 12 is called the first position, and the acting position of the lever member 12 is called the second position. However, the normal position may be called the second position of the lever member 12, and the acting position may be called the first position of the lever member. The same applies to the embodiments which will be described hereinafter.

Embodiment 2

Next, Embodiment 2 will be described. The description of the same points as those in the above-described embodiment may be omitted. In particular, among the elements disclosed in the present embodiment, those corresponding to the members described in the Embodiment 1 will be given the same names as the members of the Embodiment 1, and the only the points different from those of the Embodiment 1 will be described.

In Embodiment 1 described above, the operating member (lever member 12) is arranged on the driving side of the cartridge B (the side on which the coupling member is arranged), but in this embodiment, the operating member is arranged on the side opposite to the driving side in the longitudinal direction. The difference in the structure and the operation resulting from the difference in the arrangement and operation the operation member will be described in detail.

Figure 18:
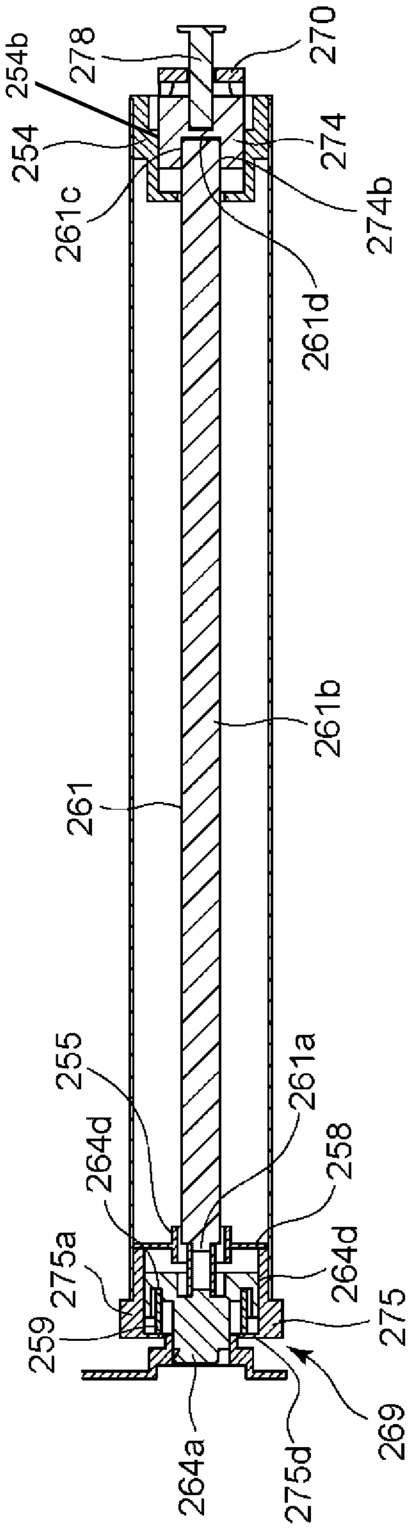
FIG. 18 is a longitudinal sectional view of the drum unit according to Embodiment 2.
Figure 19:
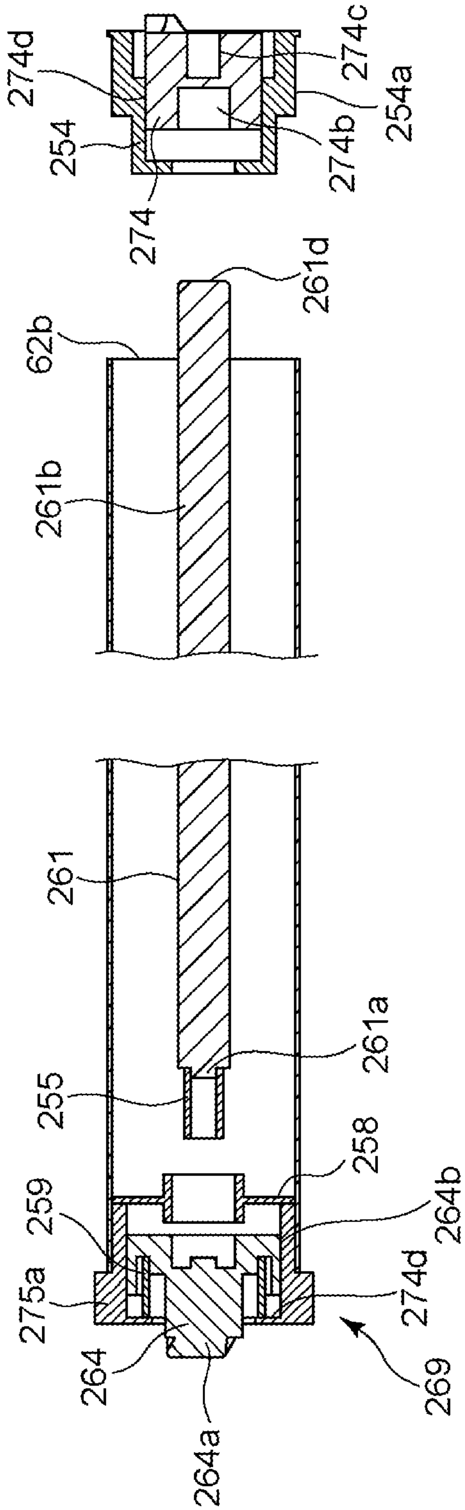
FIG. 19 is a view illustrating a method of assembling the drum unit according to Embodiment 2.

Referring first to FIGS. 18 and 19, the driving side flange unit 269 and the drum unit according to this embodiment will be described.

FIG. 18 is a longitudinal sectional view of the drum unit according to the Embodiment 2. FIG. 19 is a view illustrating a method of assembling the drum unit according to the Embodiment 2.

As shown in FIGS. 18 and 19, the driving side flange unit 269 according to the present embodiment comprises a coupling member 264, a driving side flange member 275, a lid member 258, a first pressing member 259 and the like. Further, the drum unit comprises the driving side flange unit 269, a connecting member 261, a cushion member (cushioning member, damper) 255, a non-driving side flange member 254, and an inner cylindrical cam member 274. Similar to the Embodiment 1, a coupling member 264 comprises a driven transmission portion 264*a*, a driving transmission portion 264*b* which transmits driving force to the driving side flange member 275, and the like. The driving side flange member 275 also has a gear portion 275*a* for transmitting drive to the developing roller gear provided at the end portion of the developing roller, as in the Embodiment 1. The connecting member 261 comprises a cushion member supporting portion 261*a*, a connecting portion 261*b* connecting the coupling member 264 and the inner cylindrical cam member 274, a supported portion 261*c* supported by the inner cylindrical cam member, and the like. The inner cylindrical cam member 274 comprises a cylindrical cam portion 274*a* (FIG. 23), a connecting member supporting portion 274*b*, a supported portion 274*c* supported by a drum shaft 278, and an outer diameter portion 274*d* inserted in the inner peripheral portion 254*b* of the non-driving side flange member 254.

The first pressing member 259 in the form of a compression spring or the like is provided between the first member contact surface 264*d* (FIG. 24) of the coupling member 264 and the first member contact surface 275*d* (FIG. 24) of the driving side flange member 275.

Also in this embodiment, the coupling member 264 is provided at the end of a photosensitive member drum 62. That is, the driving side flange unit 269 including the coupling member 264 is fixed to the driving side end portion of the photosensitive drum 62 by means such as press fitting or clamping as in the Embodiment 1. In addition, as shown in FIG. 19, the connecting member 261 supporting the cushion member 255 is inserted into the drum from the non-driving side end portion 62*b*. The non-driving side flange member 254 is fixed to the non-driving side drum end portion 62*b* by means such as clamping in the same manner as in the Embodiment 1 with the inner cylindrical cam member 274 fitted to the inner peripheral portion 254*b* (FIG. 18). The drum unit of the Embodiment 2 is structured as described above. The coupling member 264 is movably connected to the driving side flange member 275.

Also in this embodiment, the driven transmission portion 264*a* of the coupling member 264 employs a projection shape with a substantially triangular cross-section. Specifically, a shape in which a substantially triangular cross-section is twisted counterclockwise around the axis of the photosensitive drum from the driving side toward the non-driving side is employed.

Referring to FIGS. 20 to 23, an operation unit which enables the coupling member 264 to move forward and backward in the longitudinal direction will be described.

Figure 20:
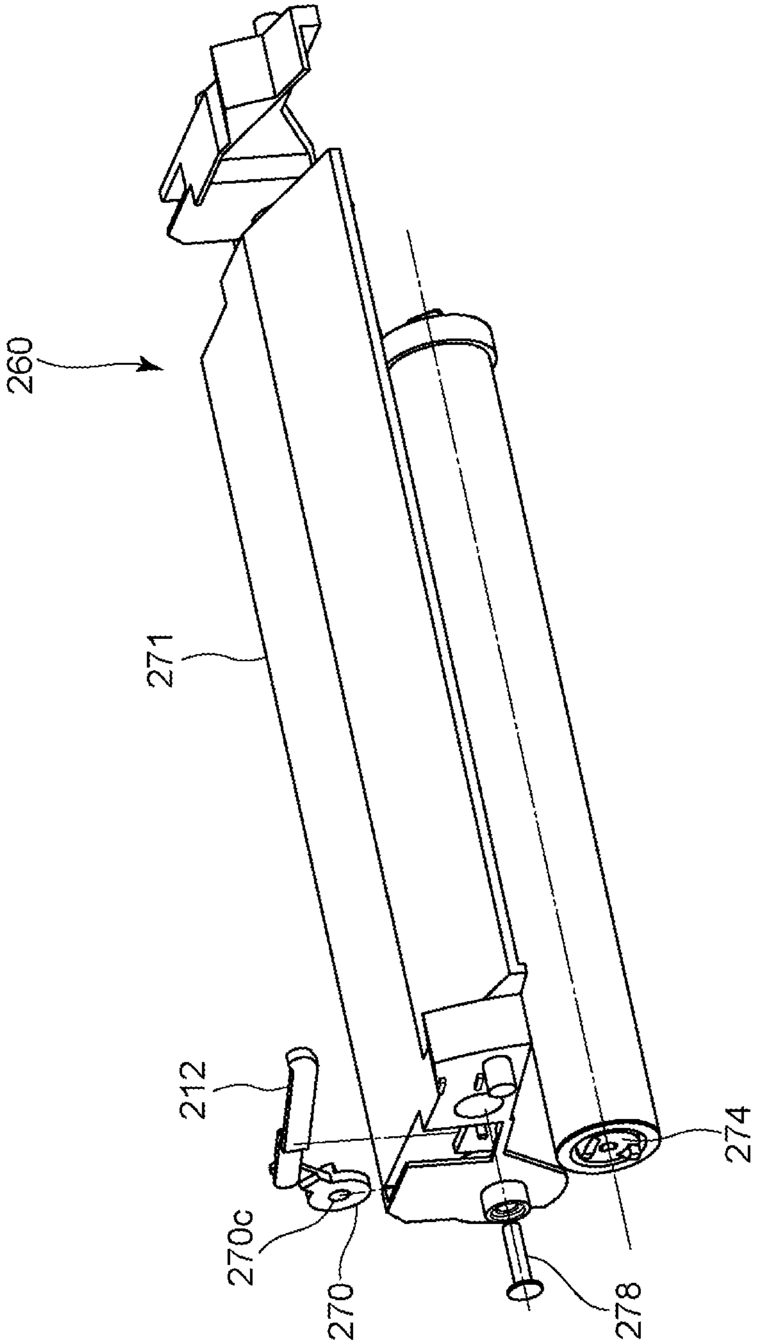
FIG. 20 is a partial perspective view illustrating a structure of the cleaning unit including the operation unit.

FIG. 20 is a partial perspective view illustrating the structure of the cleaning unit 260 including the operation unit according to this embodiment.

Figure 21:
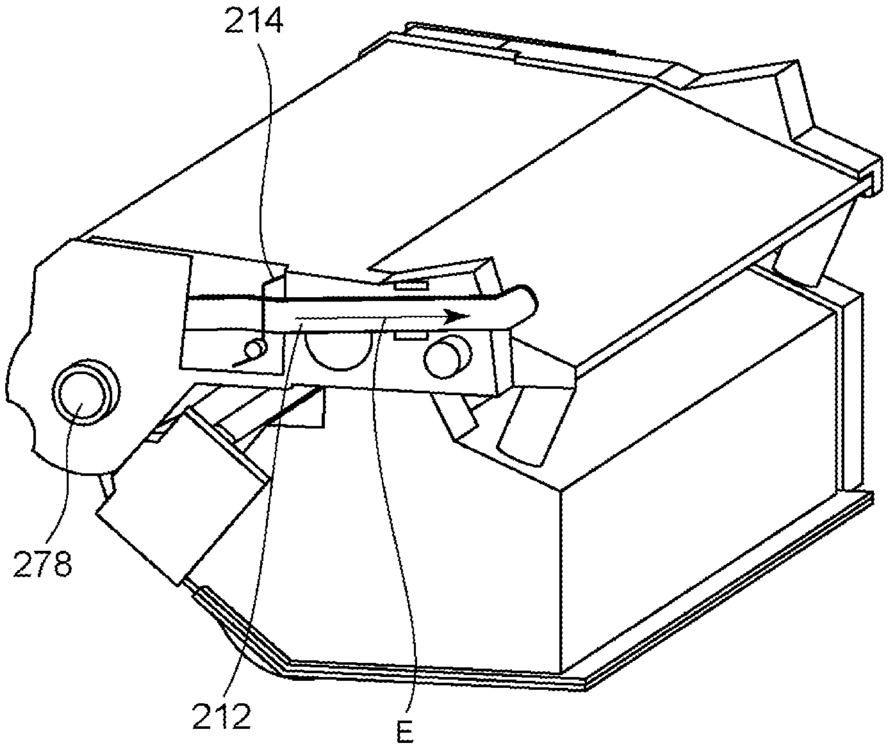
FIG. 21 is a perspective view of the process cartridge of Embodiment 2.

FIG. 21 is a perspective view of the process cartridge of this embodiment.

Figure 22:
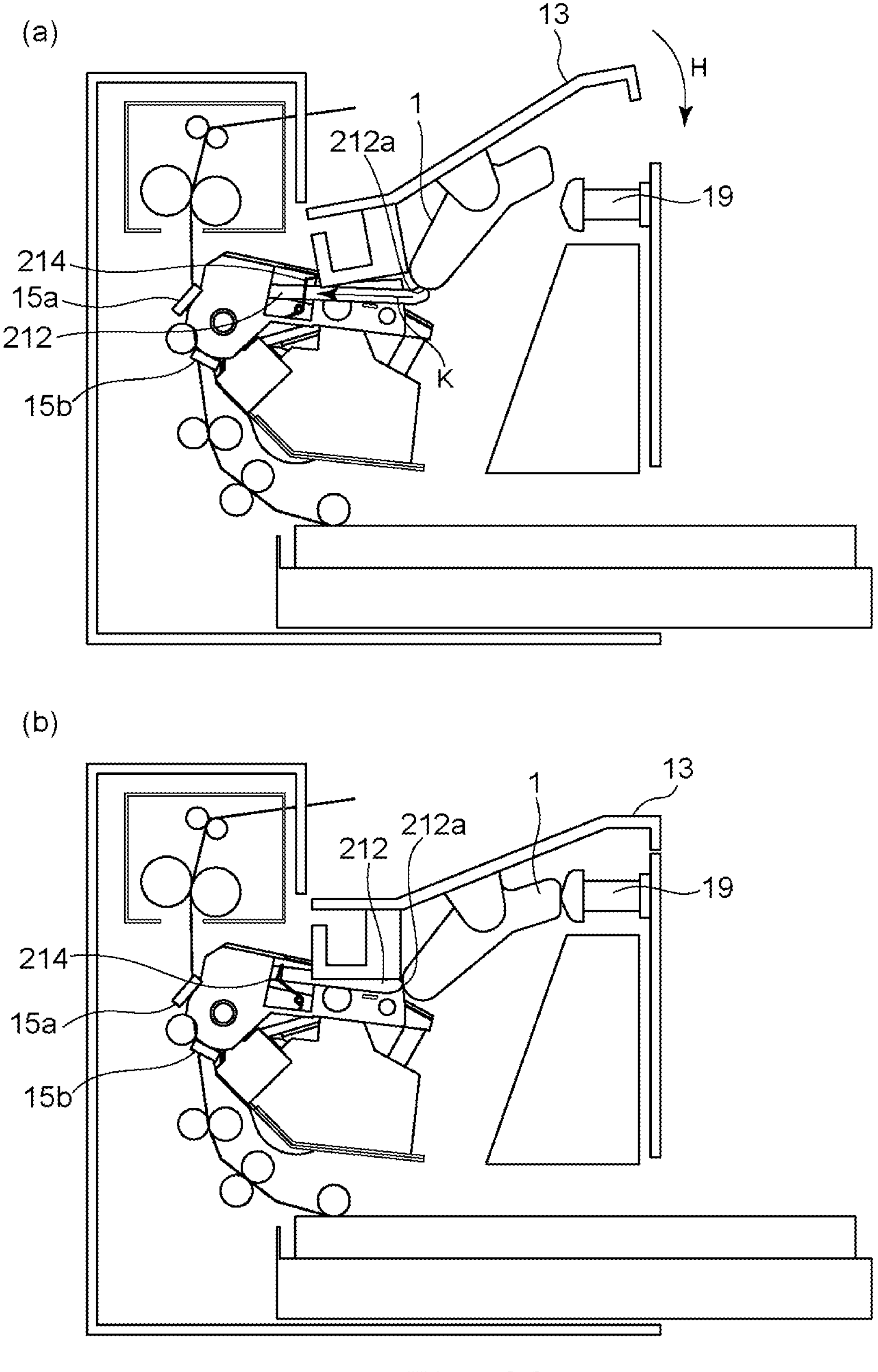
FIG. 22, parts (a) and (b), is a sectional view of the image forming apparatus for explaining the process in which the cartridge pressing member is brought into contact to the lever member according to Embodiment 2.

Part (a) of FIG. 22 is a sectional view of the image forming apparatus in a state in which the cartridge pressing member 1 has started to abut against the pressed portion 212*a* of the lever member 212 in the process of closing the opening/closing door 13 of the apparatus main assembly A in the direction H in the drawing.

Part (b) of FIG. 22 is a sectional view of the image forming apparatus with the opening/closing door 13 of the apparatus main assembly A completely closed.

Figure 23:
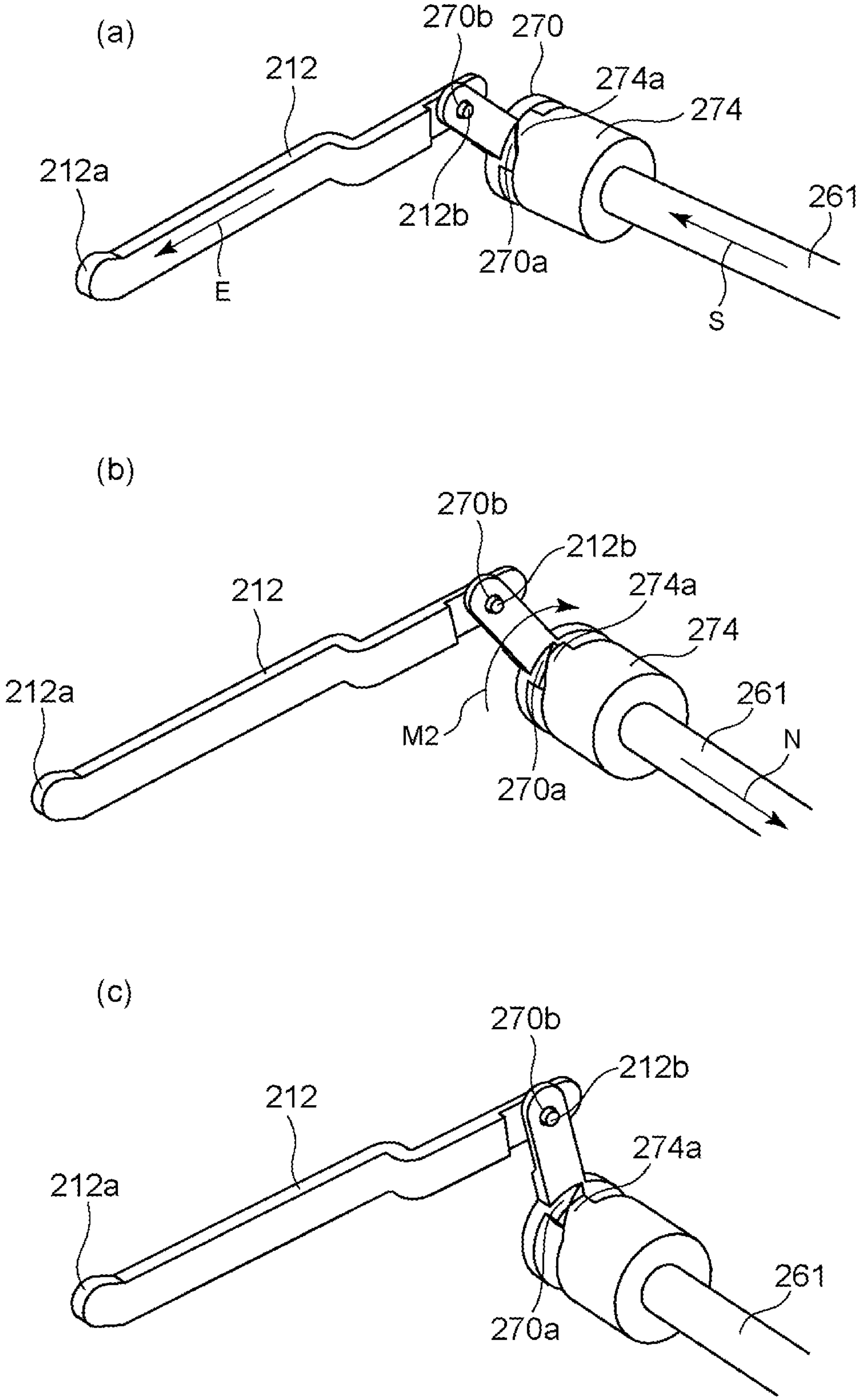
FIG. 23, parts (a), (b), and (c), is a perspective view of a lever member 212, an outer cylindrical cam member 270, and an inner cylindrical cam member 274 according to Embodiment 2.

FIG. 23 is a perspective view of the lever member 212, an outer cylindrical cam member 270, and the inner cylindrical cam member 274 according to this embodiment. Here, part (a) of FIG. 23 is a perspective view of the state before the cartridge pressing member 1 is contacted with the pressed portion 212*a* of the lever member 212. Part (c) of FIG. 23 is a perspective view of the state where the opening/closing door 13 is completely closed and a predetermined pressure of the cartridge pressing spring 19 is applied to the contact portion 212*a* of the lever member 212 (part (b) of FIG. 22). Part (b) of FIG. 23 is a perspective view in a state between the states of part (a) of FIG. 23 and part (c) of FIG. 23 (part (a) of FIGS. 22 to 22 (*b*)).

As shown in FIG. 23, the actuating unit includes the outer cylindrical cam member 270, the inner cylindrical cam member 274, the lever member (operation member) 212, a second pressing member 214 (FIG. 21) and the like. The outer cylindrical cam member 270 includes a lever member engaging portion 270*b* which engages a cylindrical cam portion 270*a* and the lever member 212, and the like. The lever member 212 includes an abutting portion 212*a* to which the cartridge pressing member 1 (FIG. 21) of the main assembly A of the apparatus abuts, an engaged portion (portion to be engaged) 212*b* with which the outer cam member 270 is engaged, and the like. As shown in FIG. 20, the outer cylindrical cam member 270 engaged with the lever member 212 is mounted to the cleaning frame 271 from the top to the bottom in the drawing. Specifically, it is supported by the drum shaft 278 so as to be rotatable relative to the cleaning frame 271 together with the drum unit by way of the supported portion 270*c*.

As shown in FIG. 21, the second pressing member 214 and a developing unit 20 are mounted to the cleaning unit 260 to constitute the process cartridge of this embodiment.

Next, a description will be made as to forward and backward movement of the coupling member 264 by the movement of the lever member 212 caused by the cartridge pressing member 1 provided in the main assembly A of the apparatus contacting to and separating from the lever member 212.

Referring first to FIG. 19, the longitudinal positioning structure of the coupling member 264 of this embodiment will be described. In this embodiment, the position of the coupling member 264 in the longitudinal direction is determined by the outer cylindrical cam member 270, the inner cylindrical cam member 274, and the connecting member 261.

Specifically, the coupling member 264 pressed to the non-driving side by the first pressing member 259 urges the connecting member 261 in an S direction shown in part (a) of FIG. 23, and the end surface 261*d* thereof abuts to the longitudinal regulation surface 274*d* of the inner cylindrical cam member 274. This determines the longitudinal position of the coupling member. As will be described hereinafter, the structure is such that the longitudinal position of the inner cylindrical cam member 274 is determined by the phases of the outer cylindrical cam member 270 and the cylindrical cam portion of the inner cylindrical cam member 274 as shown in FIG. 23.

Referring to FIGS. 21 to 24, the movement of the lever member 212 and forward/backward movement of the coupling member 264 in the longitudinal direction will be described.

Figure 24:
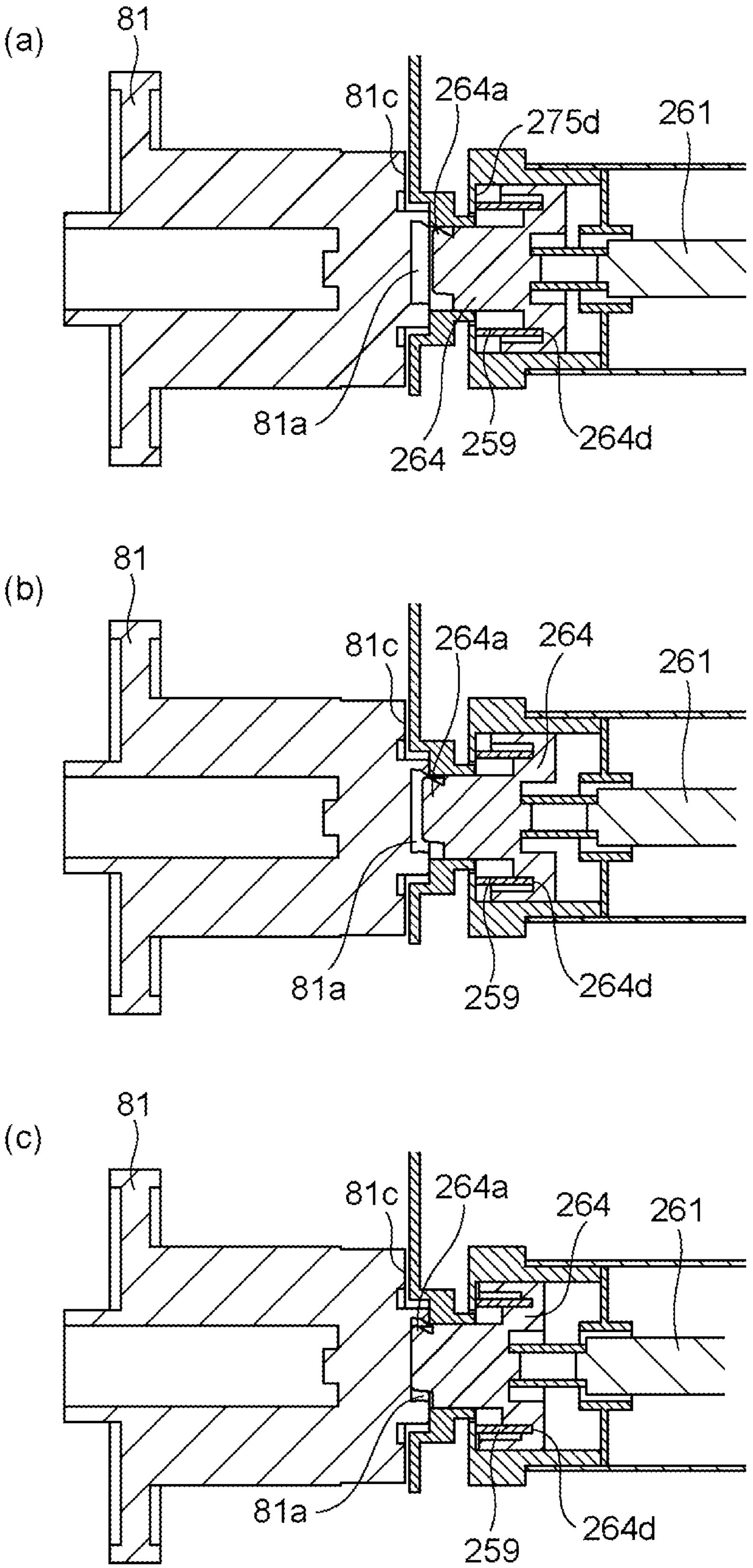
FIG. 24, parts (a), (b), and (c), is a longitudinal sectional view of the drive transmission member 81 and the coupling member 64 of the apparatus main assembly A according to Embodiment 2.

FIG. 24 is a longitudinal sectional view of the drive transmission member 81 and the coupling member 264 of the apparatus main assembly A according to this embodiment. Similar to FIG. 23, part (a) of FIG. 24 is a longitudinal sectional view illustrating a state before the cartridge pressing member abuts to the pressed portion 212*a* of the lever member 212. Part (c) of FIG. 24 is a longitudinal sectional view of a state in which the opening/closing door 13 is completely closed and a predetermined pressure of the cartridge pressing spring 19 is applied to the contact portion 212*a* of the lever member 212 (part (b) of FIG. 22). Part (b) of FIG. 24 is a longitudinal sectional view in a state (part (a) of FIG. 22 to part (b) of FIG. 22) between the states of part (a) of FIG. 24 and part (c) of FIG. 24.

As shown in part (a) of FIG. 23, in the state before the cartridge pressing member 1 is brought into contact with the lever member 212, the lever member 212 is urged by the second pressing member 214 (FIG. 21) in the direction of arrow E in FIG. 21 and part (a) of FIG. 23. The cylindrical cam portions of the outer cylindrical cam member 270 and the inner cylindrical cam member 274 are structured to have the phases shown in part (a) of FIG. 23 at this time, and therefore, the inner cylindrical cam member 274 is in the most non-driving side (S in the drawing) position. For this reason, the structure is such that the coupling member 264 taking the longitudinal position determined by way of the connecting member 261 and the cushion member 255 is located on the most non-driving side. That is, the operating unit including the connecting member 261 and the like allows the coupling member 264 to retract to the non-driving side by the urging force of the first pressing member 259 (FIG. 19). The position in which the coupling member 264 is retracted to the non-driving side in this manner is called the first position in this embodiment, similar to Embodiment 1. The first pressing member (urging member, elastic member) 259 that urges the coupling member 264 toward the non-driving side can be regarded as a portion of the operation unit.

As shown in part (a) of FIG. 24, the structure is such that when the coupling member 264 is at the first position, the driven transmission portion 264*a* of the coupling member 264 and the drive transmission portion 81*a* of the drive transmission member 81 do not overlap with each other in the longitudinal direction. That is, the process cartridge B can be smoothly mounted and dismounted to and from the device main assembly A without any interference between the coupling member 264 and the drive transmission member 81 of the apparatus main assembly.

Next, the movement in which the cartridge pressing member 1 is brought into contact with the lever member 212, the lever member 212 starts to move, and the coupling member 264 moves from the first position to the driving side will be described.

As shown in part (a) of FIG. 22, when the mounting of the process cartridge B is completed and the opening/closing door 13 is closed in the direction H in the Figure, the contact between the cartridge pressing member 1 and the lever member 212 starts, and the pressing force of the cartridge pressing spring 19 starts to act on the lever member 212. The pressing force causes the lever member 212 to start moving in the K direction shown in part (a) of FIG. 22 and part (b) of FIG. 23 against the second pressing member 214. As shown in part (b) of FIG. 23, when the lever member 212 moves in the K direction, the outer cylindrical cam member 270 engaged with the lever member 212 starts to rotate in the M2 direction in the Figure. When the outer cylindrical member 270 rotates in the M2 direction, the inner cylindrical cam member 274 starts to move in the N direction (driving side) shown in part (b) of FIG. 23 by the cylindrical cam portions of the outer cylindrical cam member 270 and the inner cylindrical cam member 274. As in Embodiment 1, the inner cylindrical cam member 274 is supported so as not to rotate and to be movable only in the longitudinal direction.

By the movement of the inner cylindrical cam member 274 in the longitudinal direction (N direction), the connecting member 261 connected to the inner cylindrical cam member 274 also starts moving against the urging force of the first pressing portion 259 (FIG. 19). Then, the connecting member 261 also moves in the N direction by the movement of the connecting member 261, and the driven transmission portion 264*a* of the coupling member 264 and the driving transmission portion 81*a* of the drive transmission member 81 of the apparatus main assembly become engageable in the longitudinal direction (part (b) of FIG. 24). The connecting member 261 is not directly connected to the coupling member 264, but the connecting member 261 is connected to the coupling member 264 by way of the cushion member 255 (FIG. 19) as described above. The cushion member 255 is an expandable and contractable elastic member, and when the connecting member 261 moves in the N direction, the cushion member 255 is compressed, and the elastic force produced by the compression is used to move the coupling member 264 in the N direction. That is, by the elastic force (urging force) of the cushion member 255 exceeding the elastic force (urging force) of the first pressing member 259 (FIG. 19), the coupling member 264 moves toward outside of the cartridge against the urging force of the first pressing member 259. This cushion member 255 can also be regarded as a portion of the operating unit.

Further, the structure is such that when the opening/closing door 13 is closed and the opening/closing door 13 is completely closed (state of part (b) of FIG. 22), the longitudinal end surfaces of the cylindrical cam portions of the outer cylindrical cam member 270 and the inner cylindrical cam member 274 contact to each other, as shown in part (c) of FIG. 23. At this time, the inner cylindrical cam member 274 is located closest to the driving side. That is, the coupling member 264 is also structured to be located closest to the driving side by way of the connecting member 261. The position where the coupling member 264 projects toward the driving side is called the second position also in this embodiment.

As shown in part (c) of FIG. 24, the structure is such that when the coupling member 264 is in the second position, the required amount of longitudinal engagement between the driven transmission portion 264*a* of the coupling member 264 and the driving transmission portion 81*a* of the drive transmission member 81 is assured.

In this embodiment, similar to Embodiment 1, the positions of the lever member 212 corresponding to the first position and the second position of the coupling member 264 are called the first position and the second position, respectively. That is, part (a) of FIG. 23 and part (a) of FIG. 24 show the first positions of the lever member 212 and the coupling member 264, respectively, and part (c) of FIG. 23 and part (c) of FIG. 24 show the second positions of the lever member 212 and the coupling member 264, respectively. Part (b) of FIG. 23 and part (b) of FIG. 24 show intermediate positions in the process of moving the lever member 212 and the coupling member 264 from the first positions to the second positions, respectively.

In addition, as described above, the driven transmission portion 264*a* of the coupling member 264 in this embodiment has a twisted triangular shape. Therefore, when the phases of the drive transmission portion 81*a* (FIG. 25) of the drive transmission member 81 and the drive transmission portion 64 of the coupling member 264 are not aligned, the drive transmission portion 81*a* and the driven transmission portion 64*a* are not completely engaged, and therefore the coupling member 264 and the drive transmission member 81 interfere with each other. At this time, the coupling member 264 cannot sufficiently move to the second position (projection position).

That is, even though the lever member 212 is moved to the second position (part (c) of FIG. 23) by the pressing member 1 of the apparatus main assembly A, the coupling member 264 cannot move to the second position (part (c) of FIG. 24). At this time, the cushion member 255 is largely compressed to absorb the positional deviation between the lever member 212 and the coupling member 264. That is, the cushion member 255 is a cushioning member disposed between the lever member 212 and the coupling member 264, and is used to allow the interference between the coupling member 264 and the drive transmission member 81.

Thus, the cushion member 255 is arranged between the coupling member 264 and the connecting member 261, and therefore the structure is such that the coupling member 264 can be stopped on the end surface 81*c* of the drive transmission member 81 without strong resistance in the longitudinal direction.

When drive is input to the apparatus main assembly A in this state, the drive transmission member 81 rotates, so that the phase difference between the coupling member 264 and the drive transmission member 81 becomes within a predetermined range as in the Embodiment 1. Then, the coupling member 264 can move to the second position. That is, at the time when the phase difference between the coupling member 264 and the drive transmission member 81 falls within a predetermined range, the elastic deformation of the cushion member 255 is partially mitigated, and the elastic force of the cushion member 255 is used to move the coupling member 264 to the second position. By this, the coupling member 264 and the drive transmission member 81 are engaged with each other. In this embodiment, the compression coil spring is used for the cushion member 255, but other elastic members such as rubber can be used. In addition, the cushion member 255 may be arranged somewhere between the lever member 212 and the coupling member 264, and the cushion member 255 does not necessarily have to be arranged between the connecting member 261 and the coupling member 264. For example, a portion of the resin forming the lever member 212 may elastically deform to function as the cushion member. Also in this case, it can be deemed that there is a cushion member between the lever member 212 and the coupling member 264.

In this embodiment, the cushion member 255 is mounted to the projection of the coupling member 264 with a gap therebetween. Therefore, the cushion member 255 is rotatable relative to the coupling member 264. In other words, the coupling member 264 slides and rotates relative to the cushion member 255 when receiving the rotational force. When the coupling member 264 rotates, the cushion member 255 does not rotate, and the connecting member 261 with which the cushion member 255 is connected does not rotate, either. In addition, in this embodiment, the drum shaft 278 and the inner cylindrical cam member 274 are structured so as not to rotate relative to each other. Specifically, the cross-sections of the drum shaft 278 and the recess portion (support portion 274*c*) of the inner cylindrical cam member 274 have a non-circular cross-section, and by the drum shaft 278 engaging (fitting) with the support portion 274*c*, the inner cylindrical cam member 274 does not rotate relative to the drum shaft 278. That is, the inner cylindrical cam 274 does not rotate but can move back and forth in the axial direction (longitudinal direction) along the drum shaft 278. Furthermore, the structure is such that the non-driving side flange member 254 is fixed to the photosensitive member drum 62, but is rotatable relative to the outer diameter portion 274*d* (FIG. 19) of the inner cylindrical cam member 274.

When the drive is transmitted to the coupling member 264, the photosensitive member drum 62 and the non-driving side flange member 254 rotate. Then, the non-driving side flange member 254 arranged so as to surround the inner cylindrical cam member 274 rotates while sliding on the inner cylindrical cam member 274. The non-driving side flange member 254 is supported by the drum shaft 278 by way of the inner cylindrical cam member 274.

In this embodiment, unlike an Embodiment 1, the operation member (lever member 212), the cam mechanism (inner cylindrical cam member 274 and outer cylindrical cam member 270) are provided on the non-driving side. Therefore, the cartridge B is provided with a connecting member 261 for connecting the operating member and the cam mechanism on the non-driving side with the coupling member 264 on the driving side. This connecting member 261 can also be deemed as a portion of the operating unit for moving the coupling member 264. The connecting member 261 is an extending member which extends in the longitudinal direction of the cartridge B. In this embodiment, by arranging the connecting member 261 inside the drum 62, the dead space inside the drum 62 is effectively utilized.

As described above, the first pressing member 259 is the urging member for urging the coupling member 264 to the first position (retracted position). When the lever member 212 is in the first position (normal position), the operating unit allows the coupling member 264 to be in the retracted position by the force of the first pressing member 259.

Figure 29:
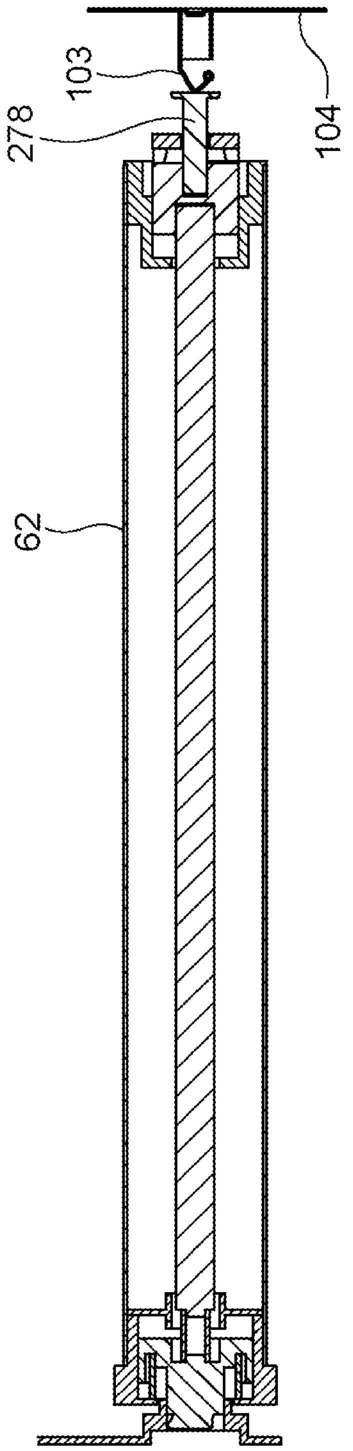
FIG. 29 is an illustration for explaining electrical grounding of the photosensitive drum.

On the other hand, when the lever member 212 moves to the second position (acting position), the cam mechanism (the inner cylindrical cam member 274, the outer cylindrical cam member 270) and the connecting member 261 move interrelatedly with each other. This cam mechanism moves the coupling member 264 to the second position (advanced position) against the urging force of the first pressing member 259. The connecting member 261 is not directly connected to the coupling member 264, but the connecting member 261 and the coupling member 264 are connected by way of the cushion member 255 as described above. In this embodiment, the drum shaft 278, the inner cylindrical cam member 274, and the non-driving side flange member 254 are made of an electroconductive material. By this, the drum 62 and the drum shaft 278 are electrically connected with each other. The drum shaft 278 is a contact member (electrical contact) that is electrically connected to the drum 62 and is used to electrically ground the drum 62. As shown in FIG. 29, the drum shaft 278 is structured to be electrically connected to the sheet metal member of the apparatus main assembly A by way of the contact member 103 provided in the apparatus main assembly A. FIG. 29 is an explanatory view illustrating grounding of the photosensitive drum 62. The contact member 103 is an electrical contact on the apparatus main assembly A side that is electrically connected to a sheet metal member (a plate-shaped metal frame of the apparatus main assembly A) 104.

Since a portion of the operating unit is electrically connected to the drum 62 and the drum shaft 278, the structure is such that the drum 62 and the sheet metal member of the apparatus main assembly A are electrically connected by way of the drum shaft 278 and the operating unit.

Therefore, since the drum shaft 278, the inner cylindrical cam member 274, and the non-driving side flange member 254 are made of a conductive material, the drum can be stably connected (grounded) to the ground.

In addition, similarly to the modified example of Embodiment 1, the coupling member 264 in this embodiment has a structure in which the member 81 can be engaged even when the rotation axis of the coupling member 264 is inclined relative to the rotation axis of the coupling member 264 before engagement. That is, similar to the modification of Embodiment 1, as the coupling member 264 advances toward the drive transmission member 81, the coupling member 264 can reduce the inclination of the drive transmission member 81 (parts (a)-(c) of FIG. 15). By this, the drive transmission member 81 is aligned with the coupling member 264 so that they can be engaged with each other.

Furthermore, the coupling member 64 and the drive transmission member 81 can engage with the drive transmission member 81 even before the engagement is that the rotation axes of the coupling member 64 and the drive transmission member 81 are parallel and not coaxial.

As described above, in this embodiment, the lever member 212 (operation member) is arranged on the non-driving side opposite to the side having the coupling member 264. The non-driving side of the cartridge B is not provided with (or the number of arranged members on this side is small) the drive transmission members such as gears as contrasted to the driving side, so that it is easy to assure a space for placing the lever member 212. That is, by providing the lever member 212 on the non-driving side of the cartridge B, the latitude in design regarding the structure, shape, and arrangement of the lever member 212 can be enhanced. In addition, since a portion of the operating unit is arranged on the non-driving side, a portion of the operating unit can be effectively used as a path for electrically grounding the drum 62. In addition, even if the lever member 212 is arranged on the non-driving side opposite to the side on which the electrical contacts 82, 83 are arranged, the electrical contacts 82, 83 can be pressed against the main assembly side electrical contacts 102, 103 by the pressing force received by the lever member 212 even though the degree of pressing is not as great as in Embodiment 1.

In the above-described Embodiment 1, the operation member 12 and the coupling member 64 are arranged on the same side of the cartridge in the axial direction of the photosensitive drum (FIGS. 1, 4, 5, 9). In other words, in Embodiment 1, the operation member 12 is arranged in the neighborhood of the driving side end of the frame of the cartridge, like the coupling member 64. That is, both the operating member 12 and the coupling member 64 are arranged near the drum bearing 73 arranged on the driving side.

On the other hand, in this embodiment, the operation member 212 and the cartridge member 264 are arranged on the opposite sides of the cartridge (FIG. 21). That is, the operation member 212 is arranged in the neighborhood of the non-driving side end of the cleaning frame 71.

On the basis of what has been described with Embodiment 1 and this embodiment, it may be selected appropriately depending on the functions, structures, conditions and so on required of the cartridge B and the apparatus main assembly A whether the operation member is arranged on the driving side or the non-driving side. Also in each of the embodiments which will be described hereinafter, it is a matter that can be appropriately selected whether the operating member is arranged on the driving side or the non-driving side of the cartridge.

Embodiment 3

Embodiment 3 will be described. In the Embodiment 3, similar to the drive transmission member 81 shown in the modification of the Embodiment 1, the drive transmission member 581 having the axis inclined relative to the axis of the photosensitive drum is shown.

A structure in which the coupling member (drive input member) is engaged with the inclined drive transmission member 581 by determining the position and attitude of the coupling member (drive input member) so as to follow the axis of the inclined drive transmission member 581, will be described (hereinafter in FIG. 35).

Figure 30:
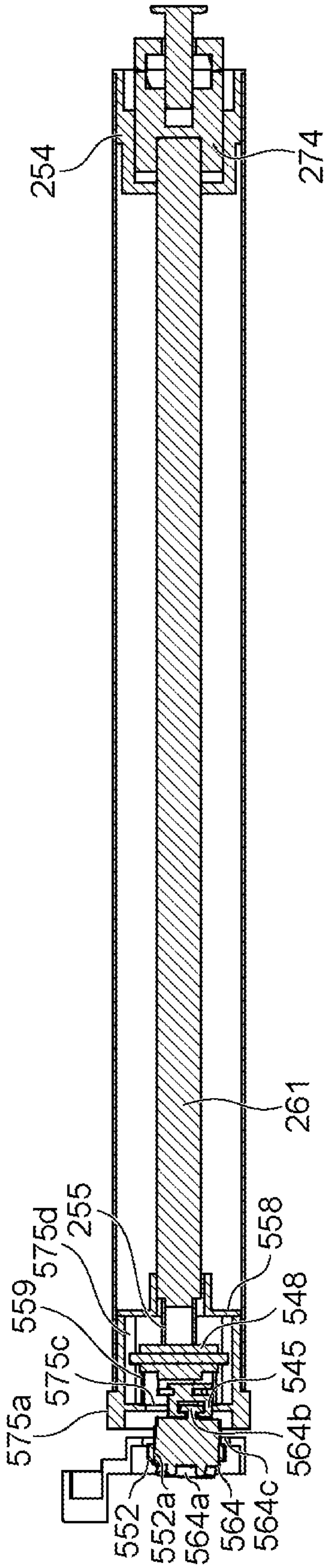
FIG. 30 is a longitudinal sectional view of the drum unit of Embodiment 3.
Figure 31:
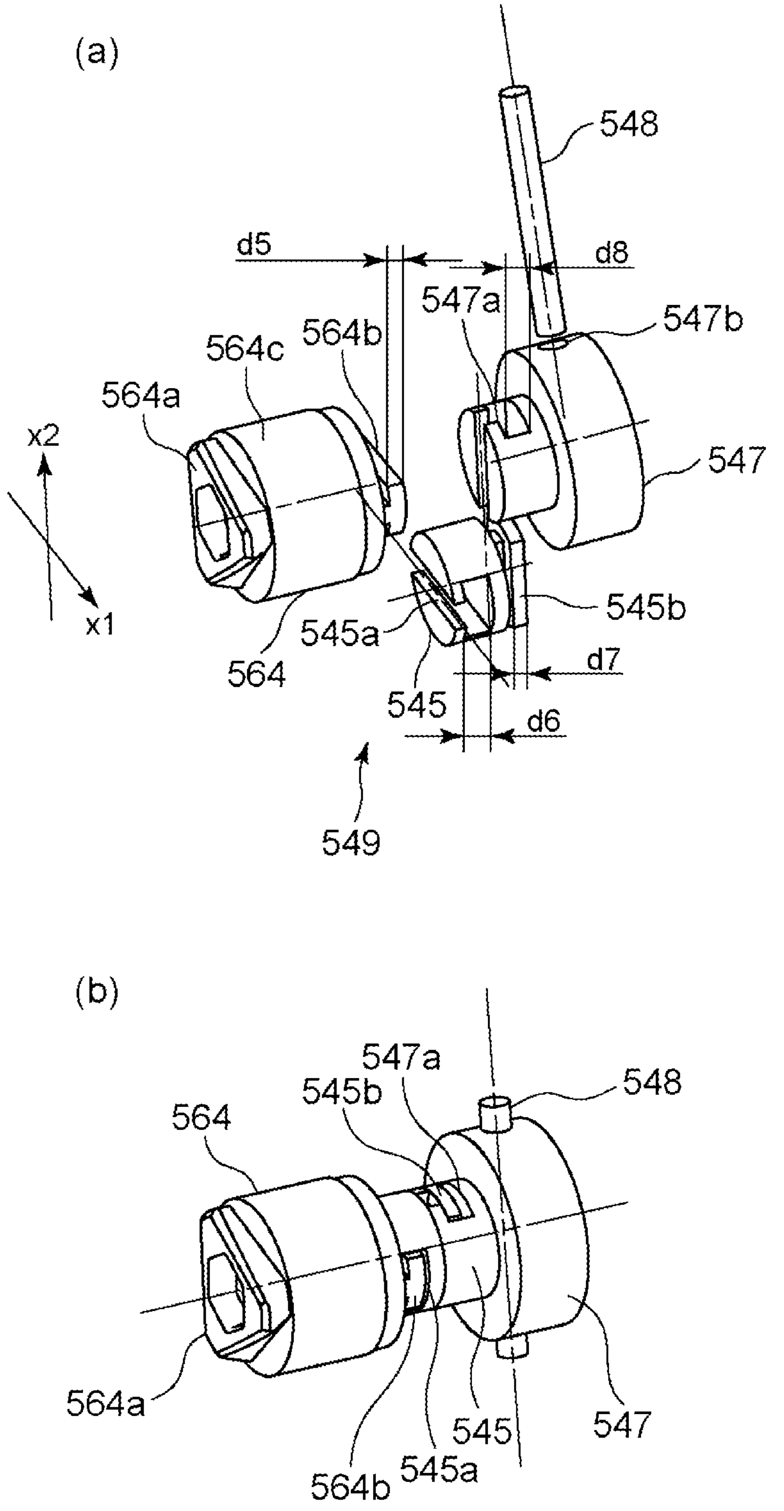
FIG. 31, parts (a) and (b), is a perspective view before assembly and a perspective view after assembly.
Figure 32:
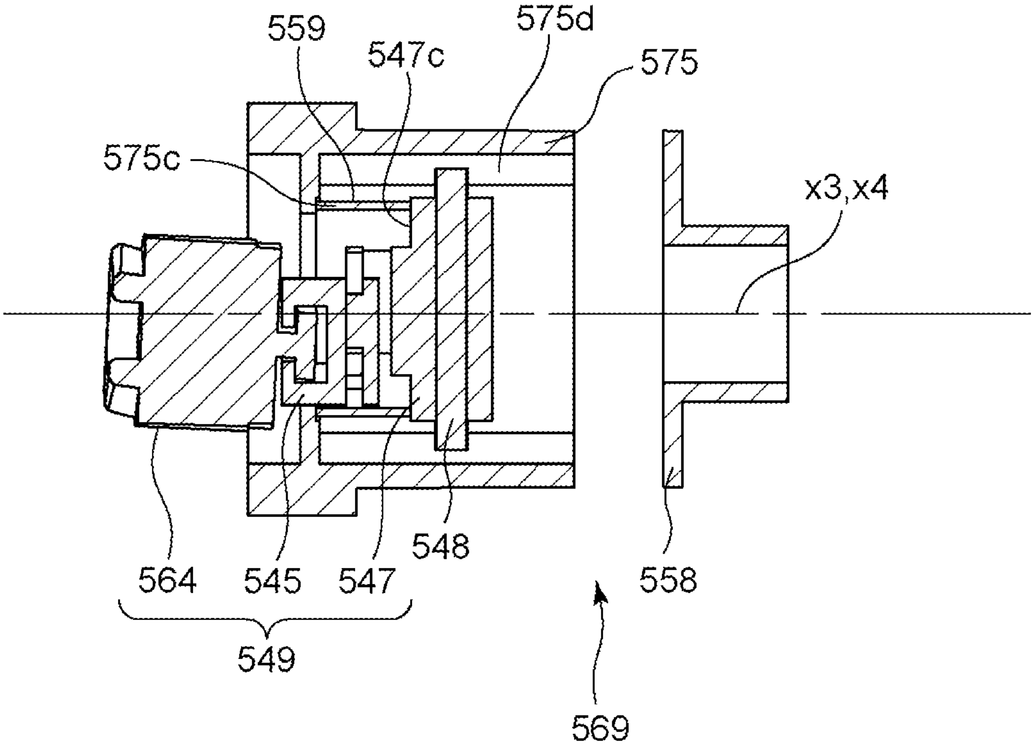
FIG. 32 is a longitudinal sectional view of the driving side flange unit.

Referring first to FIGS. 30, 31 and 32, a driving side flange unit 569 and a drum unit including an Oldham coupling 549 which is the shaft coupling according to this embodiment will be described.

FIG. 30 is a longitudinal sectional view of the drum unit.

FIG. 31 is a perspective view illustrating the Oldham coupling 549 used in this embodiment, part (a) of FIG. 31 is a perspective view before assembly, and part (b) of FIG. 31 is a perspective view after assembly. FIG. 32 is a longitudinal sectional view of the driving side flange unit 569.

As shown in FIG. 30, FIG. 31, and FIG. 32, the driving side flange unit 569 according to this embodiment includes a drive input member 564, an intermediate member 545, a drive force transmission pin 548, an output member 547, a lid member 558, and a first pressing member 559, and the like. In addition, as shown in FIG. 30, the drum unit of this embodiment includes the driving side flange unit 569, a connecting member 261, a cushion member 255, a non-driving side flange member 254, and an inner cylindrical cam member 274. The connecting member 261, the cushion member 255, the non-driving side flange member 254, and the inner cylindrical cam member 274, which are the operating member unit for moving the drive input member 564 back and forth, have the same structures as those of the Embodiment 2, and therefore, detailed description thereof is omitted.

As shown in FIGS. 30 and 31, the drive input member 564 of this embodiment includes a driven transmission portion (driving force receiving portion) 564*a* as in the above-described embodiments. The drive input member 564 is a part of the coupling member (Oldham coupling 549), and the drive force is inputted to the drive input member 564 by way of the driven transmission portion 564*a*.

As the shape of the driven transmission portion 564*a*, a triangular shape is used as in the above-described embodiment. In addition, the drive input member 564 is provided with a guided rib 564*b* which is locked to an Oldham coupling 549, which will be described hereinafter. As shown in FIG. 31, the Oldham coupling 549 includes the drive input member (input disc, input member, input portion) 564, an intermediate member (intermediate member, intermediate disc, intermediate portion) 545, and the drive output member (output member, output disc, output portion) 547.

The intermediate member 545 has a guide groove 545*a* and a guided rib 545*b*. Similar to the intermediate member 545, the output member 547 is provided with a guided groove 547*a* and a hole portion 547*b* into which a drive transmission pin, which will be described hereinafter, is inserted. As shown in part (a) of FIG. 31, the drive input member 564 is locked to the intermediate member 545 by engaging the guided rib 564*b* provided in the drive input member with the guide groove 545*a* of the intermediate member 545. This allows the drive input member 564 to move in the x1 direction in part (a) of FIG. 31 relative to the intermediate member. That is, the input member 564 is engaged with the intermediate member 545 so as to be slidable in the x1 direction relative to the intermediate member 545.

The intermediate member 545 is locked to the output member 547 by engaging the guided rib 545*b* provided in the intermediate member with the guided groove 547*a* of the output member 547. By this, the intermediate member 545 is movable relative to the output member 547 in the x2 direction in part (a) of FIG. 31. That is, the intermediate member 545 is engaged with the output member 547 so as to be slidable in the x2 direction relative to the output member 547.

The x1 direction and the x2 direction are different directions (that is, directions orthogonal to each other), and therefore, the drive input member 564 is structured to be movable with respect to the output member 547 in any of the x1 direction and the x2 direction. In addition, as shown in part (a) of FIG. 31, in this embodiment, the guided width d5 of the guided rib 564*b* of the drive input member, the width d6 of the guide groove of the intermediate member, and the guided width d7 of the intermediate member and the output member, and the width d8 of the slide groove of the output member are selected to satisfy d5<d6 and d7<d8. Although the details will be described hereinafter, the axis of the drive input member 564 is structured to be inclinable relative to the axis of the photosensitive drum.

A drive transmission pin 548 for transmitting the drive force received by the drive input member 564 to the driving side flange member 575 by way of the transmitted surface 575*d* is inserted into the hole 547*b* of the output member 547. By this, the Oldham coupling 549 including the drive input member 564 is completely constituted (part (b) of FIG. 31).

The input member 564 is a disk to which driving force is input from outside. The output member 547 is a disk for outputting a driving force from the Oldham coupling 549 to the photosensitive drum. That is, the output member 547 has the drive transmission pin (drive transmission portion) 548 to output the driving force to the driving side flange member 575. The driving force output from the output member 547 via the drive transmission pin 548 is transmitted to the photosensitive drum through the driving side drum flange. The intermediate member 545 is a disk which is provided between the input member 564 and the output member 547 so as to transmit the driving force from the input member 564 to the output member 547, and which is engaged with the input member 564 and the output member 547.

FIG. 32 shows a cross-section of the driving side drum flange unit 569, and is a view before the lid member 558 is assembled.

As shown in FIG. 32, the Oldham coupling 549 including the drive input member 564 is inserted in the driving side flange member 575 together with the first pressing member 559, as in Embodiment 2.

The first pressing member 559 is arranged between the contact surface 547*c* of the output member 547 and the contact surface 575*c* of the driving side flange member 575. By this, the Oldham coupling 549 including the drive input member 564 is structured to be urged to the first position, in the longitudinal direction, which is the retracted position. The axis x3 of the output member 547 and the axis x4 of the driving side flange member 575 are structured to be coaxial. The lid member 558 is fixed to the driving side flange member 575. The driving side flange member 564 to which the lid member 558 is fixed to the photosensitive drum 62. The connecting member 261, the cushion member 255, the non-driving side flange member 254, and the inner cylindrical cam member 274 described in Embodiment 2 are also mounted to the drum unit (FIG. 30).

As described above, the drive input member 564 is structured to take an arbitrary position in the x1 direction and the x2 direction in part (a) of FIG. 31 relative to the output member 547. In addition, since the output member 547 and the axis lines x3 and x4 of the driving side flange member are coaxial with the axis L1 of the photosensitive member drum 62, the drive input member 564 in this embodiment can take any position in the x1 direction and in the x2 direction relative to the axis of the photosensitive member drum 62.

Next, referring to FIGS. 33 and 34, a method for assembling the drum unit according to this embodiment will be described. Part (a) of FIG. 33 is a perspective view illustrating a method of assembling the drum unit.

Figure 33:
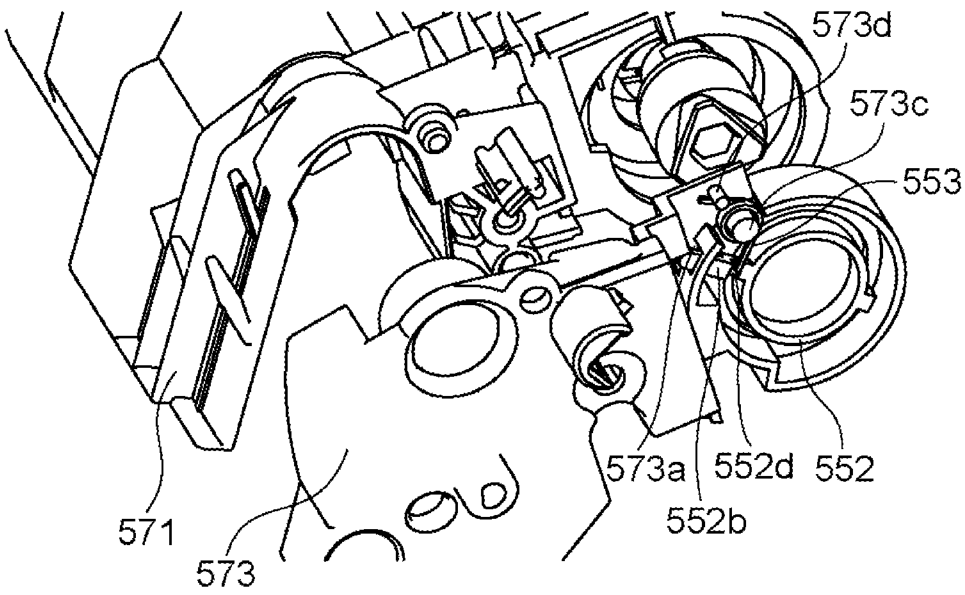
FIG. 33, parts (a) and (b), is a perspective view illustrating a method of assembling the drum unit and a partial detailed view illustrating a locking portion for a coupling support member 552 and a drum bearing 573.
Figure 33:
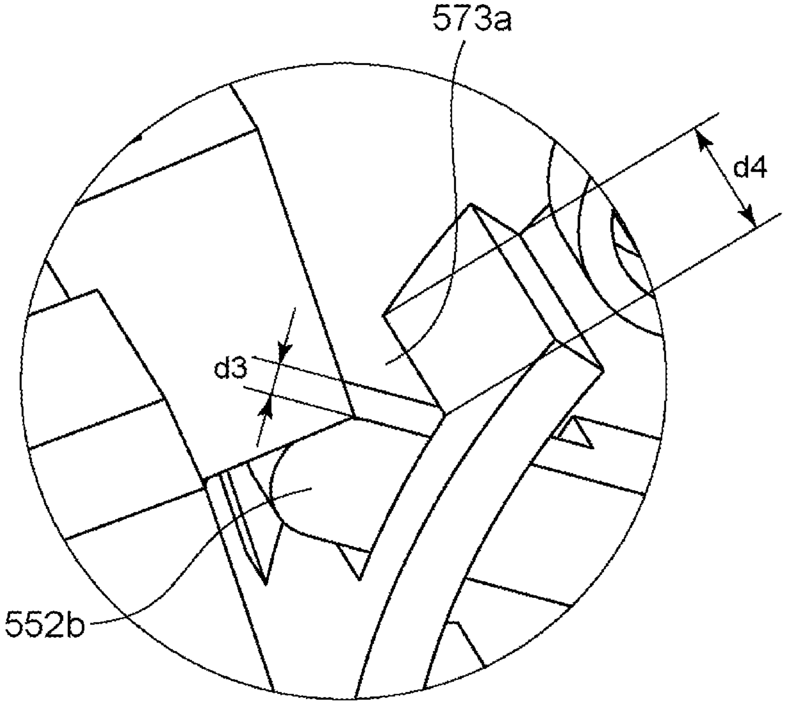

Part (b) of FIG. 33 is a partial detailed view illustrating a locking portion between the coupling support member 552 and the drum bearing 573.

Figure 34:
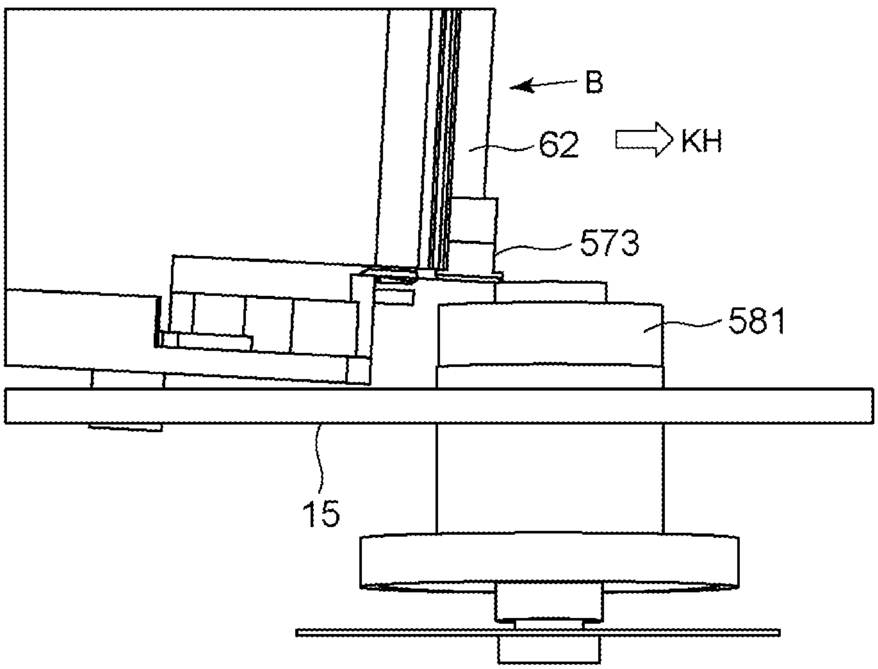
FIG. 34, parts (a) and (b), is a side view of the process cartridge.
Figure 34:
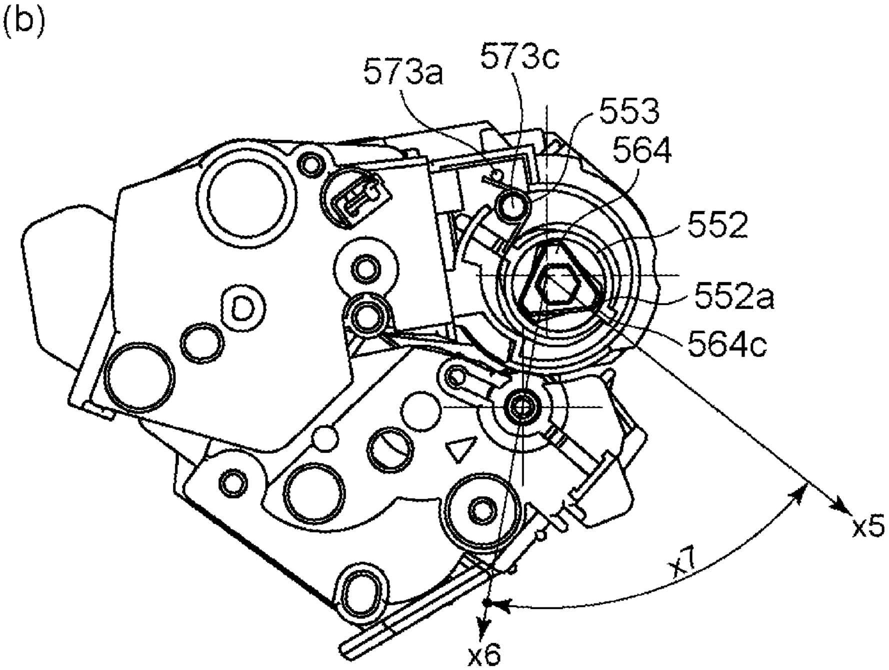

FIG. 34 is a side view of the process cartridge according to this embodiment.

As shown in FIG. 33, the drum unit of this embodiment is rotatably supported by the cleaning frame 571 by way of a drum bearing 573. A coupling support member 552 and a coupling urging member 553 are mounted to the drum bearing 573 in this embodiment. As shown in part (a) of FIG. 33, the coupling support member 552 is structured such that the locked portion 552*b* of the coupling support member 552 is locked by the cut-away portion 573*a* provided in the drum bearing 573. In addition, in this embodiment, the relationship between the width d3 of the locked portion 552*b* of the coupling support member 552 and the cut-away width d4 of the cut-away portion 573*a* of the drum bearing 573 is d4>d3.

By this, the axis of the coupling support member 552 is structured to be inclinable relative to the axis of the photosensitive member drum. A torsion coil spring is used as a coupling urging member 553 in this embodiment, and the torsion coil spring is held by boss portions 573*c* and 573*d* of the drum bearing 573. One end of the torsion coil spring is in contact with the contacted portion 552*d* of the coupling support member 552, and the coupling support member 552 is structured to urge in the X5 direction in part (b) of FIG. 34.

As shown in FIGS. 30 and 34, the coupling support member 552 is structured to rotatably support the drive input member outer peripheral portion 564*c* by the inner peripheral portion 552*a*. By this, the drive input member 564 supported by the coupling support member 552 is urged in the x5 direction in the Figure by the urging force of the coupling urging member 553. As will be described hereinafter, the direction x5 is a direction in which the drive input member 564 engages with the drive transmission member 81 having an axis inclined relative to the axis of the photosensitive drum.

Next, referring to part (a) of FIG. 34, the inclination of the drive transmission member 581 will be described. Similar to the modified example of Embodiment 1 described above and the like, the drive transmission member 581 is also inclinable in this embodiment. That is, similar to the above-described embodiment, there is a gap (play) between the bearing portion which supports the drive transmission member 581 and the drive transmission member 581. The drive transmission member 581 can be tilted within this gap.

However, in this embodiment, the direction in which the drive transmission member 581 is inclined is different from that in each of the above-described embodiments. That is, in the above-described embodiment, the drive transmission member is inclined downward due to gravity when it is not connected to the cartridge B (FIG. 15 and so on). However, in this embodiment, the drive transmission member 581 is inclined in a direction different from the gravity direction (right downward). Specifically, as shown in part (a) of FIG. 34, the drive transmission member 581 is inclined so that the free end of the drive transmission member 581 is directed toward the downstream side in the mounting direction KH of the cartridge B. The reason for this will be described.

As shown in part (a) of FIG. 34, the cartridge may be mounted to the apparatus main assembly in a state of being slightly inclined relative to the apparatus main assembly. At this time, a portion of the cartridge B lightly contacts the free end portion of the drive transmission member 581 and pushes it, with the possible result that the drive transmission member 581 is inclined toward the downstream side in the mounting direction KH. If the attitude and the momentum when mounting the cartridge B are different, the contacting state between the cartridge B and the drive transmission member 581 is also different, and the inclining direction and the inclining distance of the drive transmission member 581 may be different. Under such circumstances, the attitude (inclination) of the drive transmission member 581 varies every time the cartridge B is mounted, with the result that it may be difficult to stably engage the drive transmission member 581 and the cartridge B with each other.

Therefore, in this embodiment, the drive transmission member 581 is preliminarily inclined to the downstream side in the mounting direction KH. That is, regardless of how the cartridge B is mounted, the drive transmission member 581 is always inclined in substantially the same direction so as to take a substantially the same attitude. By this, the connection between the drive transmission member 581 and the cartridge B is stabilized every time.

In the state that the cartridge B is mounted in the apparatus main assembly, the free end of the drive transmission member 581 is inclined relative to the cartridge B in the arrow x5 direction shown in part (b) of FIG. 34.

The arrow x5 direction is the direction of a line (half line) x6 extending from the center of the photosensitive drum toward the center of the developing roller when the line is rotated counterclockwise by 41 degrees. The counterclockwise direction in part (b) of FIG. 34 is the direction in which the photosensitive drum rotates when a latent image and a toner image are formed on the surface of the photosensitive drum.

In this embodiment, the drive input member 564 is moved in the x5 direction relative to the photosensitive drum, with the drive transmission member 581 being inclined in the x5 direction. By this, the drive transmission member 581 and the drive input member 564 are engaged (connected) with each other. Referring to FIGS. 35 and 36, this will be described in detail.

Figure 35:
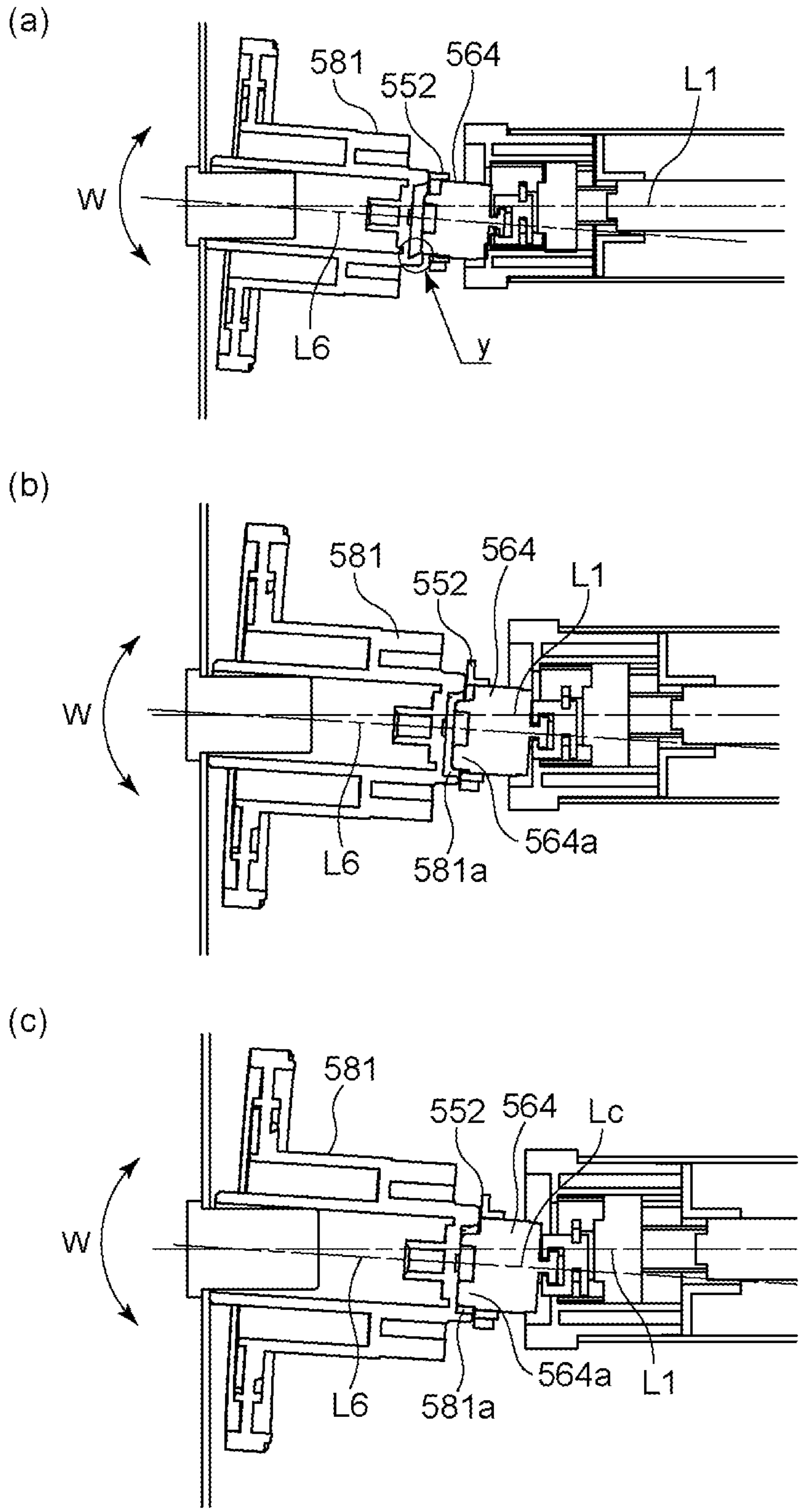
FIG. 35, parts (a), (b), and (c), is a longitudinal sectional view of the apparatus main assembly.
Figure 36:
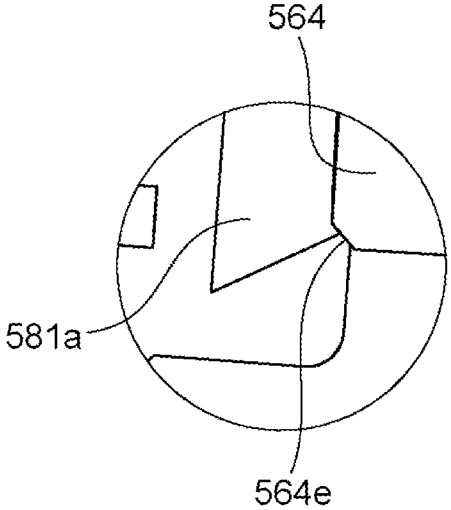
FIG. 36 is a partial detailed view of the apparatus main assembly.

Parts (a), (b), and (c), of FIG. 35 show step by step how the drive input member 564 of this embodiment is engaged with the drive transmission member 581 having the axis L6 inclined with respect to the axis L1 of the photosensitive drum.

Similar to Embodiment 2, part (a) of FIG. 35 is a longitudinal sectional view illustrating a state in which the process cartridge is inserted into the apparatus main assembly A and the opening/closing door 13 is closed. Part (b) of FIG. 35 is a longitudinal cross-sectional view immediately after the operation in which the driving force is input to the apparatus main assembly A, the drive transmission member 581 starts to rotate, and the phase of the drive transmission portion 581*a* and the phase of the driven transmission portion 564*a* of the drive input member 564 are within a predetermined range. Part (c) of FIG. 35 is a longitudinal sectional view illustrating a state in which the drive transmission portion 581*a* of the drive transmission member 581 and the driven transmission portion 564*a* of the drive input member 564 are completely engaged with each other.

FIG. 36 is a partial detailed view of y portion of part (a) of FIG. 35.

The coupling member (Oldham coupling 549) of this embodiment has a structure capable of moving back and forth similar to the coupling members of the first and second embodiments described above. The structure for moving the Oldham coupling 549 (drive input member 564, intermediate member 545, output member 547) along the longitudinal direction is the same as that in Embodiment 2. That is, the output member 547 moves along the axial direction of the photosensitive member drum 62, similar to the coupling member 264 shown in FIG. 26. By this movement of the output member 547, the entire coupling member (Oldham coupling 549) moves between the advanced position (part (c) of FIG. 35) and the retracted position (part (a) of FIG. 35).

As described above, in this embodiment, the drive input member 564 is urged in the x5 direction of part (b) of FIG. 34 so that the drive input member 564 can be engaged with the drive transmission member 581 having the axis L6.

More specifically, the drive input member 564 is urged in the x5 direction such that in the state that the opening/closing door 13 of the apparatus main assembly is closed, a part of the chamfered portion 564*e* is inside the drive transmission portion 581*a* of the drive transmission member 581 in the radial direction. When the drive transmission member 581 further rotates, the drive input member 564 moves to the second position in the longitudinal direction, and the engagement between the input member 564 of the Oldham coupling and the drive transmission member 581 is completed (part (c) of FIG. 35).

As described above, in this embodiment, the axes of the drive input member (input member, input portion) 564 and the coupling support member (coupling bearing) 552 are structured to be inclinable relative to the axis of the photosensitive drum. Therefore, when the engagement between the drive input member 564 and the drive transmission member 581 is completed, the axes of the drive input member 564 and the coupling support member 552 are coaxial with the axis of the drive transmission member 581.

The drive transmission member of the apparatus main assembly is transmitted to the photosensitive drum by way of the drive input member 564, the intermediate member (intermediate member, intermediate portion) 545, the output member (output portion) 547, the drive transmission pin 548, and the driving side flange member 575.

As described above, in this embodiment, the drive input member 564 is urged in the x5 direction (FIG. 34), by which the drive input member 564 can be engaged with the drive transmission member 81 having the axis L6 inclined relative to the axis L1 of the photosensitive drum.

The Oldham coupling 549 (the drive input member 564, the intermediate member 545, the output member 547) is an axis misalignment permitting mechanism (misalignment accommodating mechanism) for permitting a state in which the axis of the drive transmission member 581 and the axis of the photosensitive drum are not aligned with each other (axis misalignment state).

That is, the coupling member (Oldham coupling 549) has the input member 564 for inputting a driving force from the apparatus main assembly and the output member 547 for outputting the driving force to the photosensitive drum. The axis of the output member 547 is substantially aligned with the axis L1 of the photosensitive drum, and the input member 564 is movable relative to the output member 547 in the direction crossing with the axis of the output member (direction perpendicular to each other). That is, the axis (rotation center) of the input member 564 can be displaced (offset or separated) from the axis (L1) of the output member 547. By this, the input member 564 can accommodate the deviation resulting between the axis of the drive transmission member 581 and the axis of the photosensitive drum. That is, since the input member 654 is displaced in the direction intersecting the axis L1, the free end of the drive transmission member 581 and the input member 654 are close to each other when the cartridge B is mounted in the apparatus main assembly. In this state, the input member 654 further approaches the drive transmission member 581 along the axis L1 and engages with the drive transmission member 581.

In this embodiment, the direction in which the center of the input member 654 is displaced with respect to the output member 547 and the photosensitive member drum is the arrow x5 direction shown in part (b) of FIG. 34. The x5 direction is a direction in which the free end side of the drive transmission member 581 is inclined as described above. The x5 direction is a direction in which a line x6 extending from the center of the photosensitive drum toward the center of the developing roller is rotated counterclockwise (that is, toward the downstream side in the rotational direction of the photosensitive drum) by an angle x5.

In this embodiment, the angle in the direction x5 in which the free end of the drive transmission member 581 is inclined is 41 degrees. Therefore, the angle x7 of the direction in which the input member 654 is displaced is also 41 degrees. However, the angle in the direction in which the drive transmission member 581 is displaced need not be strictly 41 degrees, and may be in the range of 11° to 71° (range of ±30 degrees with respect to the angle of the drive transmission member 581). That is, the direction in which the input member 654 is displaced relative to the photosensitive member drum is in a range greater than 11 degrees and less than 71 degrees relative to x6.

The input member 654 is held in a state of being moved in the x5 direction by urging the input member 654 by the coupling urging member 553 (referring to part (a) of FIG. 33). An elastic member (spring) is employed as the coupling urging member 553. Although the coupling urging member 553 of the present embodiment is a torsion coil spring, it is not limited to this example and may have another structure.

In this embodiment, the axis of the input member 654 may be inclined with respect to the axis (L1) of the output member 547 and the photosensitive member drum 62. The input member 654 is also inclined along the inclined drive transmission member 581 to stabilize the engagement state between the drive transmission member 581 and the input member 654. As shown in parts (a), (b), and (c) of FIG. 35, the axis of the input member 654 is inclined so as to approach the axis of the drum toward the free end (that is, the left side) of the Oldham coupling. In parts (a), (b), and (c) of Figure, the axis of the input member 654 is inclined toward the upper left.

As described above, in this embodiment, the drive transmission member 581 is inclined in the KH direction (x5 direction) (parts (a) and (b) of FIG. 34). The drive transmission members of Embodiments 1 and 2 may also be inclined in the same direction as this embodiment. Also in the embodiments which will be described hereinafter, the drive transmission member may be inclined in the same direction as this embodiment.

Embodiment 4

Next, Embodiment 4 will be described. The description of the same points as those in the above-described embodiment may be omitted. In particular, among the elements disclosed in the present embodiment, those corresponding to the members described in Embodiment 1 will be assigned the same names as the members of the Embodiment 1, and only the points different from those of the Embodiment 1 will be described.

In the modification of the Embodiment 1 described above, the slope of the free end of the coupling member 64 is brought into contact to the drive transmission member 81 in the process of moving the coupling member 64 toward the drive transmission member 81. By this, the coupling member 64 causes the drive transmission member 81 to incline so that the coupling member 64 is engaged with the drive transmission member 81.

On the other hand, in this embodiment, the drive transmission member 81 and the coupling member are engaged with each other by controlling the phase of the coupling member to a specific state depending on the inclination of the drive transmission member 81. That is, the coupling member is held in the phase that facilitates engagement with the inclined drive transmission member 81. The difference in the structure and the operation caused by the difference in the coupling engagement method will be described in detail.

(Explanation of Process Cartridge Mounting/Dismounting)

Figure 37:
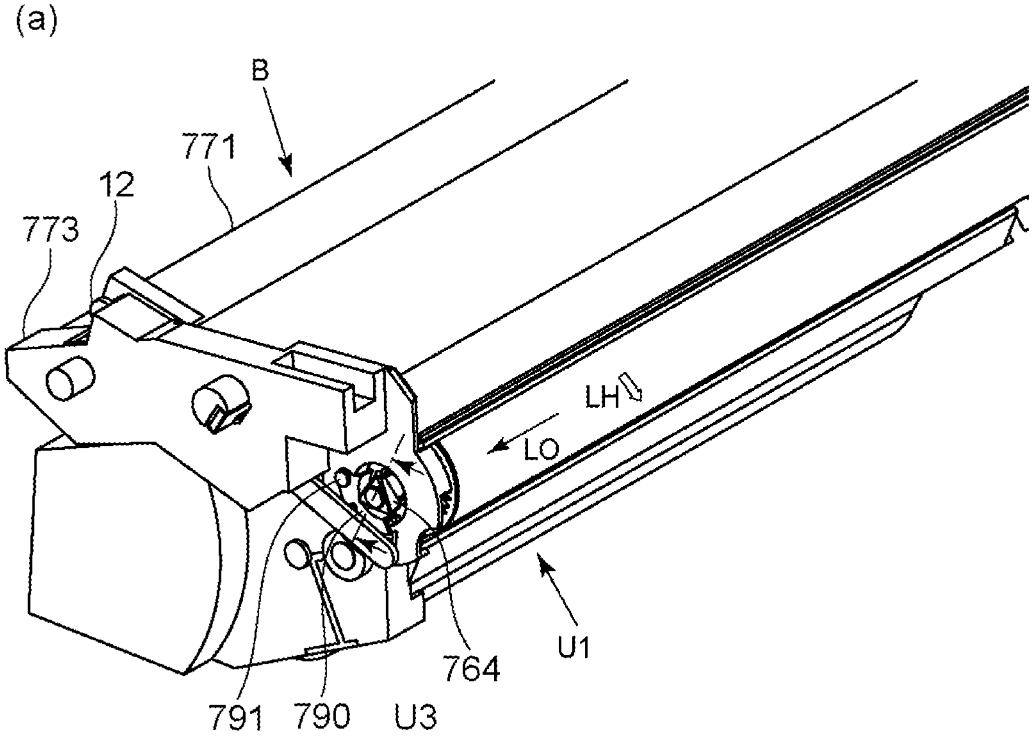
FIG. 37, parts (a) and (b), is a perspective view of the process cartridge.
Figure 37:
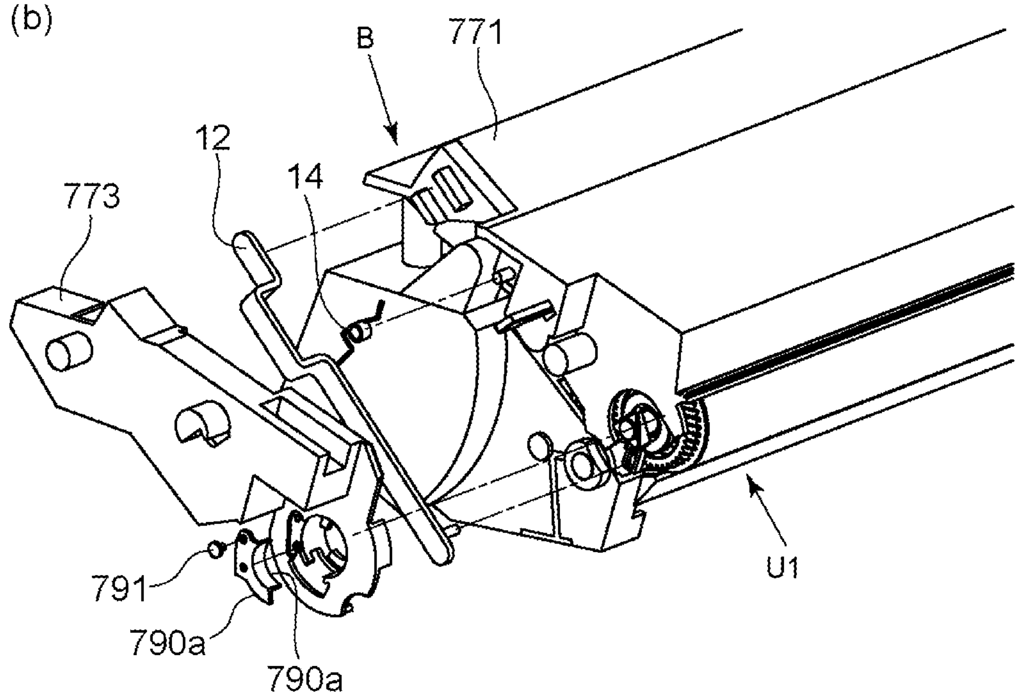

FIG. 37 is a perspective view of a cartridge B of an embodiment according to the present application.

Part (a) of FIG. 37 is an overall view of the cartridge B. Part (b) of FIG. 37 is an exploded view of the cartridge B illustrating the mechanism for operating an input member (driving input member, moving member) 764.

In part (a) of FIG. 37, a coupling unit U3 including an input member 764 is provided on a side surface of a cleaning frame 771. In addition, on this side surface, a drum bearing 773 which rotatably supports the drum unit U1 and a restricting member 790 which is fixed to the drum bearing 773 and which regulates the movement of the coupling unit U3 in the longitudinally outward direction LO are provided.

Part (b) of FIG. 37 is an exploded perspective view when the restricting member 790 and the drum bearing 773 are removed. The restricting member 790 is fixed to the drum bearing 773 with screws 791. The end surface 790*a* of the restricting member 790 can contact the end surface 770*a* of the outer cylindrical cam 770 which will be described hereinafterwith FIG. 43, and restricts the outer cylindrical cam 770 from moving in the longitudinally outward direction LO.

Next, referring to FIG. 38, a description will be made as to the internal structure of the coupling unit U3 for receiving a rotational force from the drive transmission member 81 of the apparatus main assembly A. Part (a) of FIGS. 38 and 38(*b*) are exploded perspective views of the coupling unit U3. The outside of the long side is LO and the inside of the long side is LI.

The coupling unit U3 includes a coupling shaft 793, a third pressing member 787, an input member 764, an outer cylindrical cam 770, an inner cylindrical cam 774, a first pressing spring 759, a driving side flange 775, a torsion spring 789, and a fixing screw 788.

Figure 43:
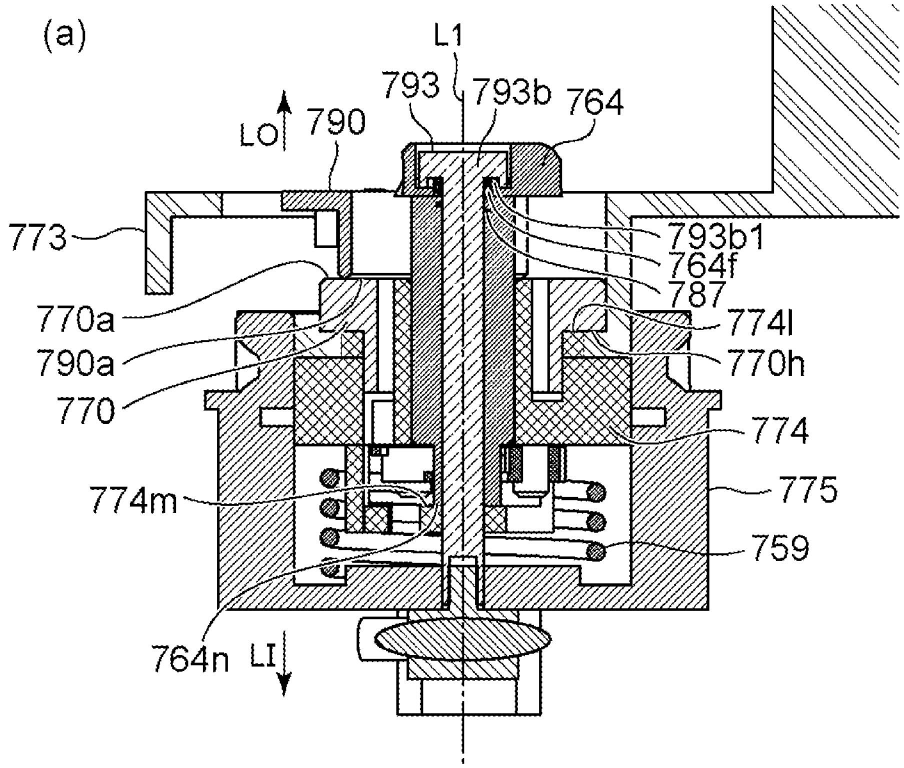
FIG. 43, parts (a) and (b), is a sectional view of the coupling unit.
Figure 43:
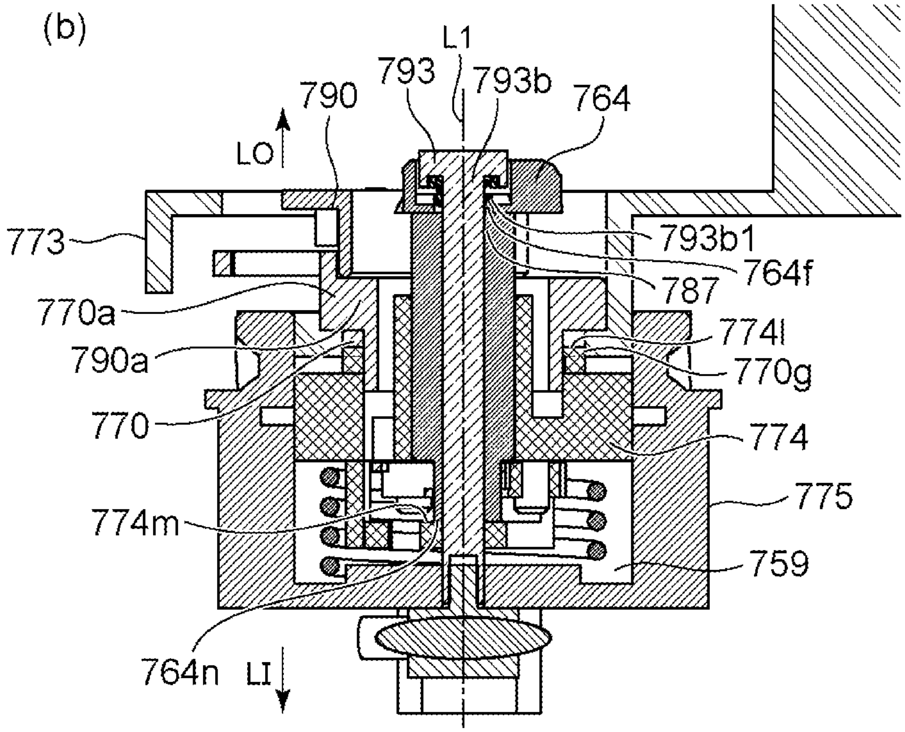

The coupling shaft 793 is provided on the driving side flange 775. In this embodiment, the coupling shaft 793 is fixed to the driving side flange 775 using a fixing screw 788. In this embodiment, the coupling shaft 793 is provided coaxially with the rotation axis L1 of the drum 62. More specifically, the fixing screw 788 penetrates the hole 775*a* of the driving side flange 775, is inserted into the hole 793*a*1 of the coupling shaft 793, and is fixed by a screw. The coupling shaft 793 has a free end portion 793*b* as a restricting portion in the longitudinally outside direction LO (longitudinal outside end portion) and a shaft 793*a* in the longitudinally inward direction LI. In the longitudinally inward direction LI of the free end portion 793*b*, there is provided an engaging portion 793*b*1 which includes a plurality of recesses and projections and which functions as a drive transmitting portion. An end surface 793*b*2 is provided radially inside the engaging portion 793*b*1 (an enlarged view is shown in FIG. 43).

Figure 39:
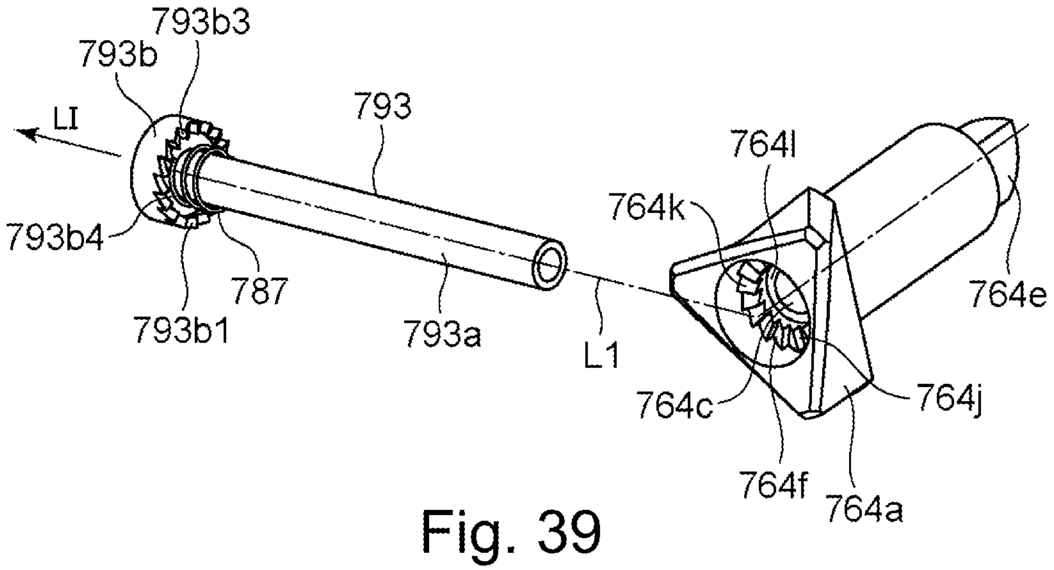
FIG. 39 is an exploded view of a coupling shaft and the coupling member.

In this embodiment, the input member 764 has, at one end, a driven transmission portion 764*a*, which is a substantially triangular twisted prism, and a substantially triangular prism 764*e* at the other end. The input member 764 is provided at the center of the rotation axis L1 with an engaging portion 764*f* as a driving force transmitting portion including a through hole 764*c* and a plurality of recess and projections (part (a) of FIG. 39 is an enlarged view). The engaging portion 764*f* is adjacent to the driven transmission portion 764*a* in the inward radial direction and adjacent to the through hole 764*c* in the outward longitudinal direction LO. The coupling shaft 793 is inserted into the through hole 764*c* of the input member 764. The third pressing member 787 is mounted around the shaft 793*a* of the coupling shaft 793, and is disposed between the input member 764 and the end surface 793*b*2 of the free end portion 793*b* functioning as the restricting portion for the coupling shaft 793. The engaging portion 793*b*1 as a driving force receiving portion of the coupling shaft 793 and the engaging portion 764*f* as a driving force transmitting portion of the input member 764 are structured to be engageable with and disengageable from each other. By this, the driving force is transmitted or interrupted between the input member 764 and the coupling shaft 793.

The coupling member of this embodiment includes the input member 764 and the coupling shaft 793. The input member 764 is a drive input member provided on the coupling member to receive a driving force inputted from the outside. Although it will be described in detail hereinafter, the input member 764 is a moving member (movable coupling member) which can move along the axis of the coupling member. On the other hand, the coupling shaft 793 is an output member (driving output member) for outputting a driving force from the coupling member toward the photosensitive drum. The coupling shaft 793 is a connecting member which is connected to the driving side flange 775 so as to be capable of transmitting the driving force, and is a fixed member which is fixed to the driving side flange 775 and the photosensitive drum.

Here, the engaging portion 793*b*1 functions as a restricting portion, and the engaging portion 764*f* functions as a regulated portion. The coupling shaft 793 can regulate the movement of the input member 764 by the contact between the restricting portion (engagement portion 793*b*1) and the regulated portion (engagement portion 764*f*). That is, the movement of the input member 764 in the direction away from the driving side flange 775 (or the drum 62) can be restricted.

The outer cylindrical cam 770 is provided so as to surround the periphery of the input member 764. The outer cylindrical cam 770 has the end surface 770*a* on the outside with respect to the longitudinally outward direction LO. The outer cylindrical cam 770 is provided on the longitudinally LI inner side with an end surface 770*b* having a cam 770*e* and a cylindrical portion 770*c* provided with a through hole 770*d* at the center.

The inner cylindrical cam 774 has a cylinder 774*a*, a hole 774*j*, an outer end surface 774*b*, a hole 774*c*, a cam 774*d*, a hole 774*e*, a shaft 774*f*, an inner end surface 774*g*, a wall 774*h*, and a hole 774*i*. The hole 774*j* is provided at the center of the cylindrical portion 774*a*. The cam 774*d* projects from the outer end surface 774*b* in the longitudinally outward direction LO. A hole 774*c* is arranged around the cylindrical portion 774*a*. The hole 774*e* is provided at least in the outer end surface 774*b*. The hole 774*e* may be penetrated. The shaft 774*f* and the wall 774*h* are arranged so as to project in the longitudinally inward direction LI from the inner end surface 774*g*. A hole 774*i* is provided in the inner cylindrical cam 774 at the longitudinally inward LI side. The shaft 793*a* of the coupling shaft 793 is in the hole 774*i*.

The shaft 764*d* of the input member 764 is in the hole 774*j*. The cylindrical portion 770*c* of the outer cylindrical cam 770 is in the hole 774*c*. The cam 774*d* of the inner cylindrical cam 774 and the end surface 770*b* including the inclined surface 770*e* of the outer cylindrical cam 770 are structured to contact with each other.

The torsion spring 789 has a hole 789*a*, an arm 789*b*, and an arm 789*c*. By inserting the hole 789*a* of the torsion spring 789 into the shaft 774*f*, the torsion spring 789 is held by the shaft 774*f*. The arm 789*c* contacts a radially inner surface of a wall 774*h* of the inner cylindrical cam 774. The arm 789*b* contacts a substantially triangular prism 786*e* provided on the input member 764.

In this embodiment, two cams 774*d* and holes 774*e* are provided, and three shafts 774*f* and three walls 774*h* are provided.

The driving side flange 775 is provided with the hole 775*a* on the inside with respect to the longitudinally inward direction LI. The driving side flange 775 has a gear 775*b*, a hole 775*c*, and an outer end surface 775*d* with respect to the longitudinal direction LO.

The first pressing spring 759 as an urging member is accommodated in the hole 775*c* of the driving side flange 775. The first pressing spring 759 contacts the end surface 775*d* of the driving side flange 775 in the longitudinally inward direction LI, and contacts the end surface 774*g* of the inner cylindrical cam 774 in the longitudinally outward direction LO.

FIG. 39 is an enlarged perspective view of the coupling shaft 793, the third pressing member 787 as an urging member, and the input member 764. This is for explaining the free end portion 793*b* as a restricting portion of the coupling shaft 793.

The engaging portion 793*b*1 as a driving force receiving portion including a plurality of recesses and projections is provided at the free end portion 793*b* as the regulated portion of the coupling shaft 793. An arbitrary projection of the free end portion 793*b* has a surface 793*b*3 on one side in the circumferential direction and a surface 793*b*4 on the opposite side in the circumferential direction. In this embodiment, the surface 793*b*3 is the drive transmission surface (the shaft side driving force receiving portion or the flange side driving force receiving portion).

A third pressing member 787 is provided around the shaft 793*a*. An end surface 787*a* of the third pressing member 787 contacts the end surface 793*b*2 of the free end portion 793*b* in the assembled state.

Next, the input member 764 will be described.

An arbitrary projection of the engaging portion 764*f* has a surface 764*j* on one side in the circumferential direction and a surface 764*k* on the opposite side in the circumferential direction. In this embodiment, the surface 764*j* is the drive transmission surface (driving force transmission portion). When the coupling shaft 793 and the input member 764 are in the drive transmission state, the surface 793*b*3 as the drive force receiving portion of the coupling shaft 793 and the surface 764*j* as the drive force transmission portion of the input member 764 contact with each other, and the input member 764 transmits the driving force to the coupling shaft 793. The input member 764 has an end surface 764*l*. The end surface 764*l* is in contact with the end surface 787*b* (FIG. 43) of the third pressing member 787 in the assembled state.

The input member 764 has a through hole 764*c* centered on the axis L1.

Figure 40:
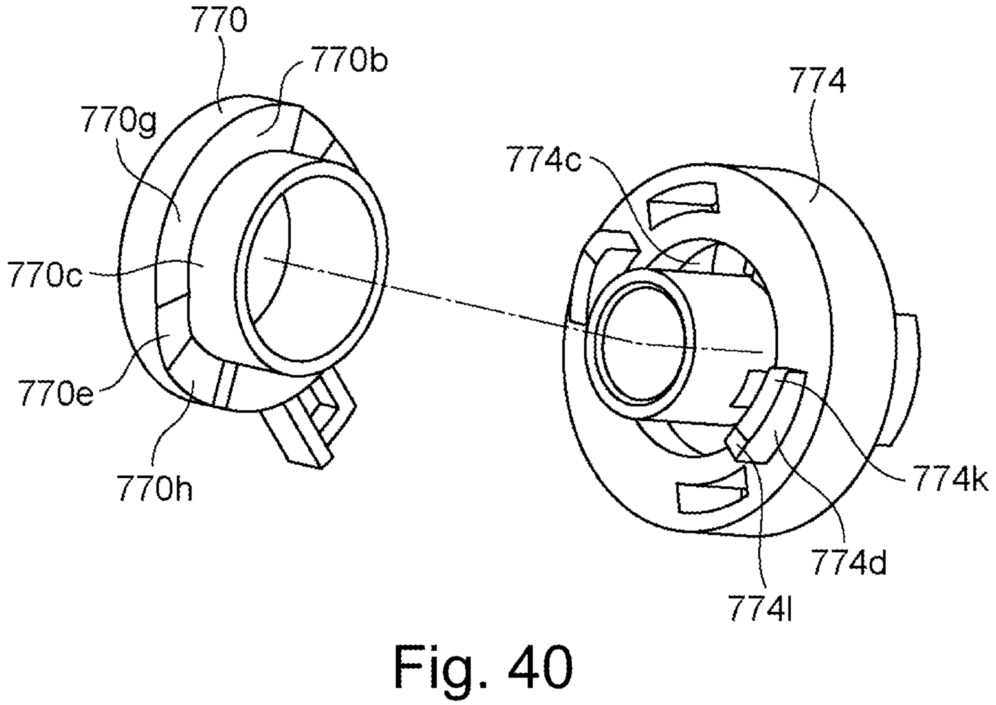
FIG. 40 is an exploded view of an outer cylindrical cam and an inner cylindrical cam.

FIG. 40 is an illustration of a contact portion between the outer cylindrical cam 770 and the inner cylindrical cam 774. The cylindrical portion 770*c* of the outer cylindrical cam 770 is accommodated and supported in the hole 774*c* of the inner cylindrical cam 774. The end surface 770*b* of the outer cylindrical cam 770 has an inclined surface 770*e*, an end surface 770*g*, and an end surface 770*h*. The cam 774*d* of the inner cylindrical cam 774 has an inclined surface 774*k* and an end surface 774*l*.

In a state in which the input member 764 is retracted in the longitudinally inward direction LI (nondriving side) (part (a) of FIG. 43), the end surface 770*g* of the outer cylindrical cam 770 contacts the end surface 774*l* of the inner cylindrical cam 774.

The end surface 770*h* of the outer cylindrical cam 770 is in contact with the end surface 774*l* of the inner cylindrical cam 774 in the state where the input member 764 projects in the longitudinally outward direction LO (driving side) (part (b) of FIG. 5).

In the process of moving the input member 764 from the retracted state (part (a) of FIG. 43) to the projected state (part (b) of FIG. 43), the inclined surface 770*e* of the outer cylindrical cam 770 and the inclined surface 774*k* of the inner cylindrical cam 774 contact each other.

Figure 41:
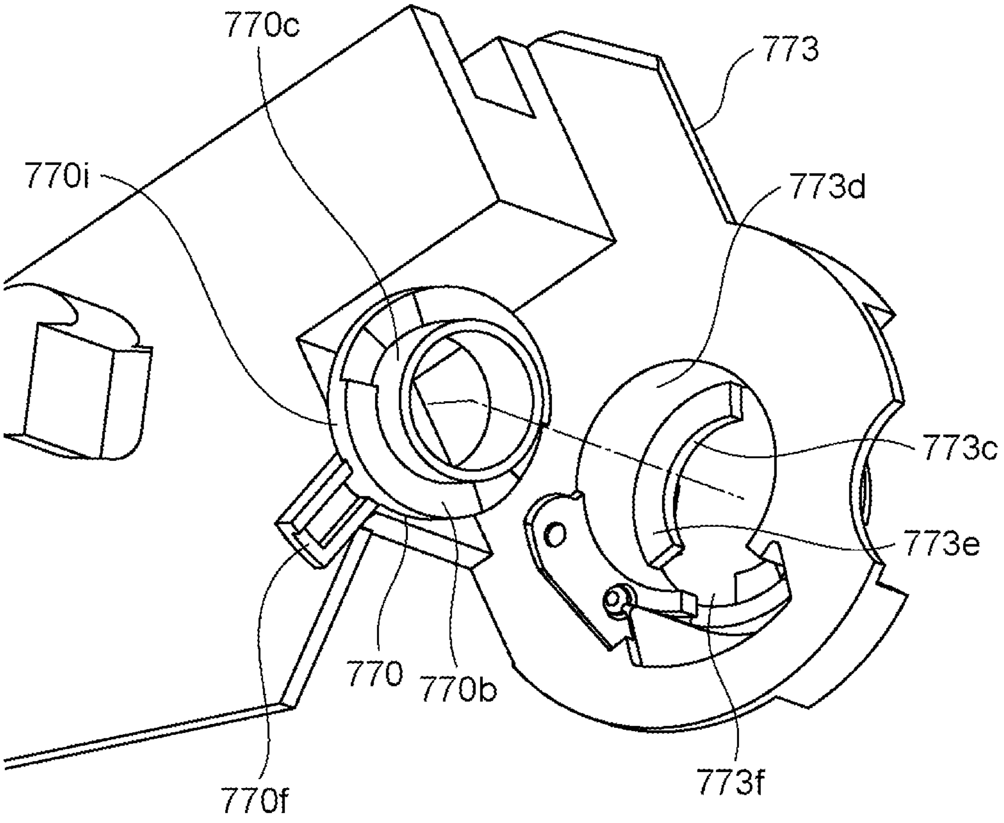
FIG. 41 is an exploded view of the outer cylindrical cam and the drum bearing.

FIG. 41 is an illustration of a structure of the drum bearing 773 which accommodates the outer cylindrical cam 770.

The outer cylindrical cam 770 includes the cylindrical portion 770*c*, an outer cylindrical portion 770*i*, an engaging portion 770*f*, and the end surface 770*b*. The drum bearing 773 includes a sector-shaped hole 773*c* which accommodates the cylindrical portion 770*c*, a hole 773*d* which accommodates the outer cylindrical portion 770*i*, an end surface 773*e* which contacts the end surface 770*b*, and a slit 773*f* which accommodates the engaging portion 770*f*. The outer cylindrical cam 770 is rotatably mounted to the drum bearing 773.

Figure 42:
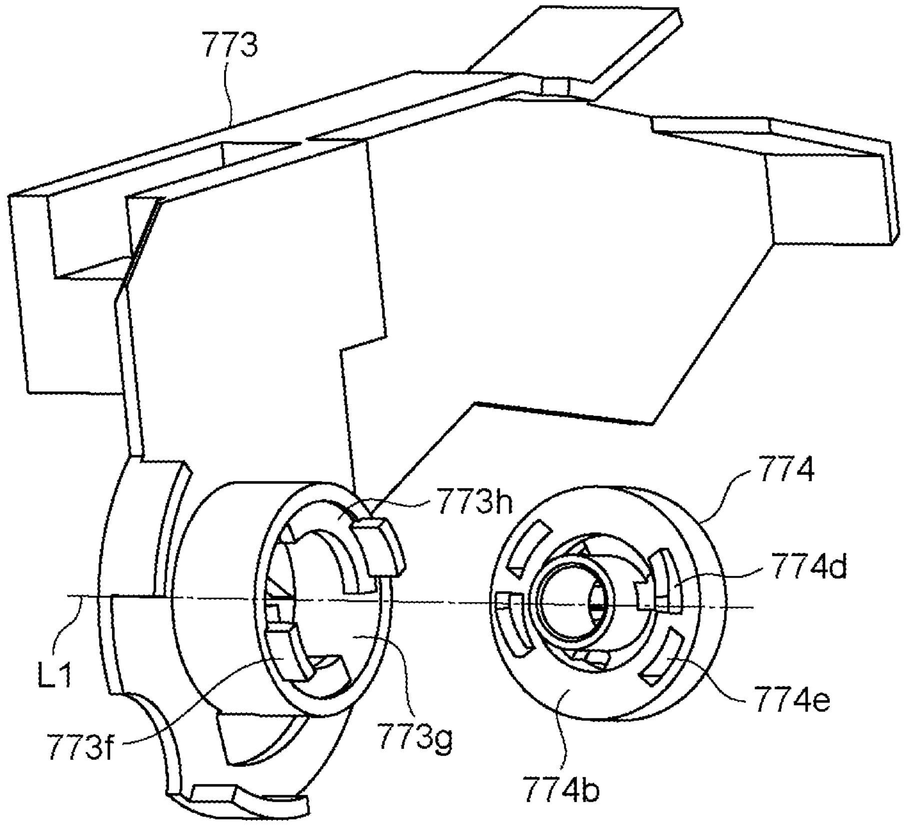
FIG. 42 is an exploded view of the inner cylindrical cam and the drum bearing.

FIG. 42 is an illustration of the structures of the inner cylindrical cam 774 and the drum bearing 773.

The inner cylindrical cam 774 includes the cam 774*d*, the hole 774*e*, and the outer end surface 774*b*. The drum bearing 773 includes a rib 773*f*, a hole 773*g*, and an end surface 773*h*. The rib 773*f* of the drum bearing 773 is accommodated in the hole 774*e* of the inner cylindrical cam 774. By this, the inner cylindrical cam 774 is structured to be slidable along the rotation axis L1 of the drum 62 while being prevented from rotating relative to the drum bearing 773. The cam 774*d* of the inner cylindrical cam 774 is accommodated in the hole 773*g* of the drum bearing 773. The outer end surface 774*b* of the inner cylindrical cam 774 is structured to be to be contactable to the end surface 773*h* of the drum bearing 773.

FIG. 43 is a sectional view of the coupling unit U3 and the drum bearing 773 taken along the sectional line in FIG. 37.

Part (b) of FIG. 43 shows a state in which the input member 764 is retracted in the inner longitudinal direction LI (a state in which the input member 764 is located at the retracted position).

The coupling shaft 793 is held by the fixing screw 788 on the driving side flange 775.

The input member 764 is supported by the coupling shaft 793 so as to be rotatable about the axis L1 and movable in the direction of the axis L1. The engaging portion 793*b*1 of the coupling shaft 793 and the engaging portion 764*f* of the input member 764 are not engaged with each other. A third pressing member 787 as an urging member is provided between the coupling shaft 793 and the input member 764. The third pressing member 787 acts so as to move the input member 764 in the longitudinally inward direction LI relative to the coupling shaft 793. The end surface 787*a* of the third pressing member 787 contacts the end surface 793*b*2 of the coupling shaft 793. The end surface 787*b* of the third pressing member 787 contacts the end surface 764*l* of the input member 764. The inner cylindrical cam 774 is disposed between the input member 764 and the driving side flange 775. The first pressing spring 759 for pressing the inner cylindrical cam is disposed between the inner cylindrical cam 774 and the driving side flange 775. The first pressing spring 759 acts so as to move the inner cylindrical cam 774 relative to the driving side flange 775 in the longitudinally outward direction LO. The first pressing spring 759 is provided inside the driving side flange 775. The outer cylindrical cam 770 regulates the movement of the inner cylindrical cam 774 in the longitudinally outward direction LO. The restricting member 790 regulates the movement of the outer cylindrical cam 770 in the longitudinally outward direction LO. The restricting member 790 is fixed to the drum bearing 773. The drum bearing 773 rotatably supports the driving side flange 775 and the outer cylindrical cam 770.

Part (b) of FIG. 43 shows a state in which the input member 764 is retracted in the longitudinally inward direction LI (the state in which the input member 764 is located at the retracted position). In this state, the inner cylindrical cam 774 receives a force in the longitudinally outward direction LO by the urging force of the first pressing spring 759. By this, the cam 7741 of the inner cylindrical cam 774 contacts the end surface 770*g* of the outer cylindrical cam 770. By this, the outer cylindrical cam 770 receives a force in the longitudinally outward direction LO by the inner cylindrical cam 774. The end surface 770*a* of the outer cylindrical cam 770 is restricted from moving in the longitudinally outward direction LO by the end surface 790*a* of the restricting member 790. The third pressing member 787 urges the input member 764 in the longitudinal inward direction LI so that the end surface 764*n* (in the longitudinally inward direction LI) and the end surface 774*m* of the inner cylindrical cam 774 abut against each other. At this time, the connection between the engaging portion 793*b*1 as the driving force receiving portion of the coupling shaft 793 and the engaging portion 764*f* as the driving force transmitting portion of the input member 764 is broken (in the disengaged state). Therefore, at this time, the rotational driving force of the input member 764 cannot be transmitted to the coupling shaft 793. In other words, the input member 764 at this time is located at the (driving force) non-transmission position. Thus, the input member 764 and the coupling shaft 793 function as a clutch.

Part (a) of FIG. 43 shows a state in which the input member 764 is projecting in the longitudinally outward direction LO (position at the projecting position or the advancing position).

Figure 45:
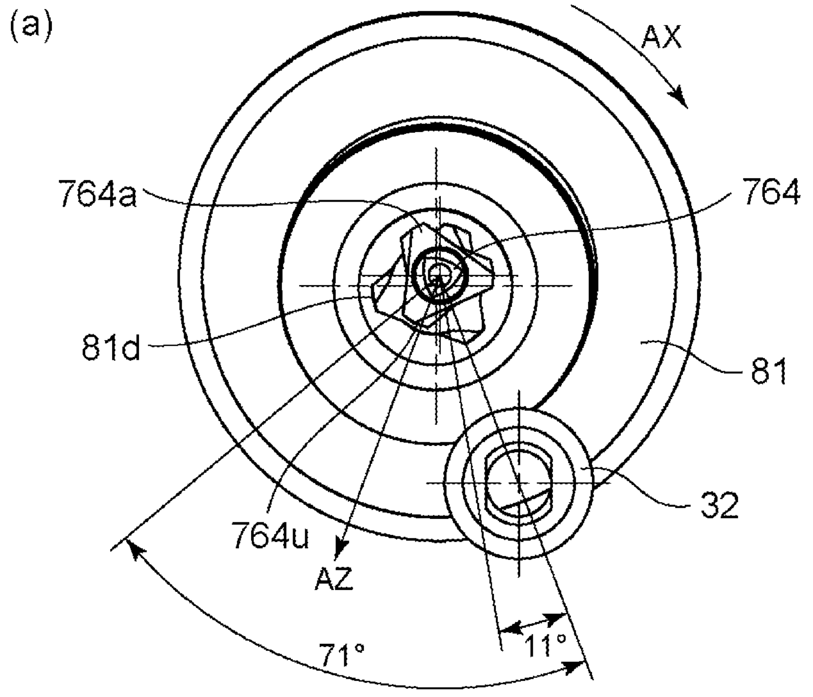
FIG. 45, parts (a) and (b), is an illustration of the coupling unit as viewed in an axial direction.
Figure 45:
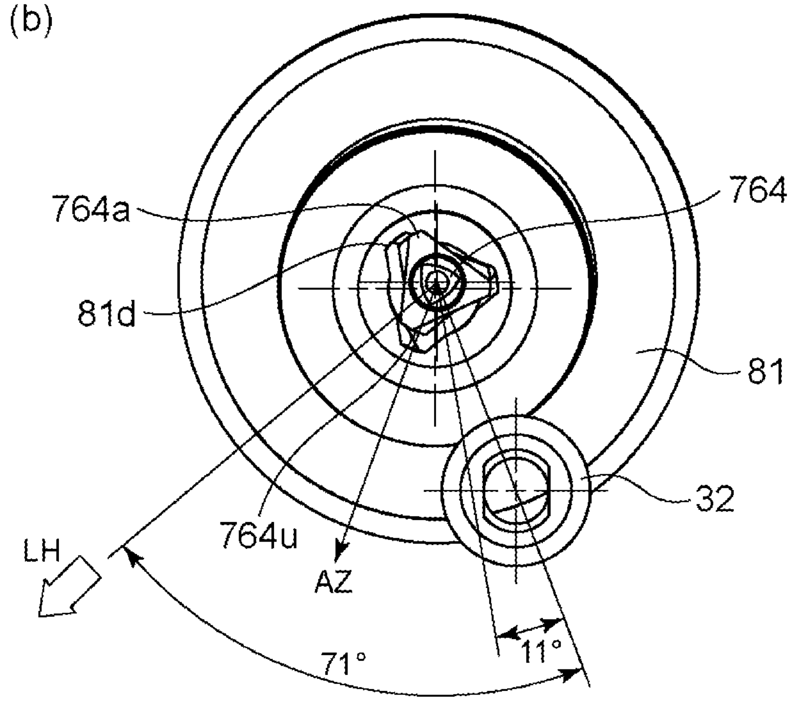

The lever member 712 rotates the outer cylindrical cam 770 to a predetermined phase (parts (a) and (b) of FIG. 45). Then, the end surface 774*l* of the inner cylindrical cam 774 moves from the state of contacting the end surface 770*h* of the outer cylindrical cam 770 to the state of contacting the end surface 770*n* (also FIG. 14). By this, the inner cylindrical cam 774 is moved in the longitudinally outward direction LO by the urging force of the translation cam first-pressing-spring 759. The end surface 774*m* of the inner cylindrical cam 774 pushes the end surface 764*n* (in the longitudinally inward direction LI) of the input member 764. The urging force of the first pressing spring 759 as the urging member is set to be larger than the urging force of the third pressing member 787 as the urging member, and therefore, the input member 764 moves in the longitudinally outward direction LO. At this time, the engaging portion 793*b*1 as the driving force receiving portion of the coupling shaft 793 is engaged (connected) with the engaging portion 764*f* as the driving force transmitting portion of the input member 764. As a result, the rotational driving force of the input member 764 becomes transmittable to the coupling shaft 793. The input member 764 and the coupling shaft 793 constitute the coupling member of this embodiment.

The free end portion 793*b* of the coupling shaft 793 restricts the movement of the input member 764 in the longitudinally outward direction LO.

Figure 44:
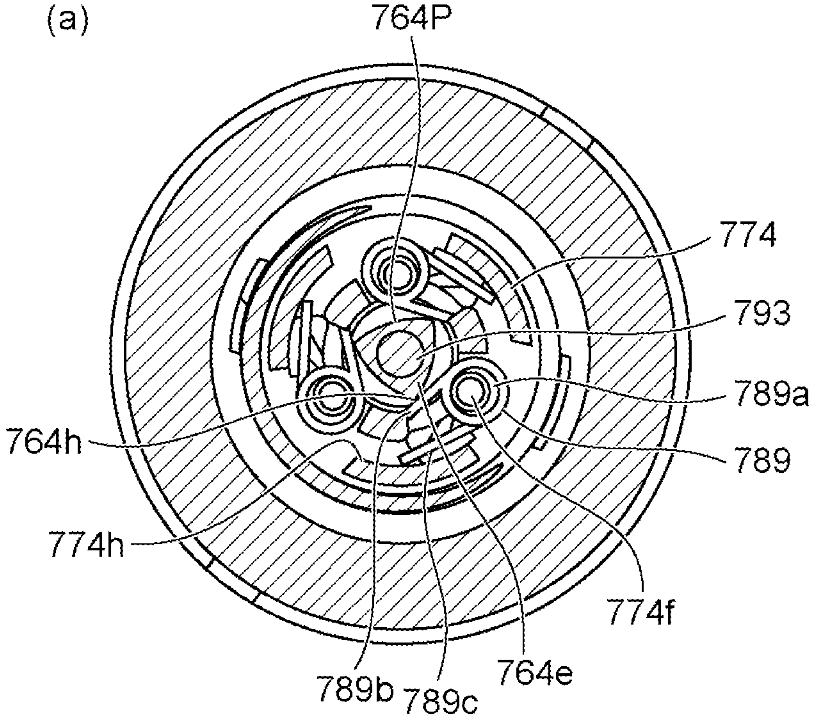
FIG. 44, parts (a) and (b), is a sectional view of the coupling unit.
Figure 44:
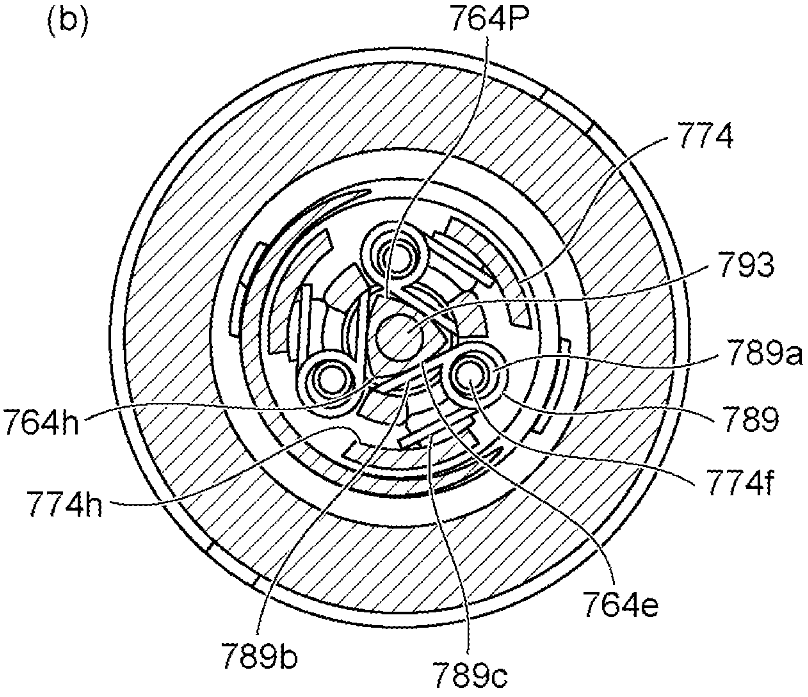

Referring to FIG. 44, a phase control mechanism of the input member 764 will be described. The phase control mechanism is a mechanism which sets the input member 764 to a phase with which it is easily engaged with the drive transmission member 81 of the apparatus main assembly.

Parts (a) and (b) of FIG. 44 are sectional views of the coupling unit U3. By inserting the shaft 774*f* of the inner cylindrical cam 774 into the hole 789*a* of the torsion spring 789, the torsion spring 789 is supported. One of the two torsion springs 789 (arm 789*c*) is in contact with the wall 774*h* of the inner cylindrical cam 774.

Part (a) of FIG. 44 shows a state in which the input member 764 is stopped at a certain phase after the image formation is completed. The arm 789*b* of the torsion spring 789 is in contact with the substantially triangular prism 764*e* of the input member 764. More specifically, the arm 789*b* is in contact with the neighborhood of the apex 764*h* of the prism 764*e*. Here, the torsion spring 789 is set so that an urging force acts in a direction in which the arms 789*b* and 789*c* expand. Therefore, the urging force of the torsion spring 789 received by the input member 764 by way of the arm 789*b* acts in the direction of rotating the input member 764 clockwise in part (a) of FIG. 44.

Actually, the input member 764 does not rotate when the input member 764 is coupled (engaged) with the drive transmission member 81. However, when the user opens the opening/closing door 13 of the apparatus main assembly A (part (a) of FIG. 12), the input member 764 retracts in the longitudinally inward direction LI. That is, the input member 764 moves from the advanced position (drive transmission position, projecting position: part (a) of FIG. 43) to the retracted position (non-drive transmission position: part (b) of FIG. 43), so that the input member 764 disengages from the drive transmission member 81. Further, at this time, the input member 764 also disengages from the coupling shaft 793. That is, the engaging portion **793*b*1 as the driving force receiving portion of the coupling shaft 793 and the engaging portion 764*f* as the driving force transmitting portion of the input member 764 are disengaged from each other. Then, the input member 764 becomes freely rotatable relative to the coupling shaft 793**.

Therefore, the input member 764 is rotated by the urging force of the torsion spring 789, and the phase changes from that shown in part (a) of FIG. 44 to the phase shown in part (b) of FIG. 44. The phase of the input member 764 shown in part (b) of FIG. 44 is the phase in which the arm **789*b* contacts the arcuate portion 764*p* of the input member 764. In this state, the rotation moment of the input member 764 received from the torsion spring 789 is balanced, so that the rotation of the input member 764 is stopped. That is, the input member 764 is held in the predetermined phase shown in part (b) of FIG. 44 by the torsion spring 789. The torsion spring 789 is a phase determining member for determining the input member 764** in a predetermined phase.

The prism **764*e* of the input member 764 has a substantially triangular shape, which is substantially 120-degree rotationally symmetrical. Therefore, while the input member 764 rotates once (360 degrees), the rotation is stopped by the torsion spring every 120 degrees. That is, assuming that the phase of the input member 764 shown in part (b) of FIG. 44 is 0 degrees, even when the input member 764 is 120 degrees and 240 degrees positions, the rotational moments received by the input member 764 are balanced and the input member 764 stops rotating. In other words, the input member 764 is held (rotation is stopped) by the torsion spring 789** in any of three different phases (0 degrees, 120 degrees, and 240 degrees in this embodiment).

The phase control means is not limited to the above structure, and may have another structure. For example, although three torsion springs 789 are provided in this embodiment, the number of torsion springs 789 is not necessarily limited to this number, and even if the number of torsion springs 789 is one or two, the phase of the input member 764 may be any one of the above-described three phases. The prism of the input member 764 has a rotational symmetry of 120 degrees, but strict symmetry is not required. That is, although the input member 764 is held in any of the three phases, it is not required that those phases are exactly 0 degrees, 120 degrees, and 240 degrees.

Figure 38:
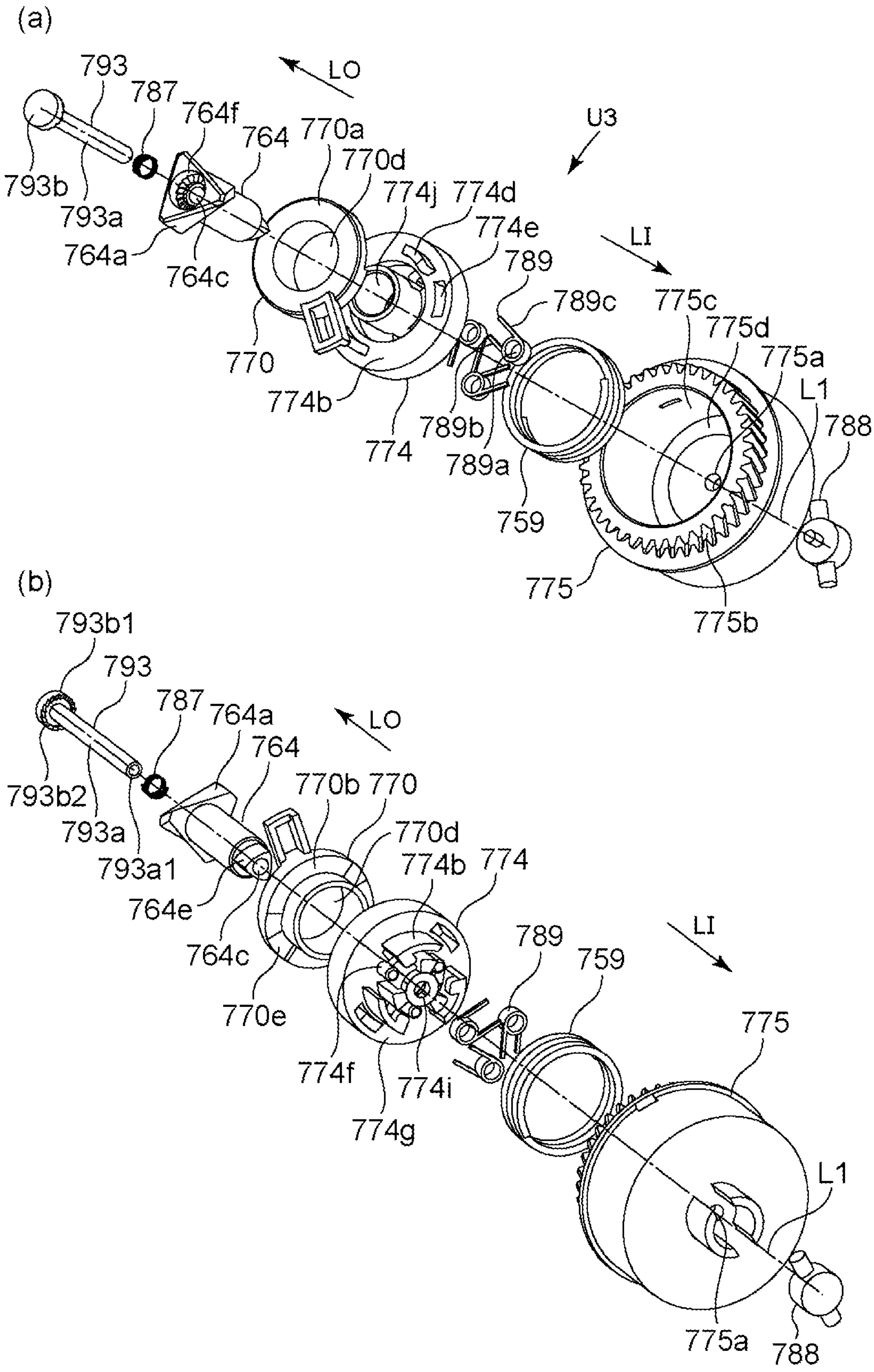
FIG. 38, parts (a) and (b), is an exploded view of a coupling unit.

Referring to FIGS. 45, 38 and 44, the description will be made further. FIG. 45 is a view of the drive transmission unit viewed from the axial direction LO. In this embodiment, the phase at which the three vertices **764*h* (FIGS. 38, 44) of the substantially triangular prism 764*e* of the input member 764*a* are arranged is substantially the same as the phase in which three apexes 764*u* of the substantially triangular driven transmission portion 764*a* are arranged. In that case, the direction in which each apex 764*u* faces is substantially the same as the direction in which each apex 764*h*** faces.

By performing the phase control of the coupling member (input member) as described above, the drive transmission member 81 of the apparatus main assembly A and the coupling member (input member 764) of the cartridge B are smoothly connected, as will be described below.

Similar to the drive transmission member 581 of Embodiment 3 described above, the drive transmission member 81 is held in this embodiment in a state of being inclined toward the downstream side in the cartridge mounting direction (FIG. 34). Specifically, the drive transmission member 81 is inclined to the direction of arrow AZ shown in part (a) of FIG. 45 when the opening/closing door 13 is open (part (a) of FIG. 12). The arrow AZ direction is a direction in which the line is inclined by 41 degrees downstream of the drum 62 in the rotational direction, from the line drawn from the center of the drum 62 to the developing roller 32 which is a reference line of 0°. The rotational direction of the drum 62 is the direction in which the drum 62 rotates during image formation (during toner image formation). Specifically, the rotational direction is the direction in which the surface of the drum 62 contacts or approaches the charging roller 66 (FIG. 3) and then the developing roller 32 sequentially (arrow AX direction).

Since the drive transmission member 81 is inclined, when the cartridge B is inserted into the apparatus main assembly A, the center of the driven transmission portion **764*a* of the input member 764 and the center of the drive transmission portion 81*a* of the drive transmission member 81 are misaligned. However, by the phase control described above, any one of the three triangular apexes 764*u*, which is the driven transmission portion 764*a* of the input member 764, is positioned in the AZ direction in which the driving transmission member 81 is inclined (part (a) of FIG. 45). In other words, in the driven transmission portion 764*a*, a portion (apex 764*u*) that most radially projects from the center of the drum 62 is located in the AZ direction in which the drive transmission member 81 is inclined. By holding the input member 764 in such a phase, it is easy to engage the input member 764 and the drive transmission member 81** even if they are misaligned.

That is, when the drive transmission member 81 is rotated from the state shown in part (a) of FIG. 45, the phase of the substantially triangular shape of the drive transmission portion **81*a* of the drive transmission member 81 substantially aligns the phase of the triangle shape of the driven transmission portion 764*a* of the input member 764 (referring to part (b) of FIG. 45). Then, the driven transmission portion 764*a* of the input member 764 enters the driving transmission portion 81*a* of the driving transmission member 81**, thus establishing the engagement.

Figure 46:
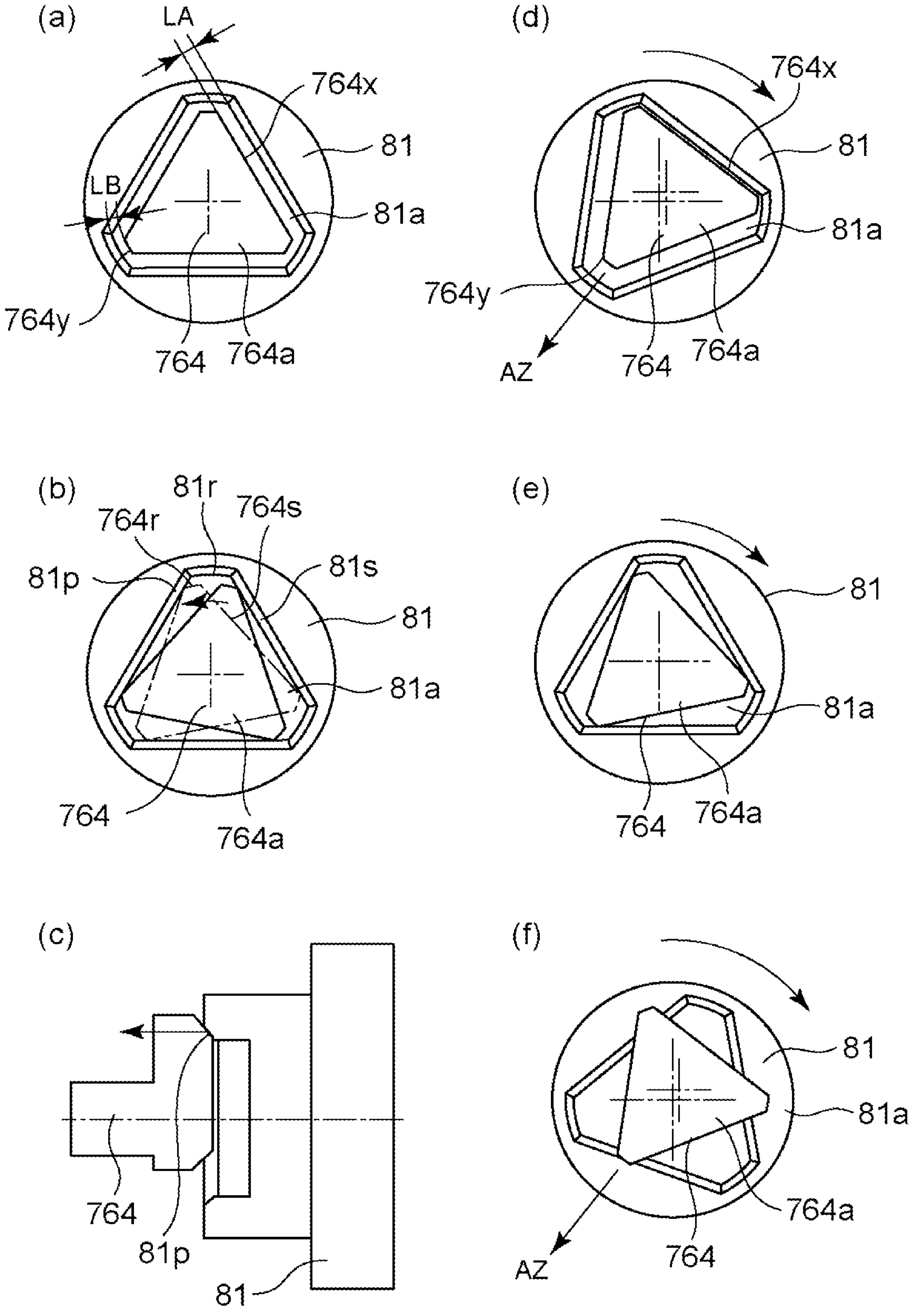
FIG. 46, parts (a) through (f), is an illustration of the coupling portion as viewed in the axial direction.
Figure 47:
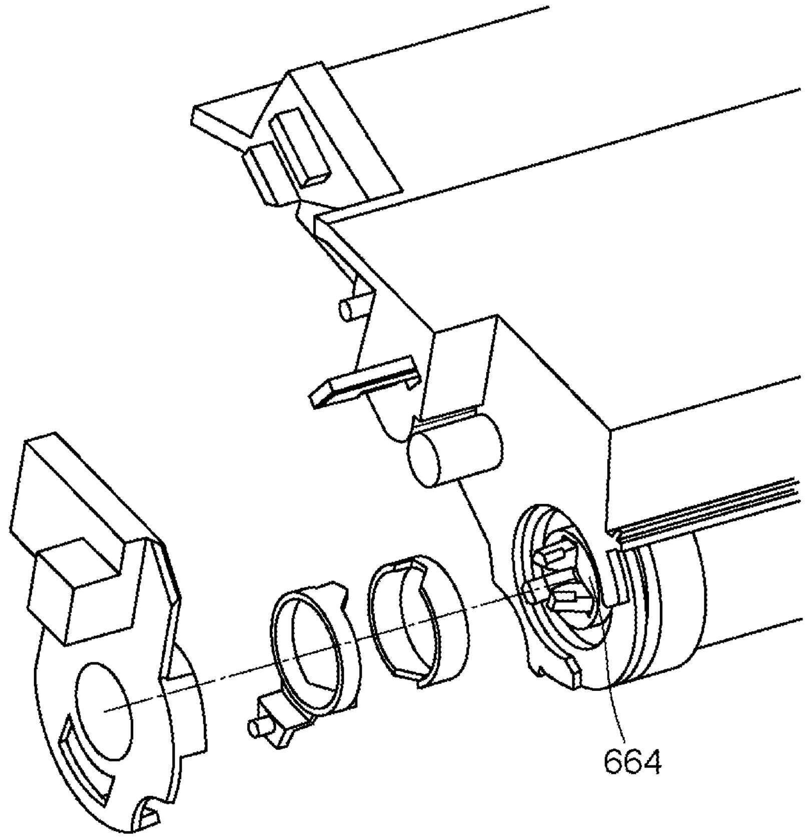
FIG. 47 is a perspective view of the process cartridge.
Figure 48:
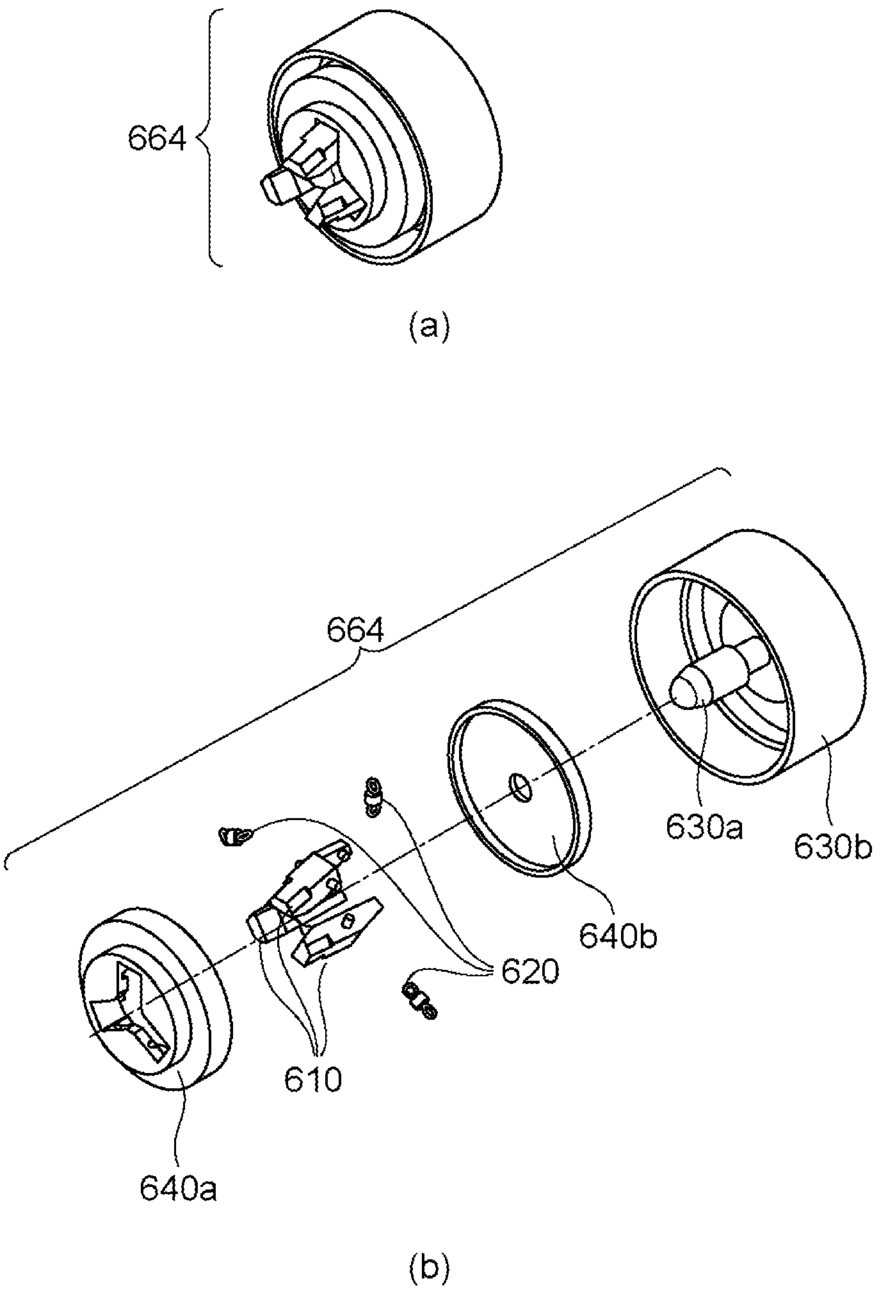
FIG. 48, parts (a) and (b), is a perspective view of the coupling.

Hereinafter, the reason why the phase control makes it easier to engage the input member 764 with the inclined drive transmission member 81 will be described referring to parts (a)-(f) of FIG. 46. Part (a) of FIG. 46, part (b) of FIG. 46, part (d) of FIG. 46, part (e) of FIG. 46, part (e) of Figure, and part (f) of FIG. 46 are cross-sectional views of the drive transmission unit as viewed in the axial direction LO. Part (c) of FIG. 46 is a sectional view as viewed in a direction perpendicular to the axis of the drive transmission unit.

As described above, in this embodiment, the apparatus main assembly is provided with the drive transmission member 81, the cartridge is provided with the power input member 764, and these are couplings which connect with each other. As shown in FIG. 46, these couplings (81, 764)

have engaging portions in the form of substantially triangular shaped recess portions 81*a* (referring to FIG. 25, part (a) of FIG. 46 and so on) and projections 764*a* (part (a) of FIG. 38 and part (a) of FIG. 46), respectively. The tips (corners, apexes) of these triangular shapes (81*a*, 764*a*) are portions for transmitting the driving force, and therefore they are rounded to keep necessary strength. As shown in part (a) of FIG. 46, when the triangular shapes are engaged with each other in a coaxial state and in aligned phase with each other, the triangular clearances are defined as follows. The gap between the tips of these triangular shapes (81*a*, 764*a*) (distance between the free end 81*r* and free end 764*y*) is LB, and the gap between these sides (distance between the side 81*s* and side 764*x*) is LA. Then, there is the following relationship: LA>LB (Formula A)

That is, in these triangular shapes (81*a*, 764*a*), the gap LA between the sides of the triangle (81*a*, 764*a*) is larger than the gap LB between the tips (the gap LA has a margin larger than the gap LB). In this case, as shown in parts (d), (e), and (f) of FIGS. 46, it is preferable that the apex 764*y* of the triangular shape (projection 764*a*) on the cartridge side is inclined in the direction in which the drive transmission member 81 is inclined (lower left AZ direction in the Figure). This corresponds to directing the side 764*x* of the projection 764*a* to the side opposite to the AZ direction in which the drive transmission member 81 is inclined. By doing so, the projection 764*a* of the input member 764 can be smoothly engaged with the recess portion 81*a* of the drive transmission member 81 which is inclined.

As shown in part (d) of FIG. 46, the phases of the recess portion 81*a* and the projection 764*a* are not aligned when they are not engaged. When the drive transmission member 81 rotates clockwise in this state from this state, the phases of the triangular shapes 81*a* and 764*a* are aligned as shown in part (d) of FIG. 46. However, the drive transmission member 81 is inclined in the AZ direction, and therefore, the recess 81*a* is shifted in this inclination direction, and there is an area in which the gap between the recess 81*a* and the projection 764*a* is narrowed. Nonetheless, in this embodiment, in the region where the gap is narrowed (that is, the side opposite to the direction in which the drive transmission member 81 is inclined), the side of the recess portion 81*a* and the side of the projection 764*a* are located. The gap between the side of the recess portion 81*a* and the side of the projection 764*a* is assured to be relatively large (LA) as defined in Equation A and shown in part (a) of FIG. 46. Therefore, even if this gap is shortened due to the inclination of the drive transmission member 81, the positional relationship required for an operating the engagement between the drive transmission member and the input member can be assured. Therefore, when the phases of the recess portion 81*a* and the projection 764*a* become aligned, the projection 764*a* can enter the recess portion 81*a* by the force of the first pressing spring 759 (parts (a) and (b) of FIG. 38). Further, the drive transmission member 81 continues to rotate, and the recess portion 81*a* and the projection 764*a* are engaged with each other as shown in part (d) of FIG. 46, and the projection 764*a* receives the driving force from the recess portion 81*a*. In summary, even if the gap between the drive transmission member 81 and the input member 764 becomes small due to the inclination of the drive transmission member 81, the phase of the member 764 is set so that the gap between the drive transmission member 81 and the input member 764 is assured to be a certain degree or more. In this embodiment, this corresponds to directing the triangular (projection 764*a*) side of the input member 764 to the side opposite to the direction AZ in which the drive transmission member 81 is inclined (that is, the upper right in part (d) of FIG. 46). In other words, it corresponds to directing any one of the three apexes 764*y* of the triangular shape (projection 764*a*) of the input member 764 in the inclination direction AZ (lower left) of the drive transmission member 81. The three apexes (three arcs 764*y*) of the projection 764*a* correspond to the driving force receiving portion for receiving the driving force from the drive transmission member 81.

The reason why the gap LA between the sides is set larger than the gap LB between the apexes as shown in (Equation A) and part (a) of FIG. 46 will be described below.

The gaps LA and LB between the triangular shapes (the projection 81*a* and the recess portion 764*a*) are set in consideration of the dimensional tolerances of the recess portion 81*a* and the recess portion 764*a*. However, the clearance LA between the sides is set to be larger in consideration of not only the dimensional tolerance, but also the fact that the input member 764 is more easily engaged with the rotating drive transmission member 81.

When the drive transmission member 81 rotates and the phase difference between the triangular shape of the drive transmission member 81 (the recess portion 81*a*) and the triangular shape of the input member 764 (the projection 764*a*) is smaller than a certain angle, the drive transmission member 81 and the input member 764 are in the engageable state. As shown in part (b) of FIG. 46, when the projection 764*a* is between the phase indicated by the solid line and the phase indicated by the broken line, the recess portion 81*a* and the projection 764*a* can engage with each other. The larger the clearance LA between the sides of the recess portion 81*a* and the projection 764*a*, the larger the phase difference that can permit the engagement, so that the recess portion 81*a* and the projection portion 764*a* are more easily engaged.

Here, when the drive transmission member 81 rotates, at a stage where the recess portion 81*a* and the projection 764*a* are insufficiently engaged, a force may act in a direction of moving the coupling member 764 away from the drive transmission member 81. That is, as shown in part (c) of FIG. 46, the input member 764 may contact the chamfer 81*p* of the recess 81*a*, with the result that the input member 764 receives a force from the drive transmission member 81 in a direction of hindering the engagement. The above-mentioned gap LA is set large so that such a force is not produced. If the gap LA is large, the above-described force does not act when the drive transmission member 81 rotates, and therefore, the state that the recess portion 81*a* and the projection 764*a* can be engaged with each other continues for a long time, so that the engagement is promoted.

When the inclination direction AZ of the drive transmission member 81 and the direction of the triangular free end (arc portion 764*y*) of the input member 764 are completely aligned, they are most easily engaged with each other. However, if the direction of the free end (arc portion 764*y*) of the triangular shape (projection 764*a*) relative to the direction in which the drive transmission member 81 is inclined is within ±30°, the effect of promoting the engagement between the couplings is enhanced.

As described above, the inclination direction of the drive transmission member 91 (the arrow AZ direction) is a direction in which a line drawn from the center of the drum 62 to the center of the developing roller 32 is inclined 41 degrees toward the downstream side in the rotational direction of the drum 62. In consideration of this, it is preferable that the apex of the projection (projection portion) 764 is in the range of 11 degrees to 71 degrees toward the downstream side in the rotational direction of the drum 62, from the line passing through the center of the drum 62 and the center of the developing roller 32.

In addition, in the above description, the engaging portions (the recess portion 81*a* and the projection portion 764*a*) of the drive transmission member 81 and the input member 764 are similar to each other and are substantially equilateral triangles. That is, each of the recess portion 81*a* and the projection 764*a* has a rotational symmetry of 120 degrees.

However, the basic idea is the same even if the engaging portions may not have such a shape, and by controlling the phase of the input member 764, the same effect as that of the present embodiment can be obtained. For example, the shape of the projection 764*a* may be a triangular shape with a portion cut off, may not be a triangular shape, and may not be rotational symmetry of 120 degrees.

However, assuming that the shape of the recess portion 81*a* is a substantially equilateral triangle (FIG. 25) as described in this embodiment, it is desirable that the projection 764*a* contacts the recess portion 81*a* at three points and receives the driving force. More desirably, these three points are evenly arranged. That is, even when the shape of the projection 764*a* is different from that of this embodiment, it is desirable that the projection 764*a* has driving force receiving portions at positions corresponding to the three apexes (the circular arc portion 764*y*) of this embodiment. That is, it is preferable that the distance between the adjacent driving force receiving portions is approximately 120 degrees with respect to the axis of the projection 764*a* (driving force receiving portion).

Embodiment 5

An Embodiment 5 will be described below. A coupling member 664 shown in this embodiment includes an input member (drive receiving member, drive input member, input unit) 610 which receives a driving force from outside of the cartridge, and an urging member 620 (urging member) which regulates the attitude of the input member 610 and an advancing/retracting member 630 capable of advancing/retracting in the rotation axis direction of the photosensitive drum.

Three of such input members 610 and three of such urging members 620 are supported by a support member (supporting portion) 640, and are arranged along the circumferential direction (rotational direction) of the photosensitive drum.

Also in this embodiment, the structure for moving the coupling member 664 forward and backward by the operation member (lever member 12) and the operation thereof are the same as those in the Embodiment 1 (FIGS. 7, 9, 10, 11, 12, and FIG. 13). The explanations for them are omitted.

Figure 49:
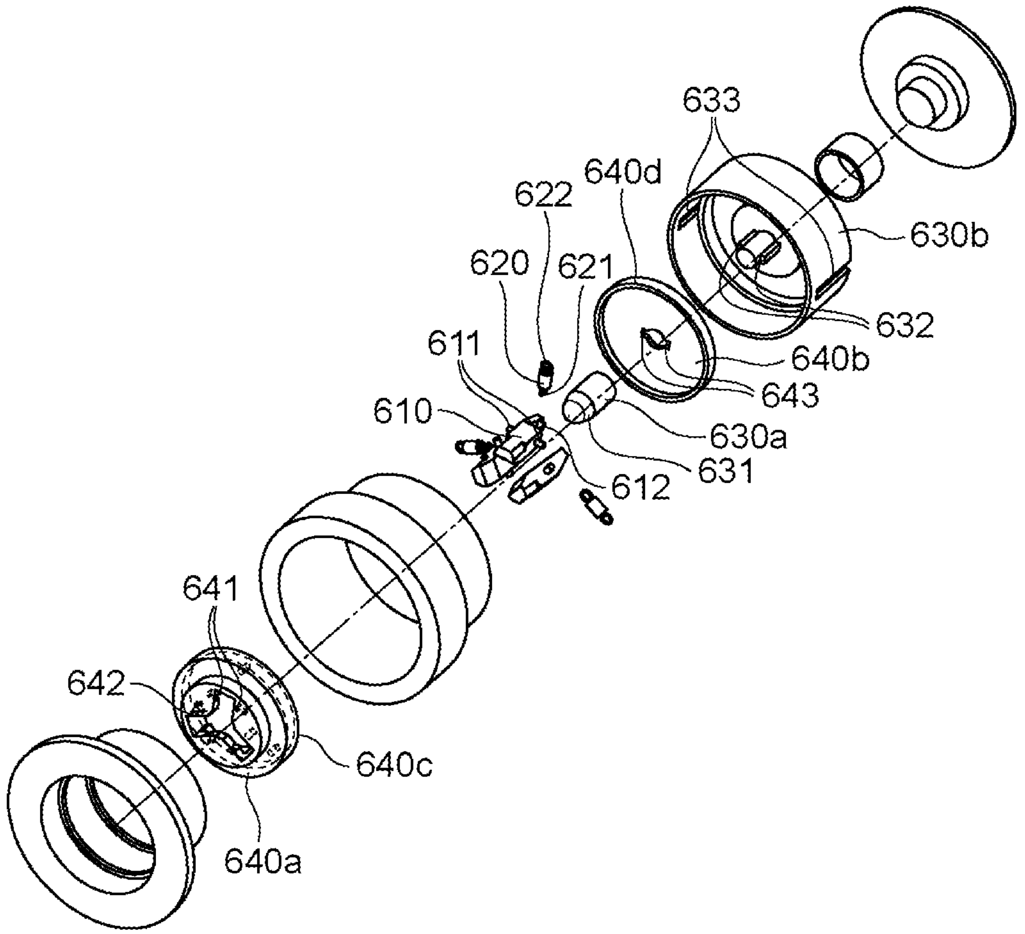
FIG. 49 is a perspective view of the coupling.

Referring first to FIG. 49, the components of the coupling member 664 of this embodiment will be described in detail.

A columnar shape 611 of the input member 610 is engaged with a recess shape 641 of a support member 640*a* and is rotatably (swingably) supported. The input member 610 can change the inclination angle about an axis of the columnar shape 611. The columnar shape 612 of the input member 610 is engaged with and supported by the one end 621 of the urging member 620. The other end 622 of the urging member 620 is engaged with and supported by the columnar shape 642 of the support member 640*a*.

The support members 640*a* and 640*b* are in a coupling relationship with each other, and the input member 610 and the urging member 620 are enclosed and supported between the support members 640*a* and 640*b* so that the positions of the input member 610 and the urging member 620 are regulated.

The urging member 620 is a pulling spring, and the force of the pulling spring regulates the input member 610 in the rotational direction about the columnar shape 611 as an axis.

The advancing/retracting member 630 includes an advancing/retracting member 630*a* having an advancing/retracting contact portion 631 capable of contacting the input member 610 when advancing/retracting, and an advancing/retracting member 630*b* receiving an advancing/retracting drive by the lever member 12. These two are joined by welding or the like and have a bonded relationship with each other. As the advancing/retracting member 630 moves forward/backward, the entire coupling member 664 also moves forward/backward.

The input member 610 has a free end portion (drive receiving portion) 613 for engaging with the drive transmission member 81 of the apparatus main assembly A. The input member 610 receives the rotational drive by way of the free end portion 613, and transmits the rotational drive to the support member 640*a* supporting itself.

The surface 640*c* of the support member 640*a* and the surface 640*d* of the support member 640*b* are joined by welding or the like and have a coupling relationship with each other, and the support member 640*a* and the support member 640*b* rotate integrally as the support member 640.

The support member 640*b* has a first rotation receiving portion 643, and can engage with a second rotation receiving portion 632 of the advancing/retracting member 630*b* to transmit rotational drive. That is, the advancing/retracting member 630 and the support member 640 are structured to be relatively slidable relative to each other in the drum axis direction L1 while being integrally rotatable.

In addition, the advancing/retracting member 630*b* has a third rotation receiving portion 633, and in this embodiment, a fourth rotation receiving portion (not shown) corresponding to the third rotation receiving portion 633 is provided in the driving side flange 75, thereby engaging with this to transmit the driving force.

By this, a component structure is capable of transmitting rotational drive to the rotating body.

Figure 50:
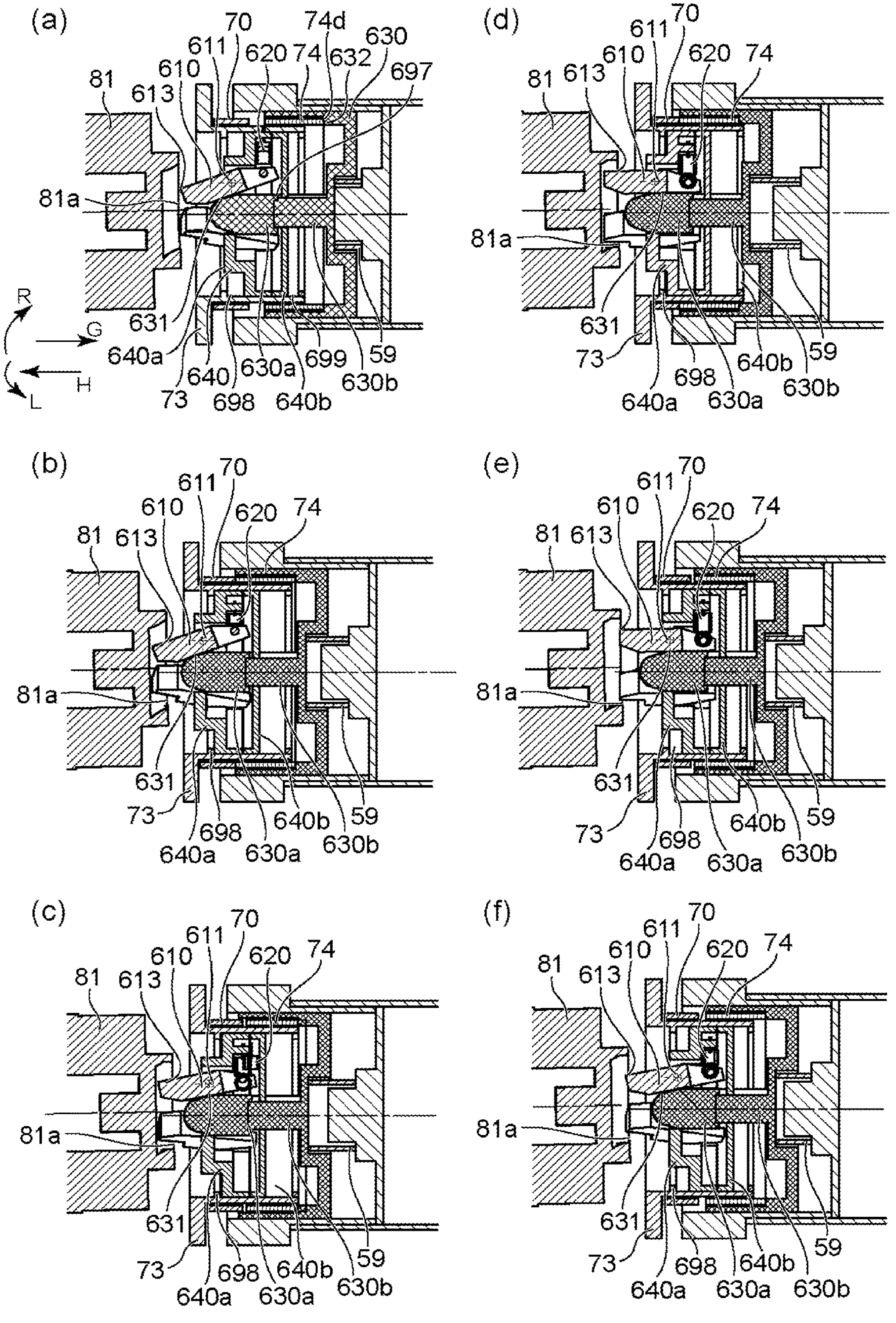
FIG. 50, parts (a) through (f), is a sectional view of the coupling.

Referring to FIG. 50, the movement of the coupling member 664 forward and backward in conjunction with the lever member 12 will be described referring to Figure FIG. 50 is a longitudinal sectional view of the drive transmission member 81 and a coupling member 664 and shows the steps (a)-(f) of advancing movement of the coupling member 664 in interrelation with the movement of the lever member 12 similar to FIG. 14 Part (a) of FIG. 50 shows a state of the retracted position in which the coupling member 664 is most inside of the cartridge in interrelation with the movement of the lever member 12.

Part (d) of FIG. 50 shows a state in which the coupling member 664 moves most to outside of the cartridge in interrelation with the movement of the lever member 12 at the advanced position.

FIGS. 50(*b*) and 50(*c*) show a state of moving from the retracted position to the advanced position and a state of moving from the advanced position to the retracted position.

FIGS. 50(*e*) and 50(*f*) show a state of movement from the advanced position to the retracted position. In FIG. 50, the order of the state change in one reciprocating movement of the coupling member 664 is as shown parts (a)→(b)→(c)→(d)→(e)→(f)→(a) or (a)→(b)→(c)→(d)→(c)→(b)→(a).

Hereinafter, the behavior of the coupling member 664 when the above-mentioned state changes will be described.

First, the outline of the behavior will be described.

The advancing/retracting member 630 can slide along the drum axis L1 by rotating the cylindrical cam 74 when the lever 12 (FIG. 12) is operated. The slide of the advancing/retracting member 630 changes the position of the support member 640 in the L1 direction on the drum axis and the opening amount (radial movement amount) of the free end 613 of the input member 610.

Next, details of the behavior will be described.

[1] First, the state change from (a) to (b) in FIG. 50 will be described. The longitudinal restricting portion 74*d* of the cylindrical cam member 74 moves in the direction H in the drawing, and the advancing/retracting members 630*a* and 630*b* that have received the spring force of the first pressing member 59 advance, so that the advancing/retracting contact portion 631 is brought into contact to the input member 610, by which the input member 610 is pressed in H direction in the drawing. Until the stopper shape 698 provided on the drum bearing member 73 and the support member 640*a* come into contact with each other, the input member 610 is urged in the closing direction by the force of the pulling spring of the urging member 620, and therefore does not open. Then, the columnar shape 611 presses the recess shape 641 of the support member 640*a* supporting it in the H direction in the drawing, and the entire coupling member 664 advances in the H direction. That is, the support member 640, the input member 610, and the advancing/retracting member 630 are integrally moved in the direction H in the Figure until just before the stopper shape 698 provided on the drum bearing member 73 and the support member 640*a* are brought into contact with each other in the state that the free end 613 of the input member 610 is not opened. As a result, the drive transmission member 81 enters to the second advanced position where the free end 613 of the input member 610 can be engaged with the triangular recess (drive transmission portion) 81*a* (FIG. 25).

[2] Next, the state change from (b) to (c) in FIG. 50 will be described. The cylindrical cam member 74 moves in the direction H in the Figure, and the advancing/retracting members 630*a* and 630*b* which receives the spring force of the first pressing member 59 advance. By this, the contact portion 631 at the time of advancing and retracting contacts the input member 610 and presses it in the direction H in the Figure. At this time, the stopper shape 698 provided on the drum bearing member 73 and the support member 640*a* contact with each other, and the support member 640*a* does not further advance in the H direction in the Figure. By this, the input member 610 rotates by the force to rotate in the R direction in the Figure with the columnar shape 611 as an axis becoming larger than the force of the pulling spring of the urging member 620, and the inclination angle in the R direction in the Figure changes. In other words, the free end 613 of the input member 610 starts to open radially outward at the second advanced position. The radial direction is the radial direction (rotation radial direction) of the coupling member 664. That is, the free end of the input member 610 begins to move away from the axis of the coupling member 664.

[3] Next, the state change from (c) to (d) in FIG. 50 will be described. From the state of part (c) of FIG. 50, the advancing/retracting members 630*a*, 630*b* further advance, and the input member 610 changes the inclination angle in the R direction shown in the same manner as in [2], and reaches the advance position most moved to the outside of the cartridge. In the state of part (d) of FIG. 50, the free end 613 of the input member 610 opens outward in the radial direction, so that the free end 613 of the input member 610 is engaged with the triangular recess (drive transmitting portion) 81*a* (the drive transmission member 81) (FIG. 25). By this, the drive transmission is enabled, and the drive transmission member 81 is rotated by the motor (not shown), so that the rotational drive is transmitted to the input member 610.

[4] Next, description will be made on the state change from (d)→(e) (f)→(a) in FIG. 50. When moving from the advanced position to the retracted position, the inclination angle of the input member 610 changes toward the L direction in the Figure after the entire coupling member 664 retracts. First, in the state change from part (d) of FIG. 50 to part (e) of FIG. 50, the cylindrical cam member 74 moves in the G direction in the Figure, the spring of the first pressing member 59 is compressed, and the advancing/retracting members 630*a* and 630*b* retract. At that time, when the spring force of the urging member 620 is applied to the contact point 631 during advancing/retracting as a pressing force in the L direction in the drawing, and the friction force between the input member 610 and the advancing/retracting member 630 at the contact point 631 during advancing/retracting is large, the entirety of the coupling member 664 follows and retracts in the G direction in the Figure. By this, the engagement between the free end 613 of the input member 610 and the triangular recess (drive transmission portion) 81*a* (FIG. 25) of the drive transmission member 81 is released. Next, the state change from part (e) of FIG. 50 to (f) to (a) will be described. Similar to the above, the advancing/retracting member 630 retracts and the entire coupling member 664 tends to retract, but the support member 640*b* and the stopper shape 699 provided on the drum bearing member 73 abut to each other, and therefore, the support member 640*b* is not further retracted in the G direction in the drawing. After that, as the advancing/retracting member 630 retracts, the contact state between the input member 610 and the advancing/retracting member 630 changes, and the input member 610 rotates about the columnar shape 611 as an axis by the force of the pulling spring of the urging member 620, so that the inclination angle changes in the direction indicated in the Figure. As a result, the free end 613 of the input member 610 closes inward in the radial direction. That is, the free end 613 of the drive transmission member 610 approaches the axis of the coupling member 664.

[5] The state change from part (d) of FIG. 50→parts (c)→(b)→(a) will be described. When moving from the advanced position to the retracted position, the advancing/retracting member 630 retracts first, and the inclination angle of the input member 610 changes toward the L direction in the drawing, and then the support member 640 retracts. First, in the state change from part (d) of FIG. 50 to part (c) of FIG. 50, the cylindrical cam member 74 moves in the direction Gin the Figure, and the spring of the first pressing member 59 is compressed, so that the advancing/retracting members 630*a* and 630*b* retract. Then, the input member 610 rotates about the columnar shape 611 as an axis by the force of the pulling spring of the urging member 620, and the inclination angle changes toward the L direction in the drawing. By this, the engagement between the free end 613 of the input member 610 and the triangular recess (drive transmission portion) 81*a* (FIG. 25) of the drive transmission member 81 is released. Next, in the state change from part (c) of FIG. 50 to part (b) of FIG. 50, the tilt angle of the input member 610 changes to the L direction in the Figure by retracting the advancing/retracting member 630, as described above. In the state change from part (b) of FIG. 50 to part (a) of FIG. 50, when the advancing/retracting member 630 retracts, the advancing/retracting member 630*b* and the support member 640*b* abut at the abutting portion 697, and thereafter, when the advancing/retracting member 630 retracts, and the support member 640*b* also follows and retracts. As a result, the entire coupling member 664 retracts in the G direction in the Figure, and reaches the first retracted position.

The structure has been described in which the entire coupling member 664 is movable back and forth along the axial direction. However, as shown in parts (a) and (b) of FIG. 51, even in the structure that the coupling member 664 does not move back and forth along the axial direction as a whole, the recessed portion (drive transmission portion) 81*a* of the drive transmission member 81 and the input member 610 are engageable with each other.

Figure 51:
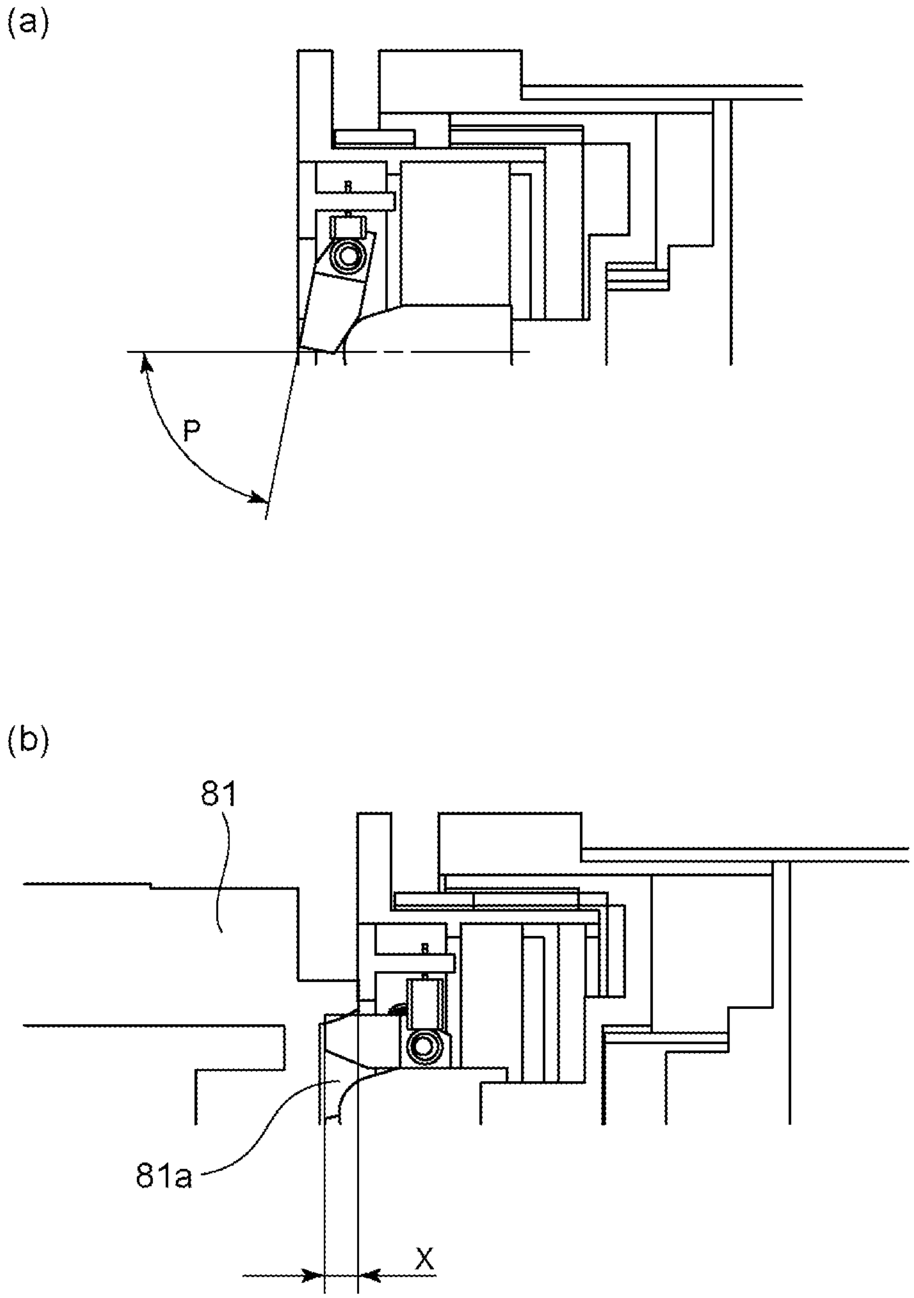
FIG. 51, parts (a) and (b), is a sectional view of the coupling.

Such an example is shown in parts (a) and (b) of FIG. 51 (*b*). As illustrated in this Figure, the amount of change in the inclination angle of the input member 610 (P in part (a) of FIG. 51) may be set to a large value. Then, when the free end of the input member 610 moves outward in the radial direction, the projection amount (X in part (b) of FIG. 51) of the input member 610 projecting to outside of the cartridge increases. It is possible to increase the engagement width between the recess portion (drive transmission portion) 81*a* of the drive transmission member 81 and the input member 610 in the axial direction. Then, even if the entire coupling member 664 does not slide along the axial direction, the drive transmission member 81 can be engaged only by inclining the input member 610.

In parts (a) and (b) of FIG. 51, the coupling member 664 moves back and forth by moving (inclining) only a portion thereof (that is, only the input member 610). That is, the coupling member 664 can take the advanced position (part (b) of FIG. 51) for engaging the drive transmission member 81 and the retracted position (part (a) of FIG. 51) for breaking the engagement with the drive transmission member 81 only by the inclining movement (inclining) of the input member 610.

However, in addition to the inclining of the input member 610, it is more effective to employ a structure in which the entire coupling member 664 can advance and retract, as in the state change from parts (a) to (b) in FIG. 50. That is, it is possible to assure a larger engagement width between the recess portion (drive transmitting portion) 81*a* of the drive transmission member 81 and the input member 610. Therefore, it is more desirable that the coupling member 664 can be moved back and forth.

Figure 52:
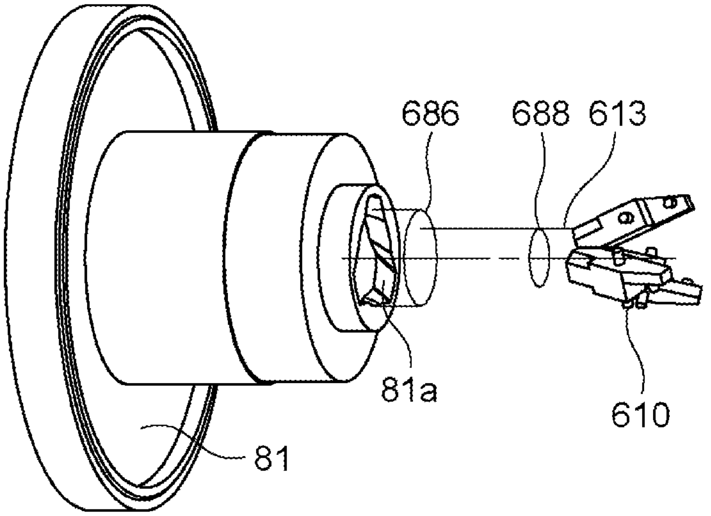
FIG. 52 is a perspective view of a drive transmission portion.

Next, referring to FIG. 52, a description will be made as to the conditions for engaging the drive transmission portion (recessed portion) 81*a* of the drive transmission member 81 and the free end portion (drive receiving portion) 613 of the input member 610. As shown in FIG. 52, when the free end portions 613 of the three input members 610 are closest to the rotation axis of the coupling member 664 by the urging member 620, a circle 688 passing through the most remote point of the three tips 613 is drawn about the rotation axis. The circle 688 is a circumscribed circle of the free end portion 613. Next, a circle 686 passing through a point closest to the rotation axis of the coupling member 664 among the recess portions (drive transmitting portions) 81*a* of the drive transmission member 81 is drawn about the rotation axis of the coupling member 664. The circle 686 is an inscribed circle of the drive transmission portion 81*a*. The circle 688 and the circle 686 are both perpendicular to the rotation axis.

At this time, it will suffice if the circle 688 formed by the free end portion 613 is smaller than the circle 686 formed by the drive transmission portion 81*a*. That is, in this case, the input member 610 enters the inside of the drive transmission portion 81*a* regardless of the combination of the phases of the recess (drive transmission portion) 81*a* of the drive transmission member 81 and the input member 610 of the coupling member 664. After that, the drive transmission member 81 and the input member 610 can be reliably engaged with each other by changing the inclination angle of the input member 610.

However, in FIG. 52, the case where the rotation axes of the drive transmission member 81 and the coupling member 664 are aligned with each other has been described as an example. In practice, the drive transmission member 81 shown in parts (a) and (b) of FIG. 50 is inclined with respect to the axis of the coupling member 664, as with the drive transmission member shown in the modified example of Embodiment 1. Even in such a case, the input member 610 can be engaged with the drive transmission member 81 if the following conditions are satisfied.

Figure 53:
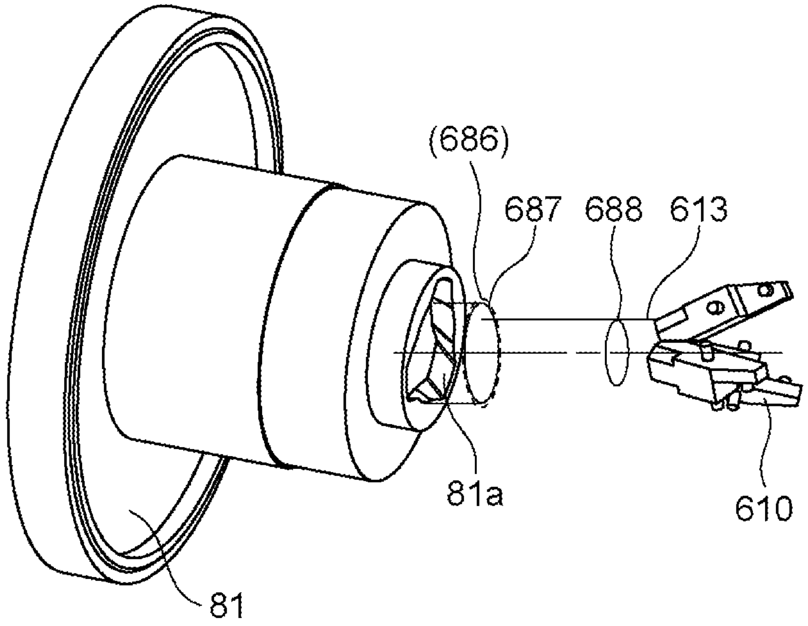
FIG. 53 is a perspective view of the drive transmission portion.
Figure 54:
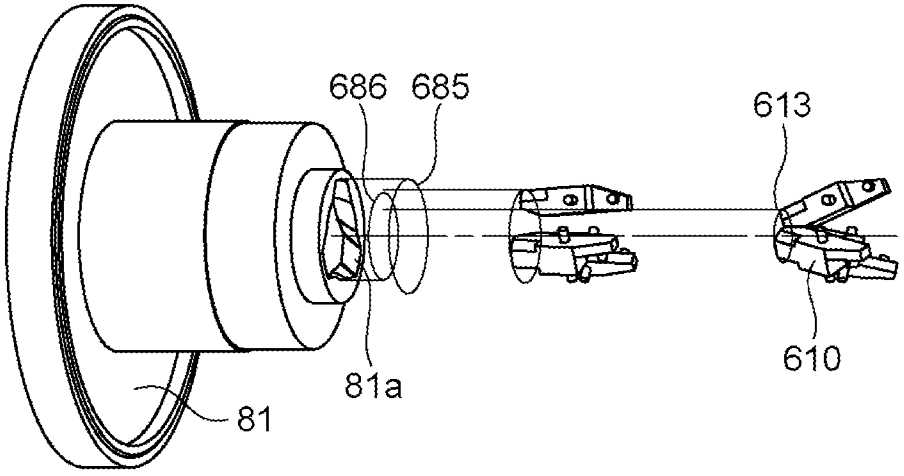
FIG. 54 is a perspective view of the drive transmission portion.

For better understanding, FIG. 53 shows a state in which the drive transmission member 81 is inclined more than the actual inclination. In FIG. 53, a circle 687 which passes through a point closest to the rotation axis of the coupling member 664 among the recesses (drive transmission portions) 81*a* of the drive transmission member 81 is drawn about the rotation axis of the coupling member 664 as the center. This circle 687 is perpendicular to the rotation axis. The circle 687 is smaller than the circle 686 (FIG. 52) described above because the drive transmission member 81 is inclined.

At this time, it will suffice if the circle 687 formed by the recess (drive transmission portion) 81*a* of the drive transmission member 81 is larger than the circle 688 formed by the free end portion 613 of the input member 610. That is, in this case, the input member 610 of the coupling member 664 can enter the drive transmission portion 81*a* irrespective of the combination of the phases of the recess (drive transmission portion) 81*a* of the drive transmission member 81 and the input member 610 of the coupling member 664. That is, the input member 610 engages with the drive transmission member 81 by changing the inclination angle of the input member 610 after the coupling member 664 advances. The drive transmission member 81 becomes substantially coaxial with the coupling member 664 by reducing the inclination angle of the input member 610 as the inclination angle of the input member 610 changes. The drive transmission member 81 is aligned with the coupling member 664.

In addition, depending on the combination of the phase of the recess portion (drive transmitting portion) 81*a* of the drive transmission member 81 and the input member 610 of the coupling member 664, the change of the inclination angle of the input member 610 may stop halfway, before the engagement of the drive transmitting portion 81*a* and the input member 610 is completed. That is, as shown in FIG.

54, the input member 610 once stops when the inclination angle of the input member 610 changes until the minimum inner diameter portion (circle 686) of the drive transmission portion 81*a* and the input member 610 come into contact with each other.

At this time, even if the lever member 12 is operated to the position where the coupling member 664 is held in the advanced position, the first pressing member 59 functions as a damper, so that the advancing/retracting member 630 does not advance any further. The first pressing member 59 holds the compression reaction force in the direction in which the advancing/retracting member 630 advances. Therefore, the drive transmission member 81 is rotated by the drive of the apparatus main assembly, and when the recess portion (drive transmission portion) 81*a* of the drive transmission member 81 and the input member 610 of the coupling member 664 are in phase, the advancing/retracting member 630 is advanced, and the inclination angle of the input member 610 also changes. That is, the inclination angle of the input member 610 changes until the free end of the input member 610 is located at a position corresponding to the maximum inner diameter circle 685 of the recess portion (drive transmitting portion) 81*a* of the drive transmission member 81. By this, the drive transmission member 81 is urged by the input member 610, and the drive transmission member 81 rotates (swings) so as to reduce its inclination angle. The drive transmission member 81 is aligned with the input member 610, and the drive transmission member 81 and the input member 610 can be reliably engaged with each other.

The input member (driving input member) 610 of this embodiment has a different moving direction from the input member (coupling member 64) shown in the modification of Embodiment 1, and also moves in the radial direction. Even with such a structure, the input member 610 moves toward the inner surface of the recess of the drive transmission member 81 to urge the drive transmission member 81, thereby reducing the inclination angle of the drive transmission member 81. By this, the input member 610 can engage with the inclined drive transmission member 81 similar to the coupling member 64 shown in the modification of Embodiment 1.

In this embodiment, three input members 610 including the same shape and three urging members 620 using pull springs are arranged along the circumference, but the structure is not limited to this example. In addition, the shape of the advancing/retracting member 630 is not limited to the shape of this embodiment. In addition, it is also possible to employ the structure in which the advancing/retracting mechanism for advancing/retracting the coupling member is on the non-driving side of the cartridge as in Embodiment 2.

Embodiment 6

Next, an Embodiment 6 will be described. The description of the same points as those in the above-described embodiment may be omitted. In particular, among the elements disclosed in the present embodiment, those corresponding to the members described in Embodiment 1 will be given the same names as the members of Embodiment 1, and only the points different from those of Embodiment 1 may be described.

In Embodiment 1 described above, the driven transmission portion 64*a* of the coupling member 64 has a substantially triangular cross-section and a projection shape (projection) (referring to FIG. 17). However, in this embodiment, the driven transmission portion comprises a plurality of members (FIG. 55).

The difference in the structure and the operation resulting from this difference will be described in detail.

Figure 55:
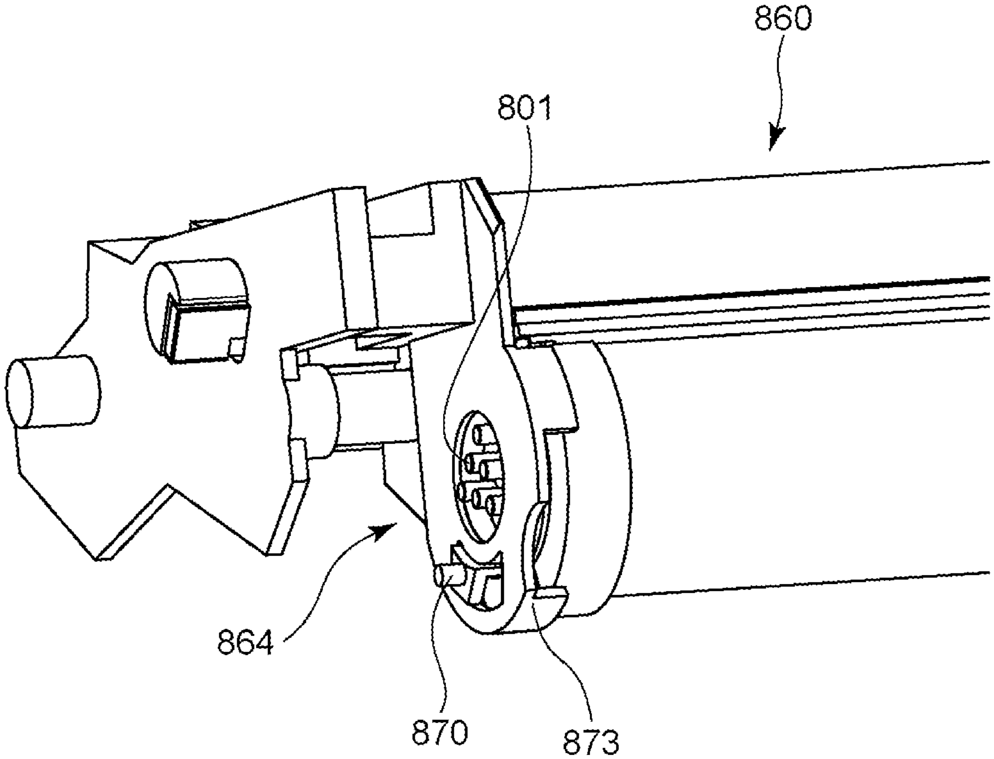
FIG. 55 is a perspective view of the coupling.
Figure 56:
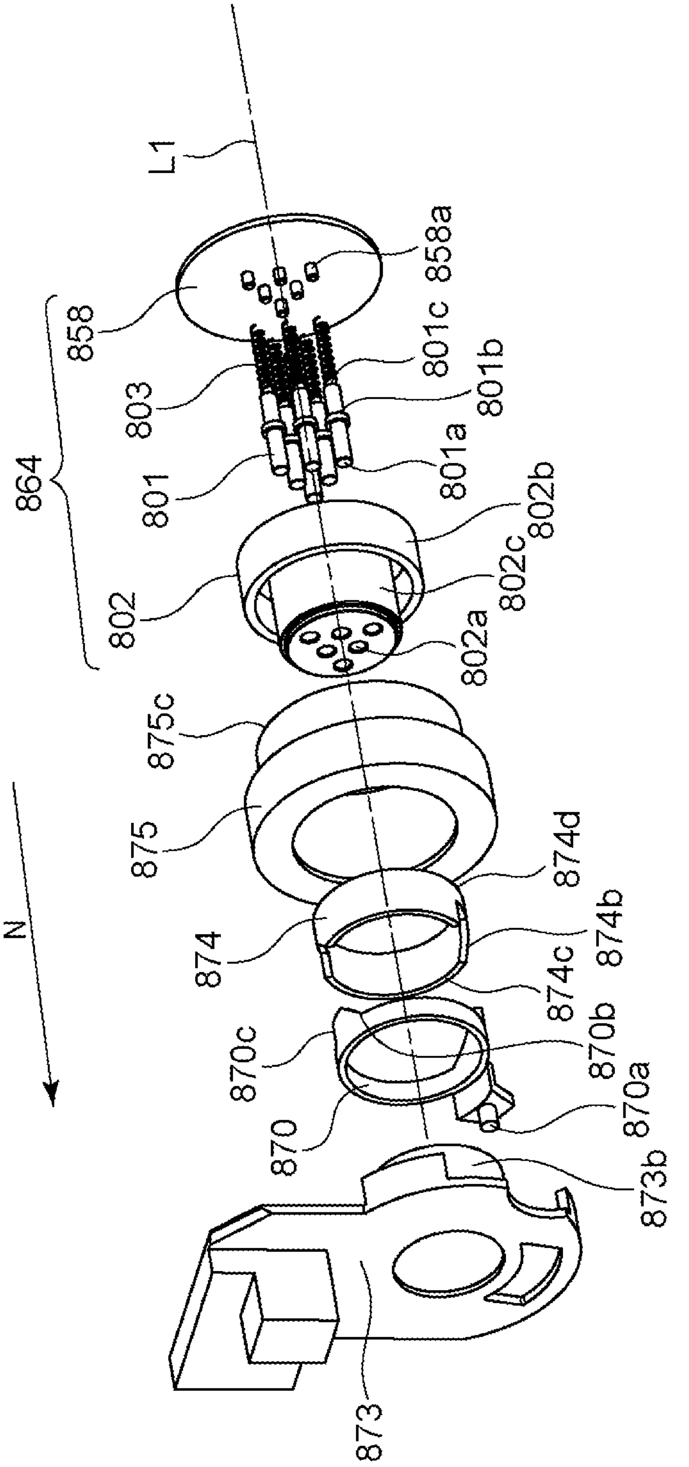
FIG. 56 is a perspective view of the coupling.
Figure 57:
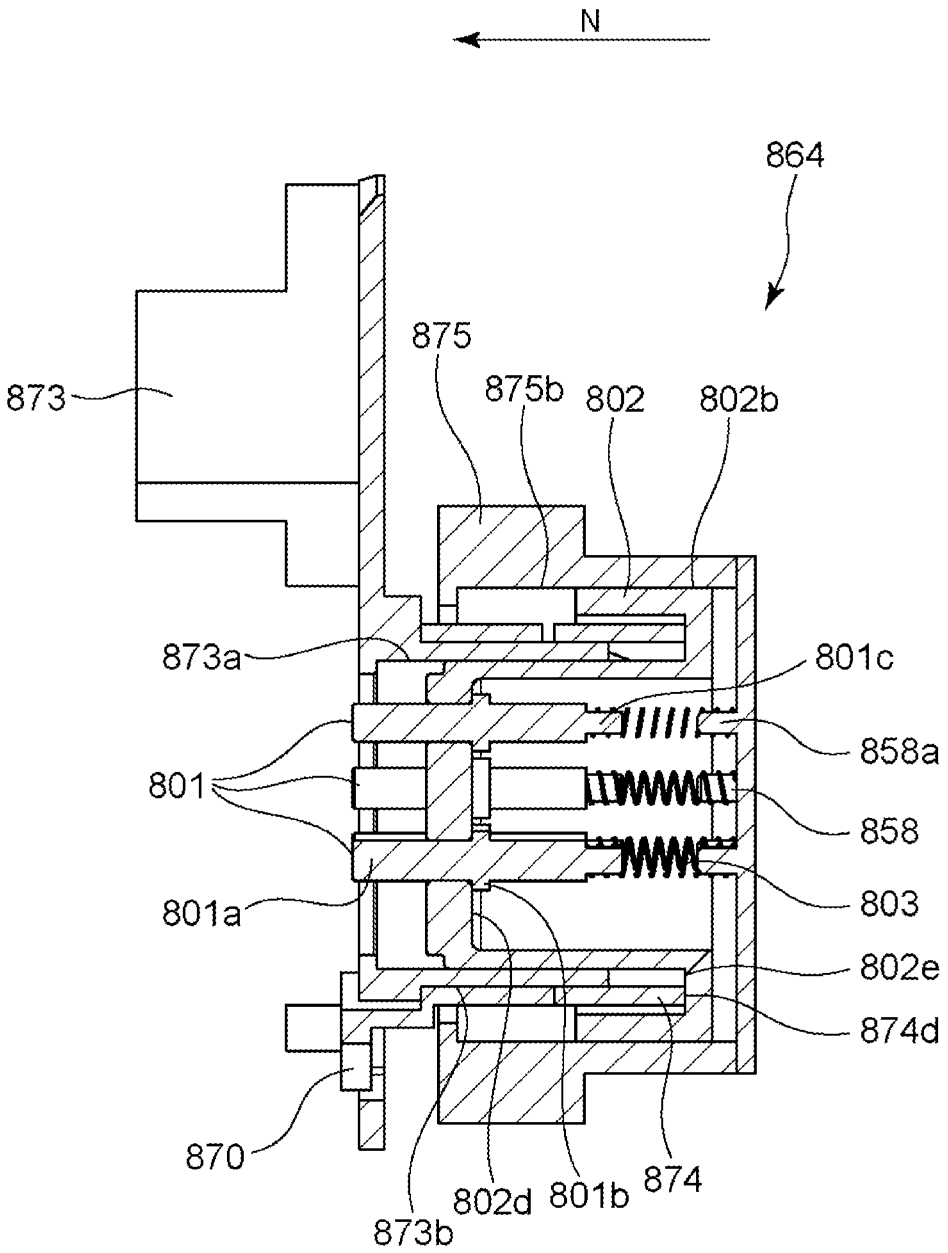
FIG. 57 is a sectional view of the coupling.

Referring first to FIGS. 55, 56, and 57, the coupling member 864 according to this embodiment will be described.

FIG. 55 is a perspective view illustrating the outer appearance of the coupling member 864 of Embodiment 6.

FIG. 56 is a partial perspective view illustrating the structure of the operation unit of Embodiment 6.

FIG. 57 is a partial longitudinal cross-sectional view of the drive unit end of the drum unit according to Embodiment 6.

Figure 58:
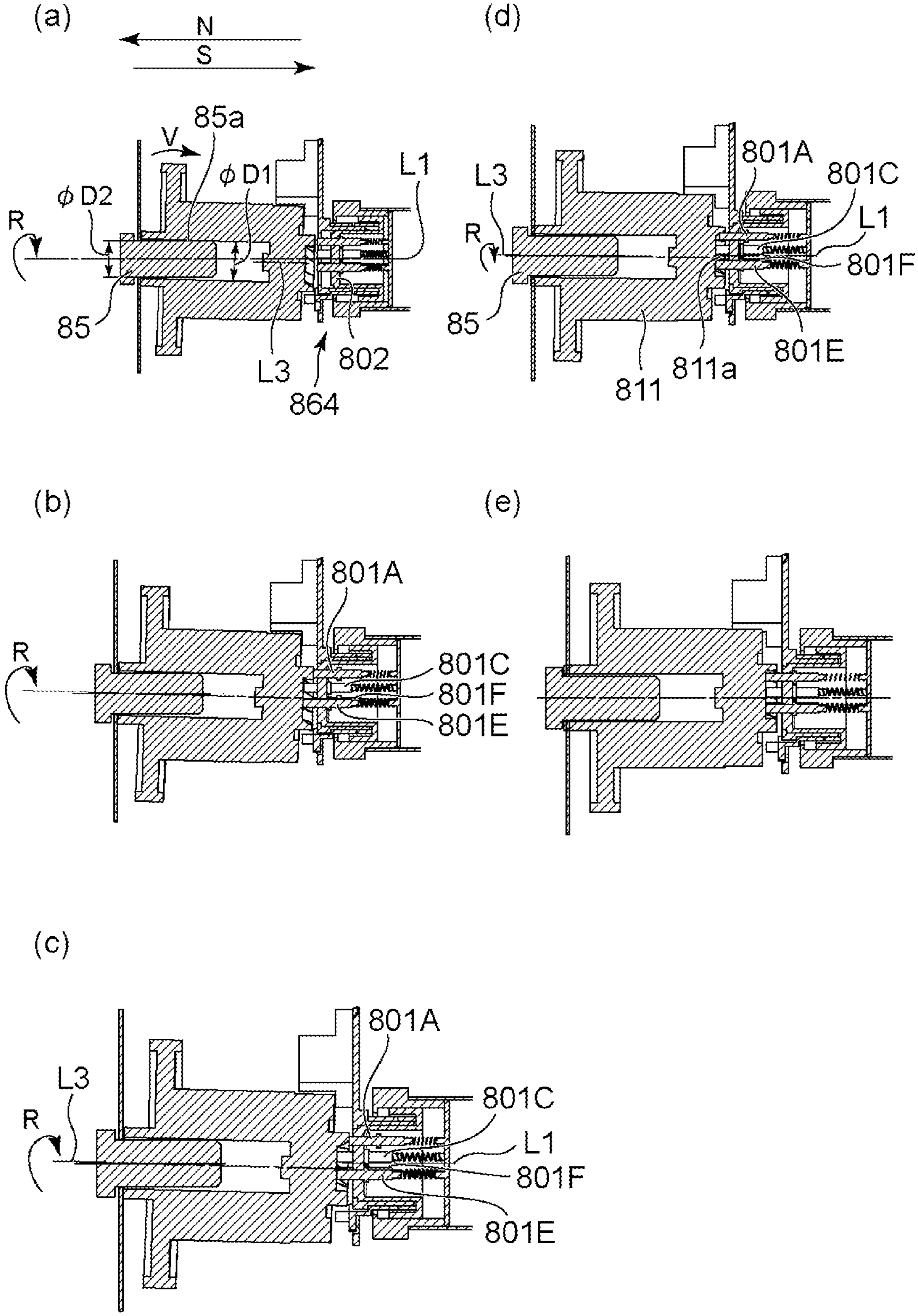
FIG. 58, parts (a) through (e), is a sectional view of the drive transmission portion.

FIG. 58 is a side view illustrating the operation of the coupling of Embodiment 6.

Figure 59:
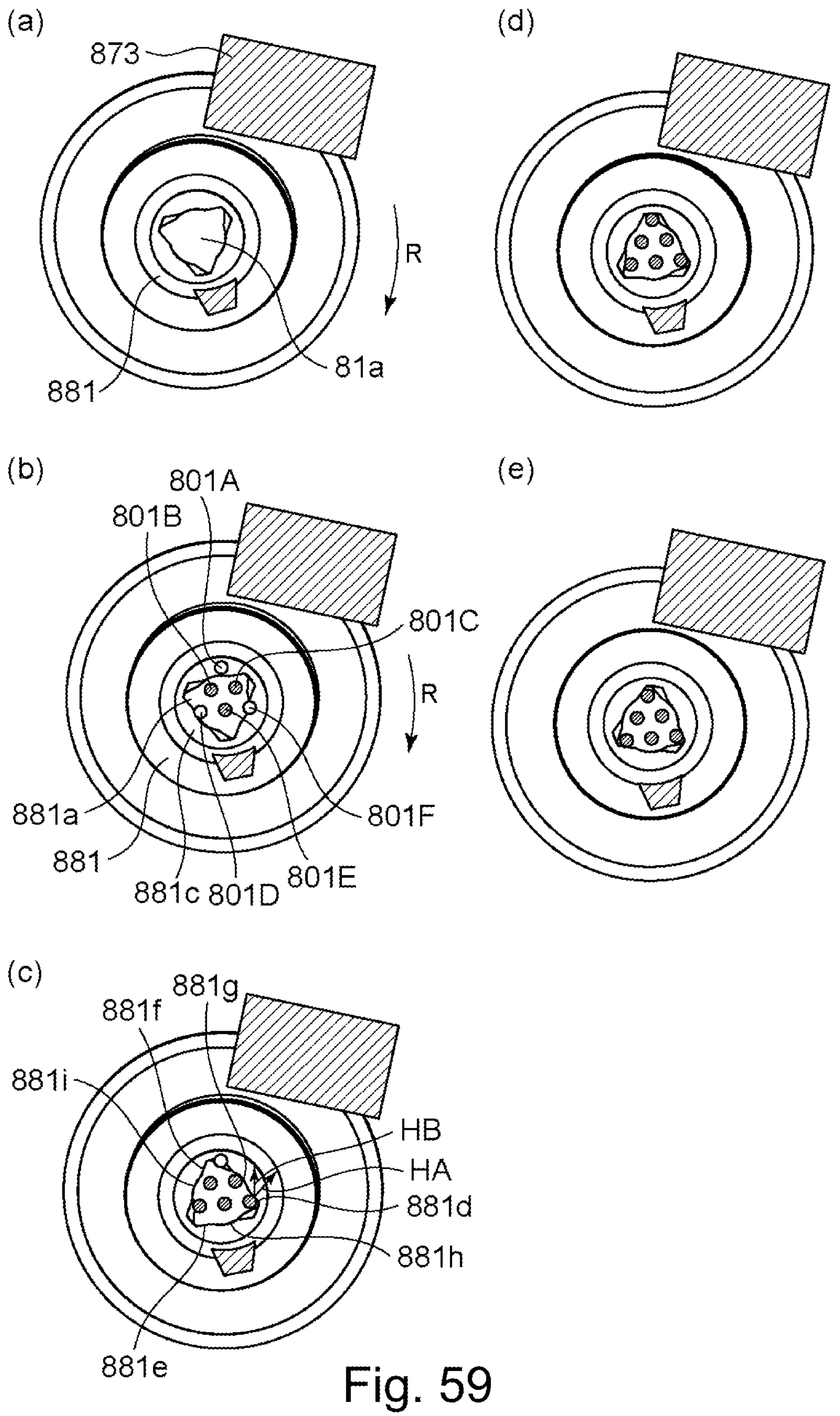
FIG. 59, parts (a) through (e), is a sectional view of the drive transmission portion.

FIG. 59 is a sectional view of the engaging portion showing the operation of the coupling according to Embodiment 6.

As in Embodiment 1, a drum bearing member 873 is supported by a cleaning unit 860. As shown in FIGS. 55 and 56, the coupling member 864 includes a plurality of projections 801, a projection support member (support member) 802, a projection pressing member 803, a lid member 858, and the like. Although the details will be described hereinafter, the projection 801 is an input member (drive input member) to which a driving force is inputted from the outside of the coupling member 864 (that is, from the drive transmission member of the apparatus main assembly).

As shown in FIGS. 56 and 57, in this embodiment, an outer cylindrical cam member 870 and an inner cylindrical cam member 874 are structured to be supported by the outer peripheral portion 873*b* of the drum bearing member 873, as in the Embodiment 1.

Further, an inner cylindrical surface 802*c* of the support member 802 is structured to be supported by a hole portion 873*a* of the drum bearing member 873. As shown in FIGS. 56 and 57, a plurality of projections 801 are provided on the inner peripheral portion of the support member 802. The support member 802 is a holding member (support member) for holding and supporting the plurality of projections 801.

A drive receiving portion 801*a* for receiving a drive transmission force from the drive portion side, a longitudinal position regulating surface 801*b*, and a pressing cylindrical shaft 801*c* are provided on the plurality of projections 801 respectively.

A projection pressing member 803 is provided on each of the pressure cylinder shafts 801*c* of the plurality of projections 801. The opposite side of the projection pressing member 803 to the projection 801 is supported by the plurality of cylindrical shafts 858*a* provided on the lid member 858.

The lid member 858 is fixed to the end portion 875*c* of the driving side flange member 875 by means of welding or the like.

The drive receiving portion 801*a* of the projection portion 801 is engaged with and supported by the engagement hole 802*a* so as to be movable in the axial direction.

The projection 801 pressed in an arrow N direction by a pressing force of the projection pressing portion 803 has longitudinal position regulating surface 801*b* thereof abutted against the longitudinal regulating surface 802*d* of the support member 802, so that the movement thereof in the arrow N direction is restricted.

A outer cylindrical surface 802*b* of the support member 802 is supported by an inner peripheral surface 875*b* of a driving side flange 875 so as to be movable in the arrow N direction.

The plurality of projections 801 which receive the pressing force of the plurality of projection pressing members 803 result in pressing the support member 802 in the arrow N direction. The support member 802 receives a pressing force in the direction of the arrow N, and a longitudinal regulation surface 802*e* abuts the longitudinal regulation surface 874*d* of the inner cylindrical cam member 874. The inner cylindrical cam member 874, which receives the pressing force in the arrow N direction, abuts to the outer cylindrical cam member 870 and presses the outer cylindrical cam member 870 in the arrow N direction.

The outer cylindrical cam member 870 abuts to the drum bearing member 873 fixed to the cleaning unit 860 in the direction of an axis N, and the longitudinal position is restricted.

Similarly to the coupling member 64 of Embodiment 1, the coupling member 864 of the present embodiment can move back and forth between the advanced position and the retracted position. Specifically, the support member 802 of the coupling member 864 moves back and forth in the same manner as in Embodiment 1, so that the coupling member 864 moves between the advanced position and the retracted position (FIG. 13).

In this embodiment, as shown in FIG. 57, the support member 802 is urged toward the driving side (arrow N side) by the projection pressing member 803, and the longitudinal regulation surface 802*e* is pressed against the longitudinal regulation surface 874*d* of the inner cylindrical cam member 874.

When the cartridge B is not mounted in the apparatus main assembly A, the inner cylindrical cam member 874 is arranged to retract the support member 802 into the drum against the elastic force of the projection pressing member 803. This is a state in which the support member 802 of the coupling member 864 is in the first position (retracted position).

When the opening/closing door 13 is closed after the cartridge B is mounted to the apparatus main assembly A, the cartridge pressing member 1 provided on the opening/closing door 13 contacts the lever member 12 (parts (a) and (b) of FIG. 12). In interrelation with the movement of the lever member 12, the support member 802 of the coupling member 864 moves from the first position (retracted position) to the driving side second position (advanced position).

That is, the longitudinal position of the support member 802 is also determined depending on the longitudinal position (position in the longitudinal direction) of the inner cylindrical cam member 874. Since the projection pressing member 803 operates the support member 802 on the driving side, the projection pressing member 803 can be regarded as a portion of the above-mentioned operating unit. In this embodiment, the compression coil spring is used as the projection pressing member 803, but it is also possible to urge the support member 802 using an elastic member having another shape.

The drive transmission member 881 of this embodiment is inclined as in the drive transmission member 81 shown in the modification of Embodiment 1. When the drive transmission member 881 is inclined, the drive transmission member 881 and the coupling member 864 are not coaxially arranged. A description will be made as to how the coupling member 864 and the drive transmission member 881 engage with each other in the case that the rotation axis L3 of the drive transmission member 881 and the rotation axis L1 of the coupling member 864 are not coaxial before the engagement.

FIG. 58 is a longitudinal cross-sectional view of the drive transmission member 881 and the coupling member 864 of the apparatus main assembly A according to this example.

Here, part (a) of FIG. 58 is a longitudinal sectional view illustrating a state in which the process cartridge is inserted into the apparatus main assembly A.

Part (b) of FIG. 58 is a longitudinal sectional view illustrating a state in which the opening/closing door 13 (not shown) is closed after the process cartridge is inserted into the apparatus main assembly A.

Part (c) of FIG. 58 shows a state in which the driving force is inputted to the apparatus main assembly A, the drive transmission member 881 starts to rotate, and a part of the projection 801 of the coupling member 864 start to engage with a part of the drive input coupling 881.

Part (d) of FIG. 58 is an illustration immediately after a phase of the drive transmission portion 881*a* and a phase of the projection 801 of the coupling member 864 fall within a predetermined range.

Part (e) of FIG. 58 is a cross-sectional view illustrating a state in which the drive transmission portion 881*a* of the drive transmission member 881 and the projection 801 of the coupling member 864 are completely engaged with each other.

In parts (c), (d) and (e) of FIG. 58, as the plurality of projections 801 of the coupling member 864 sequentially engage with the drive transmission member 881, the engagement operation is completed, while the inclination angle of the drive transmission member 881 is reducing.

Parts (a) to (e) of Figure are cross-sectional views of the drive transmission member 881 and the coupling member 864 corresponding to the timings of parts (a) to (e) of FIG. 58 in the direction perpendicular to the axis.

Similar to Embodiment 1, the drive transmission member 881 is supported by the drive transmission member support member 85. At this time, a gap is formed between the supported portion 881*b* of the drive transmission member 881 and the support portion 85*a* of the drive transmission member support member 85 due to the relationship of φD1>φD2. The drive transmission member 881 can move within the range of this gap. By properly selecting the size of this gap, when the drive transmission member 881 and the coupling member 864 are engaged, the center position of the free end side of the drive transmission member 881 can be aligned with the center position of the coupling member 864. As a result, the rotation axis L3 of the drive transmission member 881 can be accurately aligned with the rotation axis L1 of the coupling member 864.

From the relationship of φD1>φD2, the drive transmission member 881 is inclined by its own weight in a V direction as shown in part (a) of FIG. 58.

When the rotatable door 13 of the apparatus main assembly A is completely closed, the support member 802 of the coupling member 864 moves from the first position to the second position by way of the lever member 12, the outer cylindrical cam member 870, and the inner cylindrical cam member 874. At this time, the plurality of projections 801 having longitudinal positions are regulated by the support member 802 also project in the direction of arrow N with the movement of the support member 802.

In the present modified example, a portion of the plurality of projection members 801 abut against to the drive transmission member 881 inclined in the direction V in the Figure at the drive transmission portion 881*a* by the pressing force of the projection pressing member 803, and a part thereof abuts to the end surface 881*c* (part (b) of FIG. 57, part (b) of FIG. 58).

Here, for convenience of explanation, the plurality of (six) projections 801 are 801A to 801F, respectively (part (b) of FIG. 59). Each of these projections 801 can independently move back and forth.

When the drive transmission member 881 is located at the position shown in part (b) of FIG. 58 and part (b) of FIG. 59, the projections 801B, 801C, and 801E of the projection 801 abut the drive transmission portion 881*a*, and 801A, 801D, and 801F abut the end surface 881C.

Thereafter, as shown in part (c) of FIGS. 58 and 59, when the drive transmission member 881 rotates in the direction of arrow R, a part of the projection 801D and the projection 801F abuts to the drive transmission portion 881*a* by the pressing force of the projection pressing member 803. When the drive transmission member 881 further rotates from this state, a part of the surface (the surface 881*d*) of the drive transmission portion 881*a* engages with the projection 801F (f) in the rotational direction. At this time, the surface 881*d* of the drive transmission member 881 receives a reaction force in the arrow HA direction, and the drive transmission member 881 tends to move in the arrow HA direction. At the same time, the other surfaces 881*g* and 881*i* of the drive transmission member 881 abut to a part of the projections 801C and 801D, and the movement to the outside of the alignment direction is restricted. Therefore, the drive transmission member 881 continues to rotate while moving in the arrow HB direction which is the alignment direction.

Further, the drive transmission member 881 rotates in the direction of the arrow R while moving in the direction of the arrow HB, so that all the projections 801 abut to the drive transmitting portion, as shown in part (d) of FIG. 58 and part (d) of FIG. 59.

Further, as the drive transmission member 881 rotates, the surfaces 881*d*, 881*e*, and 881*f*, which are the drive transmission portions, abut to the projections 801A, 801D, and 801F, respectively.

At this time, since the projections 801A, 801D, and 801F are arranged at appropriate positions, the drive transmission member 881 engages while being aligned in the arrow HB direction.

That is, the projections 801 are placed such that when the rotation axis L3 of the drive transmission member 881 and the rotation axis L1 of the coupling member 864 are coaxially arranged, the projections 801 abut simultaneously to the surfaces 881*d*, 881*e*, and 881*f* of the drive transmission member 881. By this, a centering effect can be obtained.

Thus, the alignment of the projection 881 is completed by the projection 801, and the drive transmission is enabled.

Since each of the plurality of projections 801 is urged by the corresponding spring (projection pressing member 803), each projection 801 can move independently of each other. In accordance with the rotation of the drive transmission member 881, each projection 801 moves back and forth, and sequentially engages with the drive transmission member 881. That is, the number of projections 801 that engage with the drive transmission member 881 gradually increases. By this, the inclination angle of the drive transmission member 881 gradually decreases, and finally the engagement (coupling) between the drive transmission member 881 and the coupling member 864 is completed. In this state, the inclination angle of the drive transmission member 881 with respect to the photosensitive drum can be set to a value close to 0 degrees. That is, the drive transmission member 881 can be aligned with the photosensitive drum.

In addition, when the cartridge B is taken out from the main assembly A of the apparatus, the support member 802 is moved in the arrow S direction shown in part (a) of FIG. 58. Then, the projection 801 is retracted to the positions shown in parts (a) of FIGS. 58 and 59, and the engagement with the drive transmission member 881 is broken.

In the above description, the inclination direction (V direction) of the drive transmission member 881 is the gravity direction, but this inclination direction may be any direction. For example, the drive transmission member 881 may be inclined in the direction shown in Embodiment 3 or the like.

In addition, in this embodiment, the case where the plurality of projections (input members) 801 is six is taken, but if there are at least three projections 801, it is possible to engage with the drive transmission member 881 while obtaining the centering action.

Furthermore, as described above, in order for the projection 801 to exhibit the function of centering the drive transmission member 881, the following relationship may be preferably satisfied. That is, it is preferable that when the drive transmission member 881 and the coupling member 864 are coaxially arranged, at least three of the plurality of projections 801 are provided at positions where they can be engaged with the drive transmission member 881 at the same time. If the plurality of projections 801 includes other than the projections that engage with the rotation loci of the surfaces 881*d*, 881*e*, and 881*f* of the drive transmission member 881, the drive transmission member 881 engages first the projections other than the engaging projections, it may be difficult to obtain the effect of centering. In this embodiment, the plurality of (six) projections 801 of the coupling member 864 are arranged so as to form a substantially triangular shape (part (e) of FIG. 59). In this case, since the recess 81*a* (part (a) of FIG. 59) of the drive transmission member 881 is substantially triangular, six projections 801 are arranged correspondingly. By arranging the plurality of projections 801 so as to correspond to the shape of the recess of the drive transmission member 881, the number of projections 801 that engage with the recess 81*a* increases in accordance with the rotation of the drive transmission member 881 (parts (a)-(e) of FIG. 59). By this, the inclination amount of the drive transmission member 881 is reduced as shown in parts (a)→(e) of FIG. 58, and the connection between the drive transmission member 881 and the coupling member 864 can be accomplished.

Embodiment 7

Next, Embodiment 7 will be described. The description of the same points as those in the above-described embodiment may be omitted. Particularly, among the elements disclosed in the present embodiment, those corresponding to the members described in the first and second embodiments will be given the same names as the members in Embodiments 1 and 2, and only the points different from the one described above may be described.

In this embodiment, as in the modification of Embodiment 1, a case will be described in which the drive transmission portion 81 is structured to be pivotable (inclinable). In the Embodiment 1, the chamfered portion 64*e* is provided so as to be inclined relative to the advancing/retracting direction of the coupling member 64, so that the angular difference between the drive transmission member 81 and the coupling member 64 is reduced, and the drive transmission member 81 and the cup member can be coupled with each other. Engagement with the ring member 64 is now possible. In this embodiment, as will be described in detail hereinafter, the drive input unit 300 including the aligning member 301 and the drive transmission member 81 can be engaged with each other. The drive input unit 300 corresponds to the coupling member in this embodiment.

As a matter of course, according to this embodiment, even before they are engaged with each other even with their respective rotation axes are coaxial, the drive transmission member 81 and the drive input unit 300 are engaged with each other.

In this embodiment, the operation member (lever member 12) as in Embodiment 1 is arranged on the driving side of the cartridge B, and the operation member (lever member 212) as in Embodiment 2 is arranged on the non-driving side of the cartridge B. As will be described hereinafter, the lever member 12 advances and retracts a pin receiving member 303, and the lever member 212 advances and retracts the aligning member 301. The pin receiving member 303 and the aligning member 301 can move back and forth independently from each other.

Referring to FIGS. 60, 61, 62, and 63, a drive input unit 300 including the aligning member 301, the pins (projections, drive input members, input portions) 302, and the pin receiving members (support portions, output portions) 303 in this embodiment will be described.

Figure 60:
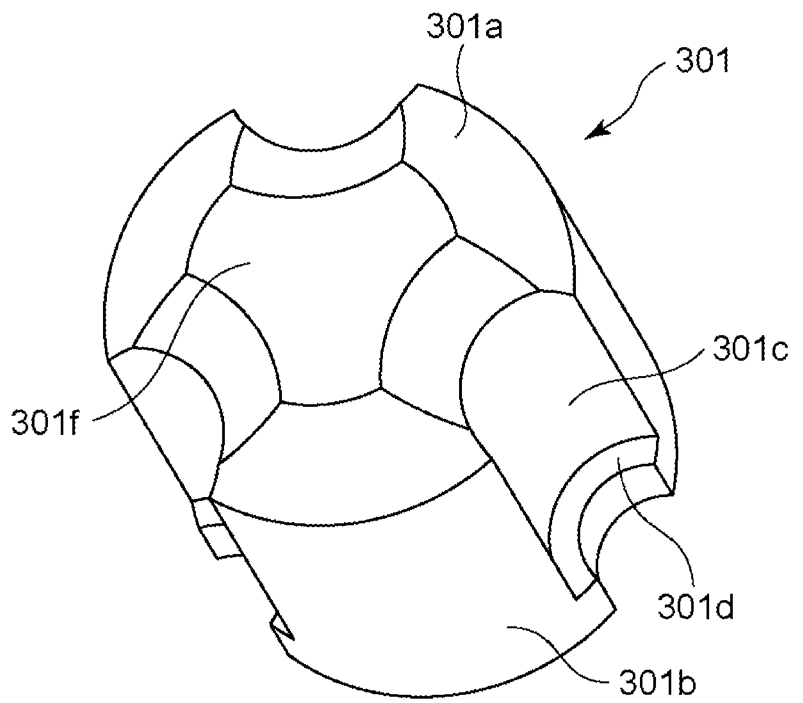
FIG. 60, parts (a) and (b), is a perspective view of an aligning member.
Figure 60:
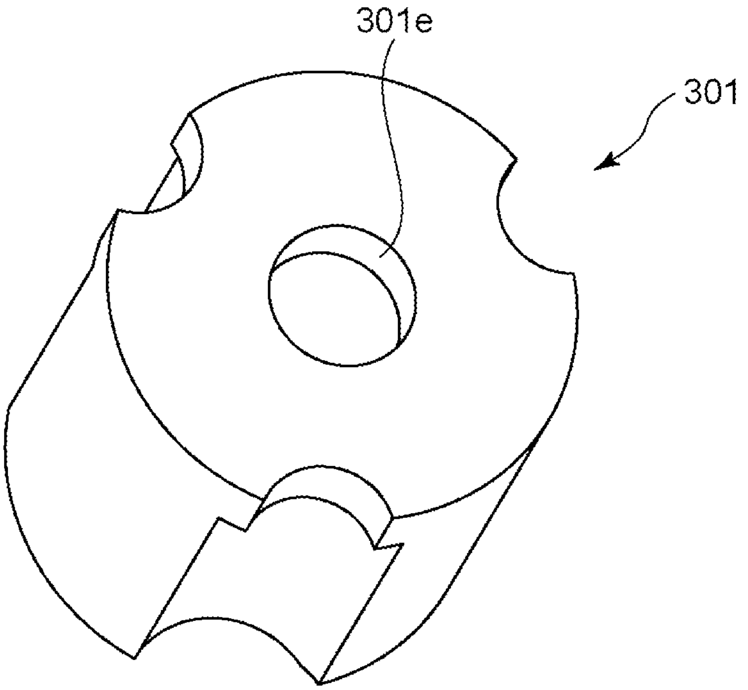

FIG. 60 is a perspective view of the aligning member 301 according to this embodiment.

Figure 61:
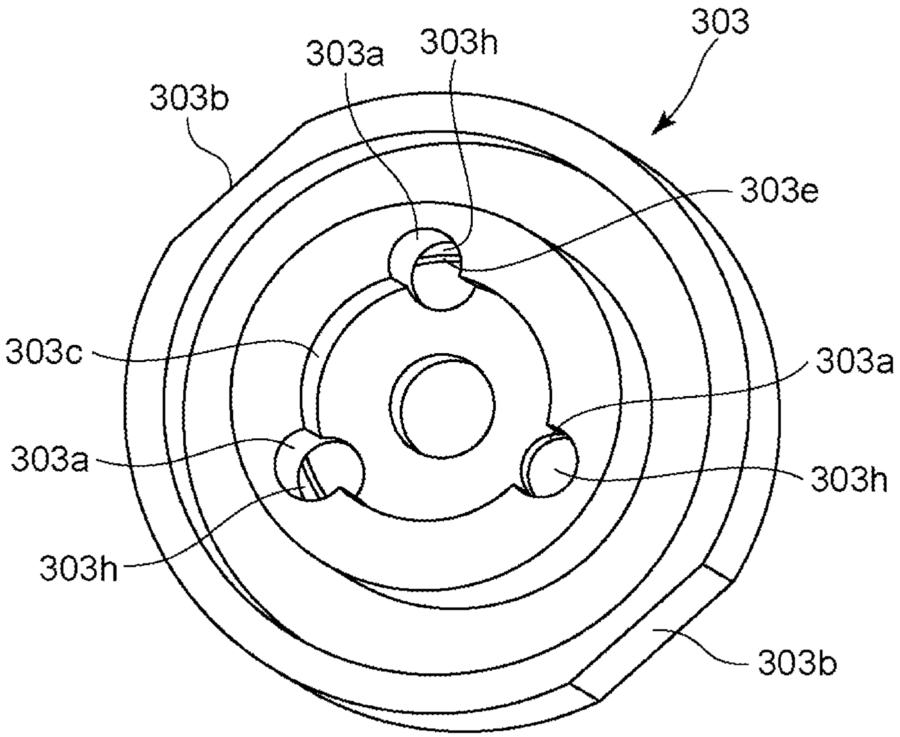
FIG. 61, parts (a) and (b), is a perspective view of a pin receiving member.
Figure 61:
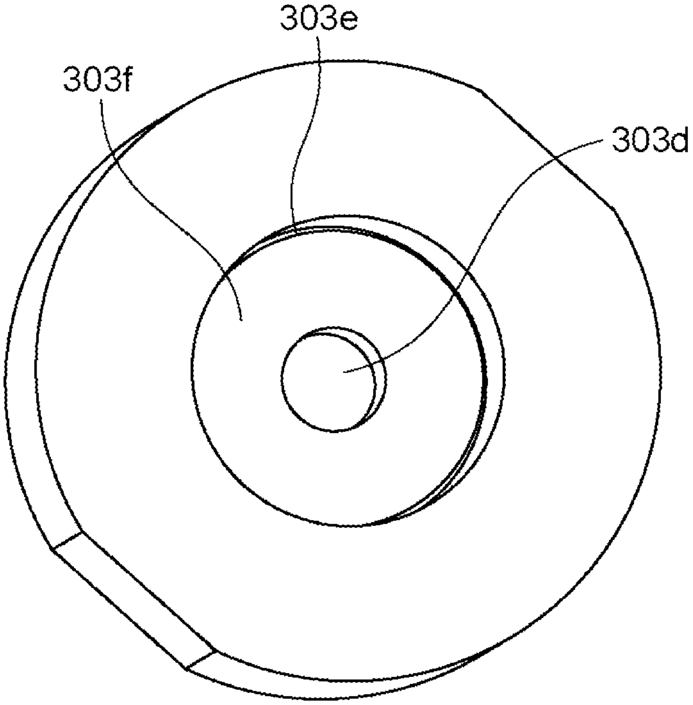

FIG. 61 is a perspective view of the pin receiving member 303 according to this embodiment.

Figure 62:
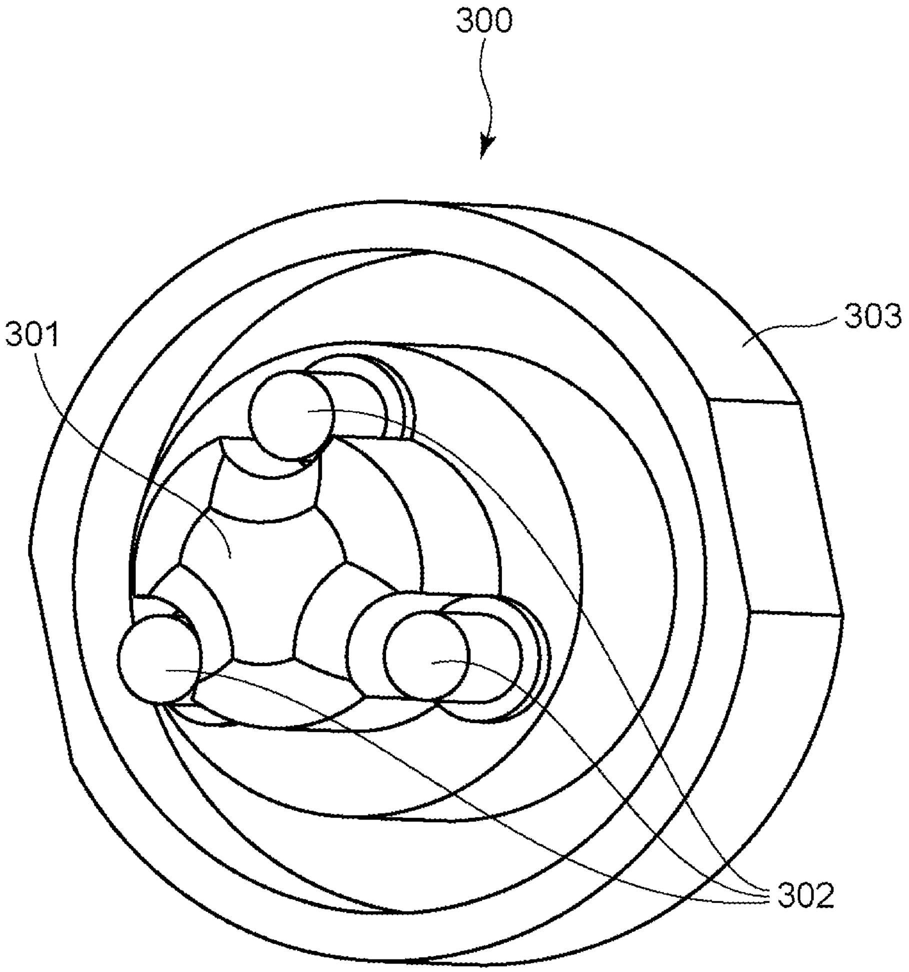
FIG. 62 is a perspective view of a drive input unit.

FIG. 62 is a perspective view of the drive input unit 300 according to this embodiment.

Figure 63:
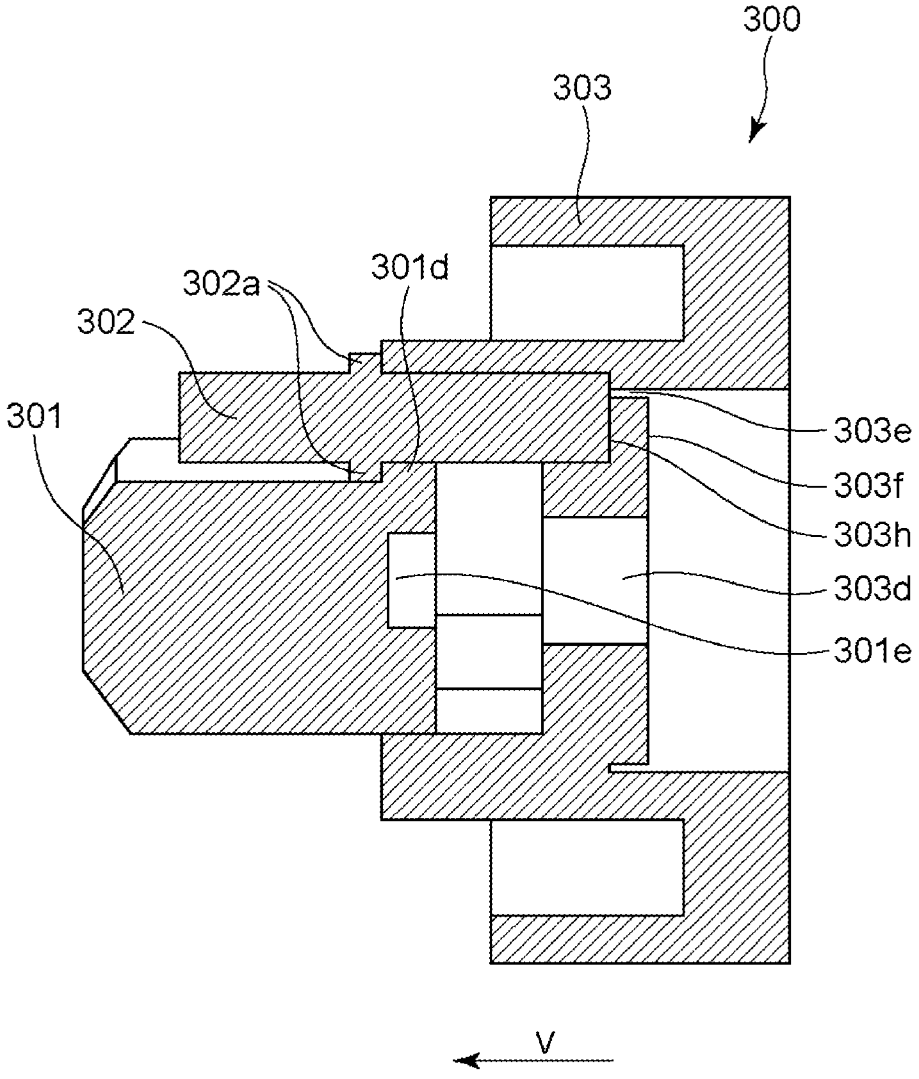
FIG. 63 is a partial longitudinal sectional view of the drive input unit.

FIG. 63 is a partial longitudinal sectional view of the drive input unit 300 according to this embodiment.

As shown in FIG. 60, the aligning member 301 is provided with an inclined surface 301*a*, a cylindrical portion 301*b*, a cut-away portion 301*c*, a longitudinal regulation surface 301*d*, a connecting member receiving portion 301*e*, and an end surface 301*f*. At this time, three cut-away portions 301*c* are provided at equal intervals along the cylindrical portion 301*b*.

In addition, as shown in FIG. 61, the pin receiving member 303 is provided with a pin receiving portion 303*a*, a drive transmitting portion 303*b*, a cylindrical receiving portion 303*c*, a hole portion 303*d*, a groove portion 303*e*, a spring seat surface 303*f*, and a longitudinal restriction surface 303*h*. At this time, three pin receiving portions 303*a* are provided at equal intervals along the cylindrical receiving portion 303*c*.

As shown in FIGS. 62 and 63, the drive input unit 300 in this embodiment includes the aligning member 301, a pin 302, and a pin receiving member 303. The cylindrical portion 301*b* of the aligning member 301 is inserted into and engaged with the cylindrical receiving portion 303*c* of the pin receiving member 303. In addition, the pin 302 is engaged with the pin receiving portion 303*a* of the pin receiving member 303. At this time, the pin 302 is inserted to a position in contact with the longitudinal regulation surface 303*h*, and can be securely fixed by applying an adhesive or the like to the groove portion 303*e* from the side of the spring seat surface 303*f*. In addition, as a means for securely fixing, a means such as press fitting or a screw may be used. Here, the pin 302 is provided with a flange portion 302*a*, and the pin 302 is engaged with the cut-away portion 301*c* of the aligning member 301 at the flange portion 302*a*. When the aligning member 301 is urged in the direction V by the drive input unit connecting member 304, which will be described hereinafter, the longitudinal regulating surface 301*d* of the aligning member 301 and the flange portion 302*a* of the pin 302 come into contact with each other, and the aligning member 301 is restricted in the longitudinal direction. In addition, as shown in FIG. 62, one pin is provided in each of the three cut-away portions of the aligning member 301.

In addition, the drive transmission portion 303*b* is provided on the pin receiving member 303 as described above. Similar to the case where the drive transmission portion 64*b* of the coupling member 64 of Embodiment 1 is supported by the driving side flange member 75 and transmits drive to the driving side flange member 75, the drive transmission portion 303*b* transmits the drive to the driving side flange member 75. The structure in which the drive transmission portion 303*b* is supported by the driving side flange member 75 and the structure in which the driving side flange member 75 is supported by the photosensitive member drum 62 are the same as those in Embodiment 1. Next, referring to FIGS. 21, 23, 64, and 65, the driving side flange unit 269 and the drum unit according to this embodiment, and the operation unit which enables the longitudinal movement of the aligning member 301 will be described.

Figure 64:
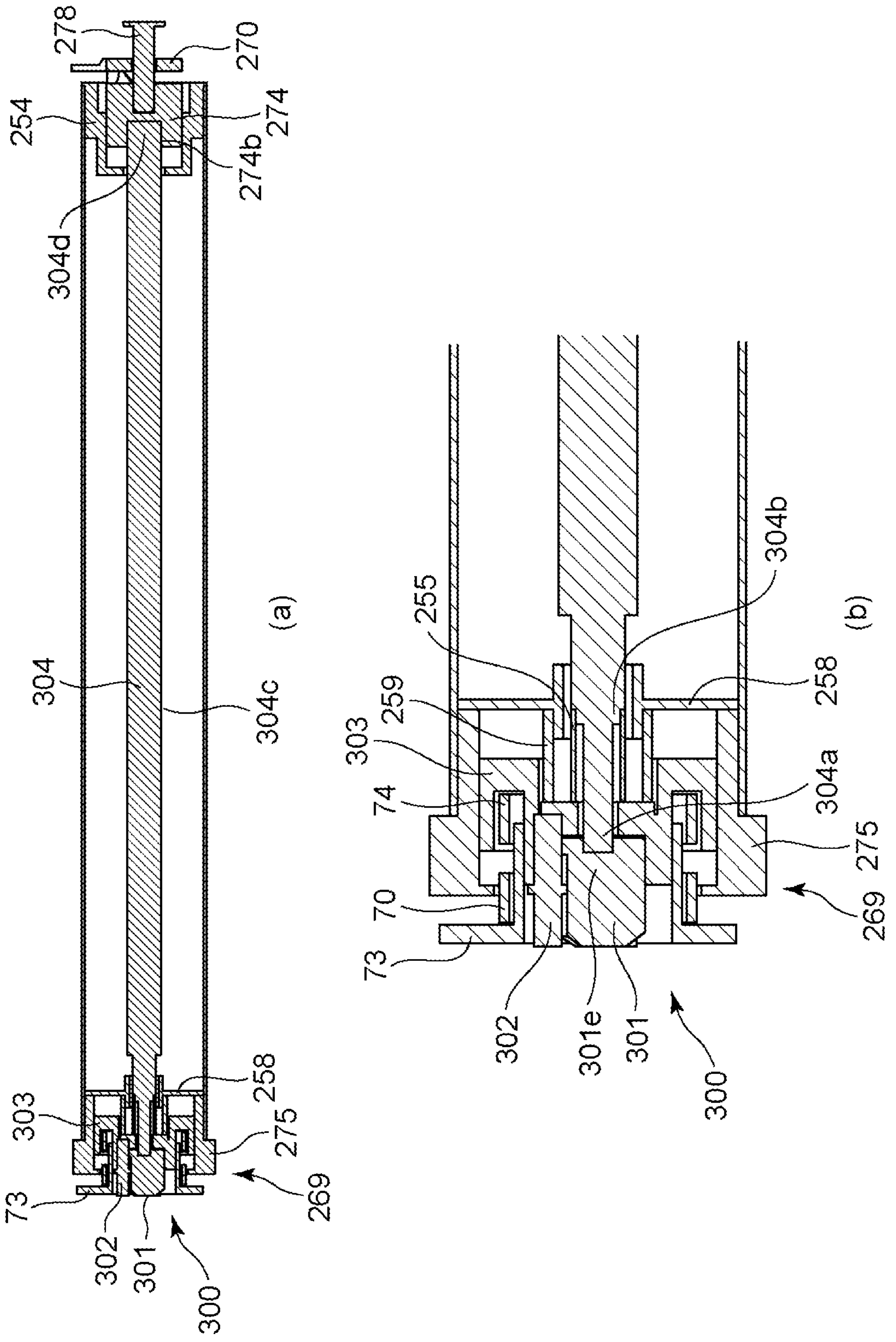
FIG. 64, parts (a) and (b), is a longitudinal sectional view of the drum unit and a partially enlarged view thereof.
Figure 65:
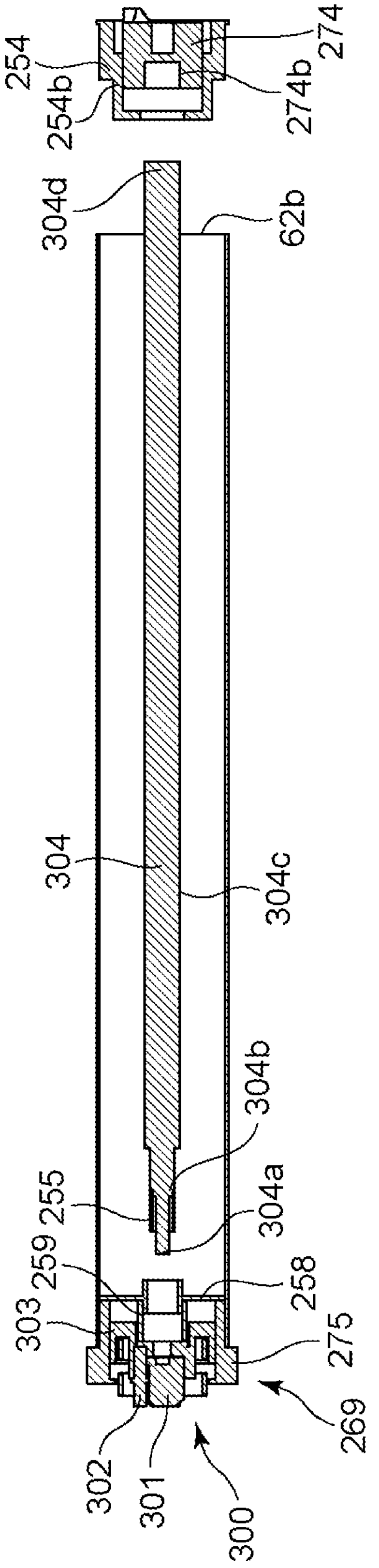
FIG. 65 is an illustration of a method of assembling the drum unit.

FIG. 64 is a longitudinal sectional view of the drum unit and a partially enlarged view thereof according to Embodiment 7. FIG. 65 is a view illustrating a method of assembling the drum unit according to Embodiment 7.

As shown in FIGS. 64 and 65, the driving side flange unit 269 according to the present embodiment comprises the drive input unit 300 including the alignment member 301, the pin 302 and the pin receiving member 303, the driving side flange member 275, and the lid member 258, and a first pressing member 259 and the like. The drive input unit 300 is provided in place of the coupling member 64 of Embodiment 1 and the coupling member 264 of Embodiment 2. Further, the drum unit comprises the driving side flange unit 269, the driving input unit connecting member 304, a cushion member 255, a non-driving side flange member 254, and the inner cylindrical cam member 274.

The driving side flange member 275 has the same structure as that of Embodiment 1, and the inner cylindrical cam member 274, the non-driving side flange member 254, and the lid member 258 have the same structure as those of Embodiment 2.

The drive input unit connecting member 304 comprises an aligning member supporting portion 304*a*, the cushion member supporting portion 304*b*, a connecting portion 304*c* connecting the drive input unit 300 and the inner cylindrical cam member 274, and a supported portion supported by the inner cylindrical cam member 274.

The first pressing member 259 including a compression spring or the like is provided between the spring seat surface 303*f* of the pin receiving member 303 and the lid member 258.

As in Embodiment 1, the driving side flange unit 269 is fixed to the driving side end portion of the photosensitive drum 62 by means such as press fitting or clamping. Further, as shown in FIG. 65, the drive input unit connecting member 304 in which the cushion member 255 is supported by the cushion member supporting portion 304*b* is inserted into the drum from the non-driving side end portion 62*b*. At this time, the cushion member 255 supported by the drive input unit connecting member 304 contacts the spring seat surface 303*f* of the pin receiving member 303, and the aligning member support portion 304*a* engages with the connecting member receiving portion 301*e* of the aligning member 301. Here, the aligning member support portion 304*a* of the drive input unit connecting member 304 and the connecting member receiving portion 301*e* of the aligning member 301 are securely fixed by press fitting, screwing, adhesive or the like. Then, the non-driving side flange member 254 is fixed to the non-driving side drum end portion 62*b* by means such as clamping as in Embodiment 1 in a state where the inner cylindrical cam member 274 is fitted to the inner peripheral portion 254*b*. At this time, the drive input unit connecting member 304 is rotatably supported by the supported member 304*d* on the connecting member supporting portion 274*b* of the inner cylindrical cam member 274. The drum unit of Embodiment 7 is structured as described above.

In addition, as in Embodiment 2, the operation unit on the cartridge non-driving side comprises an outer cylindrical cam member 270, an inner cylindrical cam member 274, the lever member (operating member) 212, a second pressing member 214, and so on (FIG. 21, FIG. 23). The operation unit on the non-driving side of the cartridge will be referred to as a non-driving side operation unit. The structure and operation of this non-driving side operation unit are the same as those of the operation unit of Embodiment 2. The difference from Embodiment 2 is that the cushion member 255 supported by the connecting member 261 is in contact with the pin receiving member 303 instead of the coupling member 264, as described above. The aligning member support portion 304*a* of the drive input unit connecting member 304 is securely fixed to the aligning member 301.

In Embodiment 2, the outer cylindrical cam member 270, the inner cylindrical cam member 274, and the connecting member 261 are structured to determine the longitudinal position of the coupling member 264. Similarly, in this embodiment, the longitudinal position of the aligning member 301 is determined by the outer cylindrical cam member 270, the inner cylindrical cam member 274, and the drive input unit connecting member 304. At this time, as shown in FIG. 64, the aligning member 301 is structured to be located on the most nondriving side in a state before the cartridge pressing member abuts on the lever member 212 of the non-driving side operation unit. The position where the aligning member 301 is retracted to the non-driving side is referred to as the aligning member retracted position (the retracted position of the aligning member, the non-acting position). In addition, as will be described hereinafter in detail, when the opening/closing door 13 is completely closed, the cartridge pressing member 1 contacts the lever member 212 of the non-driving side operation unit. Then, the inner cylindrical cam member 74, the drive input unit 300, and the aligning member 301 are structured to be located on the most driving side by the urging force of the cushion member 255. In this embodiment, the position where the aligning member 301 advances to the driving side is called the aligning member advancement position (advanced position of the aligning member, the action position) in this embodiment.

Figure 66:
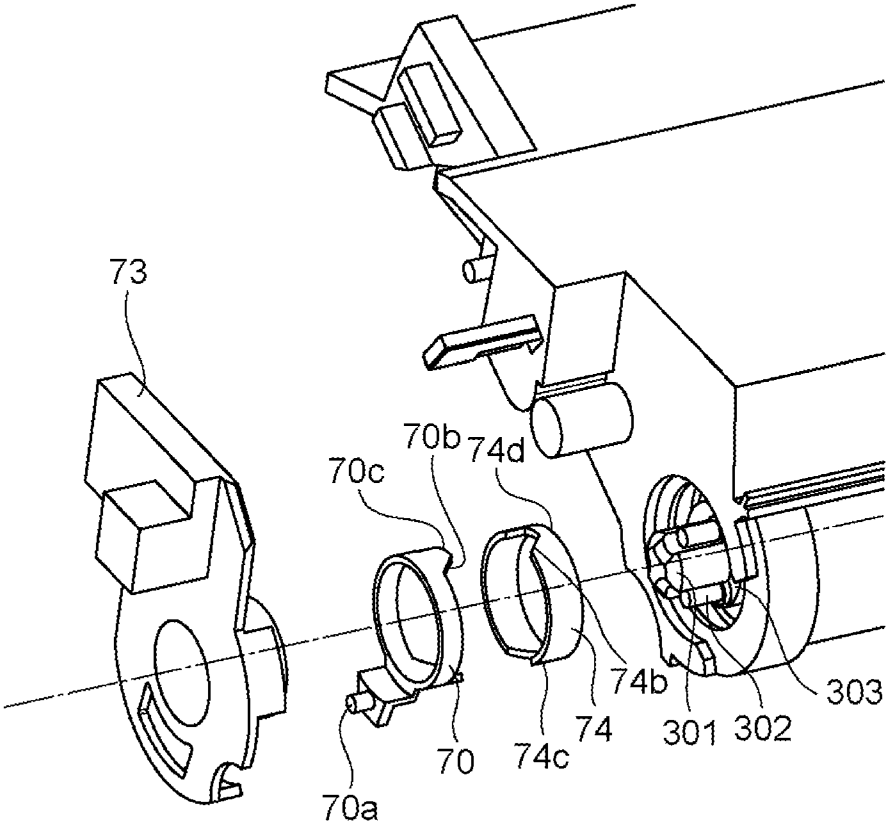
FIG. 66 is a partial perspective view of the actuation unit and the drive input unit.
Figure 67:
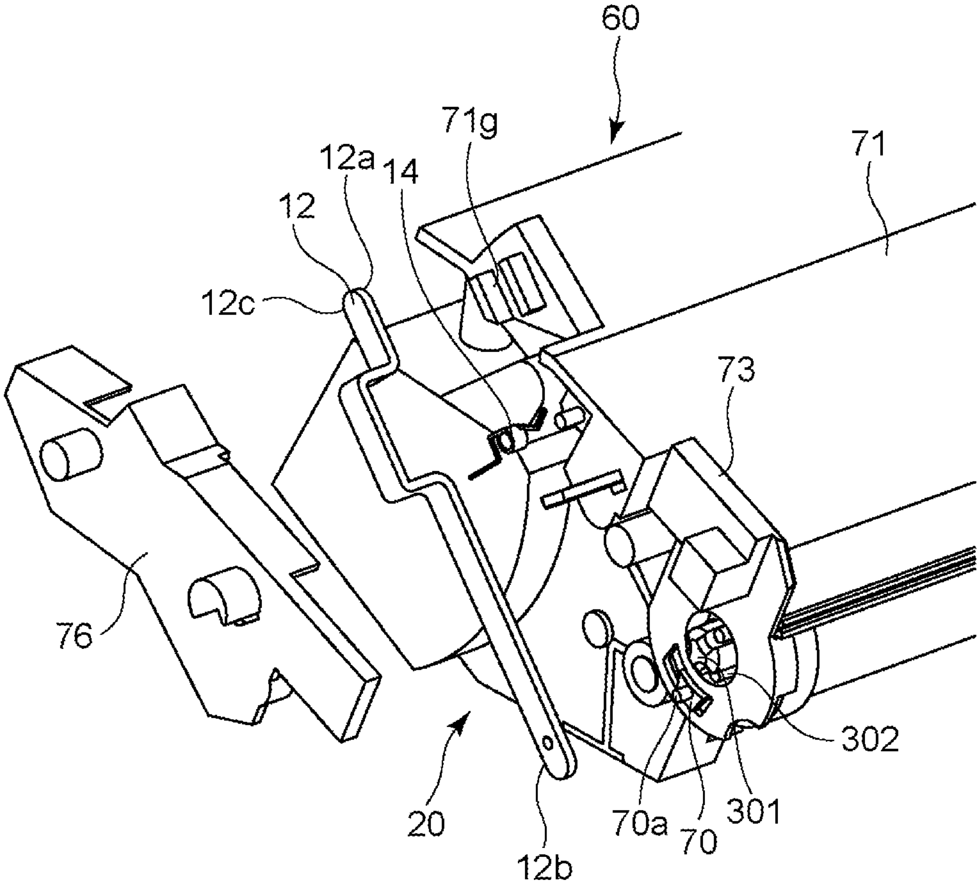
FIG. 67 is a partial perspective view of the operating unit.

Referring to FIGS. 64, 66, and 67, an operation unit that enables the pin receiving member 303 to move forward and backward in the longitudinal direction will be described.

FIG. 66 is a partial perspective view illustrating the structures of the operation unit and the drive input unit 300 provided in the cleaning unit 60 according to this embodiment.

FIG. 67 is a partial perspective view illustrating the operation unit according to the present embodiment.

As shown in FIGS. 64, 66, and 67, the operating unit similar to that of the Embodiment 1 is connected to the pin receiving member 303 and controls the movement (advancing/retracting movement) of the pin receiving member 303 (control unit). Here, this operating unit is provided on the driving side of the cartridge as in Embodiment 1. The driving side operation unit of this cartridge will be referred to as a driving side operation unit. In addition, as in Embodiment 1, the driving side operation unit includes an outer cylindrical cam member 70, the inner cylindrical cam member 74, the lever member 12, the second pressing member (elastic member, urging member) 14, and the like.

The inner cylindrical cam member 74 abuts the cylindrical cam portion 70*b* and the drive input unit 300, so that in Embodiment 1, the longitudinal position of the coupling member 64 is restricted by the coupling member longitudinal position regulation surface 74*d*. In this embodiment, instead, the inner cylindrical cam member 74 restricts the longitudinal position of the drive input unit 300 by the coupling member longitudinal position regulation surface 74*d*.

The driving side operation unit is connected to the drive input unit 300 at the inner cylindrical cam 74, and the pin receiving member 303 can be moved back and forth by operating the lever member 12. As the pin receiving member 303 moves, the pin 302 securely fixed to the pin receiving member 303 also moves. The manner of this operation is the same as that of the operating unit for the coupling member 64 in Embodiment 1.

In addition, as shown in FIG. 64, when the cartridge is not mounted to the apparatus main assembly A, the inner cylindrical cam member 74 is arranged so as to retract the pin receiving member 303 into the drum against the elastic force of the first pressing member 259. That is, the pin receiving member 303 is structured to be located on the most non-driving side in a state in which the main assembly door 13 is released or in a state before the cartridge pressing member 1 abuts on the lever member 12. The position where the pin receiving member 303 is retracted to the non-driving side is referred to as a pin receiving member retracted position. As shown in FIG. 64, when the pin receiving member 303 is at the pin receiving member retracted position, the pin 302 and the drive transmitting portion 81*a* of the drive transmission member 81 of the main assembly A of the apparatus are structured not to overlap in the longitudinal direction. That is, when the aligning member 301 is also in the aligning member retracted position, the process cartridge B can be smoothly mounted and dismounted without interference between the pin 302 and the drive transmission member 81 of the apparatus main assembly. In addition, as will be described in detail hereinafter, when the opening/closing door 13 is completely closed, the cartridge pressing member 1 contacts the lever member 12 of the driving side operation unit. Then, the structure is such that the inner cylindrical cam member 74, the pin receiving member 303, and the pin 302 are located on the most driving side by the urging force of the first pressing member 259. In this embodiment, the position where the pin receiving member 303 advances to the driving side is referred to as the pin receiving member advance position. The pin receiving member 303 moves between the retracted position and the advanced position along the axis of the photosensitive member drum 62.

Figure 68:
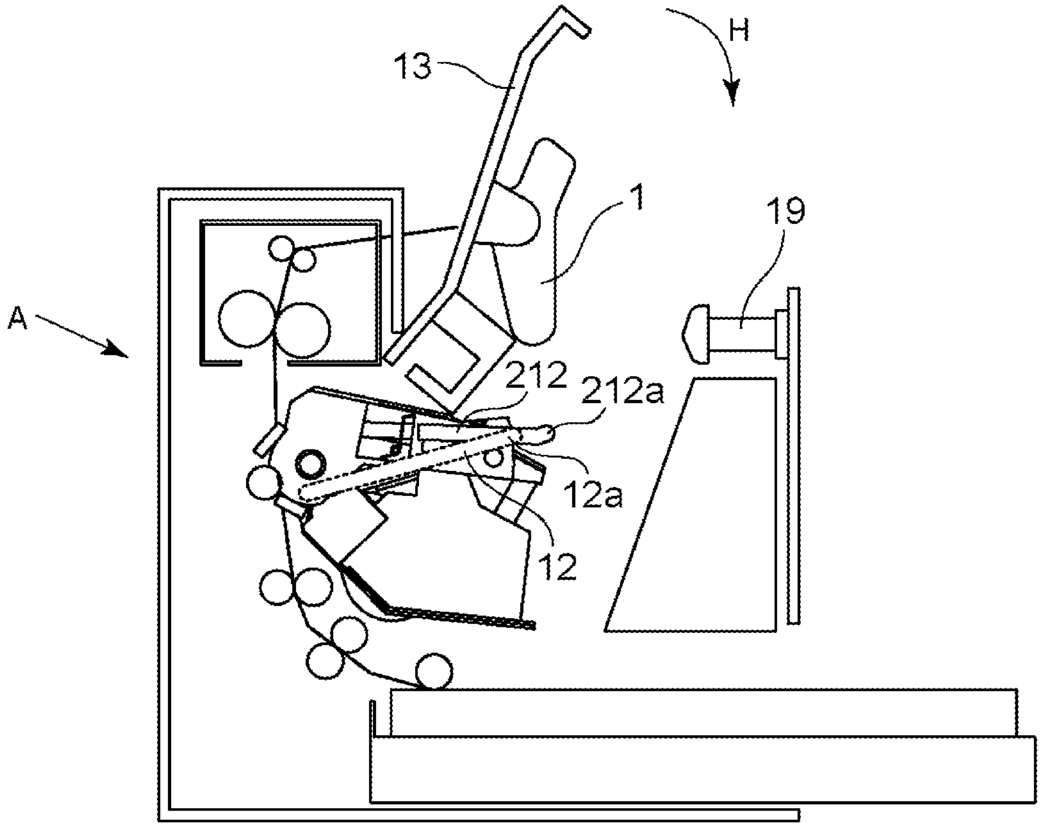
FIG. 68 is a cross-sectional view of the image forming apparatus as viewed from the cartridge non-driving side.

Referring to FIG. 68, the positional relationship between the lever member 12 of the driving side operation unit and the lever member 212 of the non-driving side operation unit will be described.

FIG. 68 is a sectional view of the image forming apparatus as seen from the non-driving side of the cartridge in which the cartridge pressing member 1 approaches the lever member 12 and the lever member 212 in the process of closing the opening/closing door 13 of the apparatus main assembly A in the direction H in the Figure. In the Figure, the lever member 12 on the driving side is indicated by a broken line.

The two cartridge pressing members 1 are arranged at such positions that they can contact the lever member 12 and the lever member 212, respectively. That is, one cartridge pressing member 1 is structured to press the driving side of the cartridge, and the other cartridge pressing member 1 is structured to press the driven side of the cartridge.

The two cartridge pressing members 1 arranged on the driving side and the non-driving side in this way are arranged so as to overlap each other when viewed along the axis of the photosensitive drum. As shown in FIG. 68, the arrangement is such that the pressed portion 212*a* of the lever member 212 contacts the cartridge pressing member 1 prior to the pressed portion 12*a* of the lever member 12 contacting the in the process of closing the opening/closing door 13 in the direction H in the cartridge pressing member 1 Figure. Therefore, in the process of closing the opening/closing door 13, the non-driving side operating unit operates before the driving side operating unit operates. Therefore, as will be described hereinafter, the advancing/retracting of the aligning member 301 by the non-driving side operating unit occurs before the advancing/retracting of the pin receiving member 303 by the driving side operating unit.

Figure 69:
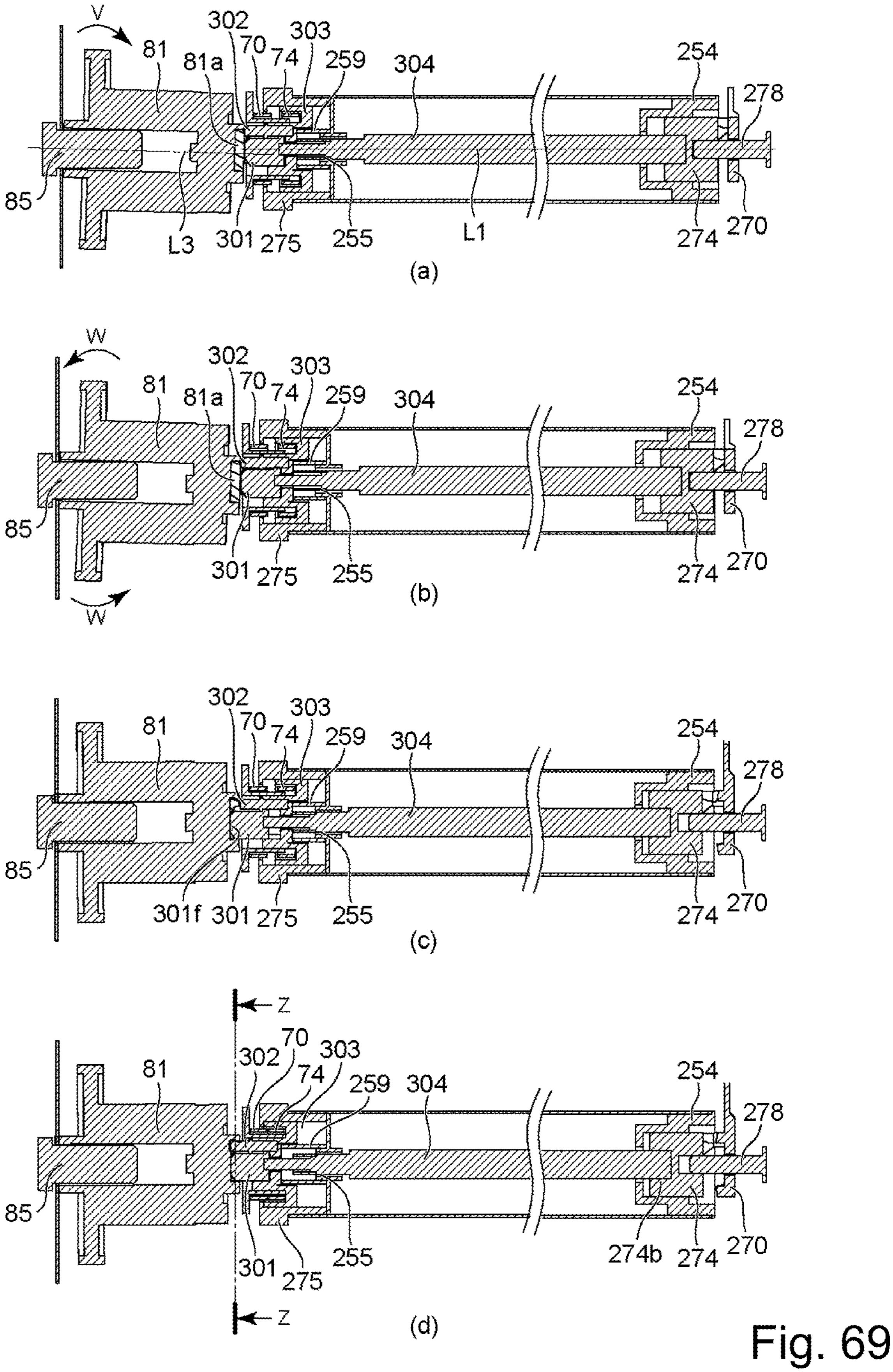
FIG. 69, parts (a) through (d), is a longitudinal sectional view of the apparatus main assembly and the cartridge.
Figure 70:
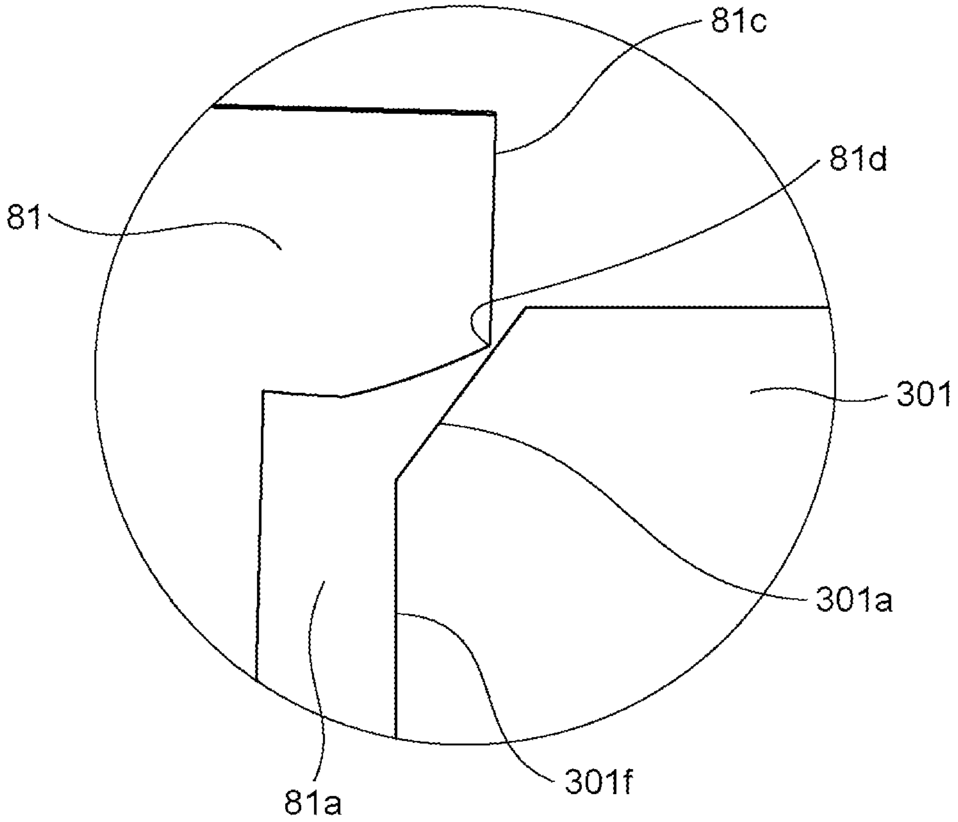
FIG. 70 is a partially enlarged view of the aligning member and the drive transmission member.
Figure 71:
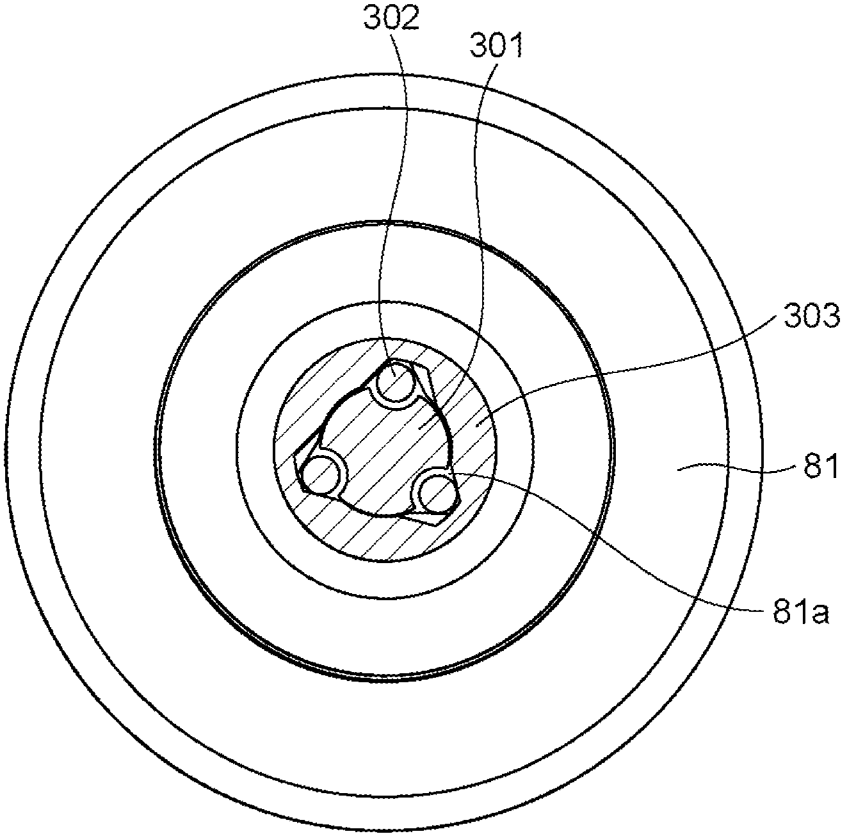
FIG. 71 is a sectional view of the drive transmission member and the drive input unit.

With reference to FIGS. 69, 70, and 71, a description will be made as to how the drive input unit 300 and the drive transmission member 81 are engaged with each other when the drive transmission member 81 and the rotation shafts L3 and L1 of the drive input unit 300 are not coaxial before engaging with each other.

Here, part (a) of FIG. 69 is a longitudinal sectional view of the apparatus main assembly A and the cartridge when the cartridge is inserted into the apparatus main assembly A and the opening/closing door 13 is completely opened. Part (b) of FIG. 69 is a longitudinal sectional view when the lever member 212 of the non-driving side operation unit starts to be pushed by the cartridge pressing member 1 in the process of closing the opening/closing door 13 after inserting the cartridge into the apparatus main assembly A. Part (c) of FIG. 69 is a longitudinal sectional view when the opening/closing door 13 is further closed, the lever member 212 is pushed by the cartridge pressing member 1, and the aligning member 301 reaches the aligning member advancing position. Part (d) of FIG. 69 is a longitudinal sectional view illustrating a state where the drive transmission portion 81*a* of the drive transmission member 81 and the pin 302 of the drive input unit 300 are completely engaged. Part (d) of FIG. 69 shows the state that the opening/closing door 13 is completely closed, the lever member 12 of the driving side operation unit is pushed by the cartridge pressing member 1, the driving force is further inputted to the apparatus main assembly A, and the drive transmission member 81 has been rotated. By this, the drive transmission portion 81*a* and the pin 302 are engaged with each other.

In parts (a), (b), (c), and (d) of FIG. 69, the inclination angle of the drive transmission member 81 is reduced as the aligning member 301 of the drive input unit 300 moves toward the aligning member advancing position. However, the process of engaging the drive transmission member 81 is shown.

FIG. 70 is a partially enlarged view of a portion where the inclined surface 301*a* of the aligning member 301 contacts the end surface 81*c* of the drive transmission member 81 immediately before the aligning member 301 and the drive transmission member 81 contact with each other.

FIG. 71 is a cross-sectional view of the drive transmission member 81 and the drive input unit 300 in the engaged state, taken along a cross-section Z in part (d) of FIG. 69 which is perpendicular to the longitudinal direction of the cartridge.

The drive transmission member 81 before being engaged with the pin 302 is inclined by its own weight in the V direction in the Figure, as shown in part (a) of FIG. 69, as in the case of the first embodiment. At this time, the aligning member 301 and the pin 302 are in the retracted position, and neither is in contact with the drive transmission member 81. Next, in the process of closing the opening/closing door 13, the cartridge pressing member 1 and the pressed portion 212*a* of the lever member 212 come into contact with each other. Then, the outer cylindrical cam member 270 rides on the inner cylindrical cam member 274, so that the inner cylindrical cam member 274, the drive input unit connecting member 304, and the aligning member 301 start moving to the driving side of the cartridge.

At this time, as shown in FIG. 70, the slope 301*a* of the aligning member 301 contacts the ridge 81*d* of the drive transmission portion 81*a* of the drive transmission member 81. Then, the aligning member 301 moves to the driving side while displacing the drive transmission member 81. Here, by providing a sufficiently large pressing force of the cushion member 255, the aligning member 301 can be moved to the driving side against the torque acting in the direction in which the drive transmission member 81 is inclined by its own weight. Then, as shown in part (b) of FIG. 69, the aligning member 301 rotates the drive transmission member 81 in the W direction, that is, moves toward the driving side while reducing the inclination angle of the drive transmission member 81. Then, after the slope 301*a* passes the ridge line 81*d* of the drive transmission member 81, the cylindrical portion 301*b* of the aligning member 301 and the ridge line of the drive transmission portion 81*a* next abut to each other. Here, the rotation axis L3 of the drive transmission member 81 and the rotation axis L1 of the drive input unit 300 are aligned with each other by the engagement of the cylindrical portion 301*b* and the drive transmission portion 81*a*. Thereafter, as shown in part (c) of FIG. 69, the aligning member 301 moves to the driving side until the end surface 301*f* of the aligning member 301 contacts the drive transmission member 81, that is, moves to the aligning member advance position.

Next, when the opening/closing door 13 is further closed, the cartridge pressing member 1 and the pressed portion 12*a* of the lever member 12 of the driving side operation unit come into contact with each other. At that time, as shown in part (d) of FIG. 69, the outer cylindrical cam 70 and the inner cylindrical cam 74 operate as in Embodiment 1, and the urging force of the first pressing member 259 causes the pin 302 and the pin receiving member 303 to move integrally from the retracted position to the driving side.

At this time, as shown in FIG. 71, if the phase of the drive transmission portion 81*a* matches the phase of the pin 302 of the drive input unit 300, the pin 302 engages with the drive transmission portion 81*a* at this point of time. However, in the case of the other phases, the pin 302 and the pin receiving member 303 move to the driving side at most until the pin 302 contacts the end surface 81*c* of the drive transmission member 81. However, even in that case, when drive is inputted to the apparatus main assembly, the drive transmission member 81 rotates, and the phase difference of the pin 302 of the drive input unit 300 with respect to the phase of the drive transmission unit 81*a* decreases. When the phases match each other, the pin 302 is engaged with the drive transmission portion 81*a* by the urging force of the first pressing member 59.

By this, the pin 302 is enabled to receive the driving force from the drive transmission portion 81*a*. The pin 302 is an input member (driving input member) to which driving force is inputted. At the time of driving, the pin 302 and the pin receiving member 303 rotate by the driving force from the drive transmitting portion 81, and at this time, the aligning member 301 is rotated by receiving the driving force from the flange portion 302*a* of the pin 302 to the cut-away portion 301*c*. At this time, the drive input unit connecting member 304 also rotates integrally with the aligning member 301 while sliding on the connecting member supporting portion 274*b* of the inner cylindrical cam member 274.

As described above, the inclined surface 301*a* of the aligning member 301 and the cylindrical portion 301*b* are engaged with the drive transmission portion 81*a*. By this, even when the rotation axes of the drive transmission member 81 and the drive input unit (coupling member) 300 are deviated from each other, the rotation axes of the drive transmission member 81 and the drive input unit (coupling member) 300 can be accurately aligned.

In this embodiment, the three pins (input member, input portion) 302 and the pin receiving member (output member, output portion, support portion) 303 correspond to the coupling member. The driving force inputted to the pin 302 is transmitted to the pin receiving member 303 and is outputted from the pin receiving member 303 toward the photosensitive drum 62. In addition, the coupling member of this embodiment is also movably supported by the flange member 75, and is disposed at the end of the photosensitive drum.

In a broad sense, not only the three pins 202 and the pin receiving member 303 but also the aligning member 301 may be referred to as a coupling member. That is, the drive input unit 300 excluding the aligning member 301 has been called a coupling member, but the drive input unit 300 as a whole may be called a coupling member in a broad sense.

In the modification of Embodiment 1, the coupling member 64 itself engages with the drive transmission member 81 by reducing the inclination of the drive transmission member 81.

On the other hand, in this embodiment, the movable member (alignment member) 301 arranged in the neighborhood of the input member (pin 302) of the coupling member moves from the retracted position (non-acting position) toward the drive transmission member 81, that is, moves to the advance position (action position). This corresponds to the process shown in part (a), (b), and (c) of FIG. 69. As the aligning member 301 moves in this manner, the aligning member 301 urges the drive transmission member 81, thereby reducing the inclination angle of the drive transmission member 81. By this, the drive input member (302) and the drive transmission member 81 are brought into the engageable state. This is the state shown in part (c) of FIG. 69.

That is, after the aligning member 301 moves from the retracted position to the advanced position to reduce the inclination angle of the drive transmission member 81, the coupling member (pin 302 and pin receiving member 303) moves from the retracted position to the advanced position (part (d) of FIG. 69). By this, the coupling member engages with the drive transmission member 81. The aligning member 301 and the coupling member (pin 302 and pin receiving member 303) are structured to be movable back and forth at different timings.

In the case that the rotation axis of the drive transmission member 81*a* is aligned with the rotation axis of the drum by the chamfered portion 64*e* of the coupling member 64 as in the modified example of Embodiment 1 and Embodiment 2, the width of engagement between the member 81 and the coupling member is reduced by the amount of the chamfered portion 64*e*. However, according to the method of this embodiment, the component that directly receives the driving force of the drive transmission member 81 is the pin 302, and the aligning member 301 aligns the rotation axis of the drive transmission member 81 with the rotation axis of the drum, and therefore, it is not necessary to provide chamfers or the like on the pins 302 themselves. Therefore, a sufficient engagement width can be provided, and more reliable drive transmission can be performed.

Modification of Embodiment 7

Hereinafter, a modified example in which the structure of this embodiment is partially modified will be described. In the foregoing description (FIG. 69), the inclined surface 301*a* of the aligning member 301 and the cylindrical portion 301*b* are engaged with the ridge 81*d* of the drive transmission portion 81. This makes it possible to rotate (swing) the drive transmission member 81 and align the rotation axis L3 of the drive transmission member 81 with the rotation axis L1 of the drive input unit 300. However, in order to rotate the drive transmission member 81 to align the rotation axis with the drive input unit 300, the ridge line 81*d* of the recess 81*a* of the drive transmission portion 81 does not have to be used, and the drive transmission portion outer periphery 81*e* (FIG. 25) may be used. Hereinafter, a modification will be described in which instead of the aligning member 301 of Embodiment 7, an outer peripheral receiving alignment member 305 is provided, and the outer peripheral receiving centering member 305 and the drive transmission unit outer periphery 81*e* are engaged with each other, and the rotation axis L3 of the drive transmission member 81 is aligned with the rotation axis L1 of the drive input unit 300

First, referring to FIGS. 72 and 73, the outer peripheral receiving alignment member 305 and the drum unit constituted by the same will be described.

Figure 72:
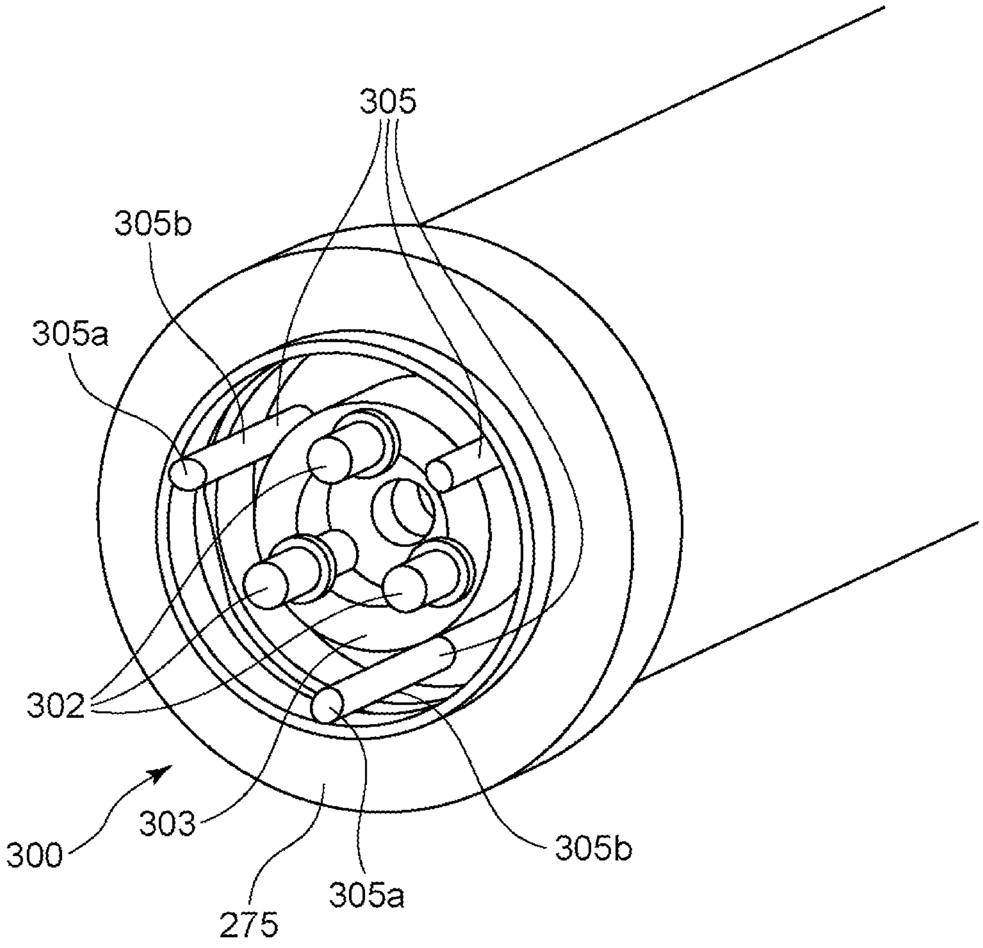
FIG. 72 is a perspective view of the drive input unit.

FIG. 72 is a perspective view of the drive input unit 300 according to this modification.

Figure 73:
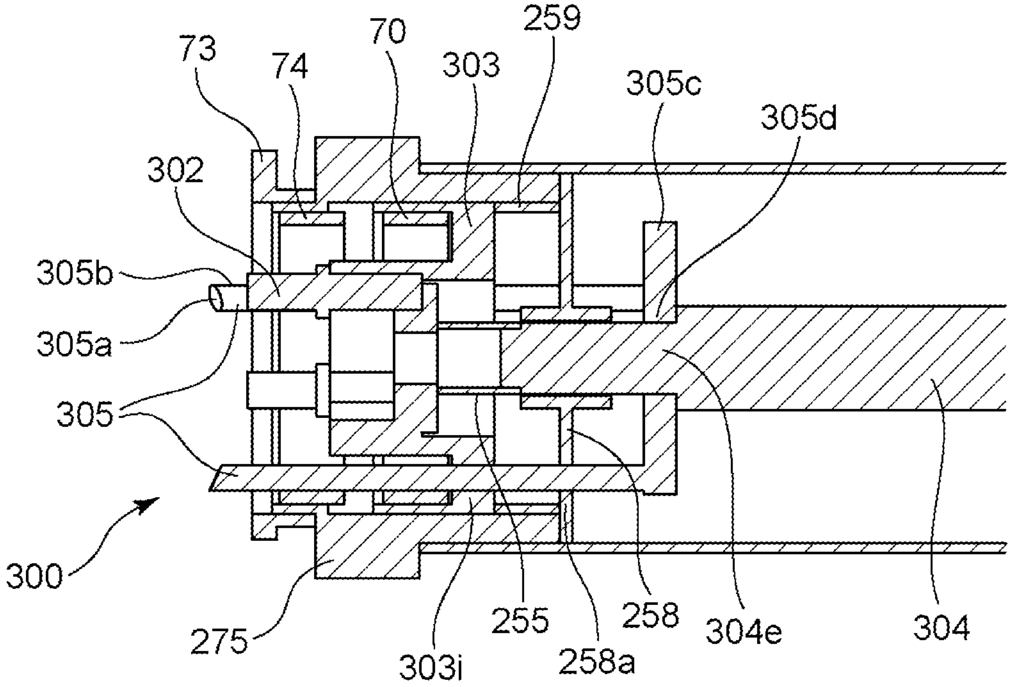
FIG. 73 is a partial longitudinal sectional view of the drum unit and the drum bearing.

FIG. 73 is a partial longitudinal sectional view of the drum unit and the drum bearing 73 according to this modification.

As shown in FIGS. 72 and 73, the outer peripheral receiving alignment member 305 is provided with a sloped surface 305*a*, a cylindrical portion 305*b*, a base portion 304*c*, and a hole portion 305*d*. A hole 305*d* is provided at the center of the base portion 304*c* on the disk. In addition, three cylinders 305*b* are provided on the base portion 304*c* outside the hole portion 305*d* in the radial direction at equal intervals in the circumferential direction. A slope 305*a* is provided at the end of the cylindrical portion 304*b*. The sloped surface 305*a* is sloped so as to approach the base portion 304*c* toward the inner side, in the radial direction, of the base portion 304*c*.

In addition, the differences of the portions other than the outer circumference receiving alignment member 305 from those of the above-described Embodiment 7, and the drum unit including the outer circumference receiving alignment member 305 will be described. The drive input unit 300 is provided with an outer circumference receiving alignment member 305 in place of the alignment member 301.

As described above, the portion of the drive input unit 300 excluding the aligning member 305 corresponds to the coupling member of this embodiment, but in a broad sense, the entire drive input member 300 may also be called a coupling member.

The drive input unit connecting member 304 is provided with a base support portion 304*e* as shown in FIG. 73. The hole 305*d* of the outer peripheral receiving alignment member 305 is inserted into the base supporting portion 304, and is securely fixed with a screw or an adhesive. At the time of assembling the drum unit, the outer peripheral receiving alignment member 305 is inserted into the drum in the state of being assembled to the drive input unit connecting member 304.

In addition, the pin receiving member 303 is provided with an outer cylindrical receiving portion 303*i*. This is provided at a position corresponding to the cylindrical portion 305*b* of the outer circumference receiving alignment member 305, and can be engaged by aligning the phase when the drive input unit connecting member 304 is inserted. The lid member 258 is also provided with a cylindrical receiving portion 258*a* at a position corresponding to the cylindrical portion 305*b* of the outer peripheral receiving alignment member 305. Therefore, the cylindrical portion 305*b* of the outer peripheral receiving alignment member 305 is structured to project from the inside of the drum to the outside of the drum through the cylindrical receiving portion 258*a* of the lid member 258 and the outer peripheral cylindrical receiving portion 303*i* of the pin receiving member 303. The drum bearing 73 supports the driving side flange 275 instead of the pin receiving member 303.

Additionally, the first pressing member 259, the outer cylindrical cam 70, and the inner cylindrical cam 74 avoid the outer circumference receiving alignment member 305 by increasing the inner diameter, but the basic structure is the same as that described above. The structures of the pin 302, the cushion member 255, and the non-driving side flange 254 are the same as those described above. In addition, similar to the above-described aligning member 301, the outer circumference receiving alignment member 305 is movable in the cartridge longitudinal direction together with the drive input unit connecting member 304 with the operation of the non-driving side operation unit. At this time, the position where the outer circumference receiving alignment member 305 is most advanced to the driving side will be referred to as the aligning member advance position also in this modification.

Next, referring to FIGS. 74 and 75, the description will be made as to how the drive input unit 300 and the drive transmission member 81 are engaged with each other in the case that the drive transmission member 81 and the rotation shafts L3 and L1 of the drive input unit 300 are not coaxial before engaging with each other.

Figure 74:
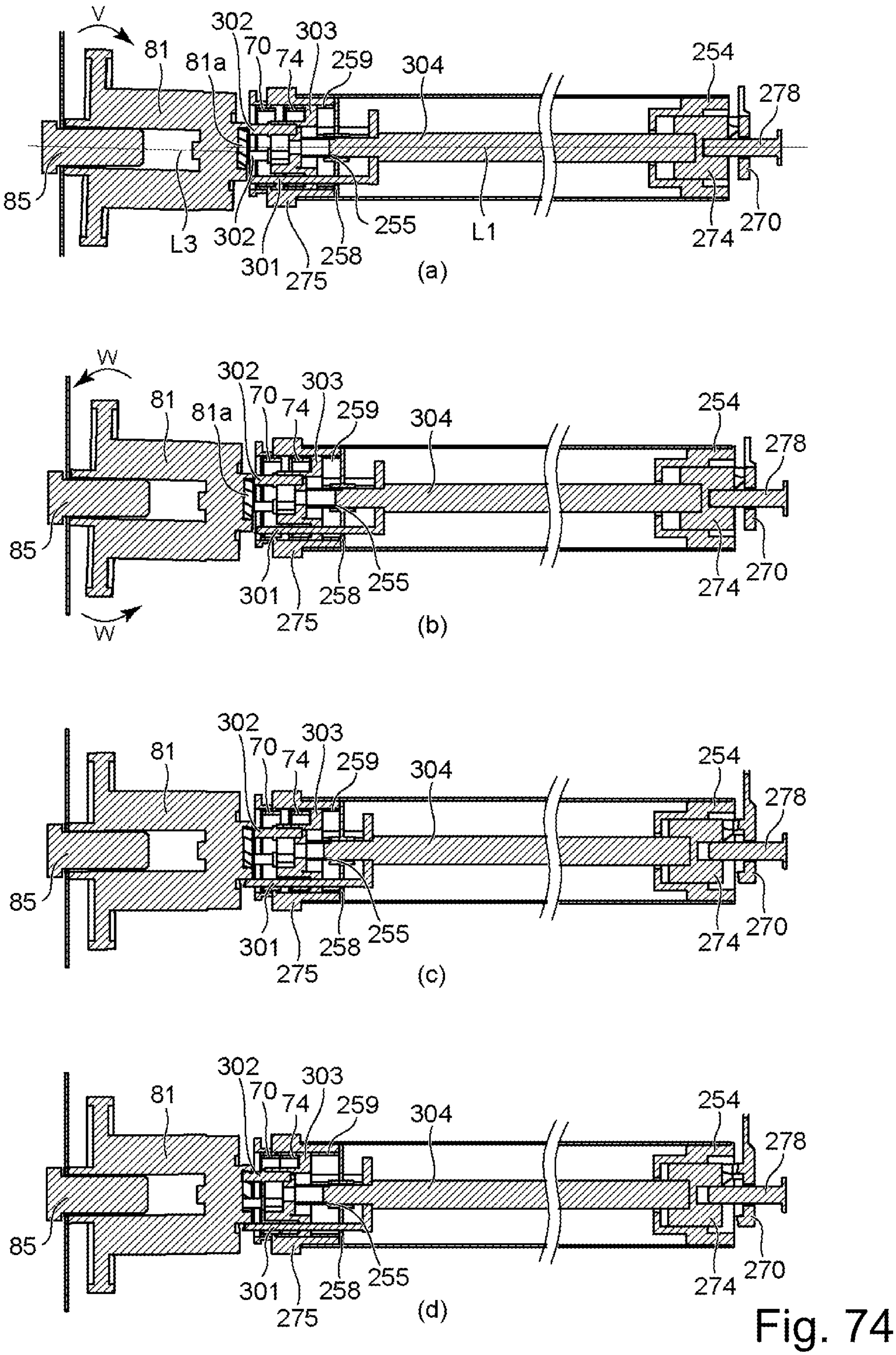
FIG. 74, parts (a) through (d), is a longitudinal sectional view of the apparatus main assembly and the cartridge.

Here, part (a) of FIG. 74 is a longitudinal sectional view of the apparatus main assembly A and the cartridge when the cartridge is inserted into the apparatus main assembly A and the opening/closing door 13 is completely opened. Part (b) of FIG. 74 is a longitudinal sectional view when the lever member 212 of the non-driving side operation unit starts to be pushed by the cartridge pressing member 1 in the process of closing the opening/closing door 13 after inserting the cartridge into the apparatus main assembly A. Part (c) of FIG. 74 is a longitudinal sectional view when the opening/closing door 13 is further closed, the lever member 212 is pushed by the cartridge pressing member 1, and the outer circumference receiving alignment member 305 reaches the aligning member advance position. Part (d) of FIG. 74 is a longitudinal sectional view illustrating a state in which the drive transmission portion 81*a* of the drive transmission member 81 and the pin 302 of the drive input unit 300 are completely engaged. Part (d) of FIG. 74 shows the state after the opening/closing door 13 is completely closed, the lever member 12 of the driving side operating unit is pushed by the cartridge pressing member 1, and the driving force is input to the main assembly A of the apparatus, and the drive transmission member 81 rotated.

In parts (a), (b), (c), and (d) of FIG. 74, the outer peripheral receiving alignment member 305 of the drive input unit 300 is brought into engagement with the drive transmission member 81, while reducing the inclination angle of the drive transmission member 81, while moving to the centering member advancing position.

Figure 75:
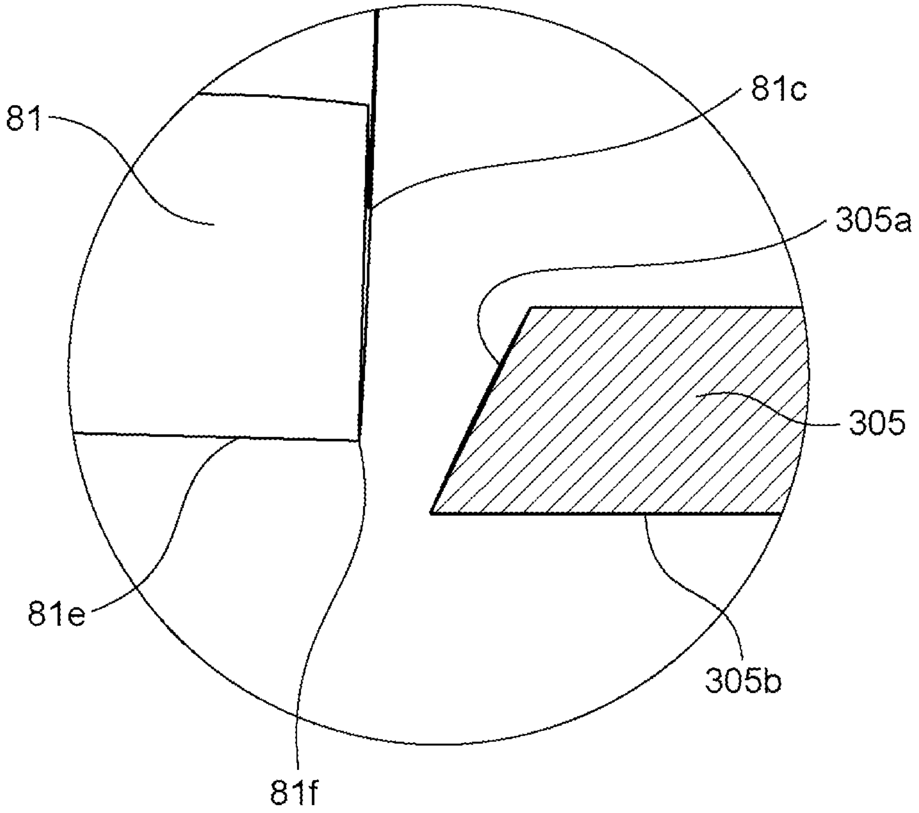
FIG. 75 is a partially enlarged view of an outer circumference receiving alignment member and the drive transmission member 81.

FIG. 75 is a partially enlarged view of a portion where the inclined surface 305*a* of the outer circumference receiving alignment member 305 abuts on the end surface 81*c* of the drive transmission member 81 immediately before the outer circumference receiving alignment member 305 and the drive transmission member 81 abut to each other.

The drive transmission member 81 before being engaged with the pin 302 is inclined by its own weight in the V direction in the Figure, as shown in part (a) of FIG. 74, as in the case of Embodiment 1. At this time, the outer circumference receiving alignment member 305 and the pin 302 are in the retracted position, and neither is in contact with the drive transmission member 81. Next, in the process of closing the opening/closing door 13, the cartridge pressing member 1 and the pressed portion 212*a* of the lever member 212 come into contact with each other. Then, the outer circular member 270 rides on the inner cylindrical cam member 274, so that the inner cylindrical cam member 274, the drive input unit connecting member 304, and the outer peripheral receiving alignment member 305 start moving the cylindrical cam to the driving side of the cartridge.

At this time, as shown in FIG. 75, the inclined surface 305*a* of the outer peripheral receiving alignment member 305 contacts the outer peripheral ridge 81*f* of the drive transmission portion 81*a* of the drive transmission member 81. Thereafter, the aligning member 301 moves to the driving side while displacing the drive transmission member 81 away. Here, by providing a sufficiently large pressing force of the cushion member 255, the aligning member 301 can move to the driving side against the torque acting in the direction in which the drive transmission member 81 is inclined by its own weight. Then, as shown in part (b) of FIG. 69, the drive transmission member 81 is rotated in the direction W in the Figure of the drive transmission member 81, that is, the drive transmission member 81 moves toward the driving side while the inclination angle of the drive transmission member 81 is being reduced. Thereafter, the inclined surface 305*a* passes through the outer peripheral ridge 81*f* of the drive transmission member 81, and then the cylindrical portion 305*b* of the aligning member 301 and the outer peripheral ridge 81*f* of the drive transmission portion 81 come into contact with each other. Here, the rotation axis of the drive transmission member 81 and the rotation axis of the drive input unit 300 are aligned by engagement between the three cylindrical portions 305*b* (FIG. 72) and the drive transmission portion 81*a*. Thereafter, as shown in part (c) of FIG. 74, the outer peripheral receiving alignment member 305 moves to the driving side until the end surface of the outer peripheral receiving alignment member 305 contacts the drive transmission member 81, that is, to the aligning member advancing position.

The operation after the outer circumference receiving alignment member 305 has moved to the aligning member advance position is the same as described above. When the opening/closing door 13 is further closed, the pin 302 and the pin receiving member 303 integrally move from the pin receiving member retracted position to the driving side by the action of the driving side operation unit. When the drive is further inputted to the apparatus main assembly A, the drive transmission portion 81 and the pin 302 are engaged with each other.

During driving, the pin 302 and the pin receiving member 303 rotate by the driving force from the drive transmitting portion 81, and at this time, the outer peripheral receiving alignment member 305 moves from the outer cylindrical receiving portion 303*i* of the pin receiving member 303 to the cylindrical portion 305*b* by receiving the driving force. At this time, the drive input unit connecting member 304 also rotates integrally with the outer peripheral receiving alignment member 305 while sliding relative to the connecting member supporting portion 274*b* of the inner cylindrical cam member 274.

In the manner described above, the inclined surface 301*a* of the aligning member 301 and the cylindrical portion 301*b* are engaged with the drive transmission portion 81*a*. By this, even when the rotation axes of the drive transmission member 81 and the drive input unit 300 are deviated from each other, the rotation axes of the drive transmission member 81 and the drive input unit 300 can be accurately aligned.

In this modification, a shape in which the rotation axis of the drive transmission member 81 is aligned with the rotation axis of the drum is provided at a position different from the drive transmission portion 81*a* that transmits the driving force of the drive transmission member 81, that is, at the outer peripheral ridge 81*f*. Therefore, the pin 302 which receives the driving force directly from the drive transmission member 81 is less restricted in shape, and it is possible to increase the diameter of the pin 302 or provide a shape which matches the drive transmission portion 81*a*. Therefore, according to this modified example, there is a possibility that more reliable drive transmission can be performed and the strength of the pin 302 can be increased, depending on the shape of the pin 302.

In addition, although the outer peripheral receiving alignment member 305 is aligned by three cylindrical portions, it may be in the shape of, for example, a circular tube, and the shape is not limited, provided that it can be aligned. Even in this case, the same effect can be obtained.

Embodiment 8

Next, Example 8 will be described. The drive transmission member of the present embodiment is structured to be inclinable as in the drive transmission portion 81 shown in the modification of Embodiment 1.

Figure 76:
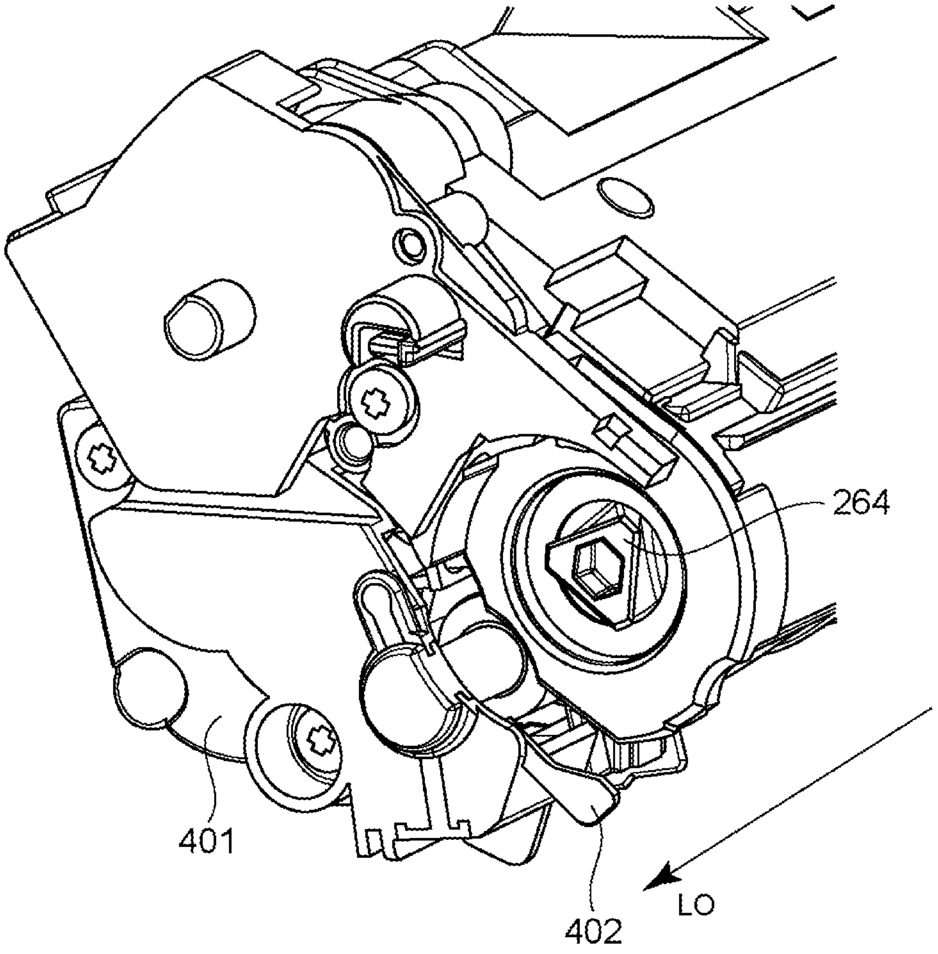
FIG. 76 is a perspective view of the cartridge.
Figure 77:
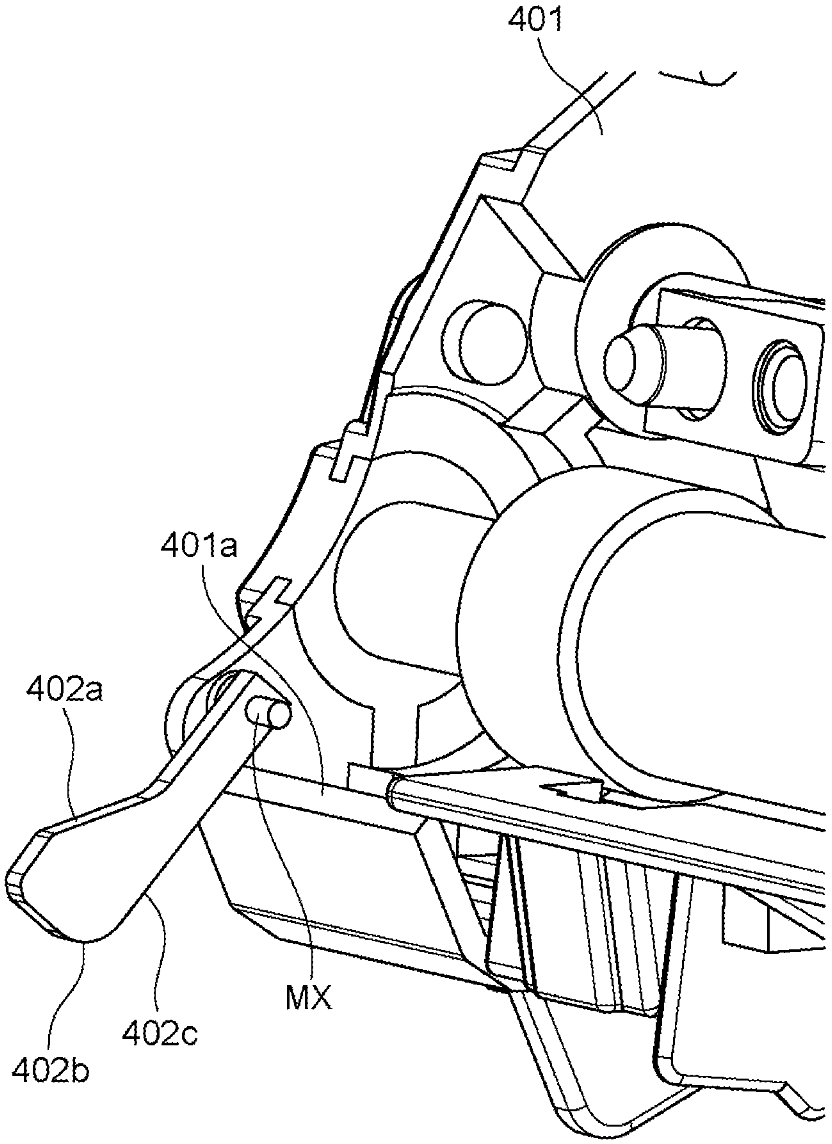
FIG. 77 is a perspective view of the developing unit.

The description of the same points as those in the above-described embodiment may be omitted. In particular, among the elements on the cartridge side disclosed in this embodiment, those corresponding to the members described in Embodiment 2 will be assigned the same names as in Embodiment 2, and only the part different from those in Embodiment 2 may be explained. FIGS. 76 and 77 are perspective views of the process cartridge of embodiment 1. Also in this embodiment, the cartridge is provided with a coupling member (drive input member) 264 for receiving a driving force from the apparatus main assembly. In this embodiment, similarly to Embodiment 2, a lever 212 (FIG. 21) for moving the coupling member 264 back and forth is provided on the non-driving side of the cartridge. Therefore, the coupling member 64 can move back and forth as with the coupling member 264 described in Embodiment 2 (parts (a) to (c) of FIG. 24).

As shown in FIG. 76, the driving side bearing member 401 is provided with a control member 402. The driving side bearing member 401 is a part of the frame of the cartridge, and is a member for rotatably supporting the photosensitive drum on the driving side of the cartridge. The bearing member 401 is also a part constituting a side surface of the frame of the cartridge. In other words, the driving side bearing member 401 is a portion which constitutes an end portion of the frame in the axial direction of the photosensitive drum.

The control member 402 is arranged on the same side (driving side) of the cartridge as the coupling member 64 in the axial direction of the photosensitive drum. The control member 402 is arranged in the neighborhood of the end (bearing member 401) of the frame of the cartridge in the axial direction of the photosensitive drum.

As shown in FIG. 77, the control member 402 is provided with a restricting portion 402*a*, a contact portion 402*b*, and an initial contact portion 402*c*. The control member 402 is provided on the driving side bearing member 401 so as to be rotatable about the axis MX, and is stationary with the initial contact portion 402*c* and the control member contact portion 401*a* in contact with each other. The position of the control member 402 at this time is called a non-acting position (retracted position). As shown in FIG. 76, the control member 402 is placed on the outer side (arrow LO) side of the free end of the coupling member 64 in the axial direction of the photosensitive drum.

Figure 78:
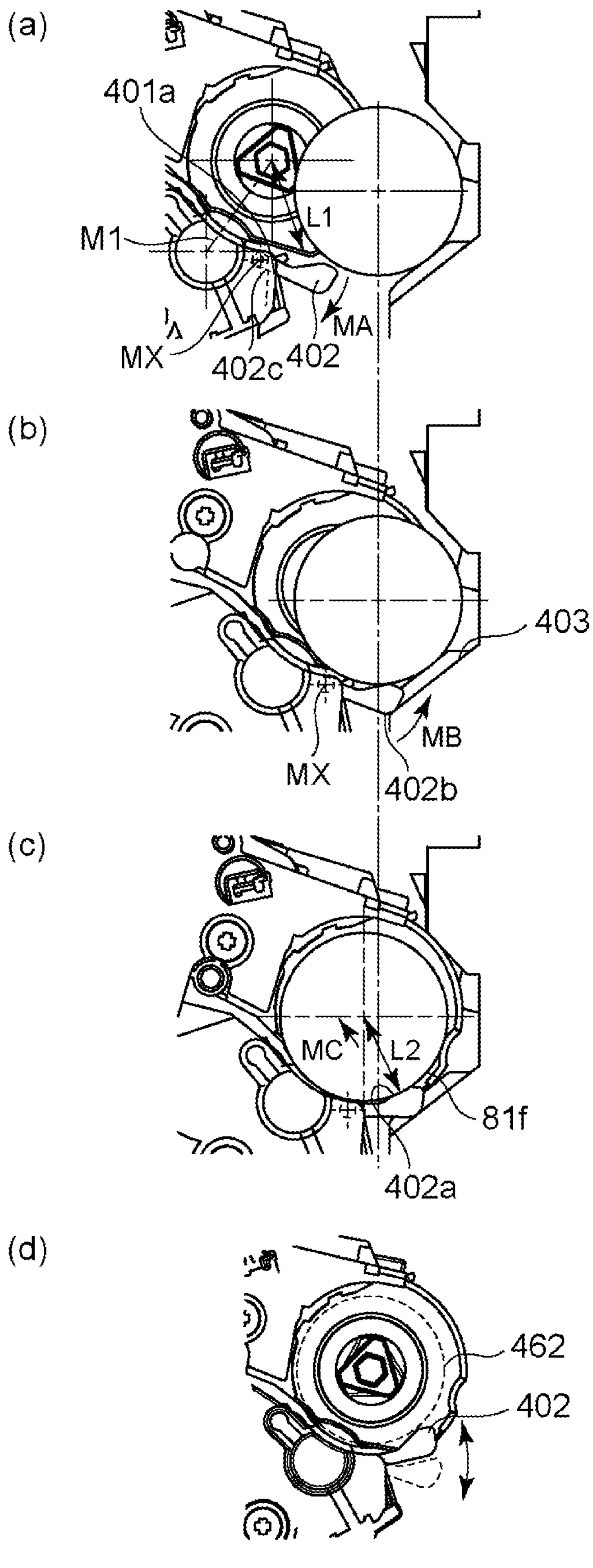
FIG. 78, parts (a) through (d), is a sectional view of the drive transmission member and the process cartridge.

FIG. 78 is a cross-sectional view of the drive transmission member and the process cartridge when the process cartridge is mounted in the apparatus main assembly. As shown in part (a) of FIG. 78, the control member 402 is provided downstream of the line M1 connecting the rotational axes of the drum 62 and the developing roller 32, in the direction of gravity. In addition, the control member 402 has a moment acting in the direction of the arrow MA due to its own weight about the axis MX as a rotation center, and an initial contact portion 402*c* is in contact with the control member contact portion 401*a* of the driving side bearing member 401.

Next, when the process cartridge is inserted as shown in part (b) of FIG. 78, the contact portion (cartridge side guide portion) 402*b* of the control member 402 comes into contact with the main assembly guide portion 403 provided in the apparatus main assembly A. When the process cartridge is further inserted, the contact portion 402*b* moves along the main assembly guide portion 403, and the control member 402 rotates about the axis MX in the arrow MB direction. When the process cartridge is further inserted, the restricting portion 402*a* comes into contact with the side surface 81*f* of the drive transmission member 81 as shown in part (c) of FIG. 78. Then, the restricting portion (urging portion, acting portion) 402*a* presses and urges the side surface 81*f* of the drive transmission member in the direction of arrow MC.

By this, in the drive transmission member 81, a moment in the arrow W direction shown in FIG. 15 is produced as in Embodiment 1, so that the inclination angle of the drive transmission member 81 can be reduced. At this time, the distance L2 between the drum rotation shaft and the restricting portion 402*a* is shorter than the distance L1 between the drum rotation shaft and the restricting portion 402*a* in part (a) of FIG. 78. The position of the control member 402 at this time is called an action position (contact position).

When the control member 402 is in the acting position, the restricting portion 402*a* of the control member 402 is adjacent to the peripheral surface (outer peripheral surface) of the photosensitive drum 62 on a plane perpendicular to the axis of the photosensitive drum 62. In other words, when the cartridge is viewed along the axis of the photosensitive drum 62, the restricting portion 402*a* of the control member 402 is adjacent to the peripheral surface of the photosensitive drum 62.

The restricting portion 402*a* is a portion having a variable distance to the axis of the photosensitive drum and constituting the surface of the regulating member 402. As viewed along the axis of the photosensitive member drum 62 when the control member 402 is in the acting position, the restricting portion 402*a* faces the side where the photosensitive member drum is provided.

Figure 79:
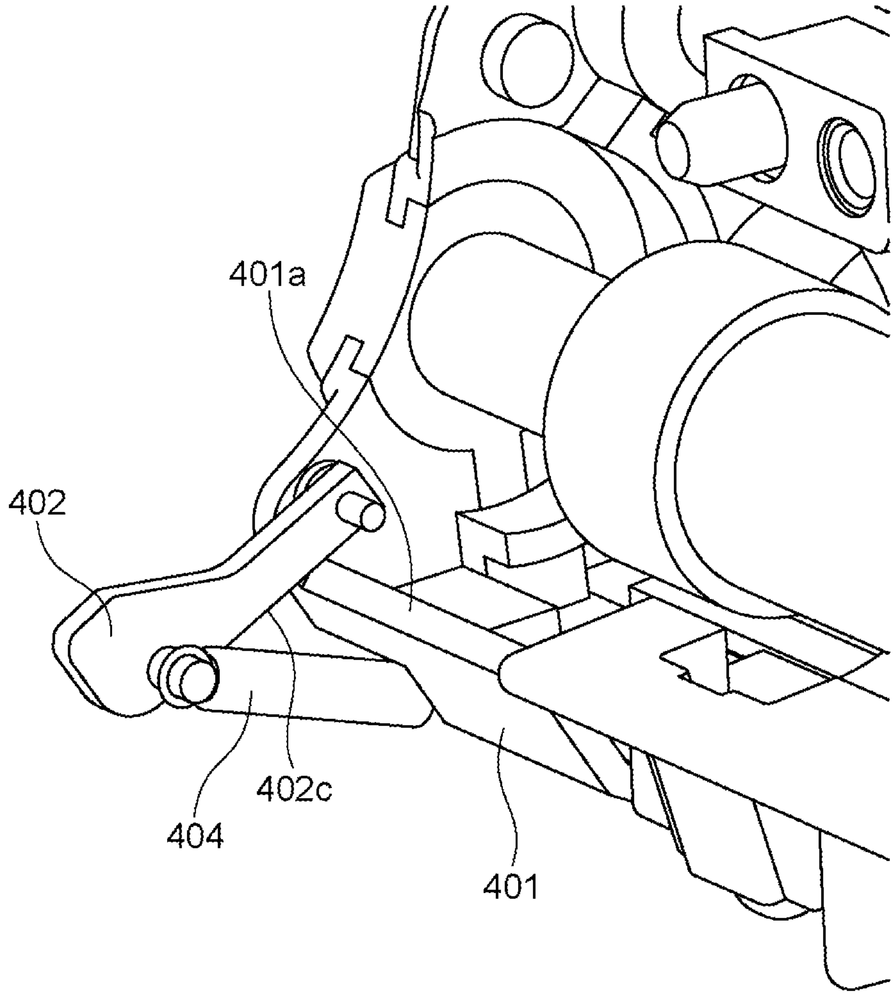
FIG. 79 is a perspective view of the developing unit.

FIG. 79 is a perspective view of a structure in which an initialization spring 404 is provided on the control member 402 and the driving side bearing member 401 of Embodiment 8. By providing the initialization spring 404, the initial contact portion 402*c* of the control member 402 can be more reliably contacted to the control member contact portion 401*a* of the driving side bearing member 401. Therefore, the inclination angle of the drive transmission member 81 can be reduced more stably.

By reducing the inclination angle of the drive transmission member 81, the angular difference between the axis of the drive transmission member 81 and the axis of the coupling member 64 is reduced. That is, the center of the output coupling portion 81*a* (FIG. 25) provided at the free end of the drive transmission member 81 approaches the center of the coupling member 264, and therefore, the output coupling portion 81*a* becomes engageable with the coupling member 264.

As described above, the coupling member 264 can move back and forth similar to the coupling member 264 shown in the Embodiment 2. Therefore, similar to the coupling member 264 shown in parts (a) to (c) of FIG. 24, the coupling member 264 can be engaged with the drive transmission member 81 by approaching the drive transmission member 81 in this embodiment (part (c) of FIG. 24).

The control member 402 is alignment assisting member (auxiliary member, alignment member, movable member) for assisting alignment of the drive transmission member 81 relative to the coupling member 264. The restricting portion 402*a* is an acting portion (contact portion) that contacts and acts on the drive transmission member 81. The restricting portion 402*a* is an urging portion which urges the drive transmission member 81 to reduce the inclination angle of the drive transmission member 81.

Referring to FIG. 78, the movement locus of the control member 402 will be described. The control member 402 is moveable between two positions. The position of the control member 402 shown by the solid line in part (d) of FIG. 78 is a position where it acts on the drive transmission member 81 (the above-mentioned acting position: part (c) of FIG. 78). The restricting portion 402*a* of the control member 402 is located in the neighborhood of the peripheral surface of the photosensitive member drum 62 on a plane perpendicular to the axis of the photosensitive member drum. On the other hand, the position of the control member 402 shown by the broken line in part (d) of FIG. 78 is the position retracted from the acting position (the non-acting position and the retracted position described above: part (a) of FIG. 78). When the control member 402 is in the non-acting position, the control member 402 is more remote from the center (axis) of the photosensitive member drum 462 than the acting position.

One of the acting position (part (c) of FIG. 78) and the non-acting position (part (a) of FIG. 78) of the control member 402 may be referred to as a first position of the control member and the other as a second position of the control member. The acting position of the control member 402 is a position where it acts on the drive transmission member 81, more specifically, urges the drive transmission member 81 to reduce the inclination of the drive transmission member 81. The non-acting position is a position retracted from the acting position.

Irrespective of in the position of the control member 402, the control member 402 is located outside (in the arrow LO direction in FIG. 76) in the axial direction with respect to the free end of the coupling member 264 located at the retracted position. Although the tension spring 404 (FIG. 79) is shown as the initialization spring (elastic member) for holding the control member 402 in the initial position (non-acting position, retracted position) in the embodiment described here, any structure can be used as long as it can be initialized. For example, a method of providing a compression spring, a torsion coil spring, or the like as a spring (elastic member) other than the tension spring can be considered. That is, by urging the control member 402 in the direction of the arrow MA by the elastic member (urging member), the control member 402 is set to a predetermined initial position (non-acting position, retracted position: part (a) of FIG. 78) when the cartridge is mounted. As another method, a structure can be considered in which a weight member is mounted to the free end of the control member and the weight of the weight member holds the control member at the initial position when the cartridge is mounted. The method is not limited.

In addition, the control member 402 is arranged so as not to cover the surface of the photosensitive drum 62 and not to contact the surface thereof for the purpose of avoiding the interference with the image forming process performed on the surface of the photosensitive drum 62. At least when the control member 402 is at the acting position (part (c) of FIG. 78), the surface of the photosensitive drum 62 is not covered or contacted by the control member 402.

<Modification 1 of Embodiment 8>

Next, a modified example (modified example 1 of Embodiment 8) of the present embodiment in which the above-described structure is partially modified will be described. In the modified example 1 as well, the drive transmission portion 81 is structured to be inclinable similar to the above-described structures.

Figure 80:
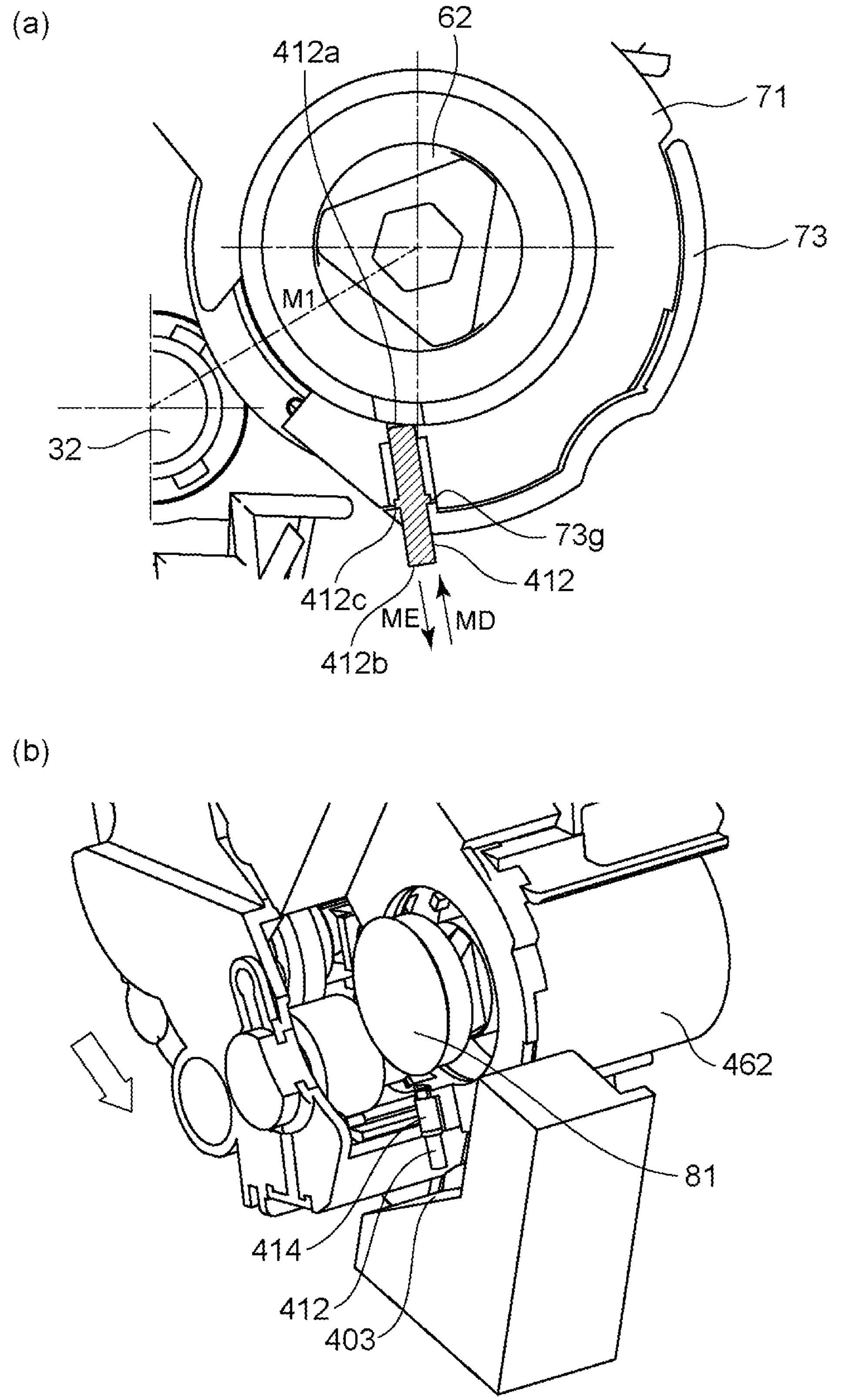
FIG. 80, parts (a) and (b), is a sectional view of the drive transmission member and the process cartridge.

FIG. 80 is a cross-sectional view of the process cartridge of this modification.

As shown in FIG. 80, the control member 412 is provided between the cleaning frame 71 and the drum bearing 73 so as to be slidable in the directions MD and ME.

The control member 412 is provided on the downstream side in the gravity direction with respect to the line M1 that connects the rotating shafts of the drum 62 and the developing roller 32.

The control member 412 is provided with a restricting portion (acting portion, urging portion) 412*a*, a contact portion 412*b*, and an initial contact portion 412*c*. The control member 412 is urged in the arrow ME direction by its own weight, and is stationary with the initial contact portion 412*c* in contact with the contact portion 73*g* of the drum bearing 73. This is a state in which the control member 412 is in the non-acting position (retracted position).

Figure 81:
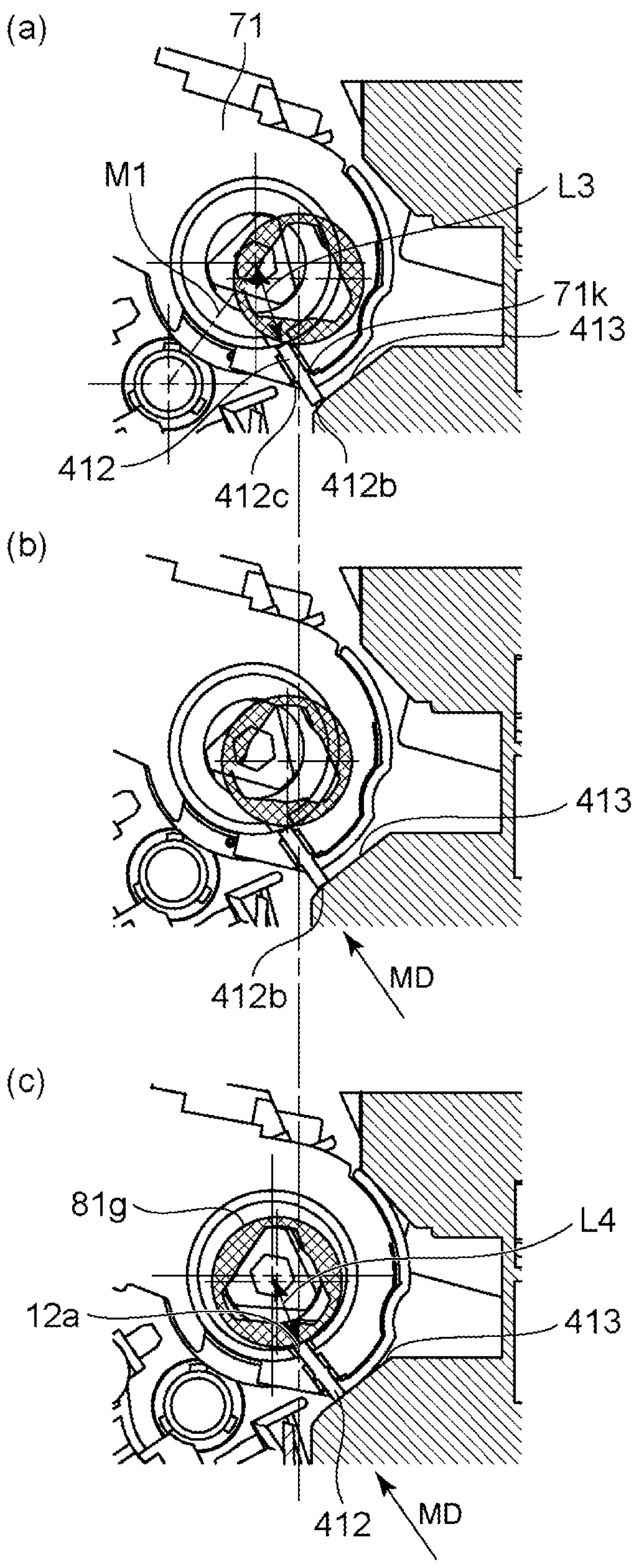
FIG. 81, parts (a), (b), and (c), is a sectional view of the drive transmission member and the process cartridge.

FIG. 81 is a cross-sectional view of the drive transmission member and the process cartridge when the process cartridge is mounted to the apparatus main assembly. As shown in part (a) of FIG. 81, the initial contact portion 412*c* of the control member 412 is in contact with the contact portion 73*g* of the drum bearing 73 by its own weight.

The control member 412 is provided on the downstream side in the gravity direction with respect to the line M1 connecting the drum 62 and the rotation axis of the developing roller 32 with each other.

When the process cartridge is inserted, the contact portion 412*b* comes into contact with the main assembly guide portion 413 as shown in part (b) of FIG. 81.

Figure 82:
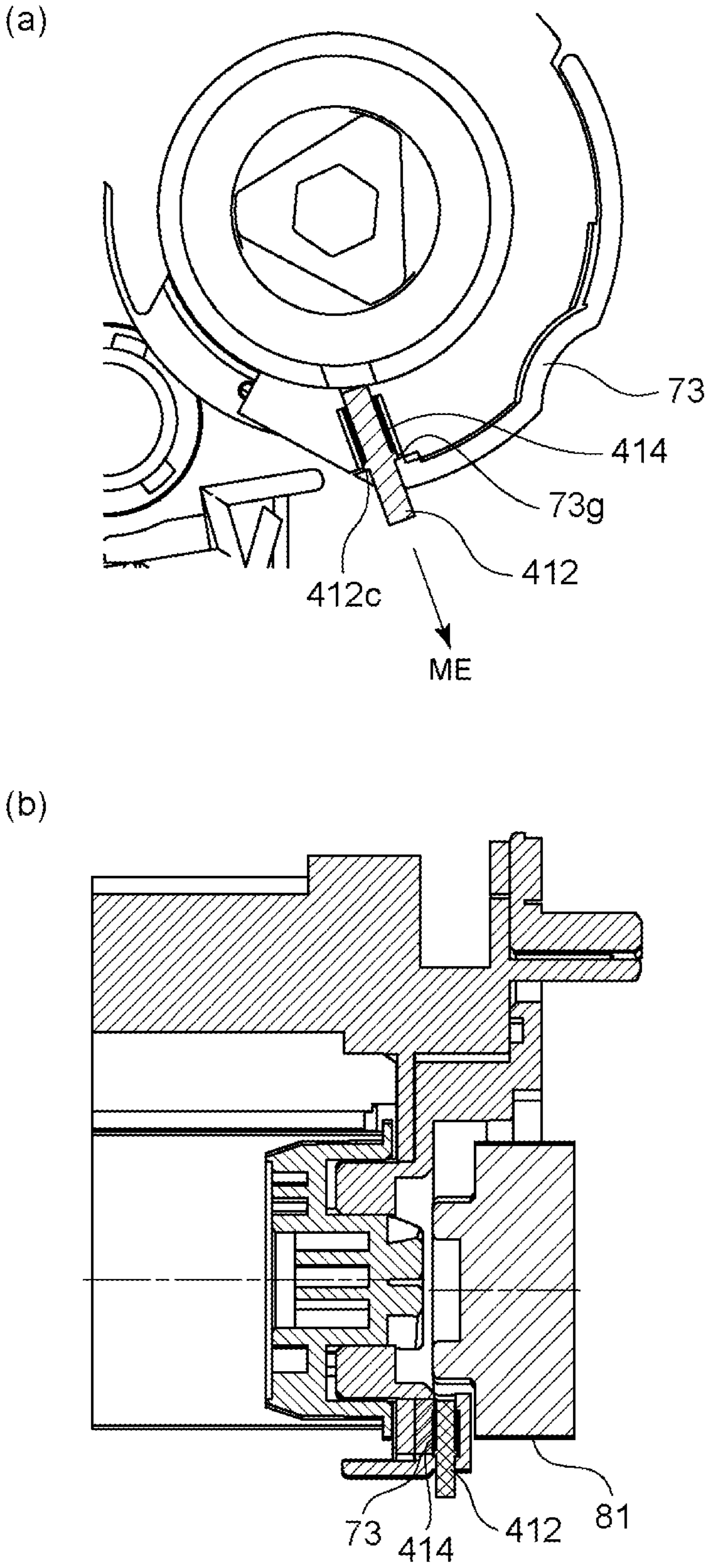
FIG. 82, parts (a) and (b), is a sectional view of the drive transmission member and the process cartridge.

When the process cartridge is further inserted, the control member 412 receives the reaction force from the main assembly guide portion 413 and moves in the direction of the arrow MD, as shown in part (c) of FIG. 81. With this operation, the restricting portion 412*a* comes into contact with the side surface 81*g* of the coupling portion of the drive transmission member 81. When the process cartridge is further inserted, the restricting portion 412*a* presses the coupling portion side surface 81*g* in the direction of the arrowMD. By this, in the drive transmission member 81, a moment in the arrow W direction shown in FIG. 15 is produced as in Embodiment 1, so that the inclination angle of the drive transmission member 81 can be reduced. This is a state in which the control member 412 is located at the acting position. At this time, the distance L4 between the drum rotation shaft and the restricting portion 412*a* is shorter than the distance L3 between the drum rotation shaft and the restricting portion 412*a* in part (a) of FIG. 81. At this time, the restricting portion 412*a* of the control member is in the neighborhood of the peripheral surface of the photosensitive drum on a plane perpendicular to the rotation axis of the photosensitive drum. FIG. 82 is a sectional view of a structure in which an initialization spring 414 is provided between the control member 412 and the cleaning frame 71. By providing the initialization spring 414, the initialization spring 414 urges the control member 412 in the ME direction. By this, the initial contact portion 412*c* of the control member 412 can be more reliably brought into contact with the contact portion 73*g* of the drum bearing 73.

In Embodiment 7, the aligning member 301 is disposed at the end of the photosensitive drum 62. That is, the aligning member 301 is arranged near the pin (drive input member) 301 of the coupling member (FIG. 62). On the other hand, the control member 412 of this embodiment is not disposed in the neighborhood of the coupling member 264, but is disposed in the frame of the cartridge. Even the control member (centering auxiliary member, movable member, aligning member) 412 is disposed apart from the coupling member 264 in this manner, it can move toward the drive transmission member 81 and the inclination angle of the drive transmission member 81 can be reduced by urging the drive transmission member 81. By this, the control member 412 can engage and connect the drive transmission member 81 with the coupling member 264.

<Modification 2 of Embodiment 8>

Next, another modification (Modification 2) in which the structure of this embodiment (Embodiment 8) is partially modified will be described. Also in this modification, the drive transmission portion 81 is structured to be pivotable (inclinable).

Figure 83:
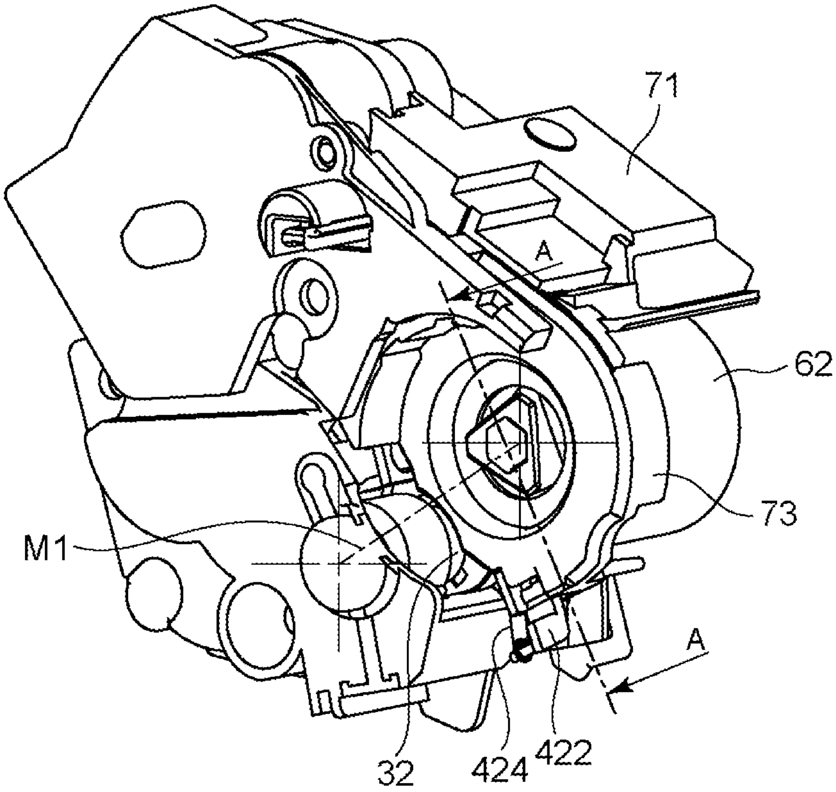
FIG. 83, parts (a) and (b), is a perspective view of the cartridge.
Figure 83:
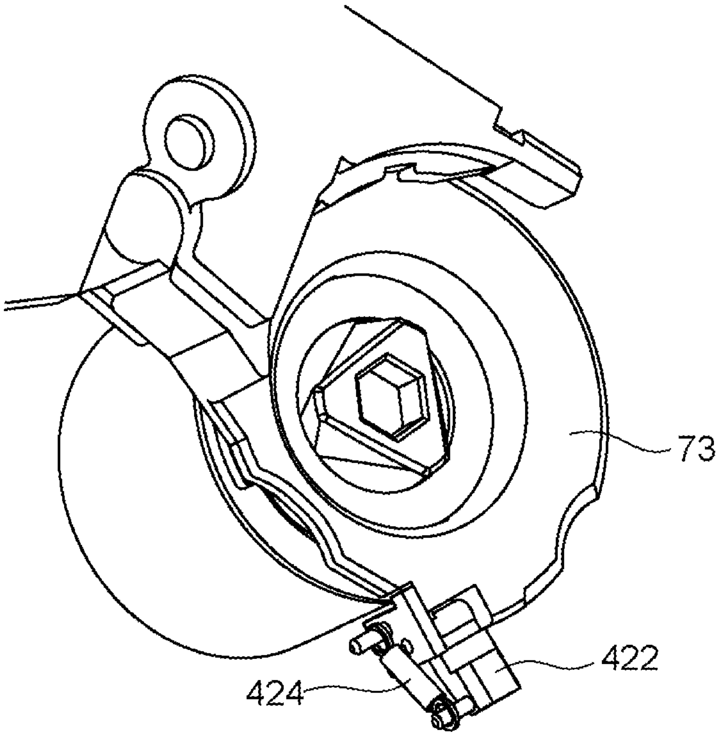
Figure 84:
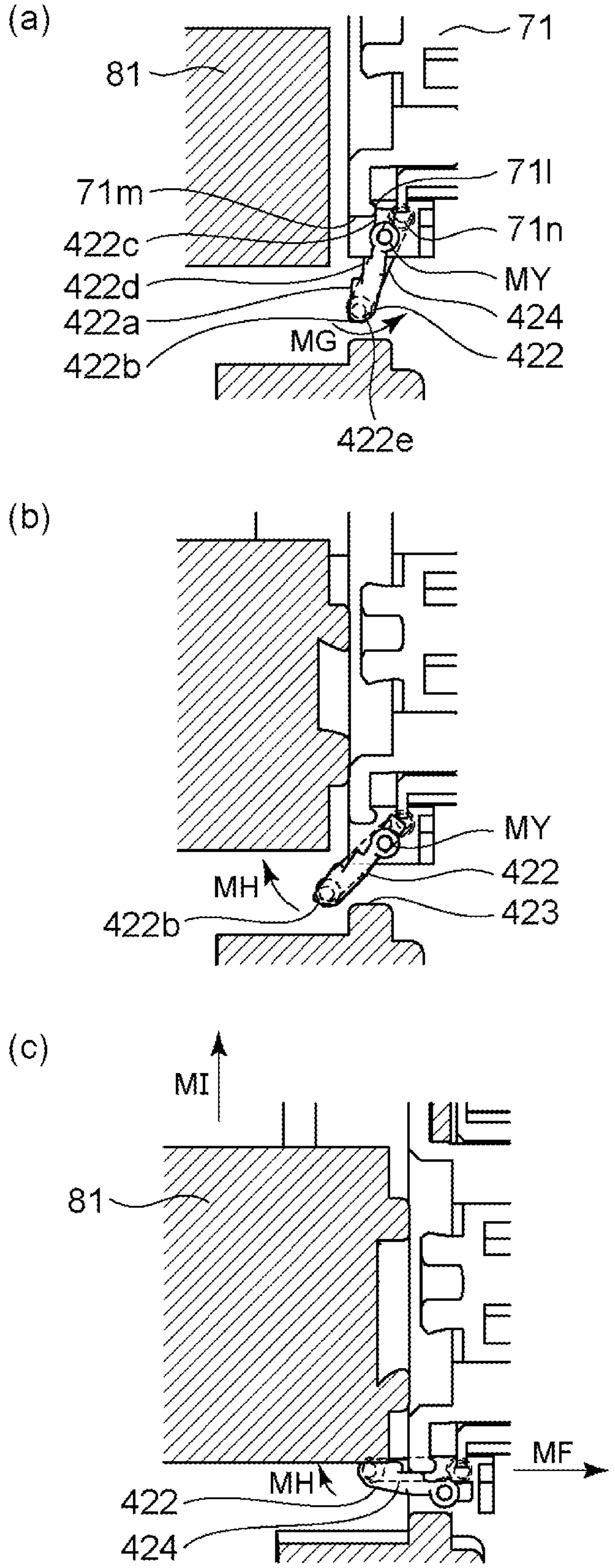
FIG. 84, parts (a), (b), and (c), is a sectional view of the drive transmission member and the process cartridge.
Figure 87:
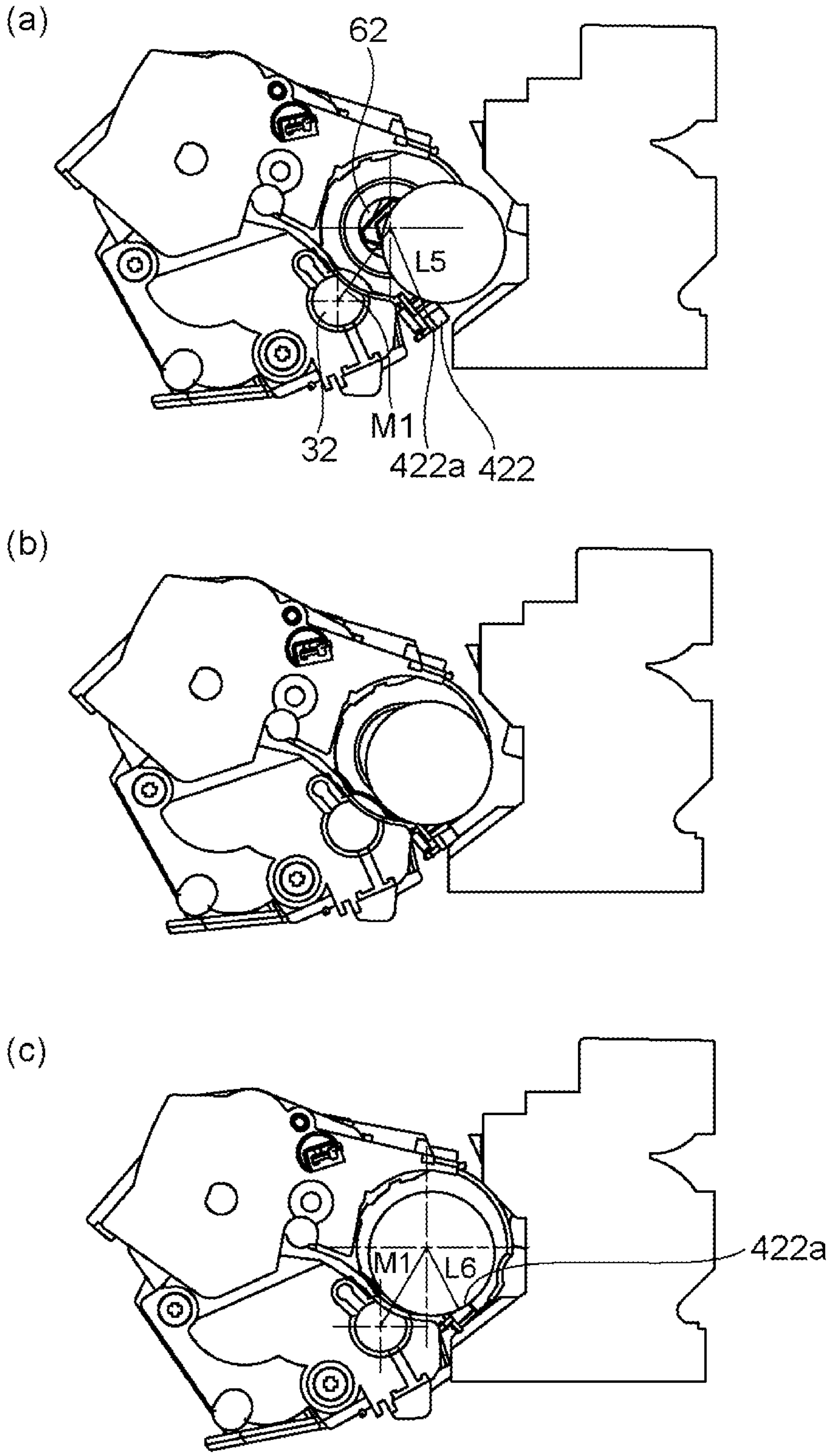
FIG. 87, parts (a), (b), and (c), is a sectional view of the drive transmission member and the process cartridge.

FIG. 83 is a perspective view of the process cartridge of this modification. In addition, FIG. 84 is a cross-sectional view when the process cartridge is mounted to the apparatus main assembly, taken along the line AA in FIG. 83. FIG. 87 is a longitudinal sectional view of the structure of FIG. 83.

As shown in FIG. 87, the control member 422 is provided on the downstream side in the gravity direction with respect to the line M1 that connects the rotation axes of the drum 62 and the developing roller 32.

As shown in part (a) of FIG. 84, the cleaning frame 71 is provided with an initial restricting portion 711, a post-insertion restricting portion 771*m*, and a frame side urging force receiving portion 71*n*. A control member 422 is supported on the cleaning frame 71 rotatably about an axis MY. In addition, the control member 422 is provided with a restricting portion (acting portion, urging portion) 422*a*, a contact portion 422*b*, an initial contact portion 422*c*, a post-insertion contact portion 422*d*, and a control member side urging force receiving portion 422*e*. A tension spring 424 as an urging member is provided on the control member side urging force receiving portion 422*e* and the frame side urging force receiving portion 71*n*.

A force in the direction of the arrow MF acts from the tension spring 424 on the control member 422 before being inserted into the apparatus main assembly. By this, a moment in the MG direction acts on the control member 422, so that the control member 422 rotates about the axis MY and is at rest with the initial contact portion 422*c* and the initial restricting portion 711 of the cleaning frame 71 in abutment with each other. This is a state in which the control member 422 is in the non-acting position (retracted position).

Next, when the process cartridge is inserted, the contact portion (cartridge side guide portion) 422*b* of the control member 422 comes into contact with the main assembly frame (main assembly side guide portion) 423 as shown in part (b) of FIG. 84. The control member 422 rotates in the direction of arrow MH about the rotation axis MY by the reaction force which the contact portion 422*b* receives from the main assembly guide portion 423. When the process cartridge is further inserted as shown in part (c) of FIG. 84, the control member 422 rotates in the MH direction by the force in the arrow MF direction received from the tension spring 424, comes into contact with the side surface 81*f* of the drive transmission member 81, and urges the drive transmission member 81 in the direction of arrow MI. By this, a moment in the arrow W direction shown in FIG. 15 is produced in the drive transmission member 81, as in Embodiment 1, so that the inclination angle of the drive transmission member 81 can be reduced. At this time, the control member 422 (control unit) is located at the acting position.

At this time, as shown in FIG. 87, the distance L6 between the drum rotation axis and the restricting portion 422*a* in part (c) of FIG. 87 is shorter than the distance L5 between the drum rotation axis and the restricting portion 422*a* in part (a) of FIG. 87. As shown in part (c) of FIG. 87, the restricting portion 422*a* is located in the neighborhood of the peripheral surface of the drum in a plane perpendicular to the axis of the photosensitive drum. When the control member 422 is in the acting position (part (c) of FIG. 84 and part (c) of FIG. 87), at least a part of the control member (that is, the contact portion 422*b*) is outside the free end of the coupling member 264 in the axial direction (in the LO direction).

The control member 402 (FIG. 77) and the control member 412 (part (a) of FIG. 80) described in Embodiment 8 and the first modification of Embodiment 8 move along the direction perpendicular to the axis of the photosensitive drum, whereas it is not movable in the axial direction of the photosensitive drum. That is, the control member 402 rotates about the shaft portion MX (referring to FIG. 77) parallel to the axis of the photosensitive member drum, and the control member 412 is linearly slid in the direction perpendicular to the axis of the photosensitive member drum (part (a) of FIG. 80).

On the other hand, in the second modification, when the control member 442 moves from the non-acting position (part (a) of FIG. 84) to the acting position (part (c) of FIG. 84), the restricting portion (acting portion, urging portion)

422*a* of the control member 442 is displaced in the axial direction of the photosensitive drum. That is, when the control unit 442 moves to the acting position, the restricting unit 422*a* is displaced toward the outside in the axial direction, that is, toward the left side in part (c) of FIG. 84.

<Modification 3 of Embodiment 8>

Further, another modification (Modification 3) according to this embodiment will be described. Also in this modification, the drive transmission portion 81 is structured to be pivotable (inclinable) as in the above-described structure.

Figure 85:
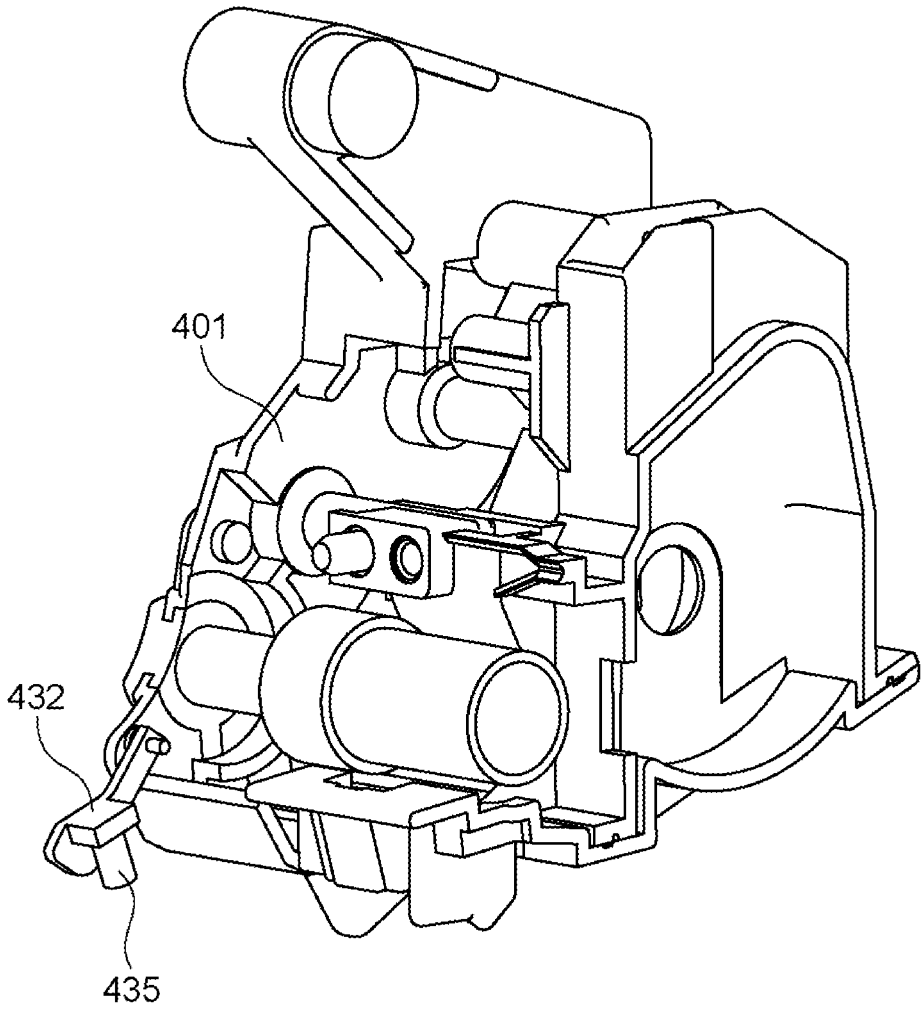
FIG. 85 is a perspective view of the developing unit.

As shown in FIG. 85, the control member 432 is provided with a compression spring 435 as a pressing unit.

Figure 86:
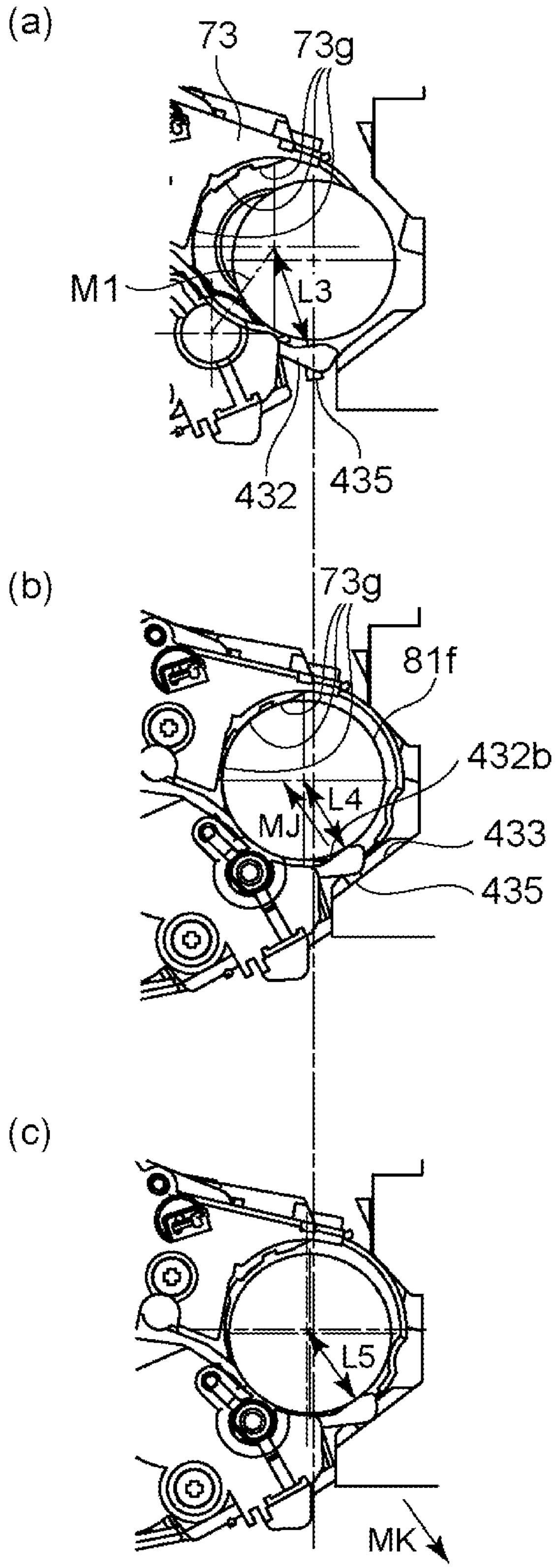
FIG. 86, parts (a), (b), and (c), is a sectional view of the drive transmission member and the process cartridge.

FIG. 86 is a cross-sectional view when the process cartridge is being mounted into the apparatus main body. As shown in part (a) of FIG. 86, the drum bearing 73 is provided with a contact portion 73*g*. When the process cartridge is inserted into the apparatus main assembly, the compression spring 435 contacts the main assembly guide portion 433 as shown in part (b) of FIG. 86, and the compression spring 435 urges the control member 432 in an arrow MJ direction. By this, a contact portion 432*b* of the control member 432 contacts the side surface 81*f* of the drive transmission member 81 and presses the drive transmission member 81 in the arrow MJ direction. By this, the drive transmission member 81 generates a moment in the direction of the arrow W shown in FIG. 15 as in Embodiment 1, and the drive transmission member 81 comes into contact with the restricting portion 73*g* provided on the drum bearing 73, so that the inclination angle of the drive transmission member 81 can be reduced.

When the mounting of the process cartridge on the apparatus main assembly is completed and the drive transmission member 81 and the coupling member 64 are engaged, the rotation axes of the drive transmission member 81 and the coupling member 64 are aligned. At this time, the drive transmission member 81 moves in the direction of arrow MK as shown in part (c) of FIG. 86.

In addition, although the mechanism of Embodiment 1 or the mechanism disclosed in Embodiment 2 was used as the mechanism for advancing and retracting the coupling in Embodiments 3 to 8, the advancing and retracting method is not limited to this method, and other methods are usable.

Embodiment 9

Next, Embodiment 9 will be described. The description of the same points as those in the above-described embodiments may be omitted. Of the elements disclosed in the present embodiment, those corresponding to the members described in Embodiment 8 will be assigned the same names as those in Embodiment 8, and only the points different from those in the Embodiment 8 may be described.

In the following embodiment, the drive transmission portion 1081 is structured to be pivotable (inclinable) as in the case of Embodiment 8 (FIG. 92), and further, a control member (centering auxiliary member, movable member, urging member, aligning member) 1001 (FIG. 88) is provided in the cartridge.

In each of the above embodiments including the Embodiment 8, the driving force is transmitted to the developing roller 32 by the developing roller gear 36 meshing with the gear portion 75*a* provided on the driving side flange member 75 (FIG. 27). That is, the driving force inputted from the apparatus main assembly to the coupling member (driving input member) of the cartridge is transmitted to not only the photosensitive drum but also the developing roller 32 by being branched inside the cartridge. However, the cartridge and the image forming apparatus main assembly do not necessarily have to have such a structure. That is, a structure in which the developing roller 32 receives a driving force directly from the image forming apparatus main assembly separately from the photosensitive drum 62 is also conceivable.

As an example thereof, this embodiment has a structure in which the developing roller gear 36 is exposed to outside of the cartridge to directly engage with the drive transmission member 1081 of the apparatus main assembly A and directly receive the drive force from the drive transmission member 1081.

In addition, although the coupling member 64 is structured to be able to advance and retract in the longitudinal direction relative to the drum 62 in the above-described plurality of embodiments including Embodiment 8 (FIGS. 6 and 8), it is not always necessary. The coupling member may be fixed to the end of the photosensitive drum. Therefore, in this embodiment, a coupling member fixed to the photosensitive drum is introduced.

Figure 92:
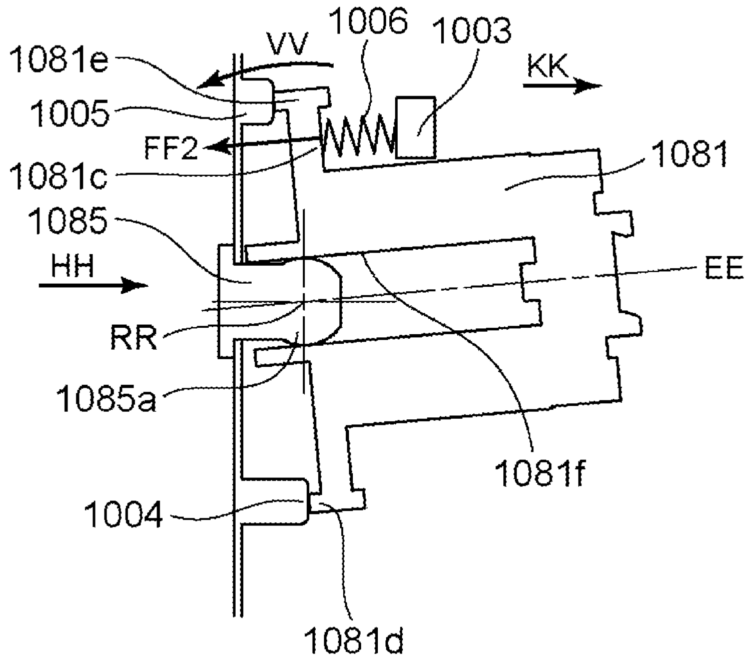
FIG. 92 is an illustration of the drive transmission member.

Furthermore, in Embodiment 8, the drive transmission member 81 is inclined in the direction of arrow V shown in FIG. 15 by its own weight, but it is not always necessary. As described in Embodiment 3 and the like, the drive transmission member may be inclined by a force other than gravity, and the drive transmission member may be inclined in a direction different from the gravity direction. Therefore, in this embodiment, as shown in FIG. 92, the drive transmission member 1081 is inclined in an arrow VV direction by an elastic force F22. By this, a resistance when the process cartridge B is mounted to and dismounted from the apparatus main assembly A can be reduced (details will be described hereinafter).

Referring first to FIGS. 88 to 91 and 98, the structures of the coupling member 1064 and the control member 1001 will be described.

Figure 88:
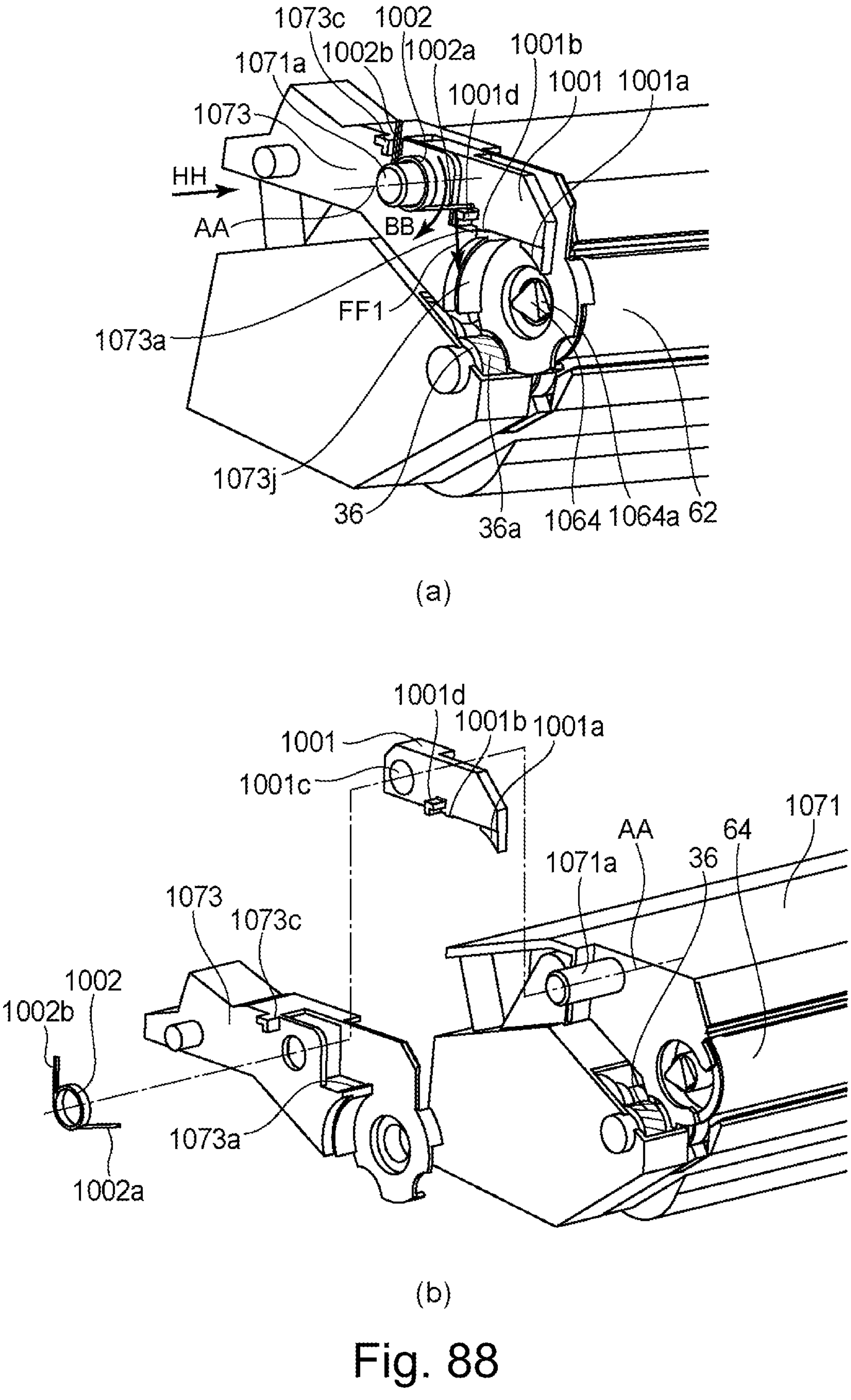
In FIG. 88, part (a) is a perspective view of the cartridge, and part (b) is an exploded perspective view of the cartridge.
Figure 89:
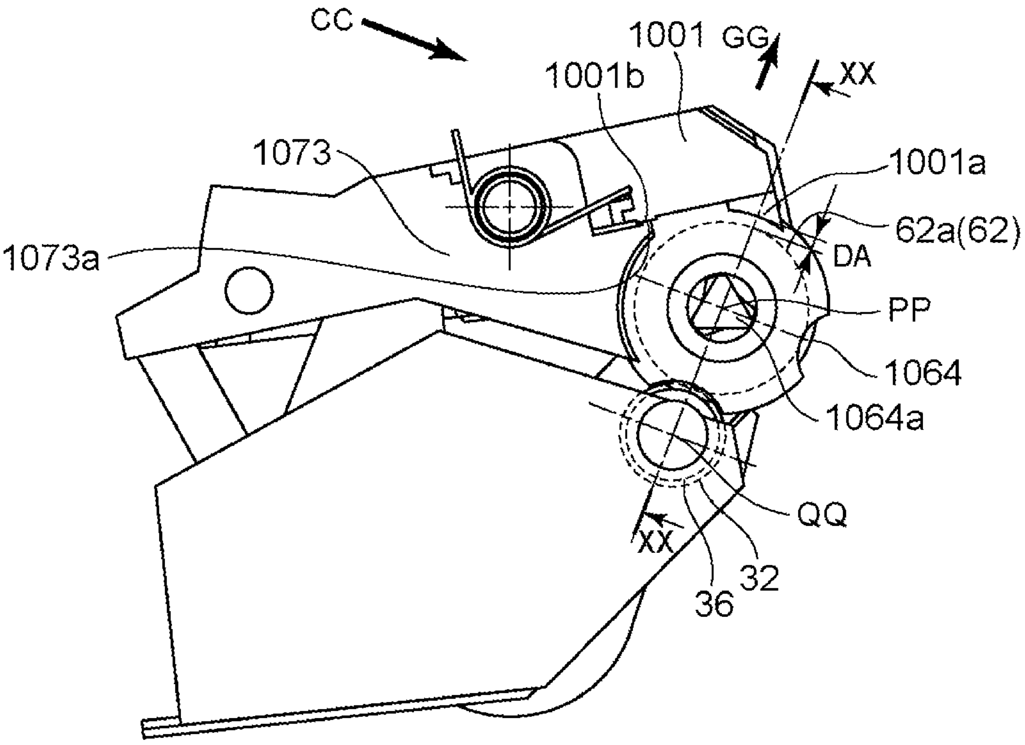
In FIG. 89, part (a) is a side view of the cartridge, and part (b) is a sectional view of the cartridge.
Figure 89:
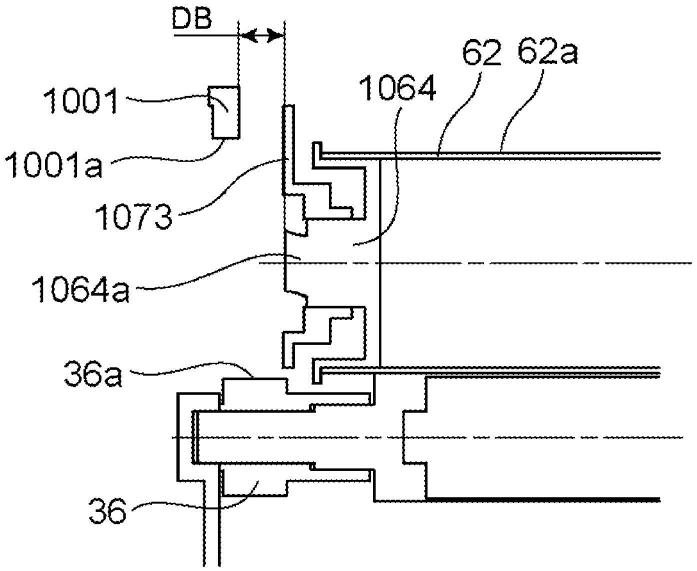

Part (a) of FIG. 88 is a perspective view of the cartridge B according to this embodiment. Part (b) of FIG. 88 is an exploded perspective view of the cartridge B according to this embodiment. Part (a) of FIG. 89 is a side view of the cartridge B according to this embodiment. Part (b) of FIG. 89 is a sectional view taken along the line XX-XX of the cartridge B driving side end in part (a) of FIG. 89.

As shown in parts (a) and (b) of FIG. 88, a control member 1001 which is a member for controlling the attitude of the drive transmission member 1081 (FIG. 92) is arranged adjacent to the end of the frame of the cartridge. The control member 1001 is a movable member which is movable respect to the photosensitive drum 62.

The control member 1001 is provided with a hole 1001*c*. The hole 1001C is supported by a support boss 1071*a* provided on the cleaning frame 1071. In addition, the drum bearing 1073 is integrally fixed to the cleaning frame 1071. The drum bearing 1073 and the cleaning frame 1071 form a portion of the frame of the cartridge. In particular, the drum bearing 1071 and the cleaning frame 1071 are frames which form the cleaning unit 60 (referring to FIG. 4). The control member 1001 is mounted to the drum bearing 1073 rotatably about the axis AA of the support boss 1071*a*.

An urging spring 1002, which is a torsion coil spring, is mounted to the support boss 1071*a*, and one end 1002*a* of the urging spring 1002 is in contact with a pressed portion 1001*d* of the control member 1001. The other end 1002*b* of the urging spring 1002 is in contact with a contacted portion 1073*c* of the drum bearing 1073. Therefore, the control member 1001 is urged in an arrow BB direction by an urging force FF1 of the urging spring 1002.

On the other hand, the drum bearing 1073 is provided with a control member contact portion (stop portion) 1073*a* which defines the rotation range of the control member 1001. The control member 1001 is urged by the urging spring 1002 in the direction of the arrow BB, and therefore, the contacted portion 1001*b* of the control member 1001 is in the attitude of contacting the control member contacting portion 1073*a*. That is, the movement of the control member 1001 is stopped by the control member contact portion 1073*a* contacting the control member 1001.

In addition, as shown in part (a) of FIG. 89, the restricting portion (urging portion, acting portion) 1001*a* of the control member 1001 is disposed adjacent to the surface 62*a* of the drum 62, that is, at a distance DA therefrom, as viewed in the arrow HH direction (part (a) of FIG. 88) parallel to the axis of the drum 62. The position of the control member 1001 in this state is called the acting position of the control member.

In addition, as shown in part (b) of FIG. 89, the restricting portion 1001*a* of the control member 1001 is disposed at the position of the distance DB, which is the outer side in the longitudinal direction with respect to the driven transmission portion 1064*a* of the coupling member 1064.

Figure 98:
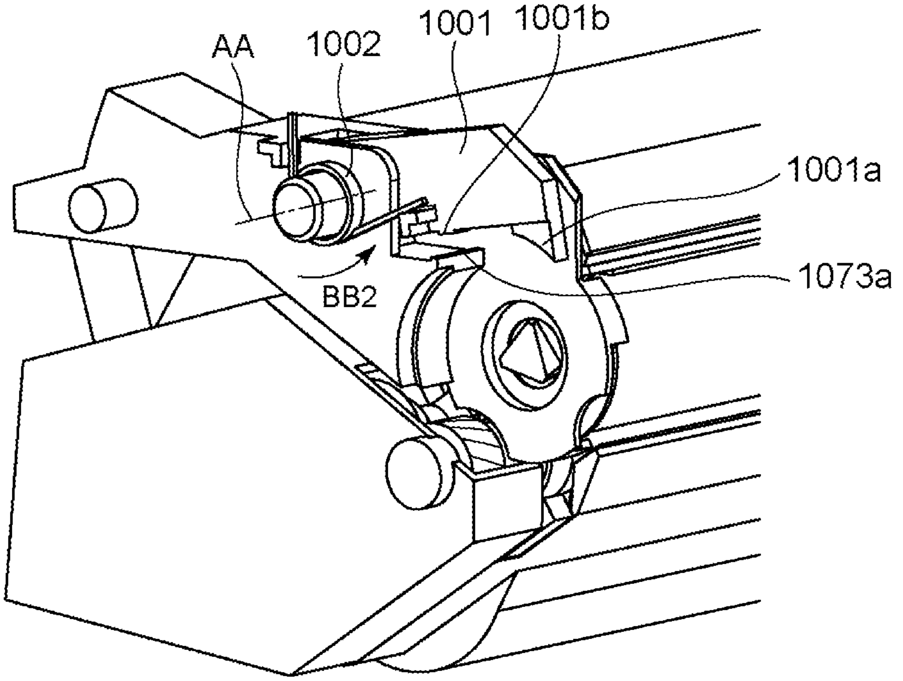
In FIG. 98, part (a) is an illustration of the drive transmission member, and part (b) is a side view of the cartridge.
Figure 98:
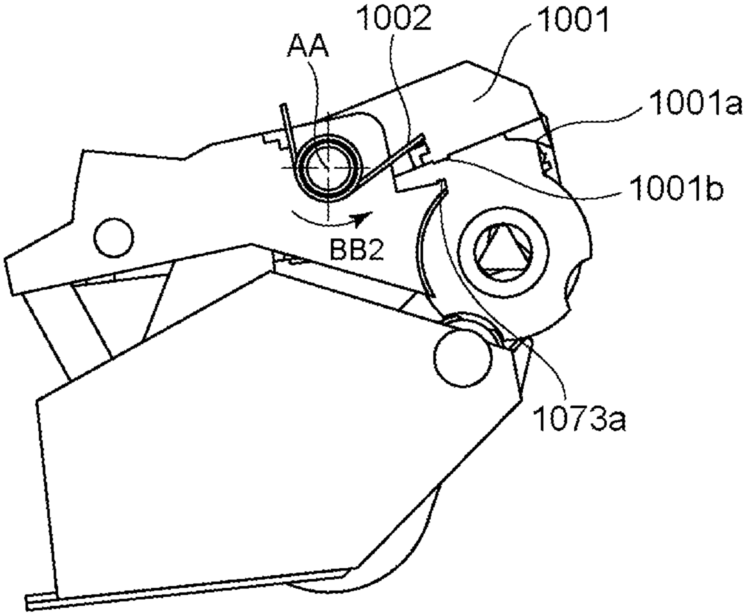

In addition, as shown in parts (a) and (b) of FIG. 98, when an external force is applied to the restricting portion 1001*a* of the control member 1001, the control member 1001 can rotate about the axis AA in the BB2 direction. At that time, the control member 1001 is rotated in the BB2 direction against the urging force of the urging spring 1002. In this state, the contacted portion 1001*b* of the control member 1001 does not contact the control member contacting portion 1073*a*. The control member 1001 can rotate in the direction of arrow BB2 by a predetermined angle.

As described above, in Embodiment 8, the coupling member 64 is mounted to the drum 62 by way of the driving side flange member 75 so as to be movable back and forth and backward in the longitudinal direction (referring to FIGS. 6 and 8). On the other hand, in this embodiment, the coupling member 1064 is integrally fixed to the drum 62 as shown in part (b) of FIG. 89. Therefore, the coupling member 1064 does not include a mechanism which moves back and forth in the longitudinal direction with respect to the drum 62. In Embodiment 1, the coupling member 64 transmits the drive to the developing roller gear 36 by way of the gear portion 75*a* of the driving side flange member (FIG. 27). On the other hand, in this embodiment, the coupling member 1064 does not have a gear portion and does not transmit the drive to the developing roller gear 36. In addition, the tooth surface 36*a* of the developing roller gear 36 is on the outer side in the longitudinal direction with respect to the coupling member 1064, and the tooth surface 36*a* is exposed to the outer surface of the cartridge B as shown in FIG. 88.

Figure 90:
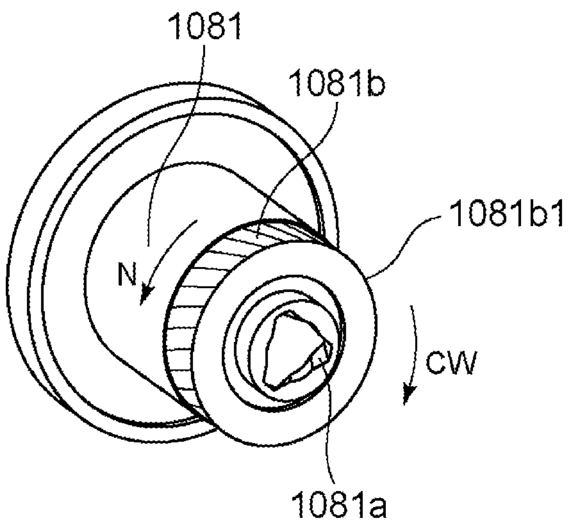
FIG. 90 is an illustration of the drive transmission member.
Figure 91:
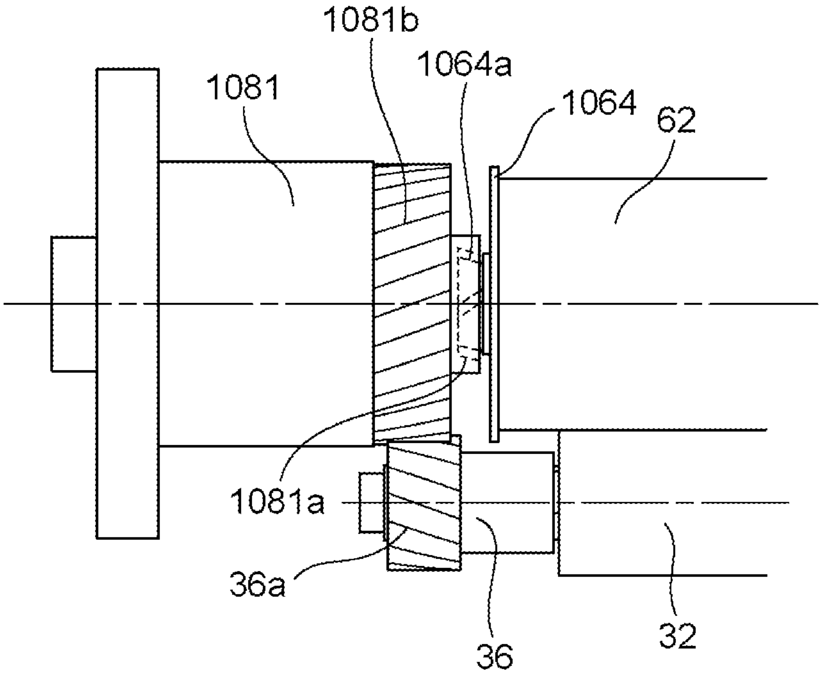
FIG. 91 is an illustration of the cartridge and the drive transmission member.

On the other hand, as shown in FIG. 90, the drive transmission member 1081 of the apparatus main assembly A has a drive transmission portion (output coupling portion) 1081*a* and a gear portion (output gear portion) 1081*b*. FIG. 91 shows a state in which the coupling member 1064 according to this embodiment is engaged with the drive transmission member 1081. At the time of image formation, as shown in FIG. 91, the drive transmission member 1081 is arranged coaxially with the drum 62. Then, the drive transmission portion 1081*a* meshes with the driven transmission portion 1064*a* of the coupling member 1064, and at the same time, the gear portion 1081*b* meshes with the tooth surface (drive input portion) 36*a* of the developing roller gear 36. Accordingly, the drive transmission member 1081 can simultaneously transmit the driving force to the coupling member 1064 and the developing roller gear 36.

Like the coupling member 1064, the developing roller gear 36 is a drive input member (gear member) to which a driving force is inputted from outside of the cartridge B (that is, the drive transmission member 1081 of the apparatus main assembly). In particular, the developing roller gear 36 may be called a drive input gear member.

(Structure of Drive Transmission Member)

Referring to FIGS. 89 and 92, the structure of the drive transmission member 1081 of the apparatus main assembly A will be described.

Similar to Embodiment 8, the cartridge B is inserted into the mounting portion of the apparatus main assembly A along the guide rails 15*h* and 15*g* (FIGS. 10 and 11). At this time, as shown in part (a) of FIG. 89, the direction CC in which the cartridge B is finally mounted to the apparatus main assembly A is substantially perpendicular to a cutting line XX connecting the center PP of the drum 62 and the center QQ of the developing roller 32.

On the other hand, FIG. 92 is a cross-sectional view illustrating the support structure of the drive transmission member 1081 according to this embodiment. FIG. 92 shows a state in which the cartridge B is not mounted to the apparatus main assembly A, and the opening/closing door 13 is open. As shown in FIG. 92, the supported portion 1081*f* of the cylindrical drive transmission member 1081 is supported by the support portion 1085*a* of the spherical drive transmission member support member 1085. Therefore, the drive transmission member 1081 can be inclined at the center RR of the support portion 1085*a*, and at the same time, the drive transmission member 1081 can move along the cylindrical axis EE of the supported portion 1081*f*.

Figure 96:
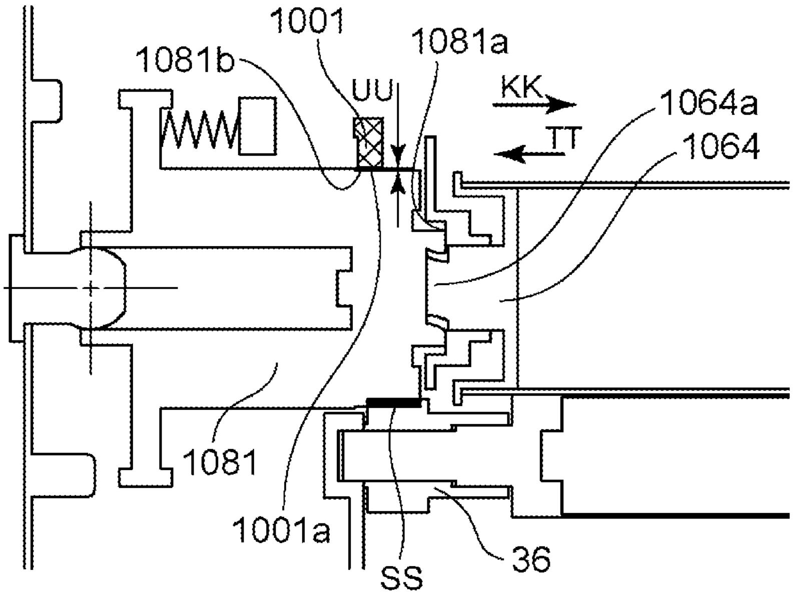
In FIG. 96, part (a) is an illustration of a drive transmission member, and part (b) is an illustration of the cartridge and the drive transmission member.
Figure 96:
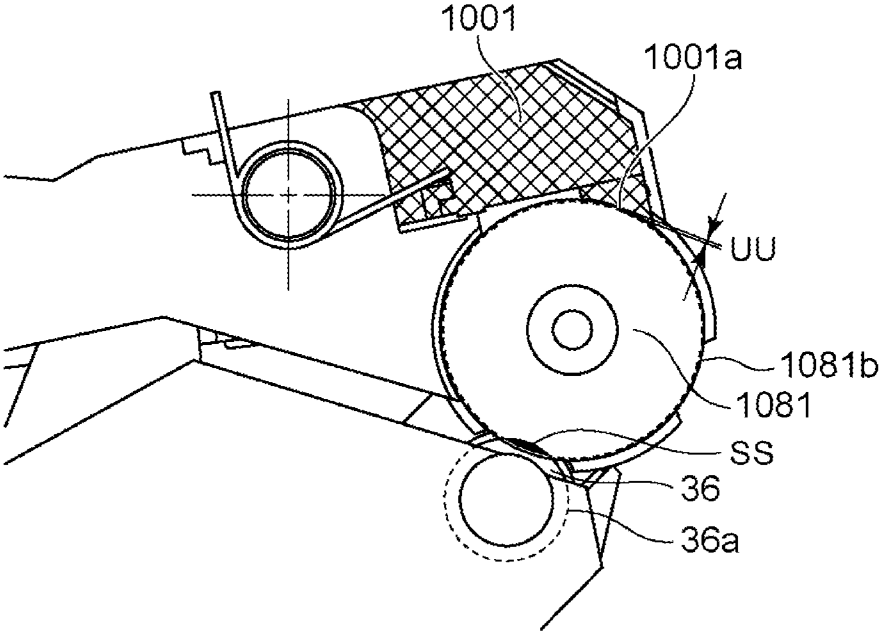

Further, an advancing/retracting member 1003 which is movable in the direction of arrow KK and in the direction of arrow TT (part (a) of FIG. 96) in accordance with the opening/closing operation of the opening/closing door 13 is mounted to the drive transmission member 1081 by means not shown. The advancing/retracting member 1003 is provided with an inclined spring 1006 which is a compression spring, and urges the drive transmission member 1081 with an urging force FF2 in the pressed portion 1081*c*. By the urging force FF2 of the inclined spring 1006, the contacted portion 1081*d* of the drive transmission member 1081 contacts the projection 1004 provided on the apparatus main assembly A, and at the same time, the contacted portion 1081*e* contacts the projection 1005. As a result, the drive transmission member 1081 takes an attitude inclined in the arrow VV direction.

At this time, the inclination direction of the drive transmission member 1081 as viewed in the arrow HH direction, which is a direction parallel to the axis of the drum 62, includes an arrow GG direction component parallel to the cutting line XX in part (a) of FIG. 89. It is preferable that the projection 1004 and the projection 1005 are provided at positions where the inclination direction of the drive transmission member 1081 is within a range of ±45° with respect to the arrow GG (part (b) of FIGS. 93 and 94).

(Process of Mounting/Dismounting Cartridge to/from Apparatus Main Assembly)

Referring to FIGS. 93 to 96, the process of mounting the cartridge B in the apparatus main assembly A and the operation of the control member 1001 will be described. In these Figures, the control member 1001 is shaded.

Figure 93:
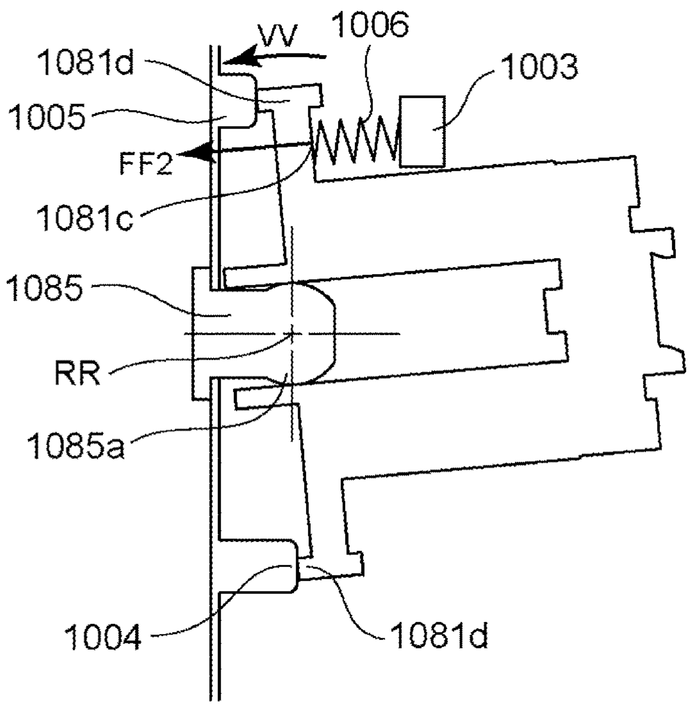
In FIG. 93, part (a) is an illustration of a drive transmission member, and part (b) is an illustration of the cartridge and the drive transmission member.
Figure 93:
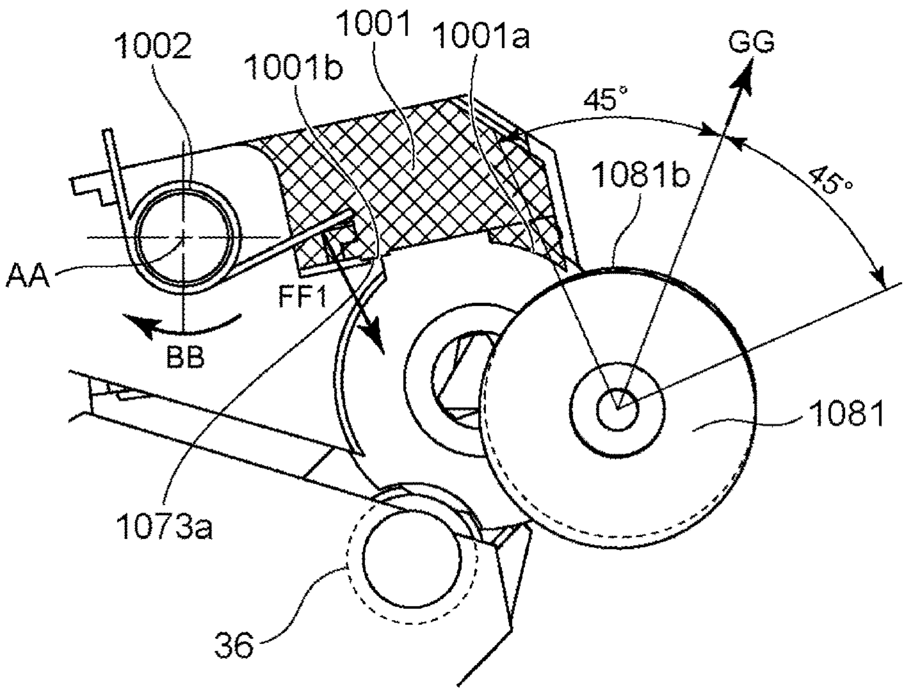

Parts (a) and (b) of FIG. 93 show the state immediately before the control unit 1001*a* of the control member 1001 contacts the gear unit 1081*b* of the drive transmission member 1081 in the process of opening the opening/closing door 13 and mounting the cartridge B into the apparatus main assembly A.

Figure 94:
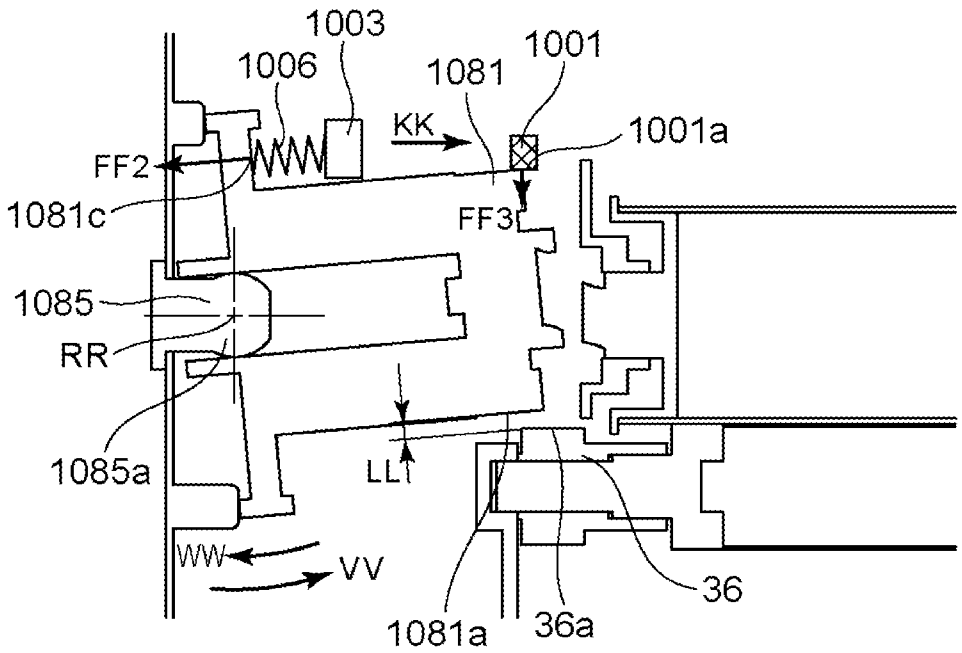
In FIG. 94, part (a) is an illustration of the drive transmission member, and part (b) is an illustration of the cartridge and the drive transmission member.
Figure 94:
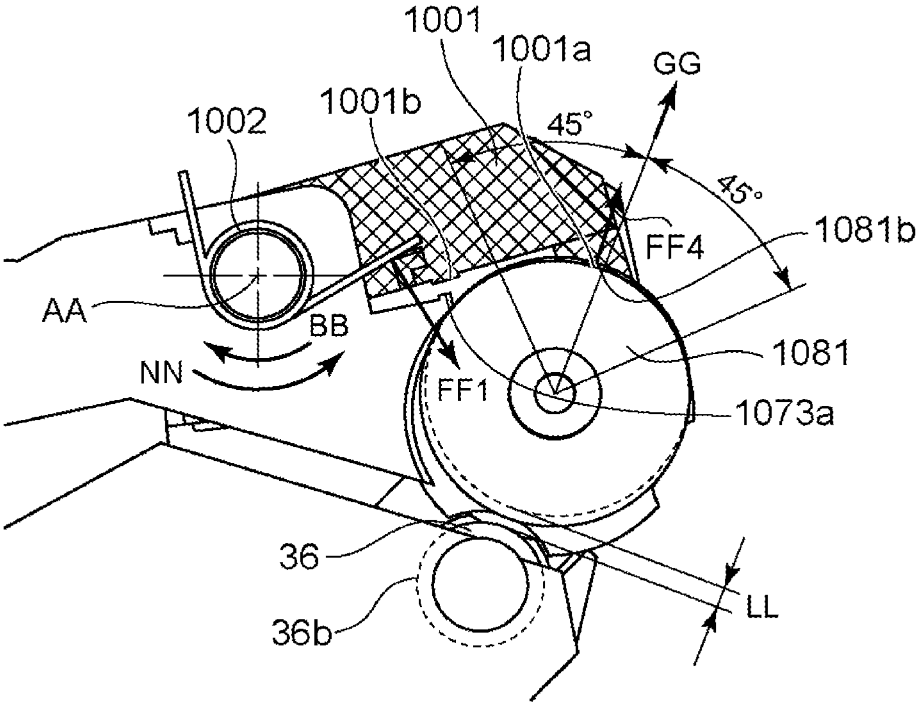

Parts (a) and (b) of FIG. 94 show a state in which the cartridge B is inserted from the state of parts (a) and (b) of FIG. 93 to the mounting portion of the apparatus main assembly A.

Figure 95:
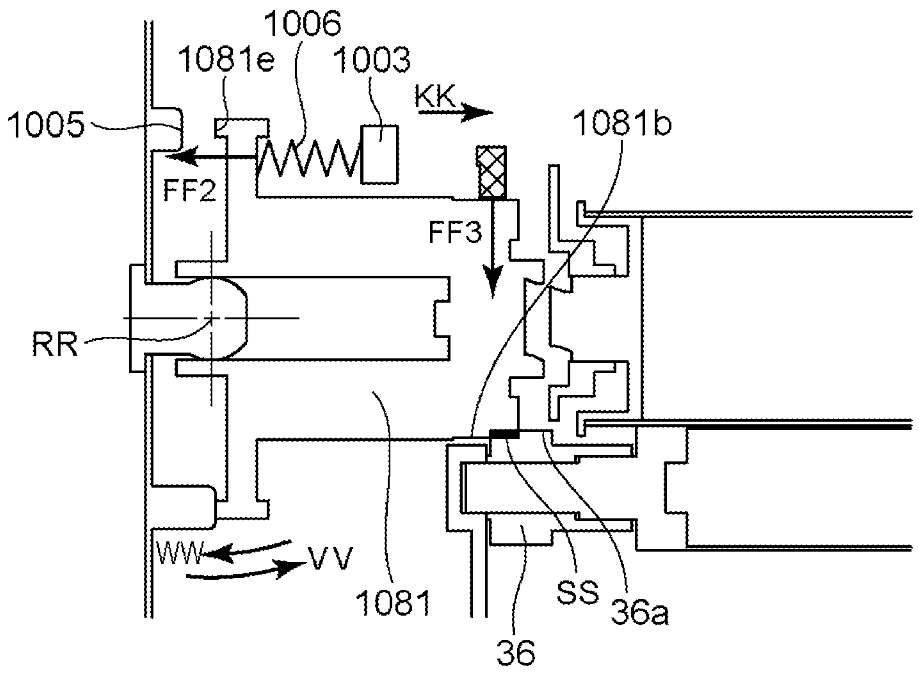
In FIG. 95, part (a) is an illustration of the drive transmission member, and part (b) is an illustration of the cartridge and the drive transmission member.
Figure 95:
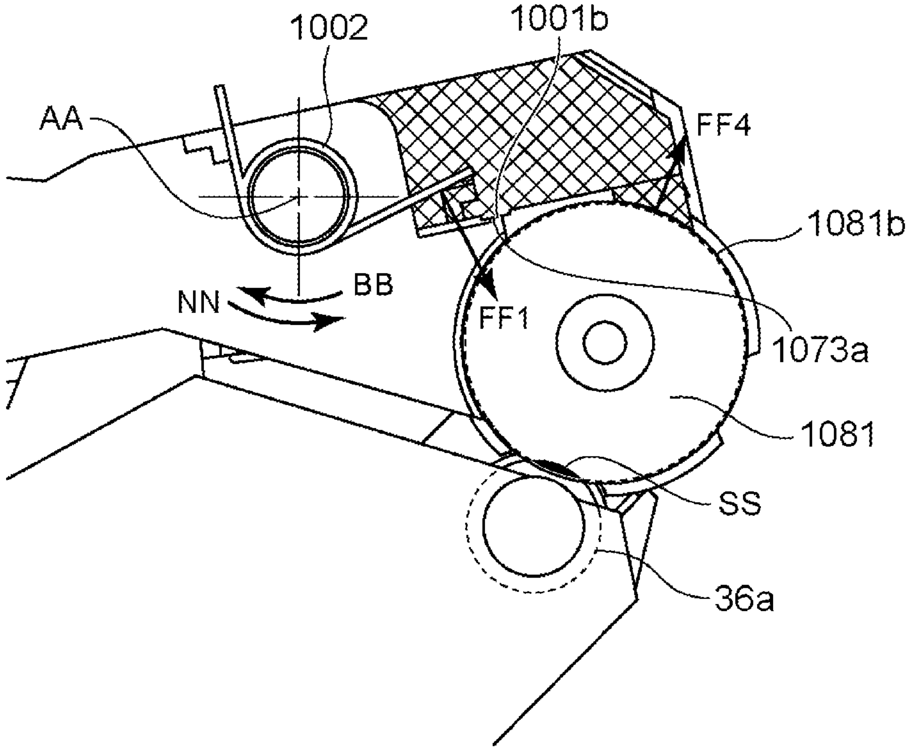

Parts (a) and (b) FIG. 95 show a state in which the opening/closing door 13 is closed from the state of parts (a) and (b) of FIG. 94.

Parts (a) and (b) of FIG. 96 show a state after driving is applied from the state of parts (a) and (b) of FIG. 95.

Before the control portion 1001*a* of the control member 1001 contacts the gear portion 1081*b* of the drive transmission member 1081, the drive transmission member is the same as when the cartridge B is not mounted to the main assembly A of the apparatus, that is, the drive transmission member 1081 is inclined to the arrow VV direction, as shown in part (a) of FIG. 93. In addition, as shown in part (b) of FIG. 93, the control member 1001 is urged in the direction of arrow BB by the urging force FF1 of the urging spring 1002, and the contacted portion 1001*b* of the control member 1001 is in contact with the member contact portion (stop portion) 1073*a* of the drum bearing 1073. That is, the movement of the control member 1001 is stopped by the control member abutting portion 1073*a* in the state in which the control member 1001 is located at the acting position.

When the cartridge B is further inserted from this position, the control portion 1001*a* of the control member 1001 abuts on the gear portion 1081*b* of the drive transmission member 1081 as shown in FIGS. 94(*a*) and 94(*b*). As shown in part (a) of FIG. 94, the drive transmission member 1081 receives the urging force FF3 from the control unit 1001*a*. In the process from the state of parts (a) and (b) of FIG. 93 to the state of parts (a) and (b) of FIG. 94, the moment MM2 (not shown) about the RR in the direction of arrow VV by the urging force FF2 and the moment MM3 (not shown) about the arrow WW by the urging force FF3 satisfy MM2>MM3. Therefore, the drive transmission member 1081 maintains the state of being inclined in the arrow VV direction. Therefore, the gear portion 1081*b* of the drive transmission member 1081 is separated from the tooth surface 36*a* of the developing roller gear 36 with a gap LL. Therefore, the gear portion 1081*b* of the drive transmission member 1081 does not contact with the tooth surface 36*a* of the developing roller gear 36 throughout the process of mounting the cartridge B in the mounting portion of the apparatus main assembly A.

On the other hand, as shown in part (b) of FIG. 94, the control unit 1001*a* receives the reaction force FF4 of the FF3 from the gear unit 1081*b*. In the process from the state of parts (a) and (b) of FIG. 93 to the state of parts (a) and (b) of FIG. 94, the moment MM1 about AA in the direction of arrow BB by the urging force FF1 and the moment MM4 about AA of arrow NN by the reaction force FF4 satisfy MM1<MM4. Therefore, the control member 1001 rotates in the arrow NN direction against the urging force FF1 of the urging spring 1002, and the contacted portion 1001*b* is separated from the control member contacting portion 1073*a*. At this time, the control member 1001 is at the non-acting position (retracted position). As shown in part (a) of FIG. 94, the restricting portion 1001*a* of the control member 1001 is retracted away from the axis of the photosensitive drum, allowing the drive transmission member 1081 to incline.

When the opening/closing door 13 is closed here, the advancing/retracting member 1003 moves in the direction of arrow KK in interrelation with the operation of the opening/closing door 13 as shown in part (a) of FIG. 95. Therefore, the compression amount of the inclined spring 1006 decreases, and therefore the urging force FF2 decreases. As a result, the relationship between the moment MM2 about the RR in the arrow VV direction by the urging force FF2 and the moment MM3 about the RR in the arrow WW direction by the urging force FF3 of the control member 1001 satisfy MM2<MM3. As a result, the drive transmission member 1081 rotates in the arrow WW direction, and the contact portion 1081*e* and the projection 1005 are separated from each other. The gear portion 1081*b* of the drive transmission member 1081 and the tooth surface 36*a* of the developing roller 36 are brought into meshing engagement with each other in the area SS. On the other hand, as shown in FIG. 95(*b*), a moment MM1 about AA in the arrow BB direction by the urging force FF1 of the urging spring 1002 and the moment MM4 around AA in the arrow NN by the reaction force FF4 of the urging force FF3 satisfy MM1>MM4. Therefore, the control member 1001 rotates in the direction of arrow BB from the state of part (b) of FIG. 94 and moves until the contacted portion 1001*b* contacts the control member contacting portion 1073*a* of the drum bearing 1073.

The control member 1001 shown in FIGS. 95(*a*) and 95(*b*) is located at the acting position, and by the restricting portion 1001*a* of the control member 1001 applying a force F33 to the drive transmission member 1081, the inclination angle of the member 1081 is reduced.

Here, when the drive transmission member 1081 is driven, the drive transmission member 1081 moves in the direction of arrow KK as shown in part (a) of FIG. 96, and the drive transmission portion 1081*a* and the driven transmission portion 1064*a* of the coupling member 1064 are brought into engagement with each other. In this state, the restricting portion 1001*a* of the control member 1001 does not contact the gear portion 1081*b* of the drive transmission member 1081, and there is a gap UU therebetween. Details of the operation from the state of parts (a) and (b) of FIG. 95 to the state of parts (a) and (b) of FIG. 96 will be described hereinafter.

Next, a process of taking out the cartridge B from the apparatus main assembly A will be described. This process is the reverse of the process of mounting the cartridge B into the apparatus main assembly A. When the image formation is completed, the drive transmission member 1081 is in the state shown in parts (a) and (b) of FIG. 96. When the opening/closing door 13 is opened in this state, the advancing/retracting member 1003 moves in the direction of the arrow TT in interrelation with the operation of the opening/closing door 13, and the state shown in parts (a) and (b) of FIG. 94 is reached. The compression amount of the inclined spring 1006 increases, and therefore the urging force FF2 increases. As a result, the drive transmission member 1081 moves to the left side in the Figure, and the engagement between the output coupling portion 1081*a* (FIG. 90) of the drive transmission member 1081 and the coupling member 1064 is broken. At this time, as described above, the moment MM2 in the direction of arrow VV by the urging force FF2 and the moment MM3 of the arrow WW by the urging force FF3 satisfy MM2>MM3. Therefore, the drive transmission member 1081 becomes in a state of being inclined to the arrow VV direction. Along with this, the gear portion 1081*b* of the drive transmission member 1081 is spaced from the tooth surface 36*a* of the developing roller gear 36 with a gap LL.

When the cartridge B is taken out of the main assembly A of the apparatus in this state, the cartridge B can be completely removed from the main assembly A of the apparatus while maintaining the state in which the drive transmission member 1081 and the developing roller gear 36 are not in contact with each other, by way of the states of parts (a) and (b) of FIG. 93. That is, before the cartridge B is removed, the gear portion of the drive transmission member 1081 and the developing roller gear 36 are disengaged from each other, so that the cartridge B can be removed with a small force.

(Engagement of Coupling Member and Drive Transmission Member by Main Assembly Drive)

Next, a detail description will be made as to the operation from the state shown in parts (a) and (b) of FIG. 95 in which the drive transmission member 1081 and the coupling member 1064 are not engaged with each other, up to the state shown in parts (a) and (b) of FIG. 96 in which the drive transmission member 1081 and the coupling member 1064 are coupled with each other.

First, a structure with which the drive transmission member 1081 moves in the longitudinal direction will be described. In the area SS of part (a) of FIG. 95, the gear portion 1081*b* of the drive transmission member 1081 is in meshing engagement with the tooth surface 36*a* of the developing roller gear 36. In that state, the drive transmission member 1081 is rotated in the arrow CW direction (the direction opposite to the arrow N) shown in FIG. 90 by the motor (not shown) provided in the apparatus main assembly A. The gear portion 1081*b* of the drive transmission member 1081 and the tooth surface 36*a* of the developing roller gear 36 constitute helical gears. When the drive transmission member 1081 rotates, the drive transmission member 1081 receives the reaction force of the meshing force due to the rotational load of the developing roller 32 from the developing roller gear 36. Since the gear portion 1081*b* and the tooth surface 36*a* are helical gears as described above, this reaction force has a component in the direction of arrow KK (a component along the axial direction of the photosensitive drum). As a result, the drive transmission member 1081 moves in the arrow KK direction from the position shown in part (a) of FIG. 95.

Figure 97:
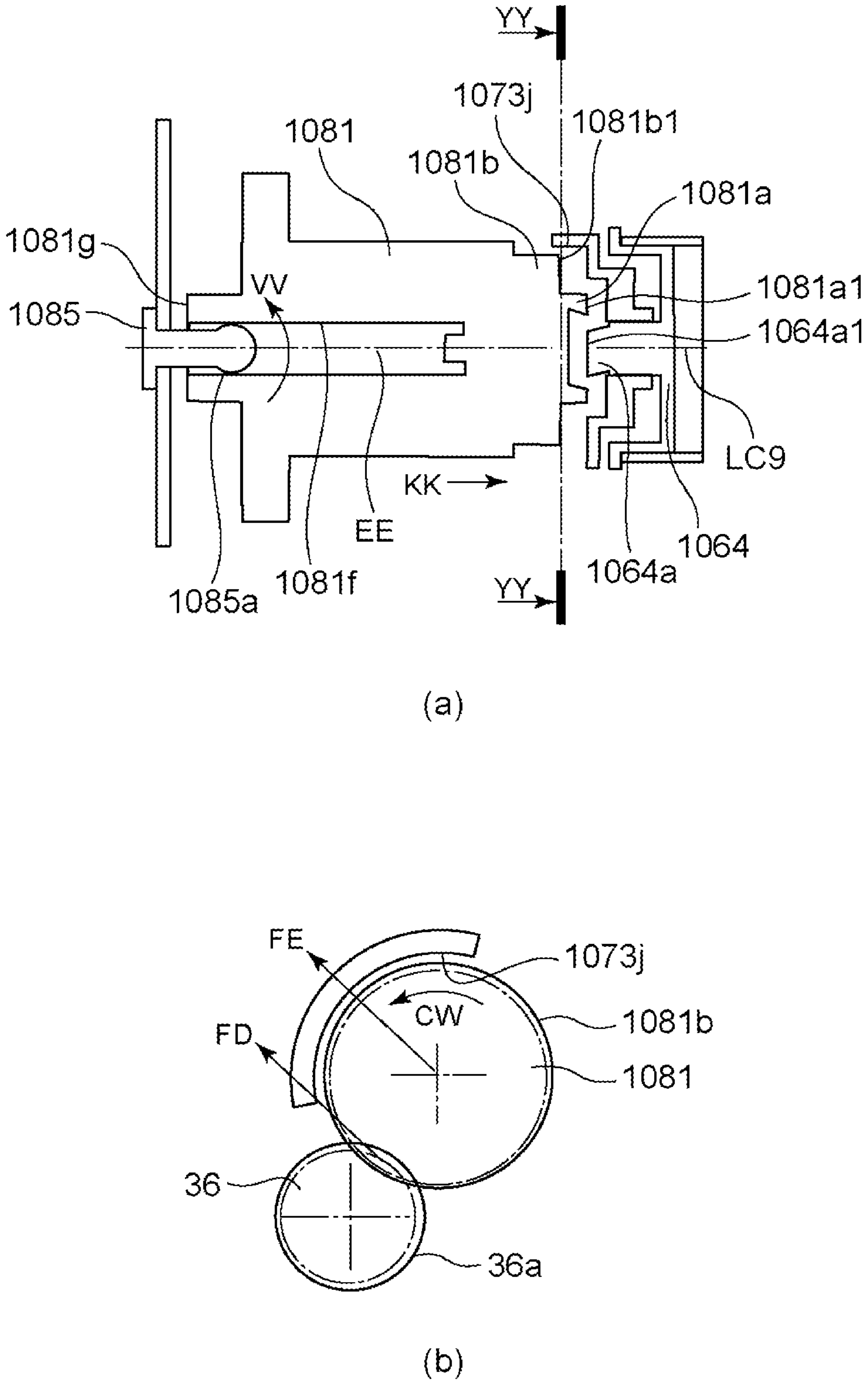
In FIG. 97, part (a) is an illustration of the drive transmission member, and part (b) is an illustration of the cartridge and the drive transmission member.

Next, referring to parts (a) and (b) of FIG. 97, the support structure of the drive transmission member 1081 will be described. Part (a) of FIG. 97 is a cross-sectional view of the coupling member 1064 taken along a line passing through the rotation axis. Part (b) of FIG. 97 schematically shows the YY-YY cross-section in part (a) of FIG. 97.

In part (a) of FIG. 97, the drive transmission member 1081 moves in the direction of arrow KK. The supported portion 1081*f* of the drive transmission member 1081 is supported by the substantially spherical support portion 1085*a* of the drive transmission member support member 1085. Therefore, the rotation axis EE of the drive transmission member 1081 can be inclined in the arrow VV direction with the fixed end 1081*g* side of the drive transmission member 1081 as the rotation center. By this, the end portion 1081*a*1 (free end) of the drive transmission member 1081 on the drive transmission portion 1081*a* side receives the force in the direction of an arrow FD (FIG. 97 (*b*)), which is the direction of the meshing force between the gear portion 1081*b* of the drive transmission member 1081 and the tooth surface 36*a* of the developing roller gear 36. Then, the drive transmission member 1081 moves in the arrow FE direction. At that time, the free end portion 1081*b*1 (part (a) of FIG. 97, FIG. 90) of the gear portion 1081*b* of the drive transmission member 1081 abuts to the restricting portion 1073*j* (part (a) of FIG. 97, FIG. 88). By this, the inclination of the drive transmission member 1081 is maintained within a predetermined range.

Next, referring to FIGS. 93 to 97, a process in which the drive transmission member 1081 engages with the coupling member 1064 will be described. In the state of part (a) of FIG. 95, by the drive transmission member 1081 further rotating about the rotation axis EE, the drive transmission member 1081 moves further in the arrow KK direction while maintaining the inclination. Since the inclination of the drive transmission member 1081 is maintained within a certain range, the driven transmission portion 1064*a* of the coupling member 1064 can enter the inside of the hole of the drive transmission portion 1081*a* of the drive transmission member 1081, as shown in part (a) of FIG. 96.

As shown in part (a) of FIG. 88, the drive transmission portion 1081*a* of the drive transmission member 1081 is in the form of a recess portion having a substantially triangular recess shape. On the other hand, the driven transmission portion 1064*a* of the coupling member 1064 is in the form of a projection having a substantially triangular projection shape as shown in FIG. 90. Therefore, when the phase of the drive transmission portion 1081*a* of the drive transmission member 1081 does not match the phase of the drive transmission portion 1064*a* of the coupling member 1064, the drive transmission portion 1064*a* is unable to enter the inside of the drive transmission portion 1081*a*. Therefore, the end portion 1081*a*1 (free end, tip) of the drive transmission portion 1081*a* of the drive transmission member 1081 abuts to the end portion 1064*a*1 (free end, tip) of the driven transmission portion 1064*a*. In this state, the drive transmission member 1081 further rotates about the rotation axis EE. When the phase of the drive transmission portion 1081*a* of the drive transmission member 1081 becomes aligned with the phase of the drive transmission portion 1064*a* of the coupling member 1064, the drive transmission portion 1064*a* of the coupling member 1064 enters the inside of the transmission portion 1081*a* of the drive transmission member 1081.

By this, the recess 1081*a* of the drive transmission member 1081 and the driven transmission portion 1064*a* of the coupling member 1064 are engaged with each other. As a result, the drive transmission member 1081 can transmit the driving force to the coupling member 1064.

In the process in which the recess 1081*a* of the drive transmission member 1081 and the driven transmission portion 1064*a* of the coupling member 1064 are engaged, the rotation axis EE of the drive transmission member 1081 is substantially aligned with the rotation axis LC9 of the coupling member 1064.

Through the above operation, the drive transmission member 1081 reaches the state at the time of image forming operation shown in parts (a) and (b) of FIG. 96.

In this embodiment, the control member 1001 not only assists the alignment of the drive transmission member 1081 relative to the coupling member 1064, but also urges the drive transmission member 1081 toward the developing roller gear 36, by urging the drive transmission member 1081.

That is, the control member 1001 moves from the non-acting position (retracted position: parts (a) and (b) of FIG. 94) to the acting position (part (a) and (b) of FIG. 95) as the opening/closing door 13 is closed. At this time, the control member 1001 urges the drive transmission member 1081 to reduce the inclination angle of the drive transmission member 1081 relative to the photosensitive drum 62. By this, the control member 1001 engages the gear portion (output gear portion) 1081*b* (FIG. 90) of the drive transmission member 1081 with the tooth surface (input gear portion) 36*a* of the developing roller gear 36 (parts (a) and (b) of FIG. 95).

In the state of the drive transmission member 1081 being urged by the control member 1001, the gear portion 1081*b* of the drive transmission member 1081 engages with the gear portion 36*a* of the developing roller gear 36 and starts transmitting the rotational force (part (a) of FIG. 95). At this time, the gears mesh with each other to generate a force in the axial direction, so that the drive transmission member 1081 is pulled toward the coupling member 1064. By this, the recess portion (output coupling portion) 1081*a* of the drive transmission member 1081 and the driven transmission portion (input coupling portion, projection) 1064*a* of the coupling member 1064 engage with each other (the state shown in part (b) of FIG. 96).

On the other hand, as the opening/closing door 13 opens, the drive transmission member 1081 retracts from the coupling member 1064, and the engagement with the coupling member 1064 is broken. At the same time as this, the control member 1001 moves from the acting position (parts (a) and (b) of FIG. 95) to the non-acting position (retracted position: parts (a) and (b) of FIG. 94). By this, the control member 1001 allows the drive transmission member 1081 to inclined. The inclination angle of the drive transmission member 1081 relative to the photosensitive drum 62 increases, and the meshing engagement between the gear portion of the drive transmission member 1081 and the developing roller gear can be eliminated. In this state, the cartridge can be easily removed.

The control member 1001 is arranged so as not to interfere with the image forming process performed on the surface of the photosensitive drum 62. That is, a portion of the surface of the photosensitive member drum 62 is exposed through the frame of the cartridge, and the toner image formed on the surface of the photosensitive member drum 62 is transferred onto the image forming apparatus main assembly at the exposed portion. Therefore, at least when the control member 1001 is located at the acting position (part (a) of FIG. 88), the control member 1001 does not cover the exposed portion of the photosensitive member drum 62 or contact the exposed portion. Particularly, the control member 1001 is arranged so as not to cover or contact the image forming area (area where a toner image can be formed) of the photosensitive drum.

As is different from the coupling member 64 of Embodiment 1 (parts (a) to (b) of FIG. 15), the coupling member 1064 of this embodiment does not move between the advanced position and the retracted position. However, as described above, when the drive transmission member 1081 starts driving, the drive transmission member 1081 moves so as to approach the coupling member 1064, and therefore, the drive transmission member 1081 and the coupling member 1064 can be connected with each other. This is because the gear portion (output gear portion) 1081*a* of the drive transmission member 1081 and the cartridge-side gear member (developing roller gear) 36 are both helical gears. That is, when the drive transmission member 1081 is driven, a force which pulls the drive transmission member 1081 toward the cartridge side is produced due to the meshing engagement of the gears.

Such a structure of this embodiment may be employed in another embodiment described above or below. For example, in each of the above-described embodiments, the structure is such that the gear 36 of the developing roller meshes with the gear portion of the flange member (75) mounted to the end portion of the photosensitive drum to receive the driving force (FIG. 27). By partially modifying such a structure and partially exposing the gear (gear member, helical gear) 36 of the developing roller to outside of the cartridge as in this embodiment, by which it may be directly engaged with the gear portion of the drive transmission member of the image forming apparatus main assembly.

If the cartridge has a gear that can directly mesh with the gear portion of the drive transmission member, the drive transmission member moves so as to approach the coupling member of the cartridge side by the force produced by the meshing engagement of the gears at the time in the driving operation of the drive transmission member (FIG. 96). Thus, the connection between the drive transmission member and the coupling member can be assisted.

In this embodiment, the gear on the cartridge side which engages with the drive transmission member 1081 is the developing roller gear 36 mounted to the shaft of the developing roller 32. However, other structures are possible. That is, the gear 36 on the cartridge side shown in part (a) of FIG. 88 does not have to be the gear mounted to the developing roller 32, or the gear for transmitting the driving force to the developing roller 32. In other words, if the cartridge has a gear which can make the meshing engagement with the gear portion 1081*a* of the drive transmission member 1081, the gear does not have to be the developing roller gear.

As an example thereof, the gear 36 on the cartridge side is not connected to the developing roller 32, and the driving force is applied from the gear 36 only to the feed member 34 (FIG. 4) by way of the idler gear 39 and the feeding member gear 41 (FIG. 3). If the driving force received by the gear 36 is not transmitted to the developing roller 32 as described above, the driving force received by the coupling member 1064 is applied not only to the photosensitive drum but also to the developing roller 32, as in the first to eighth embodiments.

In addition, the following is another example in which this embodiment is partially modified. While and the gear 36 is not directly mounted on the developing roller 32 or the shaft of the developing roller 32, a driving force is transmitted from the gear 36 to the developing roller 32 by way of another drive transmission means (an idler gear, for example).

On the other hand, also in this embodiment, similarly to the above-described first and eighth embodiments, it is possible to employ a structure (FIG. 14) in which the coupling member moves between the advanced position and the retracted position.

Embodiment 10

Next, Embodiment 10 will be described. In this embodiment, a structure similar to that of the Embodiment 9 will be described in more detail. The description of the same points as those in the above-described embodiments will be omitted. In particular, among the elements disclosed in this embodiment, those corresponding to the members described in the Embodiment 9 will be assigned the same names as in the Embodiment 9, and only the points different from those in the Embodiment 9 will be described. (Structure of coupling member and control member)

Figure 99:
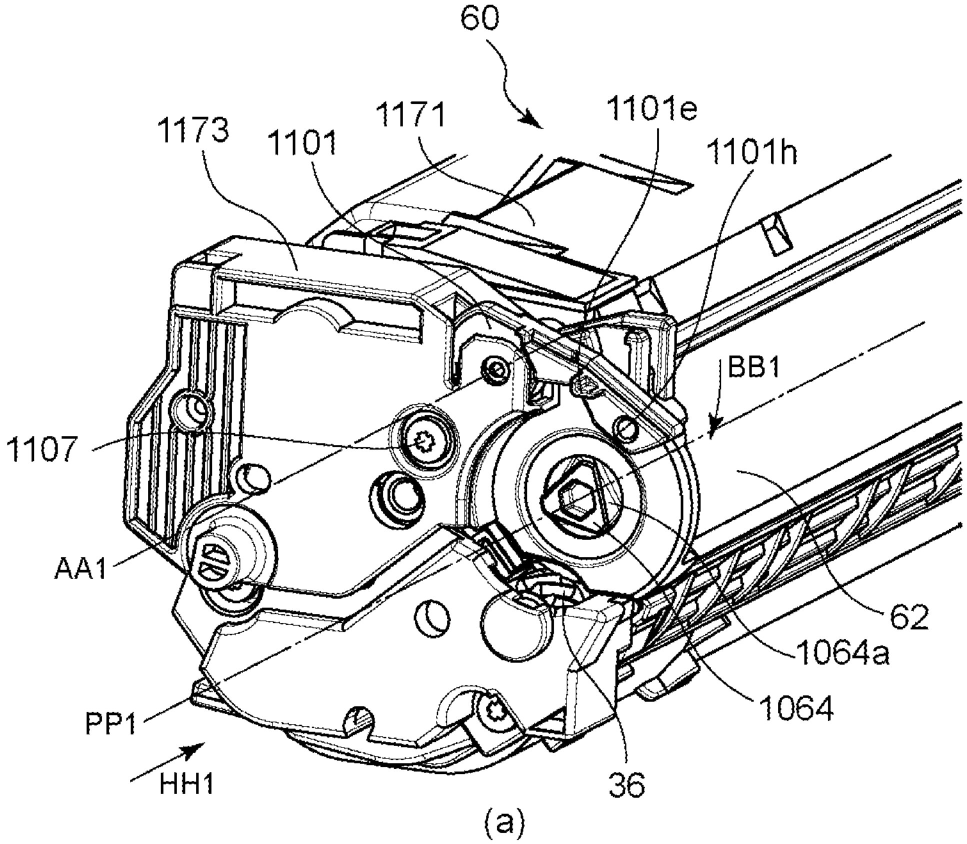
In FIG. 99, part (a) is a perspective view of the cartridge, and (b) is a side view of the cartridge.
Figure 99:
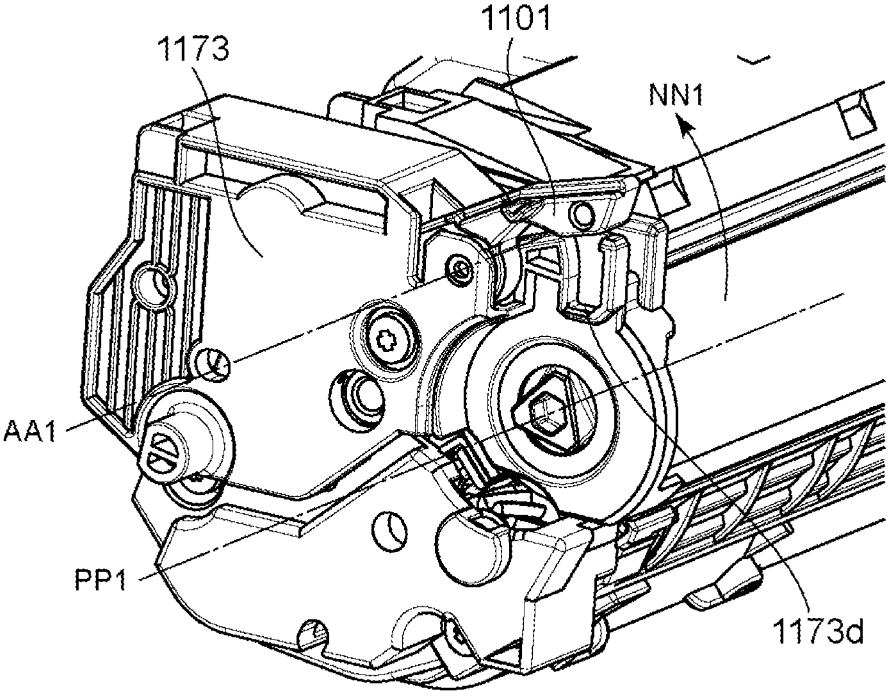
Figure 100:
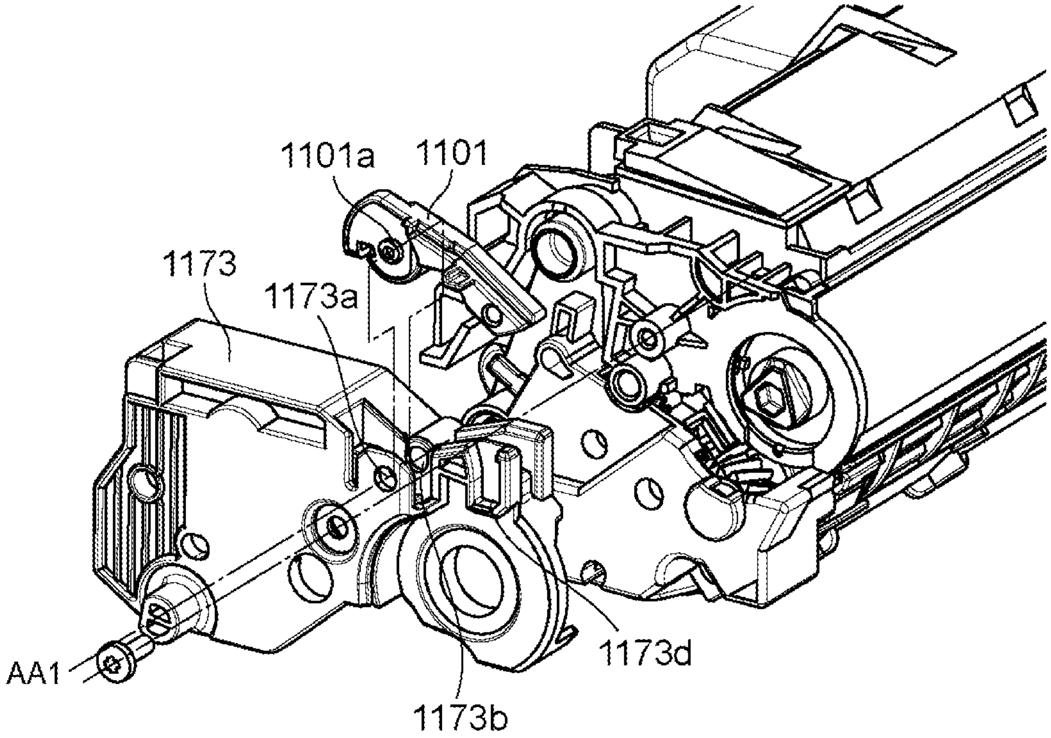
In FIG. 100, part (a) is a perspective view of the cartridge, and part (b) is a perspective view of the cartridge.
Figure 100:
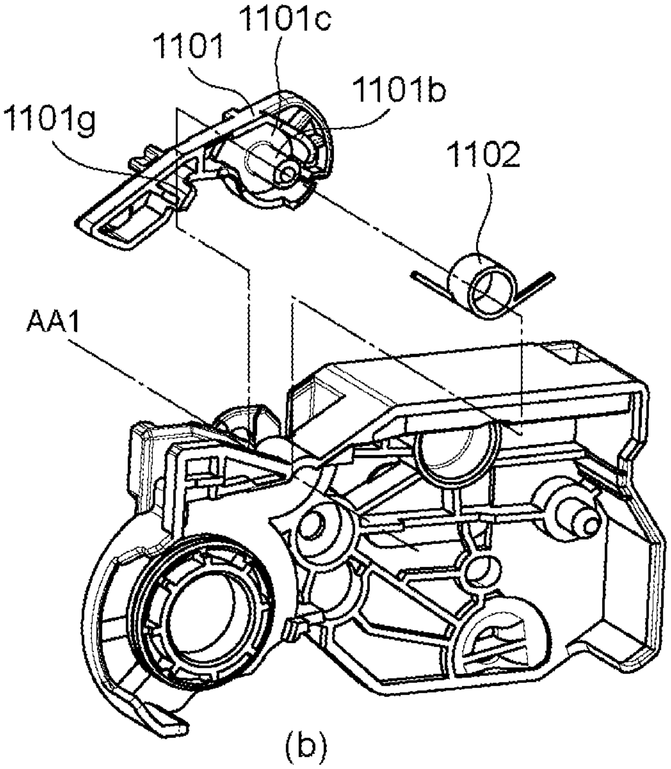
Figure 101:
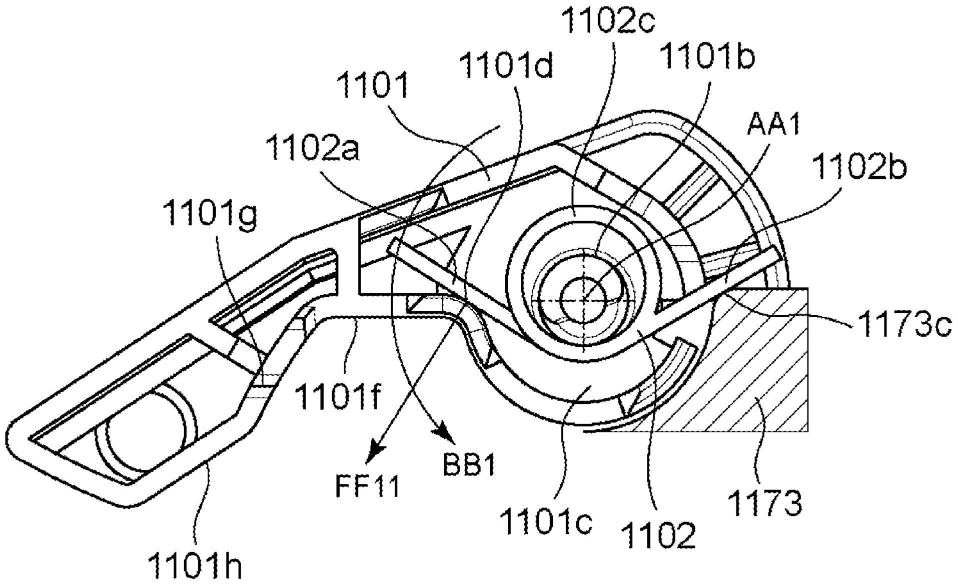
In FIG. 101, parts (a) and (b), show a control member.
Figure 101:
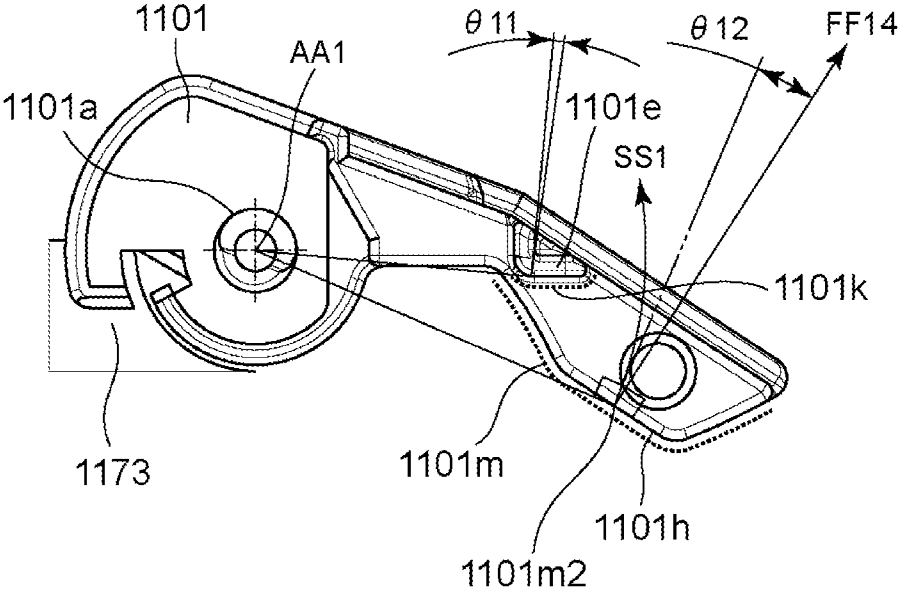
Figure 102:
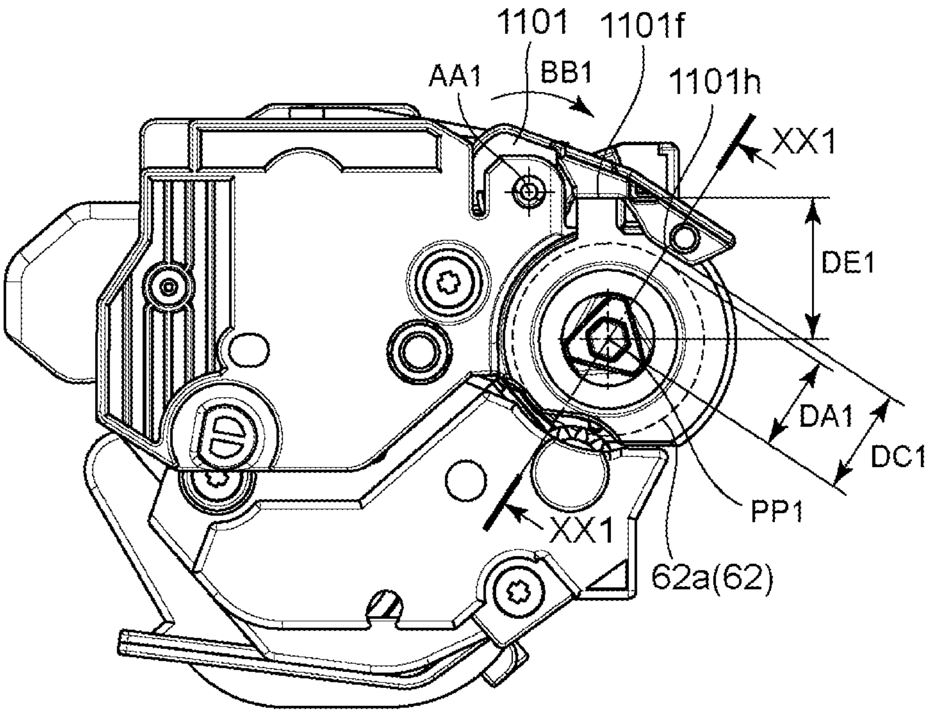
FIG. 102, parts (a) and (b), are side views of the cartridge.
Figure 102:
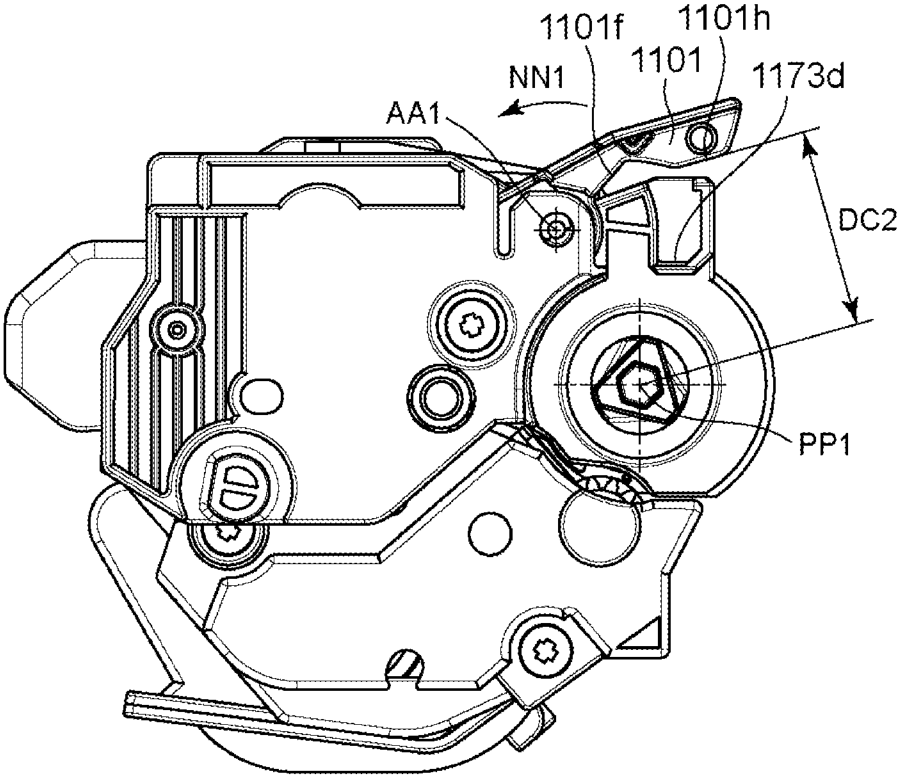
Figure 103:
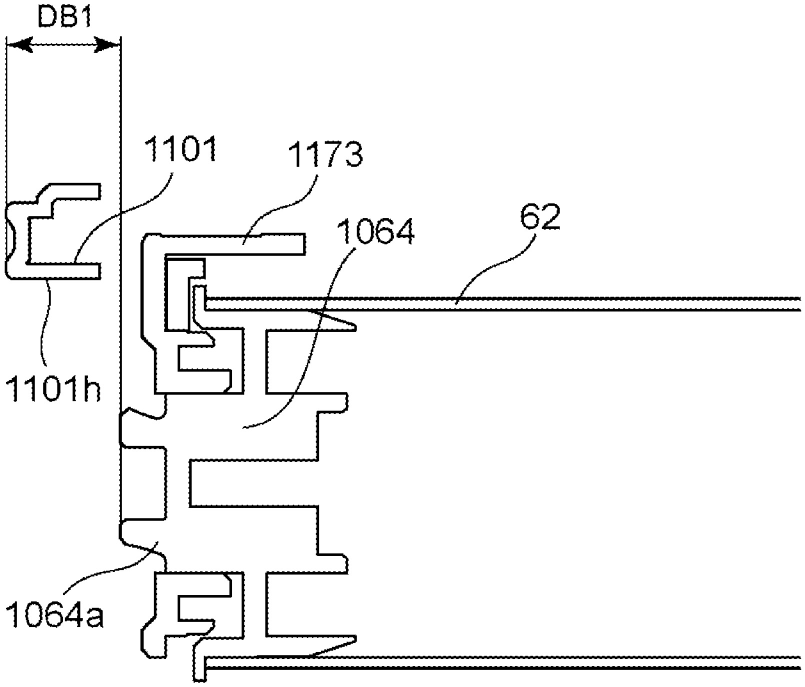
In FIG. 103, part (a) is a cross-sectional view of the cartridge illustrating the positional relationship of the control members, and part (b) is an illustration of an arrangement of the control member In FIG. 104, part (a) is a side view of the cartridge, and part (b) is a view illustrating the cartridge and the drive transmission member as viewed from the front side.
Figure 103:
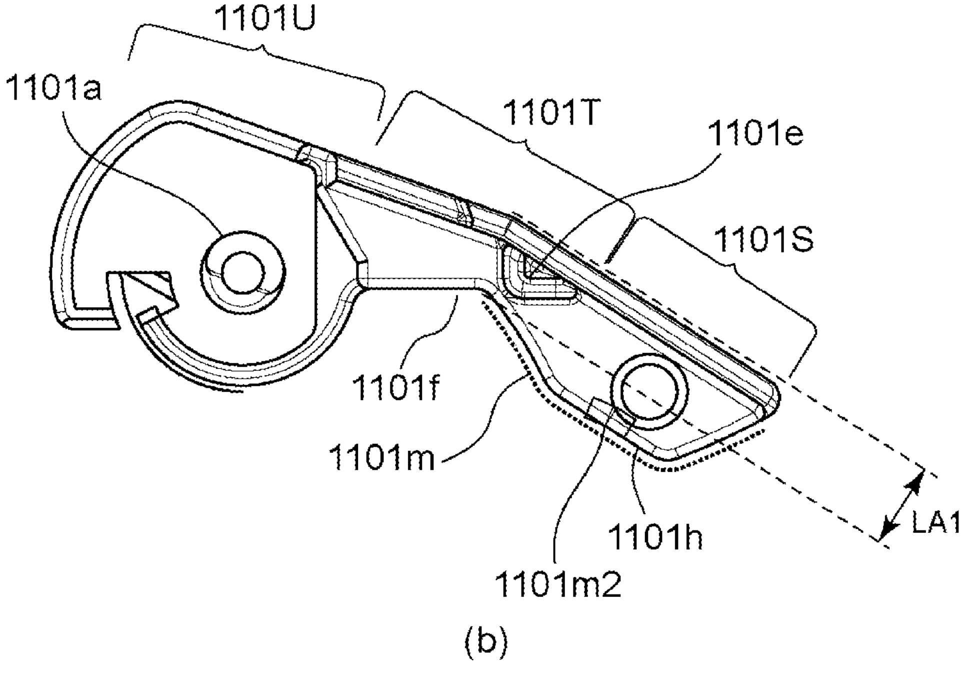

Referring first to FIGS. 99 to 103, a structure of the control member 1101 will be described. FIG. 99 is a perspective view illustrating an outer appearance of a cartridge according to this embodiment. Parts (a) and (b) of FIG. 100 are exploded perspective views of the cartridge according to this embodiment. FIG. 101 is a side view illustrating the support structure of the control member 1101 and the urging spring 1102 in the cartridge according to this embodiment. FIG. 102 is a side view of the cartridge according to this embodiment. Part (a) of FIG. 103 is a sectional view of the cartridge according to this embodiment taken along the line XX1 in part (a) of FIG. 102.

As shown in part (a) of FIG. 99, the drum bearing 1173 is integrally fixed to the cleaning frame 1171 by screws 1107. The drum bearing 1173 and the cleaning frame 1171 constitute parts of the cartridge frame. In particular, the drum bearing 1173 and the cleaning frame 1171 are frames that form the cleaning unit 60 (FIG. 4). The control member 1101 which is a member for controlling the attitude of the drive transmission member 1081 (FIG. 92) is mounted to the drum bearing 1173 rotatably about the axis AA1 and urged in the arrow BB1 direction, by the structure described below. Part (b) of FIG. 99 shows a state in which the control member 1101 has been rotated in the direction of arrow NN1 which is the opposite direction of arrow BB1 from the state of part (a) of FIG. 99.

As shown in parts (a) and (b) of FIG. 100, also in this embodiment, similar to the ninth embodiment, the control member (movable member) 1101 is provided on the driving side of the cartridge (the side on which the coupling member is arranged). The control member 1101 is provided with a shaft portion 1101*a* and a shaft portion 1101*b*. The shaft portion 1101*a* and the shaft portion 1101*b* are arranged coaxially. On the other hand, the drum bearing 1173 is coaxially provided with a hole 1173*a* and a hole 1173*b*, and the hole 1173*a* rotatably supports the shaft 1101*a* and the hole 1173*b* rotatably supports the shaft 1101*b* on the axis AA1. An urging spring 1102, which is a torsion coil spring, is mounted to the inside 1101*c* of the control member 1101. As shown in part (a) of FIG. 101, the coil portion 1102*c* of the urging member 1102 is inserted in the shaft portion 1101*b* of the control member 1101, and one end 1102*a* of the urging spring 1102 contacts to the pressed portion 1101*d* of the control member 1101. The other end 1102*b* of the urging spring is in contact with the contacted portion 1173*c* of the drum bearing 1173. Therefore, the control member 1101 receives the urging force FF11 from the urging spring 1102 in the pressed portion 1101*d*, and is urged in the arrow BB1 direction with respect to the drum bearing 1173. In addition, as shown in part (b) of FIG. 101, the control member 1101 is provided with a guided portion rib 1101*e* (projecting portion). The guided portion rib 1101*e* is a projecting portion which projects outward in the axial direction of the photosensitive drum, and is a portion which constitutes a guide portion (control member side guide portion).

On the other hand, as shown in FIG. 99, the drum bearing 1173 is provided with a control member contact portion 1173*d* which defines a rotation range of the control member 1101. The control member 1101 is urged in the direction of arrow BB1 by the urging spring 1102, and therefore, the contacted portion 1101g (part (b) of FIG. 100) of the control member 1101 contacts the control member contacting portion (stop portion) 1173*d*. The attitude of the control member 1101 at this time is a normal attitude relative to the drum bearing 1173. Part (a) of FIG. 102 shows the cartridge as viewed in an arrow HH1 direction parallel to the axis PP1 of the drum 62 (part (a) of FIG. 99).

In the normal attitude as described above, in which the contacted portion 1101g contacts the control member 1173*d*, as shown in part (a) of FIG. 102, the urging portion 1101*h* is disposed in the neighborhood of the surface 62*a* of the drum 62, as viewed along the axis PP1 of the drum 62. This is a state in which the control member 1101 takes the acting position.

At this time, the restricting portion 1101*h* is set to be positioned at a distance DC1 with respect to the axis PP1 of the drum 62. In this embodiment, the distance DC1 is set so as to satisfy the relationship of $DC1<DA1\times1.2$ with respect to the radius DA1 of the drum. DC1 is less than 1.2 times the radius of the drum. The acting position of the control member 1101 is the position for the control member 1101 to act on the drive transmission member, as in embodiment 8 (details will be described hereinafter).

As described above, the control member 1101 is at rest by the stop portion 1173*d* in the state in which the control member 1101 is located at the acting position shown in part (a) of FIG. 102 and the restricting portion 1101*h* is located near the peripheral surface of the drum 62. However, the present invention is not necessarily limited to such a structure. That is, a structure in which the control member 1101 does not stop at the acting position and the restricting portion 1101*h* can move closer to the axis of the drum 62 than in the state shown in part (a) of FIG. 102. It will suffice if an acting position and a non-acting position (retracted position) are included as described hereinafter are in the moving range of the control member 1101, and the control member 1101 may not stop at the acting position.

As shown in part (a) of FIG. 103, the restricting portion 1101*h* of the control member 1101 is disposed at the position of a distance DB1 on the outer side in the longitudinal direction (left side in the drawing) with respect to the driven transmission portion 1064*a* of the coupling member 1064. In this embodiment, the entire control member 1101 is located outside the free end of the coupling member 1064 in the longitudinal direction.

In addition, when the control member 1101 is located at the acting position, the control member 1101 is disposed at a position not to interfere with the image forming process performed on the surface of the photosensitive drum 62. The control member 1101 does not cover the image forming area of the photosensitive member drum 62 or contact the image forming area.

In addition, as shown in FIG. 102, the control member 1101 is provided with a retracted portion (recess) 1101*f* at a position of a distance DE1 with respect to the axis PP1. Here, the distance DE1 and the distance DC1 have a relationship of $DE1>DC1$. The retracted portion 1101*f* is a recessed portion (small width portion) which is recessed so as to reduce the width of the control member 1101, and when the control member 1101 is located at the acting position, it is recessed away from the axis PP1 of the photosensitive drum.

In addition, as shown in part (b) of FIG. 102, when an external force is applied to the control member 1101, the control member 1101 can rotate in the arrow NN1 direction about the axis AA1 against the urging force FF11 of the urging spring 1102. In this state, the contacted portion 1101*g* of the control member 1101 is spaced from the control member contacting portion 1173*d*. That is, the control member 1101 can rotate in the direction of the arrow NN1 by a predetermined angle. At this time, the distance DC2 between the restricting portion 1101*h* of the control member 1101 and the rotation axis PP1 of the drum 62 satisfies $DC1<DC2$. The position where the control member 1101 is moved so that the restricting portion 1101*h* is separated from the axis PP1 of the drum 62 as in Embodiment 8 is called a non-acting position (retracted position) as in Embodiments 8 and 9. When the control member 1101 moves from the acting position to the non-acting position, the surface portion in the neighborhood of the free end of the control member 1101, that is, the restricting portion 1101*h*, is structured to move away from the axis line PP1 of the drum 62. Even when the control member 1101 receives an external force at an arbitrary location (area of a dotted line portion in the drawing) of the first guided portion 1101*k* and the second guided portion 1101*m* shown in part (b) of FIG. 101, the control member 1101 can smoothly move about the axis AA1. This is because the structure is such that the pressure angle θ11 at an arbitrary position of the first guided portion 1101*k* and the pressure angle θ12 at an arbitrary position of the second guided portion 1101*m* around the axis AA1 satisfy θ11<60° and θ12<60, respectively.

The first guided portion 1101*k* is a part of the guided rib 1101*e*, and the second guided portion 1101*m* is a portion including the restricting portion 1101*h*. These are guide portions (control member side guide parts) provided on the control member.

The pressure angle is one of the cam design parameters. The pressure angle θ12 of the control member 1101 will be described as an example. It is assumed that the cam (control member 1101) operates by receiving the external force FF14 at a point 1101*m*2. At this time, the pressure angle is formed between the tangent line of the locus SS1 (the locus of rotation around the axis AA1 in this embodiment) on which the point 1101*m*2 moves and the direction of the external force FF14 (that is, the normal direction of the surface where the point exists). Generally, the smaller the pressure angle, the smoother the cam can operate. In this embodiment, the pressure angle is set to be 60 degrees or less at any position of the second guided portion 1101*m* including the first guided portion 1101*k* and the restricting portion 1101*h*.

As shown in part (b) of FIG. 103, the control member 1101 includes a fixed end portion (first end portion) 1101U including a shaft portion 1101*a* and a shaft portion 1101*b*, a free end portion 1101S (free end portion, second end) having a restricting portion 1101*h*, and an intermediate portion T connecting the free end portion and the fixed end portion.

The guided rib 1101*e* is disposed at the intermediate portion of the control member 1101. The intermediate portion 1101U has the above-mentioned retracted portion 1101*f*, and the width of the intermediate portion 1101U is narrower in the retracted portion 1101*f*. That is, the retracted portion 1101*f* is a small width portion having a smaller width than the surroundings thereof. In part (b) of FIG. 103, the width of the retract portion 1101*f* is LA1, and the width of the control member 1101 becomes larger than LA1 when it is away from the retract portion 1101*f*. The maximum width of the fixed end portion 1101U and the maximum width of the free end portion 1101S are larger than the minimum width LA1 of the middle portion 1101U. As in Embodiment 9, the coupling member 1064 is integrally fixed on the drum 62 also in this embodiment. In addition, as shown in FIG. 99, the tooth surface 36*a* of the developing roller gear 36 is located on the outer side in the longitudinal direction with respect to the coupling member 1064, and the tooth surface 36*a* is exposed through the outer surface of the cartridge B.

Since the structure of the drive transmission member 1081 is the same as that of the ninth embodiment (FIGS. 90 to 92), the description thereof is omitted in this embodiment.

(Operation when CRG is Inserted)

Next, referring to FIGS. 104 to 107, a process of mounting the cartridge B on the apparatus main assembly A and an operation of the control member 1101 at that time will be described. FIGS. 104 to 107 are views illustrating a process in which the opening/closing door 13 is opened and the cartridge B is mounted to the main assembly A of the apparatus.

Figure 104:
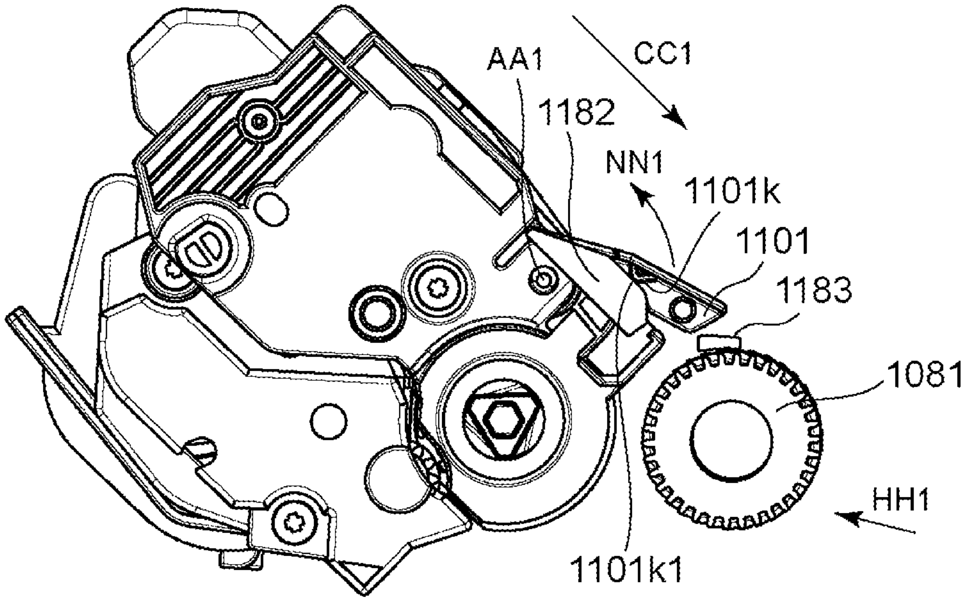
Figure 104:
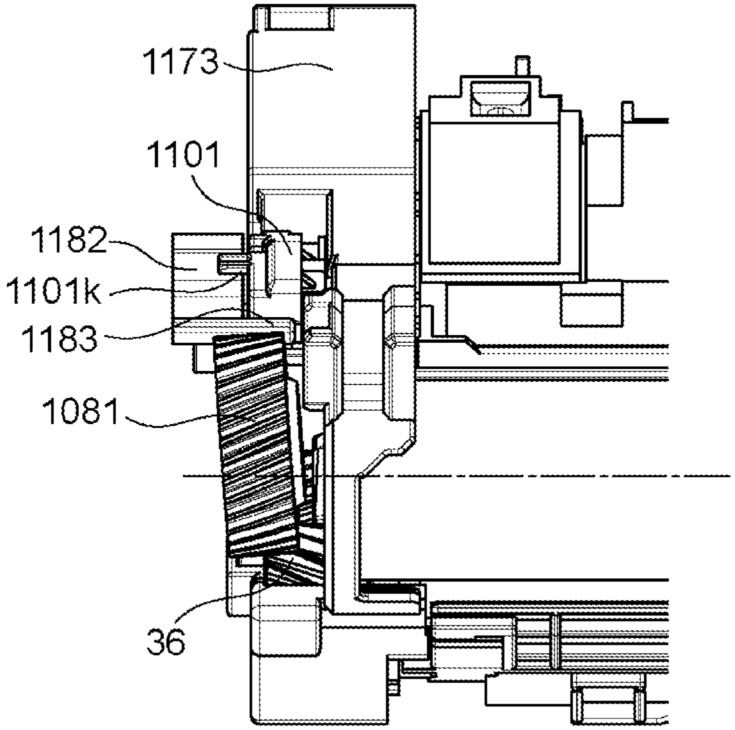

Part (a) of FIG. 104 is a side view at a predetermined timing before the cartridge B is mounted at the final mounting position in the process of mounting the cartridge B in the apparatus main assembly A. Part (b) of FIG. 104 is a view of the drive transmission member and the cartridge as viewed in the direction of arrow HH1 indicated in part (a) of FIG. 104. As shown in parts (a) and (b) of FIG. 104, when the cartridge B is mounted to the apparatus main assembly A in the direction of arrow CC1, the first guided portion 1101*k* of the control member 1101 is in contact with a first guide portion 1182 provided in the apparatus main assembly A at a point 1101*k*1. Therefore, the control member 1101 takes an attitude in which it has been rotated relative to the drum bearing 1173 from the normal attitude in the arrow NN1 direction about the axis AA1. Although the first guide portion 1182 is in contact only with the contact point 1101*k* of the first guided portion 1101*k* in FIG. 104, this is not limited to one specific point. In the mounting process, the contact point 1101*k*1 moves within the range of the first guided portion 1101*k* shown by the dotted line in part (b) of FIG. 101.

Figure 105:
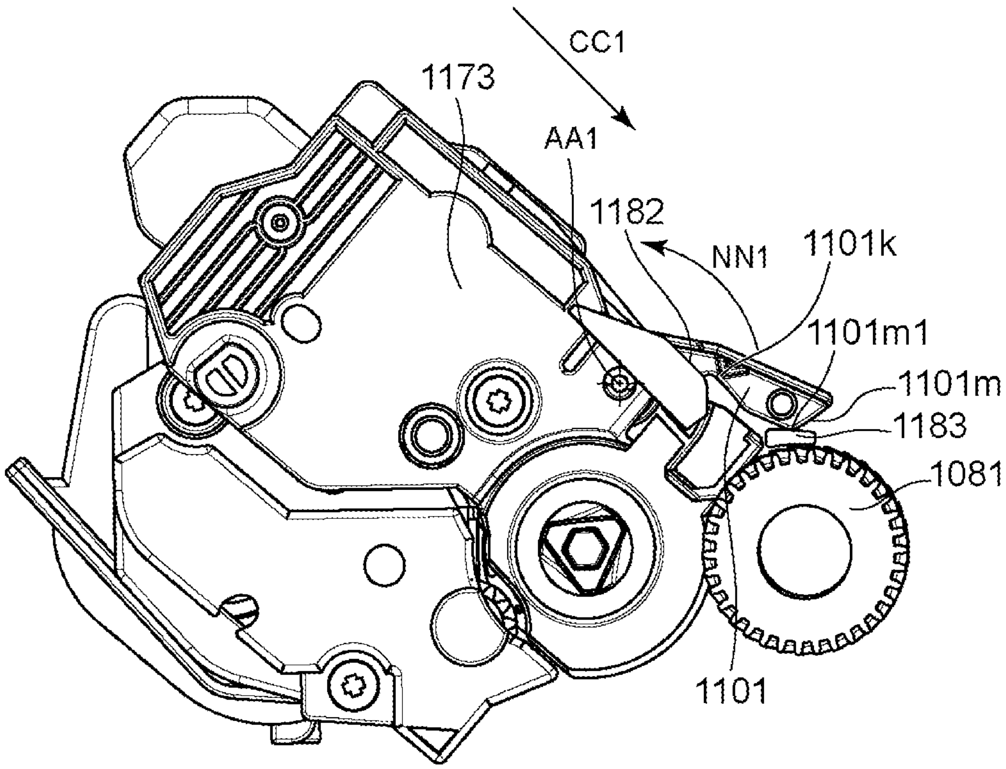
FIG. 105 is a side view of the cartridge.

When the cartridge B is further inserted in the direction of the arrow CC1 from here, a point 1101*m*1 in the second guided portion 1101*m* of the control member 1101 is brought into contact with a second guide portion 1183 provided in the neighborhood of the upper portion of the drive transmission member 1081 of the apparatus main assembly A as shown in FIG. 105. Therefore, as in the case of FIG. 104, the control member 1101 is in an attitude rotated from the normal attitude in the direction of arrow NN1. Similar to the point 1101*k*1, the contact point 1101*m*1 is not limited to one specific point, and moves in the second guided portion 1101*m* shown by the dotted line in part (b) of FIG. 101 during the mounting process. At this time, the first guided portion 1101*k* is spaced from the first guide 1182.

Figure 106:
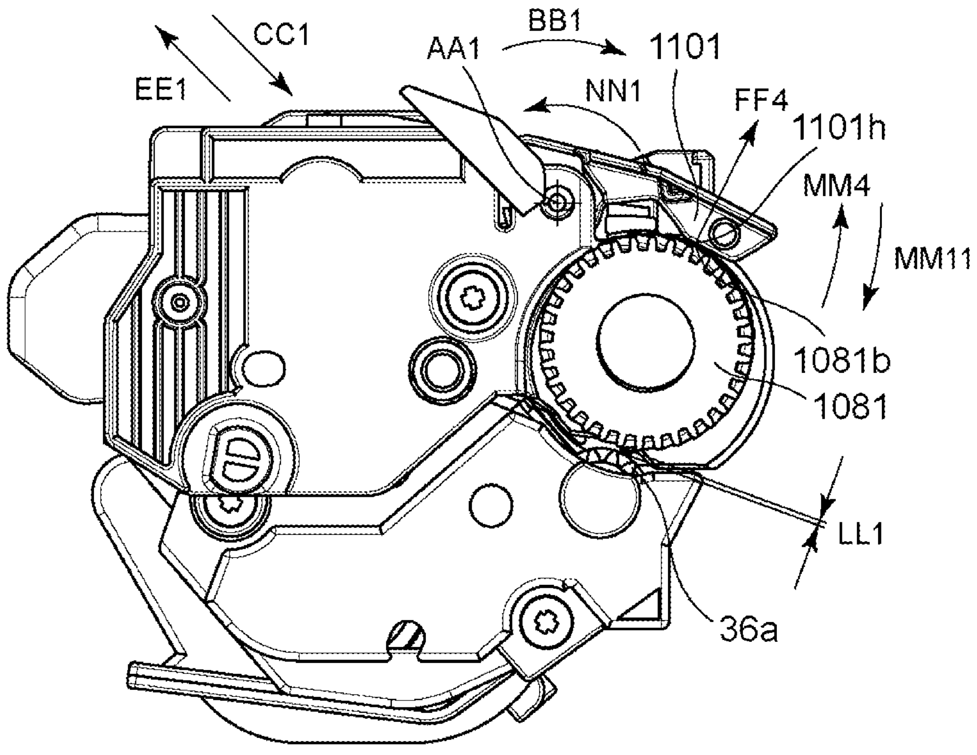
FIG. 106 is a side view of the cartridge.

The cartridge B is further inserted in the direction of arrow CC1 so that the cartridge B is mounted at the final mounting position which is the position at the time of printing operation. At this time, as shown in FIG. 106, the restricting portion 1101*h* of the control member 1101 is in contact with the gear portion 1081*b* of the drive transmission member 1081. Here, as described referring to FIG. 94 in the previous embodiment, the drive transmission member 1081 maintains the state of being inclined to the arrow VV direction. The control member 1101 receives the reaction force FF4 from the gear portion 1081*b* of the drive transmission member 1081 and the moment MM4 about the arrow NN1 by the reaction force FF4. At this time, the moment MM11 about the arrow BB1 by the urging force FF11 (part (a) of FIG. 101) which the control member 1101 receives from the urging spring 1102 and the moment MM4 by the reaction force FF4 satisfy MM11<MM4. Therefore, the control member 1101 is in an attitude rotated from the normal attitude against the urging force FF11 of the urging spring 1102 in the arrow NN1 direction about the axis AA1. As a result, the gear portion 1081*a* of the drive transmission member 1081 is spaced from the tooth surface 36*a* of the developing roller gear 36 with the gap LL1.

Figure 107:
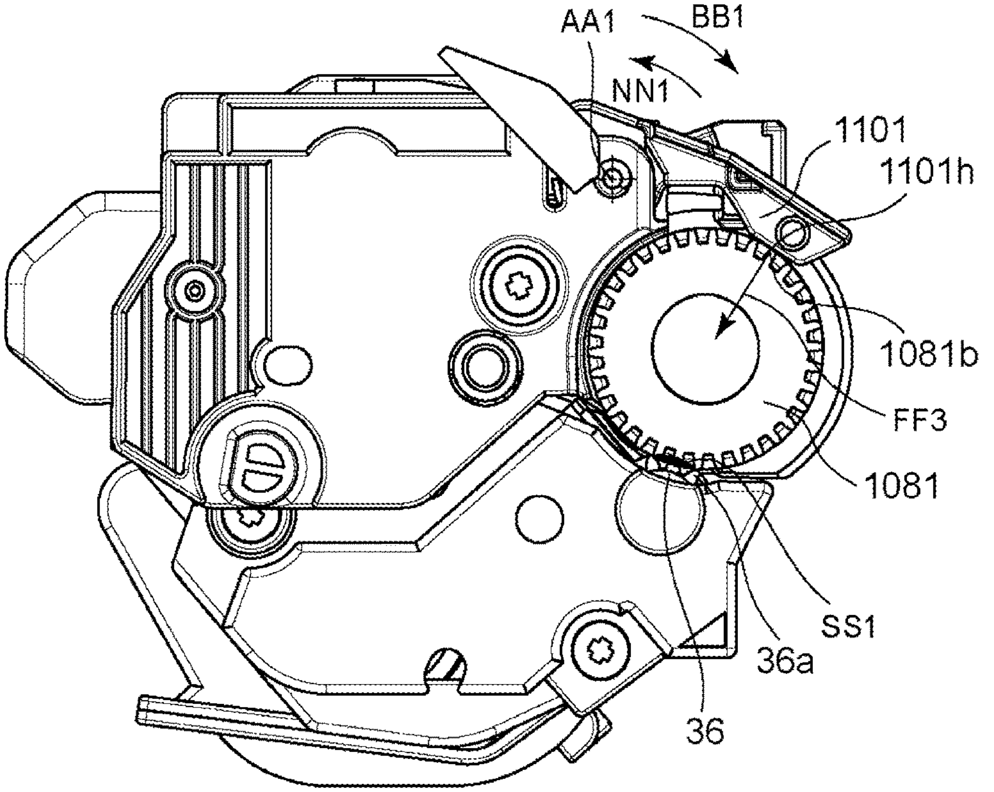
FIG. 107 is a side view of the cartridge.

When the opening/closing door 13 is closed here, the reaction force FF4 is reduced as in the structure described referring to FIG. 95 in the previous embodiment. By this, the moment MM11 about the arrow BB1 by the urging force FF11 received by the control member 1101 and the moment MM4 by the reaction force FF4 satisfy MM11>MM4. As a result, the control member 1101 rotates in the arrow BB1 direction about the axis AA1 as shown in FIG. 107. Then, the contacted portion 1101*g* of the control member 1101 abuts to the control member abutting portion 1173*d* of the drum bearing 1173, and the control member 1101 takes a normal attitude with respect to the drum bearing 1173. That is, the control member 1101 is placed in the acting position. At the same time, the drive transmission member 1081 rotates in the arrow WW direction shown in FIG. 95 by the contact force FF3 received from the restricting portion 1101*h* of the control member 1101, so that the inclination angle of the drive transmission member 1081 decreases. With this operation, the gear portion (output gear portion) 1081*a* of the drive transmission member 1081 and the tooth surface 36*a* of the developing roller gear (gear member) 36 mesh with each other in an area SS1. Alternatively, the meshing engagement therebetween is enabled. As described above, the acting position of the control member 1101 is a position for reducing the inclination angle of the drive transmission member 1081 by the control member 1101 so that the drive transmission member 1081 can be connected to the cartridge.

When the drive transmission member 1081 is driven in a state where the gear portion 1081*a* of the drive transmission member 1081 and the developing roller gear 36 can be brought into meshing engagement with each other, a force is applied such that the drive transmission member 1081 moves in the direction of arrow KK (part (a) of FIG. 96) as in the previous embodiment. This is a force generated by the engagement of the helical gears (the gear portion 81*a* and the gear 36). By this force, the drive transmission member 1081 moves in the arrow KK direction, and the drive transmission member 1081*a* and the driven transmission portion (driving force receiving portion) 1064*a* of the coupling member 1064 are engaged.

Figure 108:
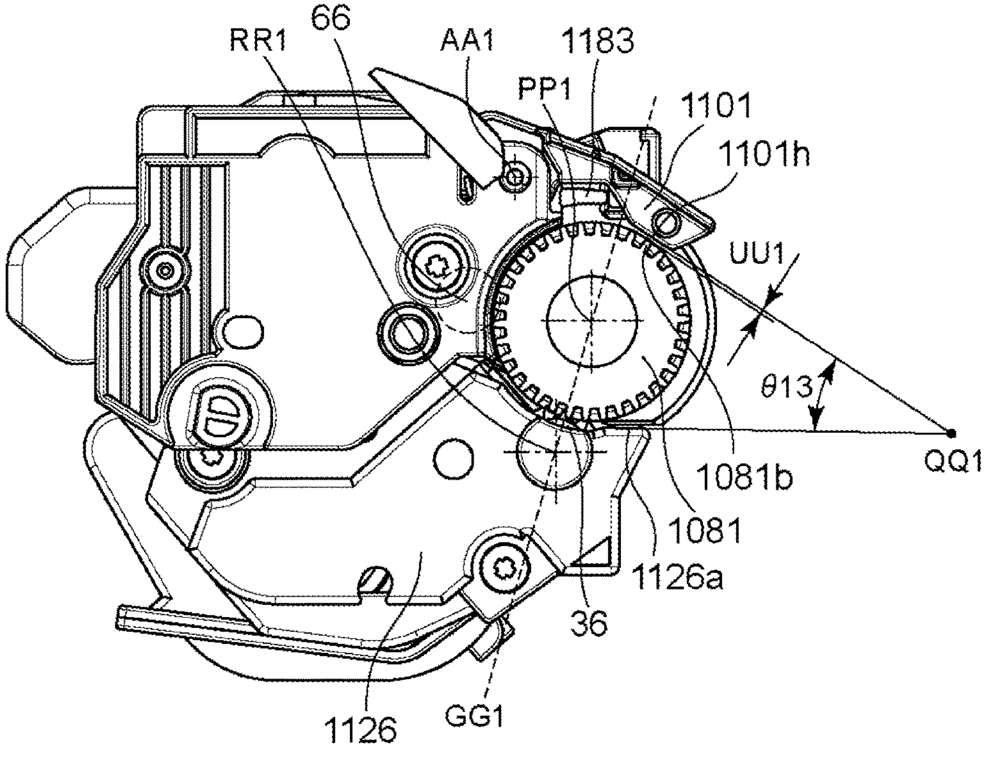
FIG. 108 is a side view of the cartridge.

At this time, the control member 1101 is in a normal attitude relative to the drum bearing 1173. By this, as shown in FIG. 108, in this state, the restricting portion 1101*h* of the control member 1101 does not contact the gear portion 1081*b* of the drive transmission member 1081, but there is a gap UU1 therebetween. This is preferable because the restricting portion 1101*h* does not affect the drive (rotation) of the drive transmission member 1081.

As described above, such a structure can be employed because when the control member 1101 is in the acting position (when the control member 1101 is in the normal attitude), the contacted portion 1101*g* of the control member 1101 (part (b) of FIG. 100) contacts the stop portion 1173*d* (part (a) of FIG. 100). That is, the stop portion 1173*d* stops the movement of the control member 1101 by contacting to the contacted portion 1101*g* so that the restricting portion 1101*h* is prevented from the contacting the drive transmission member 1081.

However, it is not always inevitable to have such a structure. If the stop portion 1173*d* is not provided or the position of the stop portion 1173*d* is different, the structure in which the movement of the control member 1101 is not stopped at the acting position is also conceivable. That is, it becomes possible for the restricting portion 1101*h* to come closer to the axis of the photosensitive drum than the position shown in FIG. 108. In such a structure, the drive transmission member 1081 effects of the driving operation in the state that the restricting portion 1101*h* is in contact with the drive transmission member 1081. That is, in this embodiment, the restricting portion 1101*h* of the control member 1101 comes close to the peripheral surface 62*a* of the photosensitive member drum 62 when it comes closest to the axis of the photosensitive member drum (FIG. 102 (*a*)). However, it is also possible to employ a structure in which the restricting portion 1101*h* can approach the axis of the drum 62 more than this extent.

In any case, if the control member 1101 can move at least until the restricting portion 1101*h* comes close to the peripheral surface of the photosensitive drum 62, the control member 1101 can urge the drive transmission member 1081 inclined by the restricting portion 1101*h* (FIG. 107). By this, the gear portion 1081*a* of the drive transmission member 1081 can be brought into meshing engagement with the gear 36 on the cartridge side. In this embodiment, when the restricting portion 1101*h* comes closest to the axis of the photosensitive drum 62, the distance DC1 from the restricting portion 1101*h* to the photosensitive drum axis is set to satisfy $DC1<DA1\times1.25$ with respect to the radius DA1 of the drum 62. In particular, in this embodiment, $DC1<DA1\times1.2$ is satisfied.

Here, the distance from the restricting portion 1101*h* to the axis of the photosensitive drum 62 is the shortest distance between them. That is, it is the distance measured from the restricting portion 1101*h* to the axis of the photosensitive member drum 62 along the direction perpendicular to the axis of the photosensitive member drum. As viewed along the axis of the photosensitive drum when the control member 1101 is in the acting position, the restricting portion 1101*h* is the portion of the control member 1101 closest to the outer peripheral surface of the drum 62.

The restricting portion 1101*h* is an acting portion which acts on the drive transmission member 1081. More specifically, the restricting portion 1101*h* is an urging portion which urges the drive transmission member 1081. When the control member 1101 is located at the acting position, the restricting portion 1101*h* faces the side where the axis of the photosensitive drum 62 is provided (FIG. 103).

Figure 109:
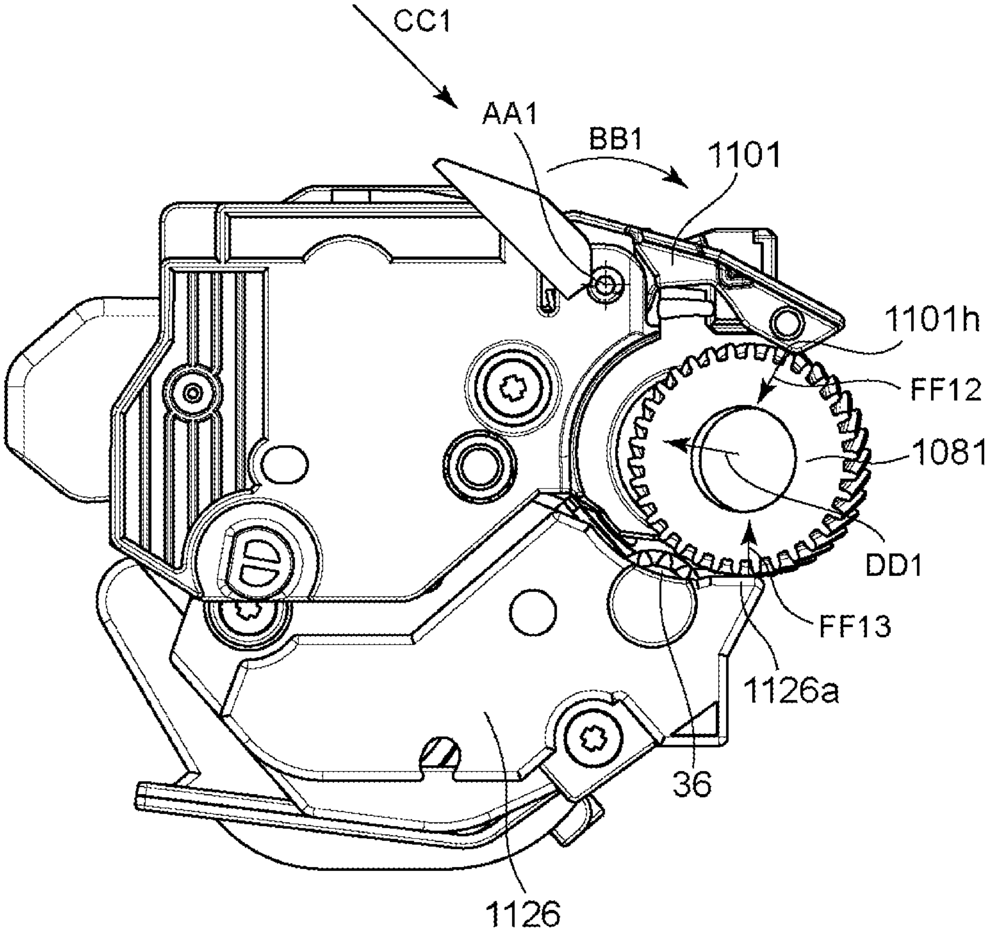
FIG. 109 is a side view of the cartridge.

Depending on the method of supporting the drive transmission member 1081 in the apparatus main assembly A, the drive transmission member 108 may be inclined to the downstream side of the mounting direction arrow CC1 as shown in FIG. 109 immediately after the opening/closing door 13 is closed. In such a case, it is likely that the drive transmission member 1081 does not mesh with the developing roller gear 36 and is sandwiched between the restricting portion 1101*h* of the control member 1101 and the contact portion 1126*a* provided on a side cover 1126. The contact portion 1126*a* is a facing portion (opposing surface) which faces the restricting portion 1101*h* when the control member 1101 is located at the acting position.

Here, as shown in FIG. 108, the arrangement is such that an intersection QQ1 between the tangent line of the contact portion 1126*a* and the tangent line of the restricting portion 1101*h* of the control member 1101 is on the opposite side of the charging roller 66 with respect to the straight line GG1 connecting the axis PP1 of the drum 62 and the axis RR1 of the developing roller gear 32. That is, by extending the tangent line of the contact portion 1126*a* and the tangent line of the restricting portion 1101*h* so as to be away from the charging member (charging roller 66), these two tangent lines intersect with each other.

Further, the angle θ13 formed by the tangent lines of the contact portion 1126*a* and the restricting portion 1101*h* is set to satisfy $\theta13>25°$. That is, θ13 is larger than 25 degrees.

At this time, as shown in FIG. 109, the control member 1101 is urged by the urging spring 1102 in the direction of arrow BB1, and therefore, the drive transmission member 1081 receives the contact force FF12 from the control member 1101. At the same time, the contact force FF13 is received from the contact portion 1126*a* of the side cover 1126. By these two abutting forces, the drive transmission member 1081 is pulled in the direction of the arrow DD1, the gear portion 1081*b* meshes with the tooth surface 36*a* of the developing roller gear 36, and the state shown in FIG. 107 is reached. That is, the drive transmission member 1081 is sandwiched between the control member 1101 and the abutting portion 1126*a* to reduce the inclination angle of the drive transmission member 1081 and to bring the drive transmission member 1081 closer to the developing roller gear and the coupling member 1064. The contact portion 1126*a* is a sandwiching portion for sandwiching the drive transmission member 1081 between itself and the control member 1101.

As described above, as a mechanism for reducing the inclination of the drive transmission member 1081, not only the movable control member 1101 but also a fixed contact portion 1126*a* may be further provided in the cartridge.

(CRG Removal)

Next, a process of taking out the cartridge B from the apparatus main assembly A will be described. Similar to the previous embodiment, this step is the reverse of the step of mounting the cartridge B in the main assembly A of the apparatus. When the image formation is completed, the drive transmission member 1081 is in the states shown in part (a) of FIGS. 96 and 109. When the opening/closing door 13 is opened here, the drive transmission member 1081 is inclined in the arrow VV direction (part (a) of FIG. 94) with the same structure as that of the previous embodiment, and the states shown in parts (a) of FIGS. 94 and 106 are reached. That is, the drive transmission member 1081 is inclined. By this, the gear portion 1081*b* of the drive transmission member 1081 and the tooth surface 36*a* of the developing roller gear 36 are spaced by the gap LL1. The meshing engagement between the gear portion 1081*b* and the developing roller gear 36 is broken, and therefore, the cartridge can be removed from the image forming apparatus main assembly with a light load.

When the cartridge B is taken out in the direction of the arrow EE1 which is the opposite direction of the arrow CC1 from here, the cartridge B is removed while maintaining the state that the gear portion 1081*b* and the tooth surface 36*a* are not in contact with each other, by way the states of FIG. 105 and then FIG. 104, and it can be completely taken out from the apparatus main assembly A.

In FIG. 106, the control member 1101 is retracted from the acting position to the nonacting position so as to allow the drive transmission member 1081 to incline. That is, the control member 1101 is moved so that the restricting portion 1101*h* of the control member 1101 is moved away from the axis of the photosensitive member drum 62. In this embodiment, the distance DC2 (part (b) of FIG. 102) from the restricting portion 1101*h* to the axis of the drum 62 when the control member 1101 is moved to the non-acting position is set to satisfy DC2>1.25×DA1. By moving the control member 1101 to the non-acting position, DC2 is larger than 1.25 times the radius of the drum 62. This is to allow the drive transmission member 1081 to incline.

However, the control member 1101 of this embodiment employs a structure in which the movable range of the restricting portion 1011*h* is larger than this condition. That is, the control member 1101 can make the restricting portion 1011*h* further distant from the axis of the photosensitive member drum when the control member 1101 is located at the non-acting position (retracted position). This is because, as shown in part (a) of FIG. 104 and part (b) of FIG. 105 (*b*), the control member 1101 is guided by the main assembly side guide (first guide portion 1182 and second guide portion 1183) to move largely when the cartridge is mounted or dismounted. By making the surface portion (restricting portion 1101*h*) in the neighborhood of the free end of the control member 1101 far away from the axis of the photosensitive drum, the control member 1101 can pass above the drive transmission member 1081 when the cartridge is mounted and dismounted.

In order for the guide portions (first guided portion 1101*k*, second guided portion 1101*m*) of the control member 1101 to be smoothly guided by the main assembly side guides (1182, 1183), in this manner, this embodiment further satisfies the following condition. The control member 1101 is allowed to move such that the distance DC2 from the restricting portion 1101*h* of the control member 1101 to the axis of the drum 62 satisfies "DC2>1.5×DA1" with respect to the radius DA1 of the drum 62. The control member 1101 can be moved to a nonacting position (retracted position) such that DC2 becomes larger than 1.5 times the radius of the drum 62. Particularly, in this embodiment, DC2>2×DA1 is satisfied.

In this embodiment, the drive transmission member 1081 is moved in the arrow KK direction shown in FIG. 94 by engaging with the developing roller gear 36 provided on the developing roller 32. However, as described above, the gear member on the cartridge side for meshing with the drive transmission member 1081 does not necessarily have to be provided on the developing roller 32 (FIG. 91).

Figure 110:
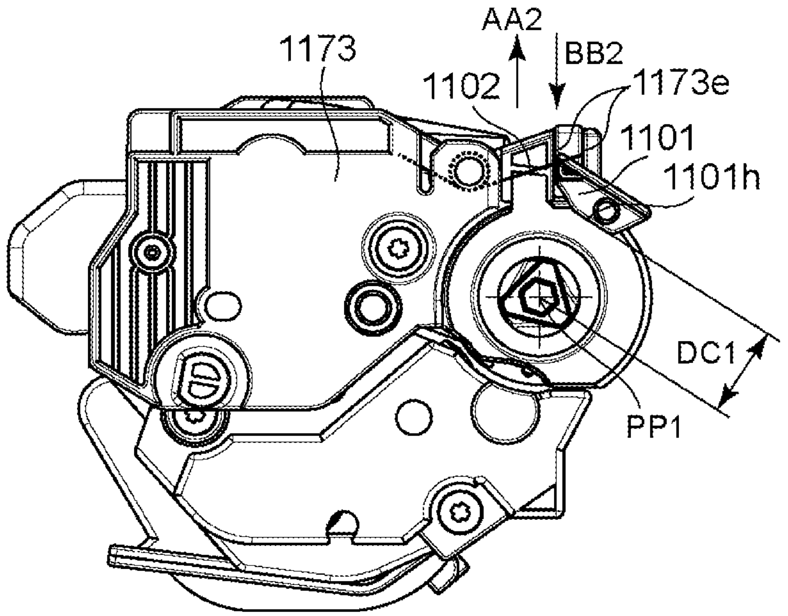
In FIG. 110, part (a) and part (b) are side views of the cartridge.
Figure 110:
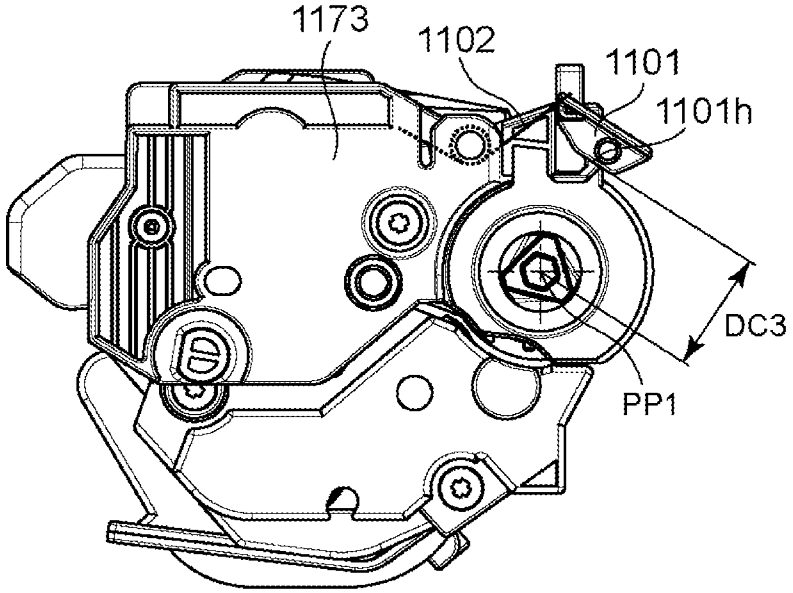

In addition, although the structure in which the control member 1101 rotates about the axis AA1 has been described in this embodiment, this structure is not inevitable. For example, as shown in FIG. 110, the control member 1101 urged in the direction of arrow BB2 by the urging spring 1102 supported by the drum bearing 1173 may slide in the direction of arrow AA2 along the guide rail 1173*e*. In this structure, the distance DC1 between the restricting portion 1101*h* in the normal attitude shown in part (a) of FIG. 110 and the axis PP1 of the drum 62, and the distance DC3 between the restricting portion 1101*h* in the attitude in which the control member 1101 shown in part (b) of FIG. 110 has slid in the direction of arrow AA2 and the axis PP1 satisfy DC1<DC3. Therefore, it is possible to obtain the same effect as the structure in which the control member 1101 described above is rotatable about the axis AA1.

Embodiment 11

Figure 111:
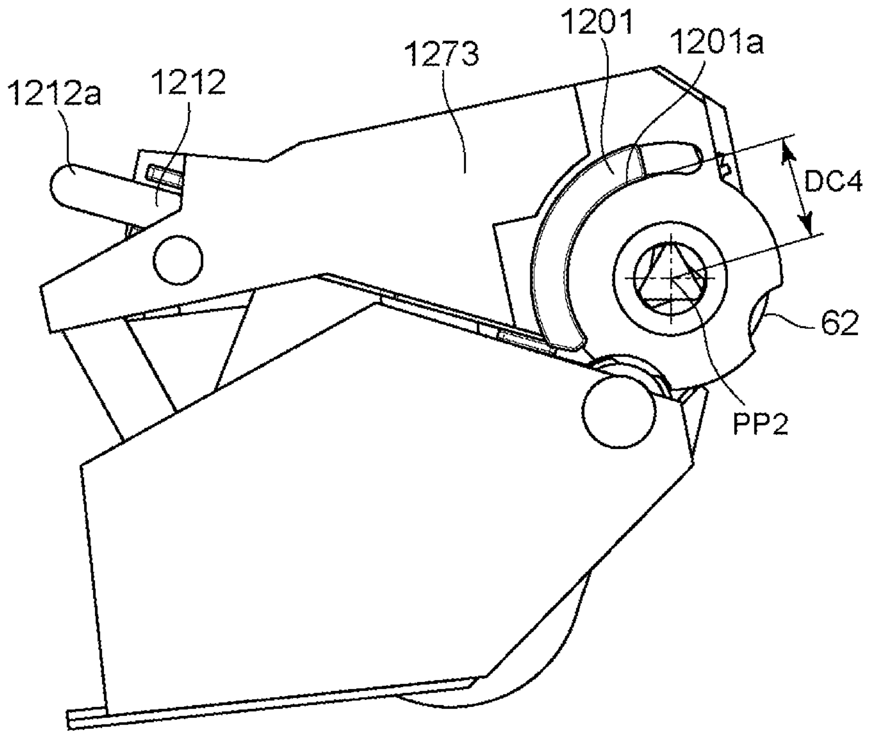
FIG. 111 is a side view of the cartridge.

In the above-described embodiment, the structure in which the distance DC1 between the restricting portion 1101*h* provided on the control member 1101 and the axis PP1 of the drum 62 changes as shown in FIG. 102 has been described. In this embodiment, as shown in FIG. 111, a structure in which the control member 1201 is rotatable around the axis PP2 of the drum 62 will be described. With the structure of this embodiment, even if the distance DC4 between the restricting portion 1201*a* of the control member 1201 and the axis line PP2 does not change, it is possible to obtain the same effect as the above-described embodiment.

Figure 112:
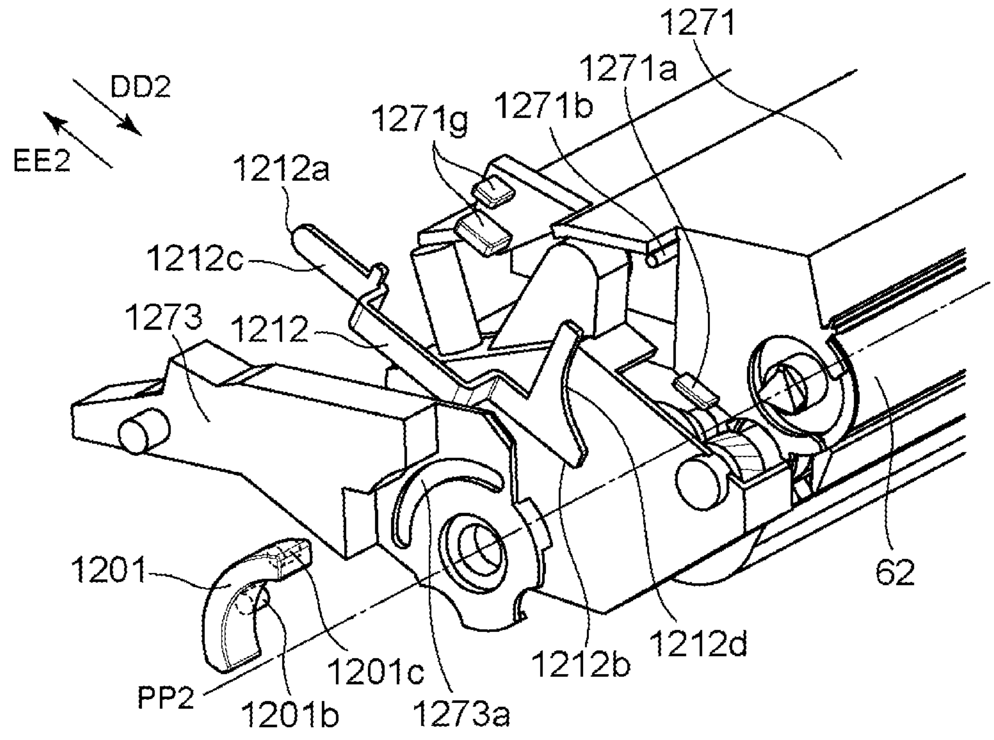
In FIG. 112, part (a) is an exploded perspective view of the cartridge, and part (b) is a perspective view of the cartridge.
Figure 112:
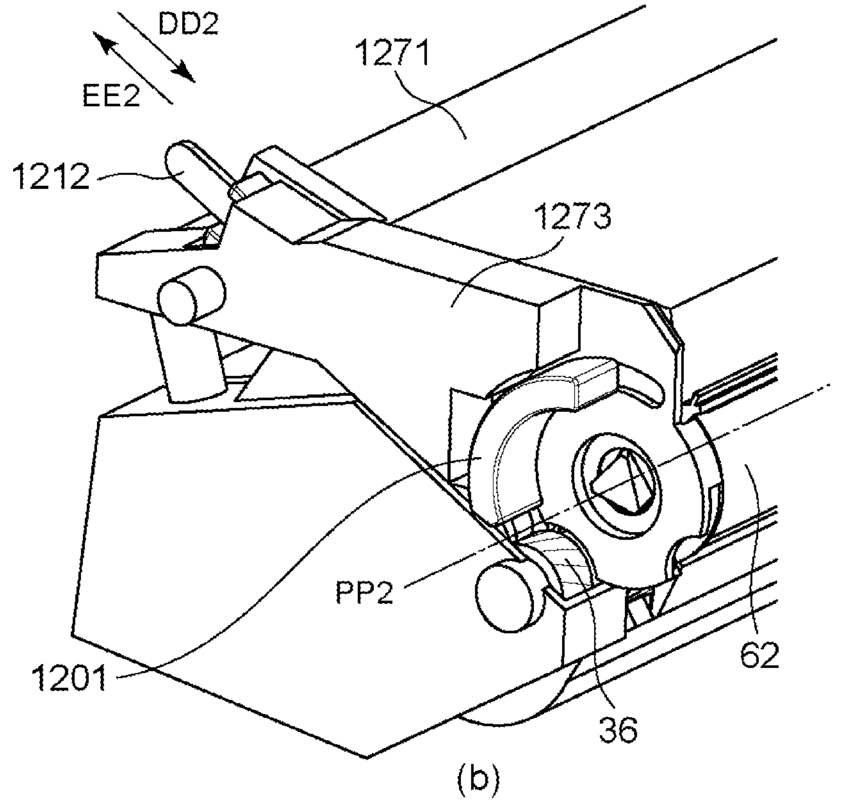

Part (a) of FIG. 112 is an exploded perspective view of the cartridge according to this embodiment. FIG. 112(*b*) is a perspective view of the cartridge according to this embodiment.

As shown in part (a) of FIG. 112, the control member 1201 has a C-shape (arc shape), and the coupling member and the control member 1201 are disposed on the same side (driving side) lateral surface of the cartridge in the axial direction of the photosensitive member. The control member 1201 is a projecting portion arranged so as to project from the side surface of the cartridge.

The control member 1201 is provided with a first boss 1201*a* and a second boss 1201*b*. On the other hand, the drum bearing 1273 is provided with an arc-shaped slit 1273*a* centered on the axis PP2 of the drum 62. The first boss 1201*b* and the second boss 1201*c* of the control member 1201 are inserted into this slit 1273*a*. Therefore, as shown in part (b) of FIG. 112, the control member 1201 is supported by the drum bearing 1273 so as to be rotatable about the axis PP2.

On the other hand, the cleaning frame 1271 is provided with a guide rib 1271*a* and a pair of slide ribs 1271*g*. In the lever member 1212 provided with the cam surface 1212*d*, the guided portion 1212*b* is supported by the guide rib 1271*a*, and the end portion 1212*c* is arranged between the slide rib pair 1271*g*. Therefore, the lever member 1212 can slide relative to the cleaning frame 1271 in the arrow DD2 direction and the arrow EE2 direction.

Figure 113:
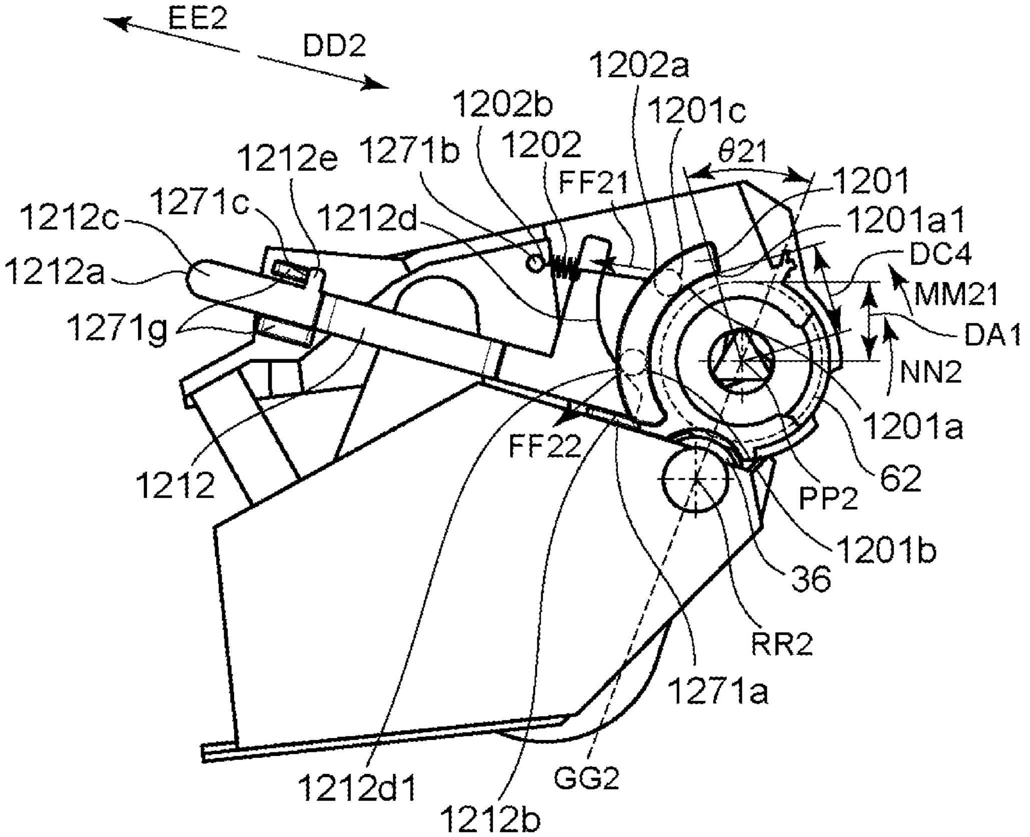
In FIG. 113, part (a) and part (b) are side views of the cartridge.
Figure 113:
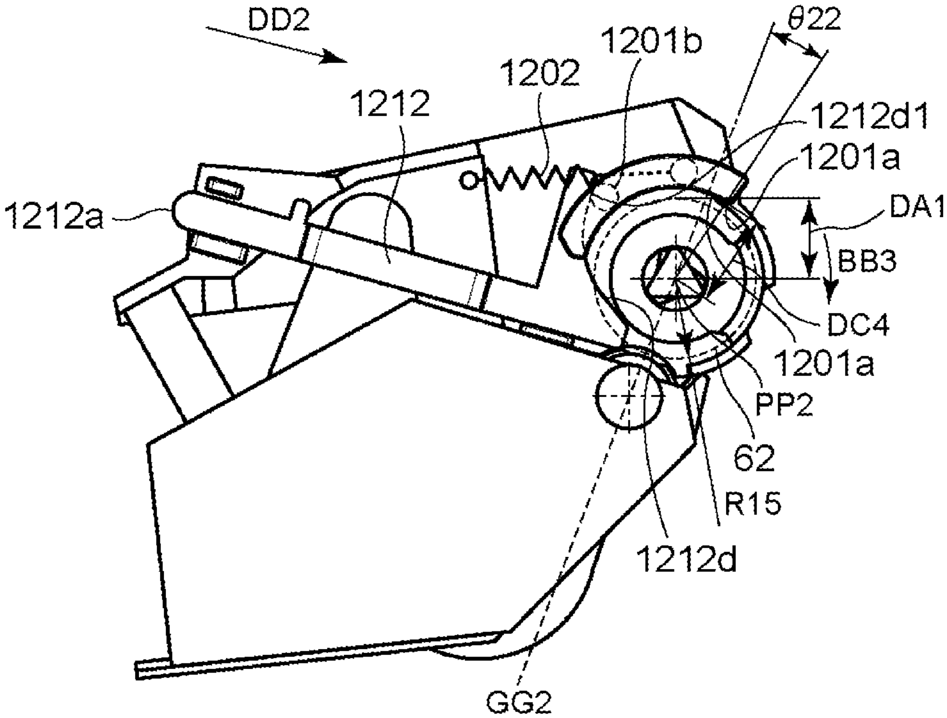

FIG. 113 is a side view in which the drum bearing 1273 is omitted for better illustration. Part (a) of FIG. 113 shows a state in which the control member (movable member) 1201 is at the non-acting position (retracted position), and part (b) of FIG. 113 shows a state in which the control member 1201 is at the acting position.

As shown in part (a) of FIG. 113, one end 1202*a* of an urging spring 1202, which is a tension spring, is mounted to the second boss 1201*c* of the control member 1201, and the control member 1201 receives the urging force FF21 from the urging spring 1202. Therefore, the control member 1201 receives moment MM21 in the direction of an arrow NN2 about the axis PP2 by the urging force FF21. As a result, the first boss 1201*b* contacts at the contact point 1212*d*1 of the cam surface 1212*d* of the lever member 1212. At the contact 1212*d*1, the lever member 1212 receives the contact force FF22 from the first boss 1201*b*, so that the lever member 1212 slides in the direction of arrow EE2, which is the opposite direction of arrow DD2, and the abutting portion 1212*e* abuts to the abutting portion 1271*cv* of the cleaning frame 1271*m*, by which the position is determined. The other end 1202*b* of the urging spring 1202 is mounted to the spring hooking portion 1271*b* of the cleaning frame 1271.

The surface of the control member 1201 facing the axis of the photosensitive member drum is a restricting portion (acting portion, urging portion) 1201*a* in this embodiment. The restricting portion 1201*a* in this embodiment is also a portion that regulates the inclination angle of the drive transmission member 1081 similarly to the restricting portion 1101*h* (FIG. 106) in the Embodiment 10.

The end portion 1201*a*1 of the restricting portion 1201*a* of the control member 1201 is located at a position of an angle θ21 in the direction of the arrow NN2 about the axis PP2 with respect to the straight line GG2 connecting the axis PP2 of the drum 62 and the axis RR2 of the developing roller gear. The arrow NN is the same direction as the rotational direction of the photosensitive drum (arrow R in FIG. 3) during image formation. In this embodiment, the angle θ21 is selected to satisfy θ21>20°. In other words, when an angle is measured from the straight line GG2 to the end 1201*a*1 of the restricting portion 1201*a* about the axis PP2 of the drum 62, the angle is smaller than 160 degrees.

That is, the end portion 1201*a* of the control member 1201 is within a range smaller than 160 degrees from the straight line GG2 toward the upstream side in the rotational direction of the drum 62 (the direction opposite to the arrow NN2). The axis RR2 of the developing roller gear is also the axis of the developing roller 32 (FIG. 91). Here, when the pressed portion 1212*a* of the lever member (operation member) 1212 is pressed in the arrow DD2 direction by an external force, the lever member 1212 slides in the arrow DD2 direction as shown in part (b) of FIG. 113. The first boss 1201*a* of the control member 1201 is in contact with the cam surface 1212*d* of the lever member 1212, and therefore, the contact point 1212*d*1 with the first boss 1201*b* moves following the cam surface 1212*d* in interrelation with the sliding of the lever member 1212. As a result, the control member 1201 rotates about the axis PP2 in the direction of arrow BB3. The end portion 1201*a*1 of the restriction surface 1201*a* is positioned at an angle θ22 in the direction of arrow BB3 with respect to the straight line GG2. The arrow BB3 direction is opposite to the rotational direction R (FIG. 3) of the photosensitive drum during image formation. The angle θ22 is preferably θ22>10°.

That is, the end 1201*a* of the control member 1201 moves from the straight line GG2 toward the upstream side in the rotational direction of the drum 62 to a position exceeding 190 degrees. At this time, the restricting portion 1201*a* of the control member 1201 draws an arcuate locus about the axis PP2, so that the distance DC4 between the restricting portion 1201*a* and the axis PP2 does not change even when the lever member 1212 is operated. Or, even if the distance changes, the amount of the change is small.

Although DC4 is slightly larger than the radius of the photosensitive drum, the inner surface of the control member 1201 is located in the neighborhood of the peripheral surface of the photosensitive drum 1 as viewed along the axis of the photosensitive drum. That is, as viewed along the axis of the photosensitive drum 1, the control member 1201 moves in the neighborhood of the outer peripheral surface of the photosensitive drum 1 along the outer peripheral surface of the photosensitive drum 1. The control member 1201 is structured to cross the straight line GG2 when the control member 1201 moves from the non-acting position (part (a) of FIG. 113) to the acting position (part (b) of FIG. 113).

Figure 114:
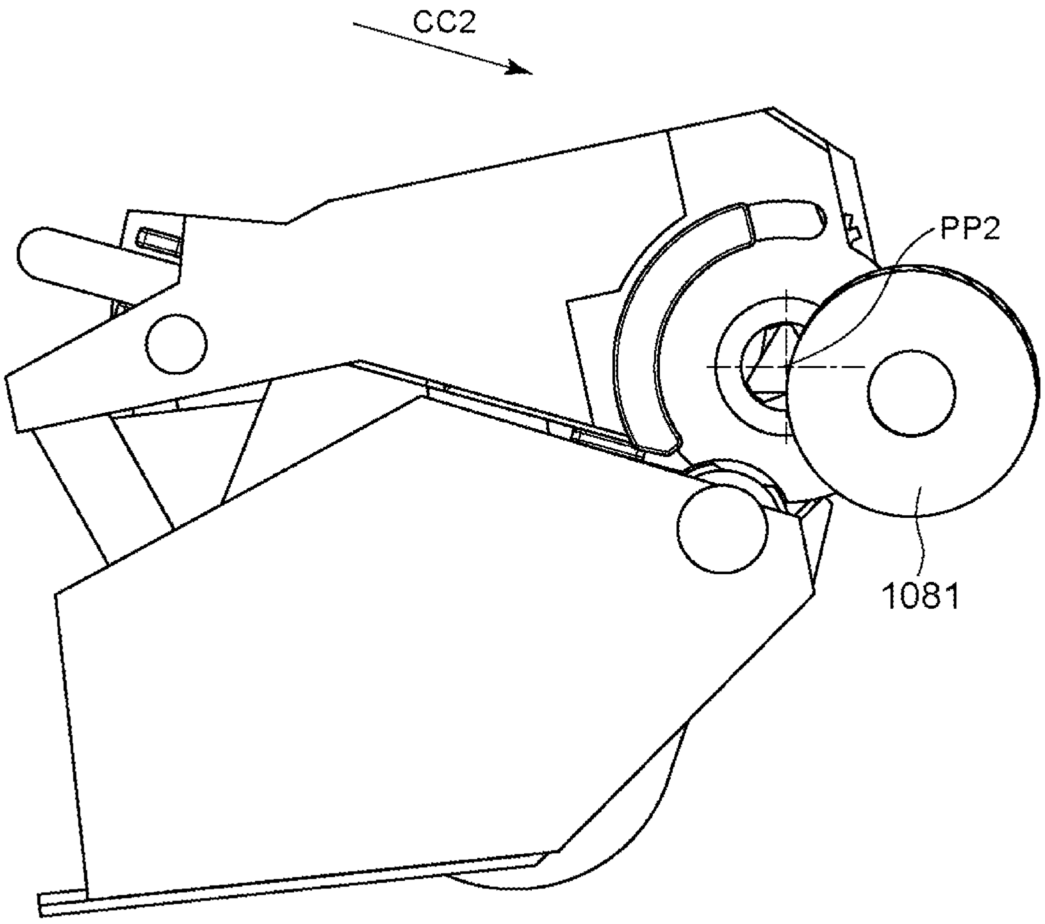
FIG. 114 is a side view of the cartridge.
Figure 115:
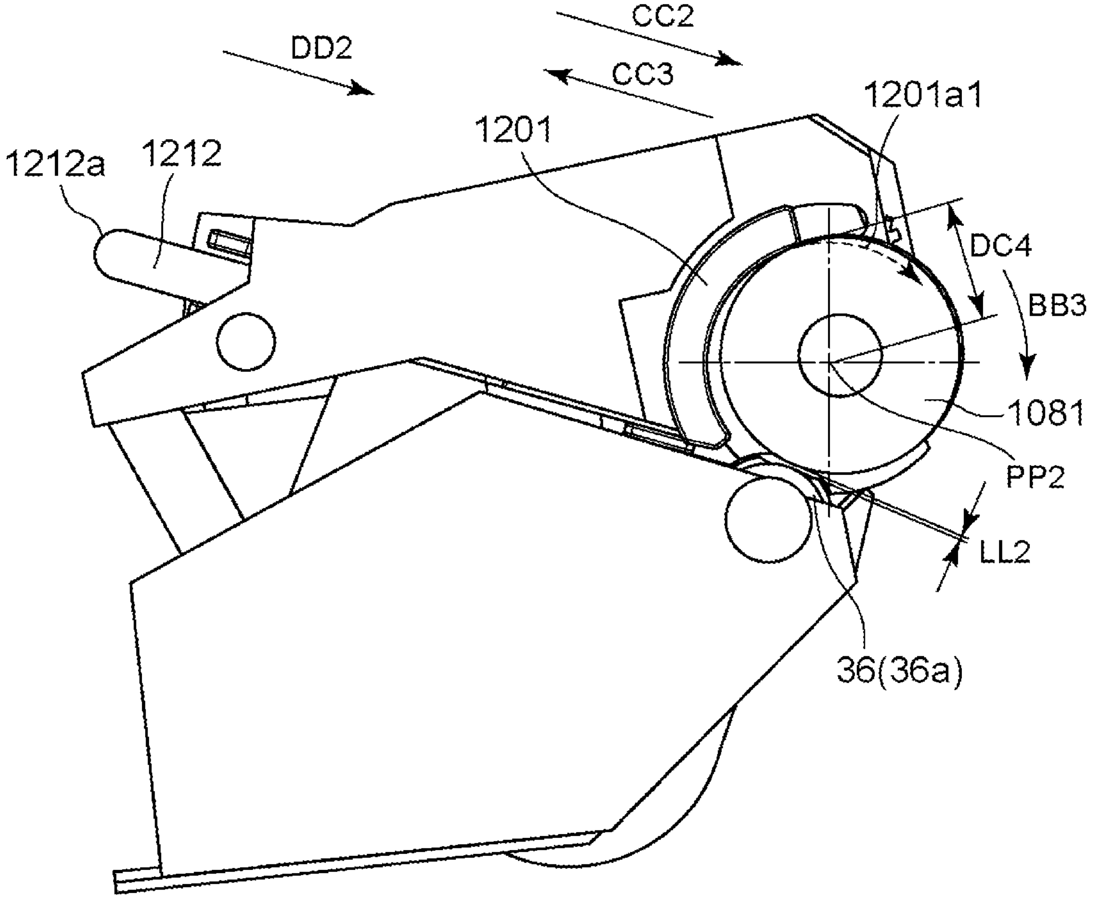
FIG. 115 is a side view of the cartridge.

The external force applied to the pressed portion 1212*a* of the lever member 1212 is released from the state in which the control member 1201 is located at the acting position (part (b) of FIG. 113). Then, as described above, the control member 1201 and the lever member 1212 return to the state of part (a) of FIG. 113 (that is, the non-acting position) by the urging force FF21 of the urging spring 1202. FIG. 114 is a side view at a predetermined timing when the cartridge B is being mounted to the apparatus main assembly A with the opening/closing door 13 opened. When the cartridge B is inserted from here to the final mounting position in the apparatus main assembly A in the direction of arrow CC2, the state shown in FIG. 115 is reached. At this time, since the drive transmission member 1081 is inclined in the arrow VV direction in FIG. 94 as described in the previous embodiment, the gear portion 1081*b* of the drive transmission member 1081 and the tooth surface 36 of the developing roller gear 36 are spaced by a gap LL2 therebetween.

Figure 116:
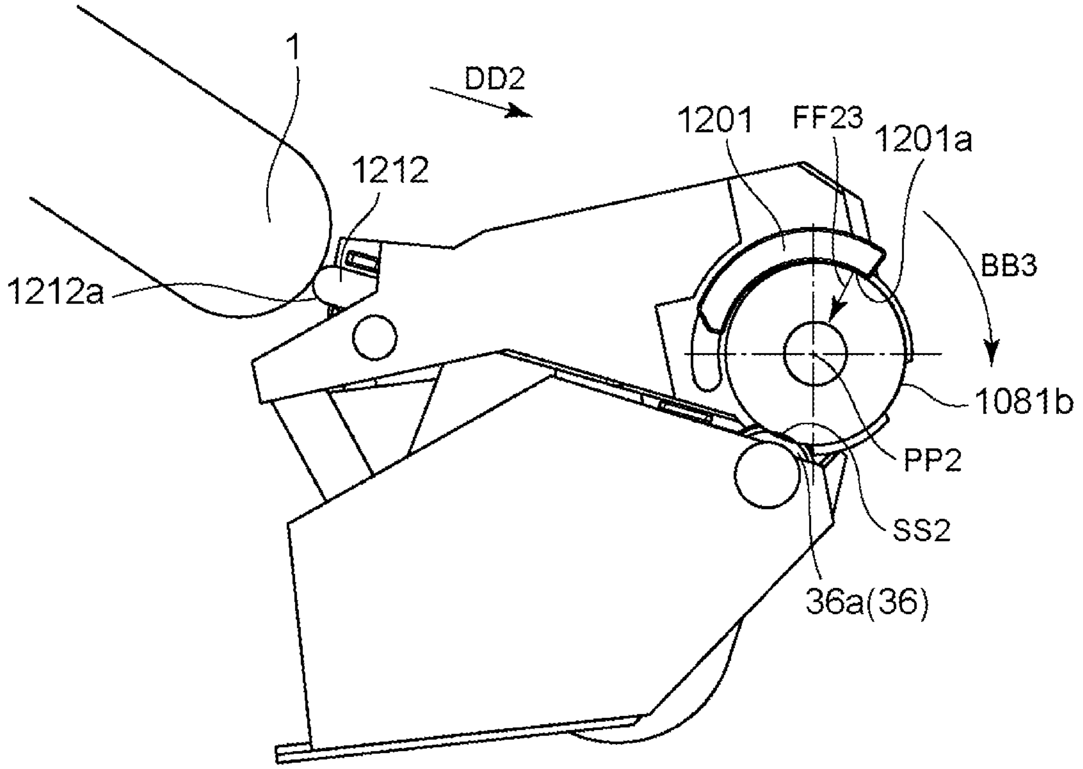
FIG. 116 is a side view of the cartridge.

When the opening/closing door 13 is closed from this state, the cartridge pressing member 1 provided on the opening/closing door 13 presses the pressed portion 1212*a* of the lever member 1212 in the direction of arrow DD2, as in the structure shown in FIGS. 11 and 12. As a result, the control member 1201 rotates about the axis PP2 in the direction of arrow BB3. That is, the control member 1201 moves from the non-acting position to the acting position. As described above, the distance DC4 between the restricting portion 1201*a* and the center of the axis PP2 does not change, even if the control member 1201 rotates to the acting position. However, since the drive transmission member 1081 is present on the locus 1201*a*1 of the restricting portion 1201*a*, the gear portion 1081*b* of the drive transmission member 1081 receives a contact force FF23 from the restricting portion 1201*a* of the control member 1201 as shown in FIG. 116. This contact force FF23 causes the drive transmission member 1081 to incline in the arrow WW direction in FIG. 94. The gear portion 1081*b* of the drive transmission member 1081 and the tooth surface 36*a* of the developing roller gear 36 mesh with each other in the area SS2.

In this embodiment, the following conditions are satisfied so that the control member 1201 can surely urge the drive transmission member. The distance DC4 from the surface of the control member 1201 (restricting portion 1201*a*) to the axis of the drum 62 is set such that DC4<1.3×DA1 is satisfied when the control member 1201 is located at the acting position (FIG. 116). In particular, in this embodiment, "DC4<1.2×DA1" is satisfied. Here, DA1 is the radius of the photosensitive drum 62 (part (a) of FIG. 113). That is, DC4 is less than 1.3 times the radius of the drum, and more preferably less than 1.2 times.

Figure 117:
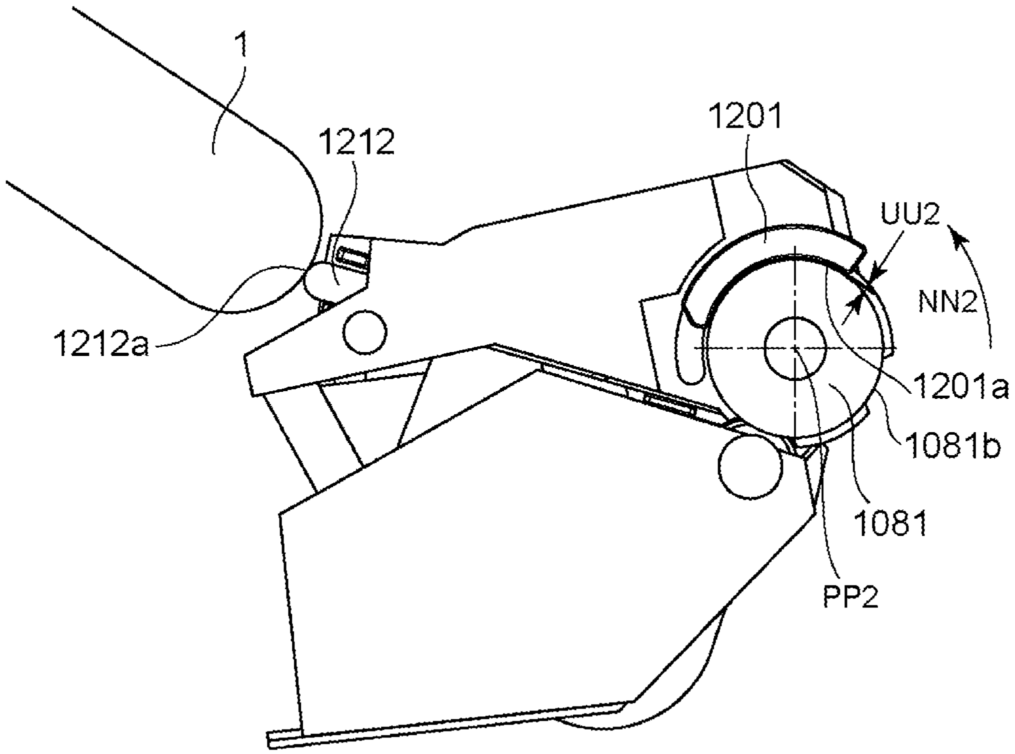
FIG. 117 is a side view of the cartridge.

When the drive transmission member 1081 is driven, the drive transmission member 1081 moves in the direction of the arrow KK (part (a) of FIG. 96) as in the previous embodiment, and the drive transmission of the drive transmission member 1081*a* and the transmitted portion 1064*a* of the coupling member 1064 are engaged with each other. Then, as shown in FIG. 117, in this state, the restricting portion 1201*a* of the control member 1201 does not contact the gear portion 1081*b* of the drive transmission member 1081 and is spaced therefrom with a gap UU2. This can prevent the control member 1201 from interfering with the rotation of the drive transmission member 1081. In this embodiment, when the control member 1201 is located at the non-acting position (FIG. 106), the following conditions are satisfied so that the control member 1201 does not hinder the rotation of the drive transmission member. The distance DC4 from the surface of the control member 1201 (restricting portion 1201*a*) to the axis of the drum 62 satisfies "DC4>1.06×DA1". Here, DA1 is the radius of the photosensitive drum 62 (part (a) of FIG. 113). That is, DC4 is larger than 1.06 times the drum radius.

Particularly, in this embodiment, DA4>1.09×DA1 is satisfied. That is, DA4 is larger than 1.09 times the radius of the drum.

Next, a process of taking the cartridge B out of the apparatus main assembly A will be described. Similar to the previous embodiment, this step is a reverse of the step of mounting the cartridge B in the main assembly A of the apparatus. When the image formation is completed, the drive transmission member 1081 is in the state shown in part (a) of FIGS. 96 and 117. When the opening/closing door 13 is opened in this state, the pressure applied by the cartridge pressing member 1 is released, so that the control member 1201 rotates about the axis PP2 in the direction of the arrow NN2 and moves to the non-acting position as described above. Further, the drive transmission member 1081 is inclined to the direction of arrow VV (part (a) of FIG. 94) with the same structure as in the previous embodiment, and the state shown in FIG. 115 is reached. Then, the gear portion 1081*b* of the drive transmission member 1081 and the tooth surface 36*a* of the developing roller gear 36 are spaced by the gap LL2. Since the gears are disengaged from each other, the cartridge can be easily taken out.

When the cartridge B is taken out in the direction of the arrow CC3, which is the opposite direction to the arrow CC2, the cartridge B can be completely removed from the main assembly A of the apparatus by way of the state of FIG. 114.

Figure 118:
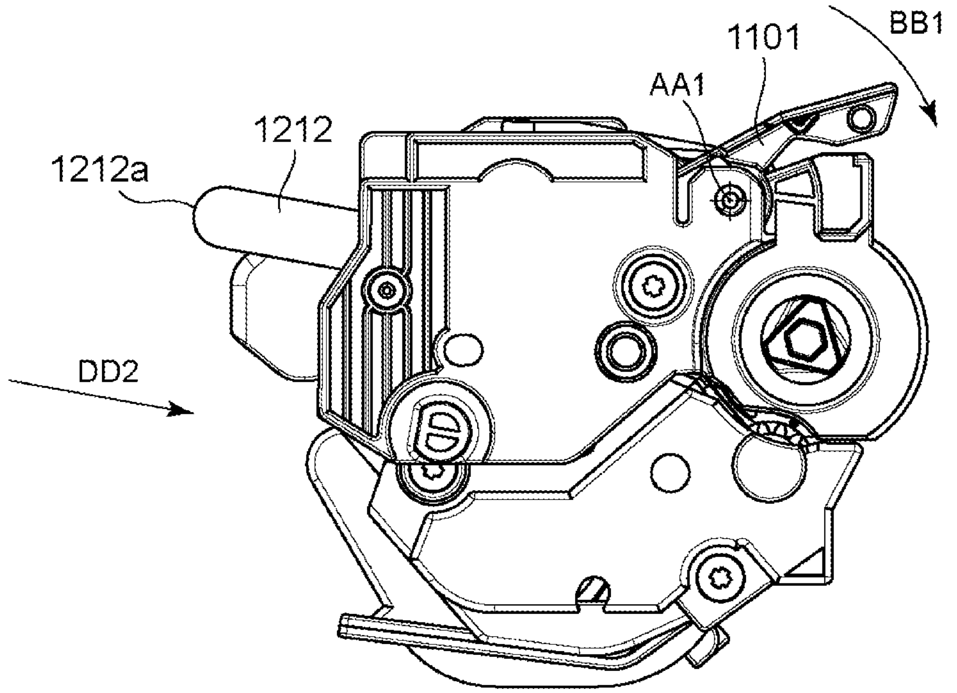
In FIG. 118, part (a) and part (b) are side views of the cartridge.
Figure 118:
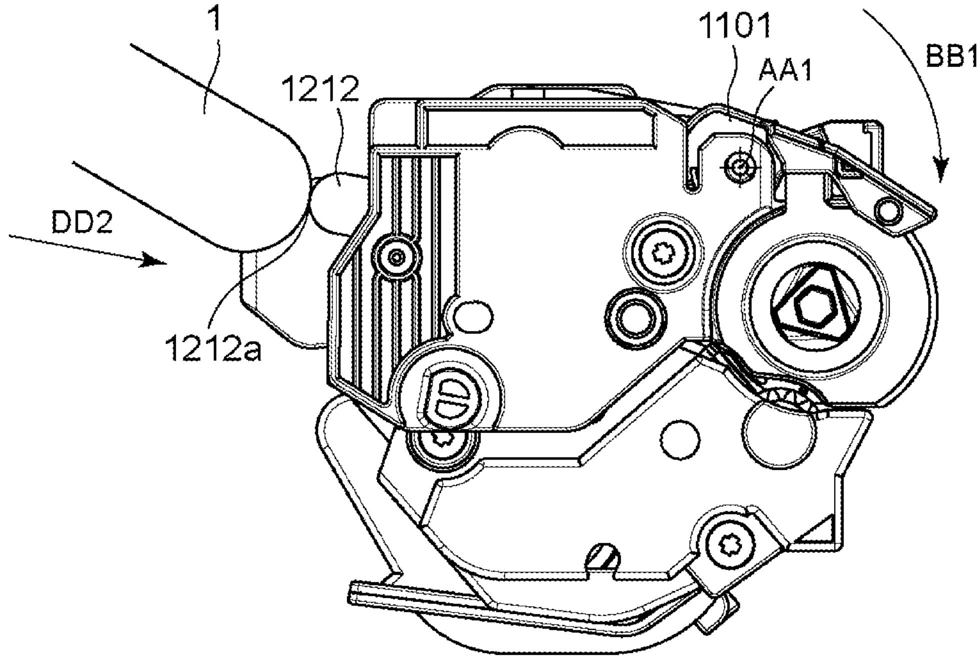

In the Embodiment 10, as shown in FIG. 104, the rotating operation of the control member 1101 is performed by the first guide portion 1182 and the second guide portion 1183 provided in the apparatus main assembly A, but it is not inevitable. For example, as shown in FIG. 118, the control member 1101 according to the Embodiment 10 is connected to the lever member 1212 by the same structure as that of this embodiment. The control member 1101 is structured to rotate in the arrow BB1 direction about the axis AA1 in interrelation with the lever member 1212 sliding in the arrow DD2 and arrow DD2 directions. Further, by employing a structure in which the pressed portion 1212*a* of the lever member 1212 is pressed by the cartridge pressing member 1 provided on the opening/closing door 13, the same effects as those of this embodiment and the Embodiment 10 can be provided.

<Embodiment 12 (Modification of Embodiment 3)>

Next, a modification of Embodiment 3 will be described, as Embodiment 12.

In this modified example, the points different from the Embodiment 3 will be mainly described. The description of the same points as in Embodiment 3 will be omitted. In addition, among the elements disclosed in Embodiment 12, those corresponding to the members described in Embodiment 3 are assigned the same names.

Figure 119:
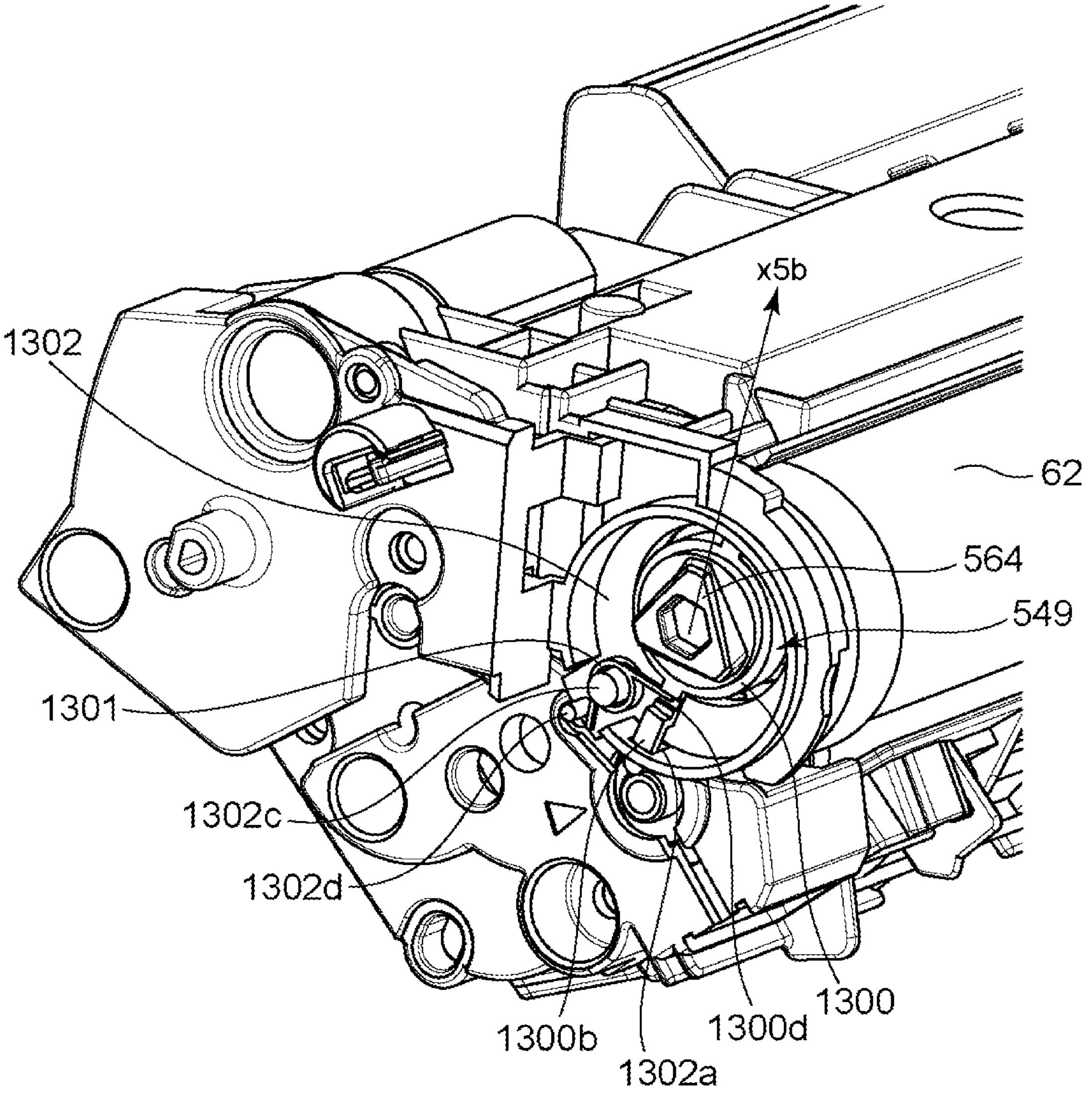
FIG. 119 is a perspective view of the cartridge.

FIG. 119 is a perspective view of the process cartridge of this embodiment. The process cartridge includes an Oldham coupling 549 including the same structure as that of the third embodiment. The Oldham coupling 549 has a drive input member 564. The process cartridge includes a coupling support member 1300 and a coupling urging member 1301.

The drive input member 564 is rotatably supported by the coupling support member 1300. The difference of the Embodiment 12 from Embodiment 3 is the direction in which the coupling urging member 1301 urges the coupling support member 1300. In embodiment 3, as shown in part (b) of FIG. 34, the coupling support member 552 is urged by the coupling urging member 553 in the arrow x5 direction. On the other hand, the coupling support member 1300 of Embodiment 12 is urged by the coupling urging member 1301 in the arrow x5*b* direction shown in FIG. 119.

The coupling urging member 1301 is supported by the drum bearing 1302. The boss portion 1302*c* of the drum bearing 1302 holds the coupling urging member 1301. One end of the arm of the coupling urging member 1301 contacts the boss portion 1302*d* of the drum bearing 1302. The other end of the arm of the coupling urging member 1301 abuts to the abutted portion 1300*d* of the coupling support member 1300. By this, the coupling urging member 1301 urges the coupling support member 1300 in the arrow x5*b* direction.

The drum bearing 1302 has a cut-away 1302*a* in order for the coupling support member 1300 to be inclinable relative to the drum bearing 1302. The gap relationship between the cut-away portion 1302*a* and the locked portion 1300*b* of the coupling support member 1300 is the same as that in the Embodiment 3.

Similarly to the Embodiment 3, the drive input member 564 and the coupling support member 1300 can be inclined relative to the drum bearing 1302. Even when the drive input member 564 is inclined with respect to the drum 62, the drive input member 564 can transmit the drive to the drum 62 through the Oldham coupling mechanism (FIGS. 31 and 35) similar to that of Embodiment 3.

Figure 120:
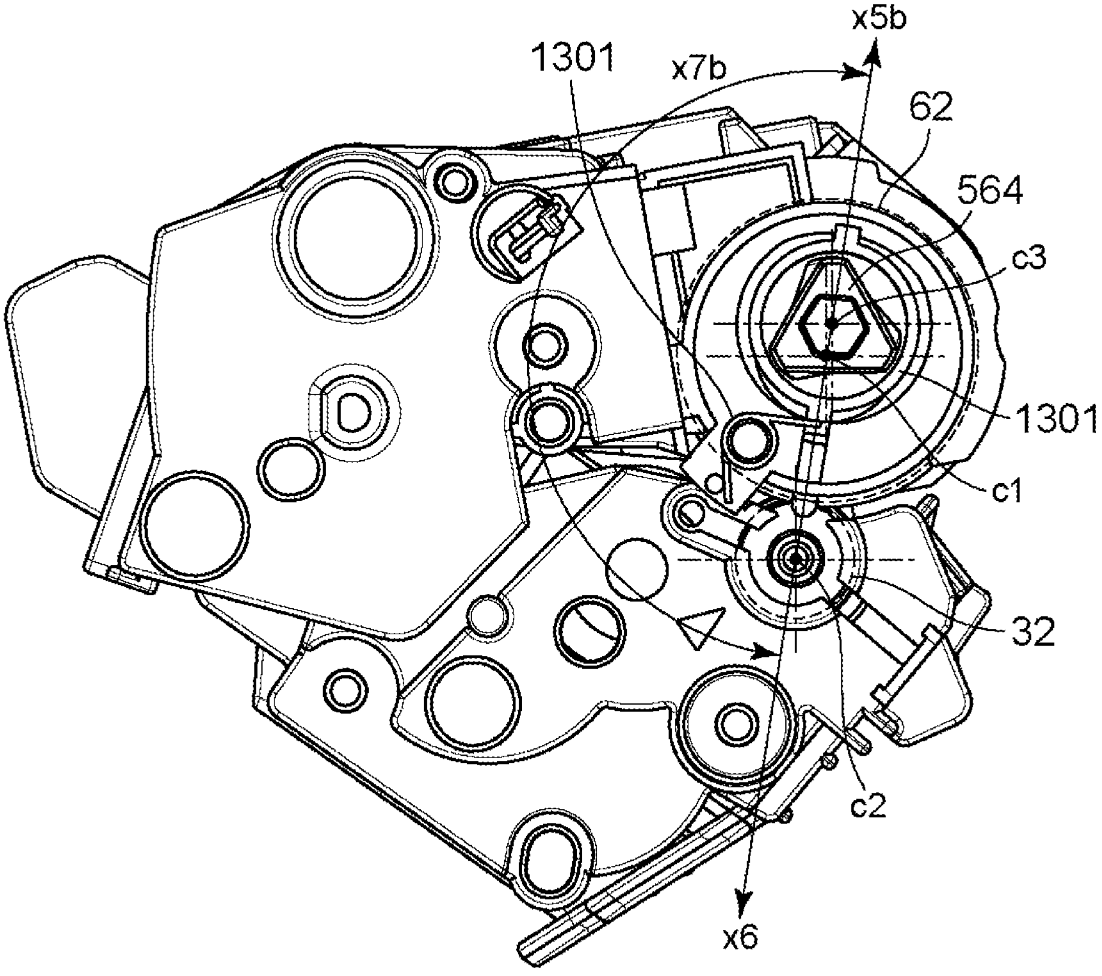
FIG. 120 is a side view of the cartridge.

The urging direction of the coupling support member 1300 will further be described. FIG. 120 is a side view of the process cartridge of this embodiment. The direction from the rotation axis center c1 of the drum 62 (dotted line) to the rotation center c2 of the developing roller 32 (dotted line) is x6 (part (b) of FIG. 34, as in Embodiment 3). When the drive input member 564 is urged by the coupling urging member 1301, the direction from the rotation center c1 of the drum 62 to the center c3 of the free end portion of the drive input member 564 is x5*b*. In this embodiment, the angle x7*b* formed between x6 and x5*b* is set to 180 degrees. The angle x7*b* does not have to be exactly 180 degrees, but may be in the range of 150 to 210 degrees (range of ±30 degrees). That is, the direction x5*b* for displacing the center of the drive input member 564 with respect to the center of the drum 62 is set to be in a range larger than 150 degrees and smaller than 210 degrees toward the upstream side of the rotational direction of the drum 62 with respect to x6. In any case, the input member 564 of the coupling member is displaced in the direction away from the developing roller 32.

Figure 121:
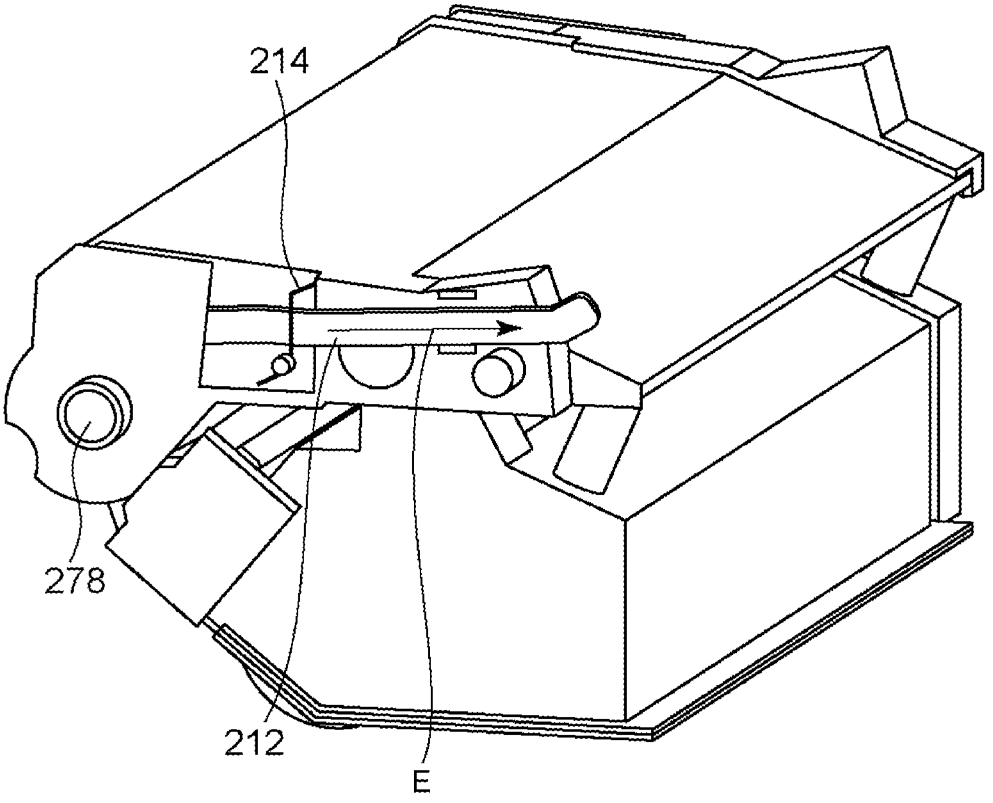

Further, as shown in FIG. 121, the process cartridge in this embodiment includes a lever member 212 for moving the drive input member 564 (FIG. 120) forward and backward in the drum axial direction. The lever member 212 is provided on the non-driving side of the process cartridge. The structure for moving the drive input member 564 by the lever member 212 is the same as that in Embodiment 2 (FIG. 21).

With the above-described structure, it is possible to stably effect the drive transmission, the connecting, and disengagement relative to the drive transmission member 1081 (FIGS. 92 to 96) of the main assembly as shown in Embodiment 9.

<Embodiment 13 (Modification of Example 12)>

Next, as an Embodiment 13, a modification of Embodiment 12 will be described. In this modified example, the points different from Embodiment 12 will be mainly described. The description of the same points as in Example 12 will be omitted. In addition, among the elements disclosed in Embodiment 13, those corresponding to the members described in Embodiment 12 are assigned the same names.

Figure 122:
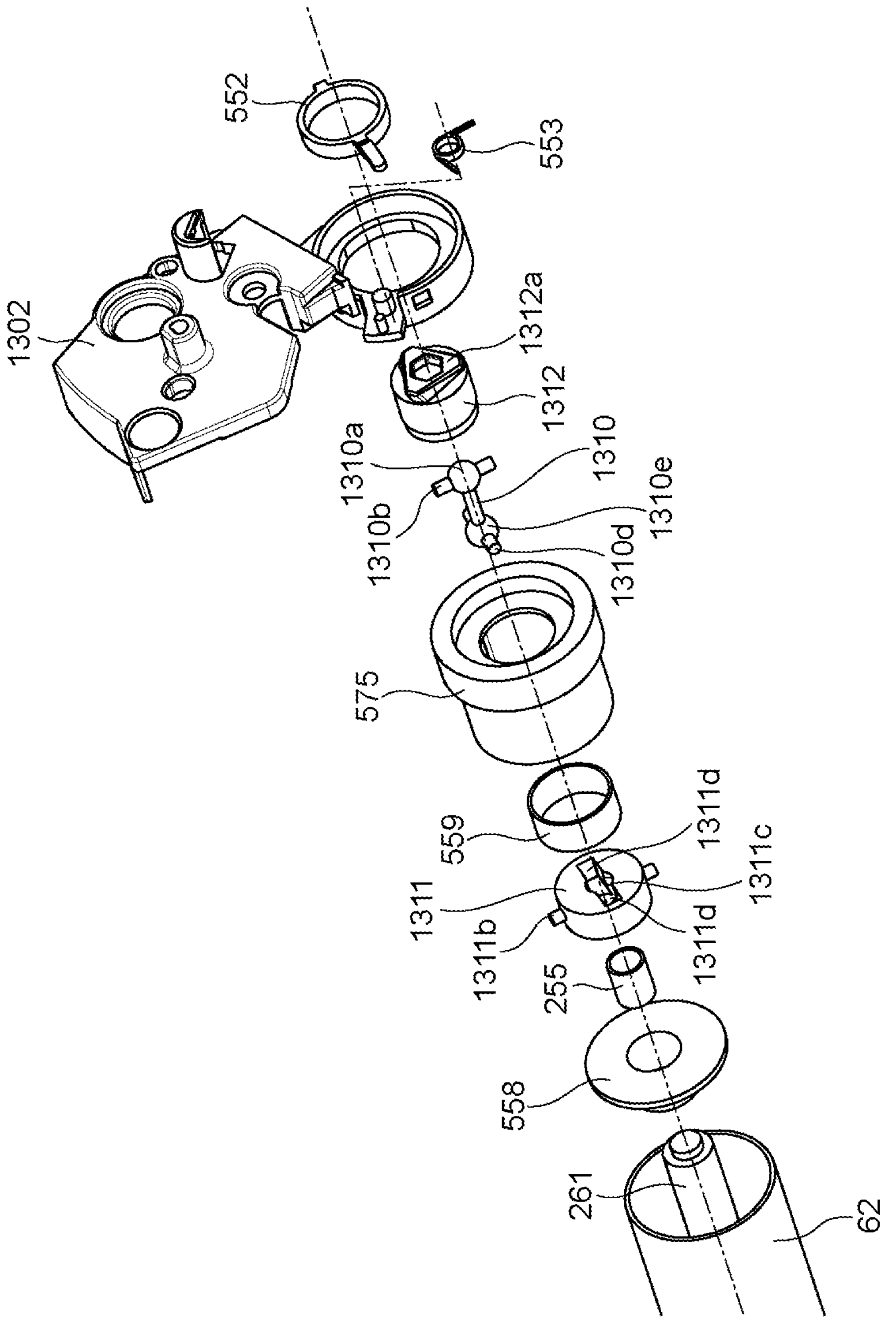
Figure 123:
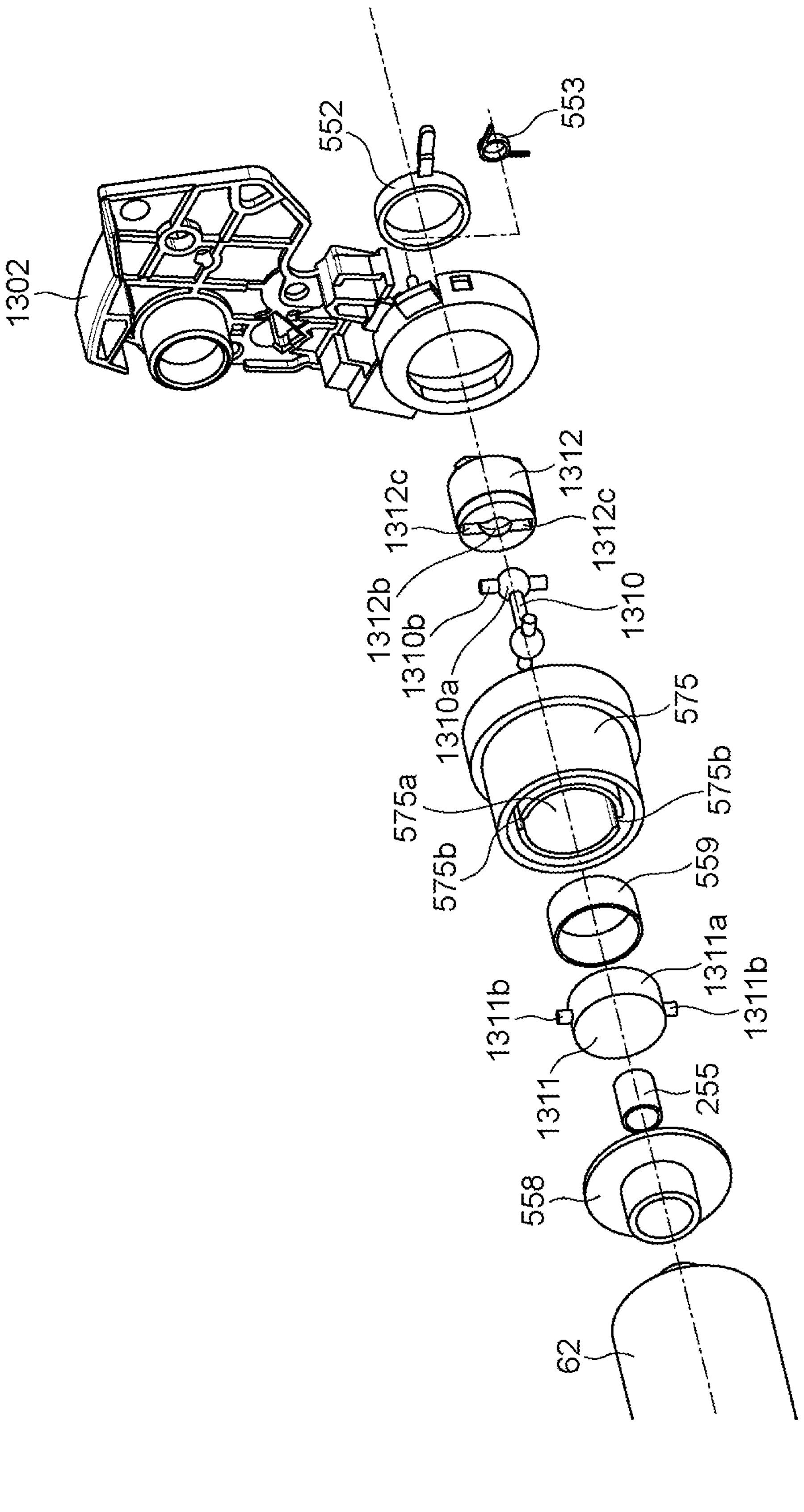

FIGS. 122 and 123 are exploded perspective views of the coupling mechanism in this embodiment.

FIG. 122 is a view as seen from the driving side. FIG. 123 is a view as seen from the non-driving side. The structure for transmitting the drive from the drive input member 1312 to the photosensitive drum 62 is different from that of Embodiment 12. Referring to FIG. 122, this will be described.

The coupling member of this embodiment also includes an input member (input portion) 1312, an intermediate member (intermediate portion) 1310, and an output member (output portion) 1311. The driving force inputted to the input member 1312 is outputted from the output member 1311 toward the photosensitive drum.

The coupling support member 552 rotatably supports the drive input member (input member, input unit) 1312. The drum bearing 1302 supports the driving side flange member 575 and the coupling urging member 553. The input member 1312 has a driven transmission portion 1312*a* at one end and a connecting portion with the intermediate member 1310 at the other end.

The intermediate member (intermediate portion) 1310 has a ball 1310*a*, a ball 1310*e*, a pin 1310*b*, and a pin 1310*d*. The output member 1311 has a recess 1311*c* and a recess 1311*d*. The sphere 1310*e* of the intermediate member 1310 is housable with the recess 1311*c* included in the output member 1311. The pin 1310*d* included in the intermediate member 1310 is accommodated in the recess 1311*d* of the output member (output unit) 1311 and is connected so as to be capable of drive transmission.

The intermediate member 1310, the first pressing member 559, the output member 1311, and the cushion member 255 are accommodated inside the driving side flange member 575. The driving side flange member 575 and the lid member 558 are joined together. The driving side flange member 575 and the output member 1311 are connected so as to be capable of drive transmission. The first pressing member 559 is provided between the driving side flange member 575 and the output member 1311. The cushion member 255 is provided between the output member 1311 and the connecting member 261. The connecting member 261 is accommodated in the drum 62. The driving side flange member 575 is connected to the drum 62 in a drive-transmittable manner.

Referring to FIG. 123, further description will be made. The sphere 1310*a* of the intermediate member 1310 is accommodated in the recess 1312*b* of the input member 1312. The pin 1310*b* included in the intermediate member 1310 is accommodated in the recess 1312*c* of the drive input member 1312, and the pin 1310*b* is connected to the drive input member 1312 so as to be capable of transmitting power. In addition, the cylindrical portion 1311*a* of the output member 1311 is accommodated in the recess 575*a* of the driving side flange member 575. The pin 1311*b* of the output member 1311 is accommodated in the recess 575*b* of the driving side flange member 575, and the pin 1311*b* is connected to the drive member so as to be capable of transmitting power. Next, the assembled state of the driving side flange unit will be described.

Figure 124:
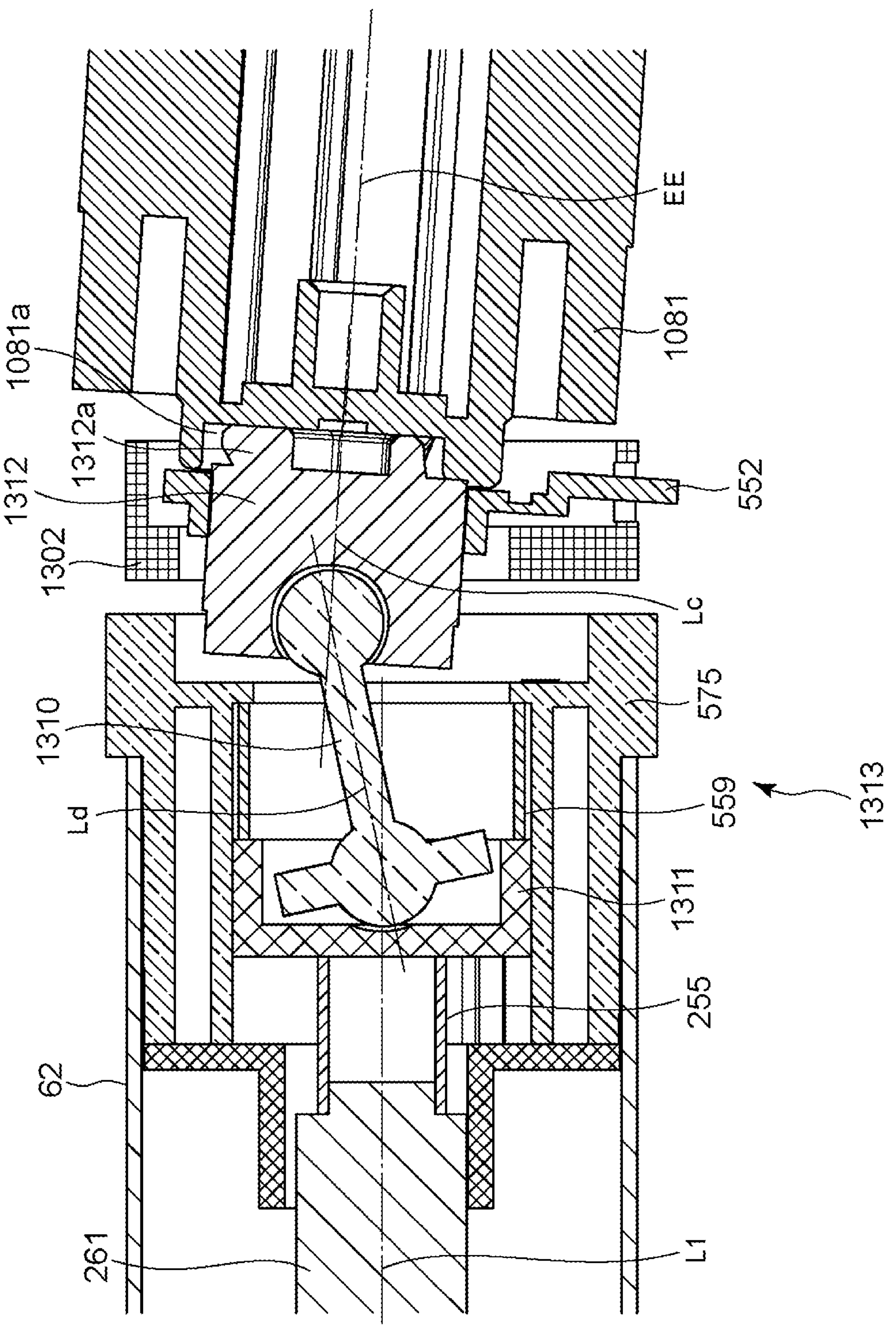

FIG. 124 is a sectional view of the driving side flange unit 1313. A rotation axis of the drum is L1, a rotation axis of the input member 1312 is Lc, and a rotation axis of the intermediate member 1310 is Ld.

The input member 1312 is inclinably engaged with the intermediate member 1310. The intermediate member 1310 is pivotably engaged with the output member 1311. With such a structure, when the photosensitive drum 62 is rotationally driven by the image forming apparatus main assembly, all the axes L1, Lc, and Ld are inclined relative to each other.

The output member 1311 of the coupling member is arranged substantially coaxially with the photosensitive drum. On the other hand, the axis Ld of the intermediate member is inclined so as to be away from the photosensitive member drum and the axis L1 of the output member toward the free end side (right side in the drawing) of the coupling member. That is, the axis Ld is inclined toward the upper right.

The axis Lc of the input member 1312 is deviated from the rotation axis L1 of the photosensitive member drum 62 and the output member 1311. In addition, the axis Lc of the input member 1312 is inclined so as to approach the axis L1 of the photosensitive drum as it goes toward the free end side (right side in the drawing) of the coupling member. That is, the axis Lc is inclined toward the lower right of the Figure. One end of the intermediate member 1310, which is the nondriving side, is supported by the output member 1311 so as to be rotatable and inclinable. The other end of the intermediate member, which is the driving side of 1310, is rotatably and inclinably coupled with the end of the input member 1312.

By the lever 212 (FIG. 121) described in Embodiment 12, the connecting member 261 is permitted to move forward and backward along the direction of the axis L1. The cushion member (buffer member, damper) 255 is a compression coil spring as an example, and is provided between the connecting member 261 and the output member 1311 in a compressed state. The first pressing member 559 is, for example, a compression coil spring, and is provided between the output member 1311 and the driving side flange member 575 in a compressed state.

When the connecting member 261 moves along the axis L1 of the photosensitive drum, the output member 1311 also moves along the axis L1. By this, the coupling member (the output member 1311, the intermediate member 1310, the input member 1312) is capable of advancing and retracting between the retracted position and the advanced position similar to the Embodiment 3 (parts (a), (b), and (c) of FIG. 35).

The input member 1312 is structured to rotate by receiving a driving force from the drive transmission unit 1081 (also FIG. 92) included in the main assembly. The rotation axis Lc of the input member 1312 can be inclined so as to be substantially parallel to the rotation axis EE of the drive transmission portion 1081. Therefore, when the drive is transmitted from the main assembly to the drum 62, the input member 1312 and the drive transmission portion 1081 are in close contact with each other by the rotational load of the drum 62, and the rotation axis Lc of the input member 1312 and the rotation axis EE of the drive transmission portion 1081 are almost parallel with each other.

With such a structure, it is possible to reduce the cause of uneven rotation of the drum 62 in the drive transmission from the drive transmission unit 1081 to the drum 62.

In addition, the coupling support member 552 is movable relative to the drum bearing 1302. Thus, when the driven transmission portion 1312*a* of the input member 1312 is inserted into the drive transmission portion 1081*a* of the drive transmission member 1081 (also FIG. 90), the input member 1312 can move in accordance with the position of the drive transmission member 1081*m* and therefore, it is possible to smoothly engage with each other.

On the other hand, as another structure, the coupling support member 552 may be fixed to the drum bearing 1302 in an immovable state. In such a case, the coupling urging member 553 is unnecessary. The drive transmission member 1081 of the image forming apparatus main assembly moves in accordance with the position of the input member 1312 when engaging with the input member 1312. By this, the inclination amounts of the input member 1312 and the drive transmission member 1081 are fixed, and uneven rotation of the drum 62 is reduced.

Also in Embodiment 3 described above, the coupling support member 552 can be fixed to the drum bearing 573. It can be properly selected as needed whether the coupling support member 552 is movable or fixed with respect to the drum bearing 1302.

As described above, in the present application, Embodiments 1 to 13 and their modifications have been described. The structures of these embodiments and their modifications can be usable with combination. For example, the cartridges described in each of the above-described embodiments and each of the modified examples have a unique structure (feature) to connect the coupling member (drive input member) of the cartridge to an inclined drive transmission member (FIG. 15 and the like). The cartridge may have a plurality of these structures (features) described in different embodiments.

INDUSTRIAL APPLICABILITY

According to the present invention, there are provided an image forming apparatus and a cartridge that can smoothly perform drive connection.

REFERENCE NUMERALS

3: Exposure device (laser scanner unit)
4: Sheet tray
5*a*: Pickup roller
5*b*: Feeding roller pair
5*c*: Feed roller pair
6: Transfer guide
7: Transfer roller
8: Feed guide
9: Fixing device
9*a*: Heating roller
9*b*: Pressure roller
10: Discharge roller
13: Opening/closing door
20: Developing device unit
23: Toner storage frame
30: Development roller gear
32: Development roller (developer carrying member)
34: Magnet roller
37: Bearing member
38: gap keeping member
43: Transport member
60: Cleaning unit
62: Drum (electrophotographic photosensitive drum)
64: Coupling member
67: Charging Roller
71: Cleaning frame
73: Drum bearing
77: Cleaning blade
77*a*: Rubber blade
77*b*: Supporting portion
78: Drum shaft
A: Image forming apparatus main assembly (apparatus main assembly)
B: Process cartridge (cartridge)
C: Lateral direction
D: Conveyance direction
F, G: illustrated direction
L: Laser beam
T: Toner (developer)
P: Sheet material (recording material)
R: Rotational direction
S: Sheet path The present invention is not limited to the above embodiments, and various changes and modifications can be made without departing from the spirit and scope of the present invention. Therefore, the following claims are attached to publish the scope of the present invention.

This application claims the benefit of Japanese Patent Applications Nos 2017-238454 filed on Dec. 13, 2017, 2018-068246 filed on Mar. 30, 2018 and 2018-080112 filed on Apr. 18, 2018, which are hereby incorporated by reference herein in their entirety.

The invention claimed is:

1. A process cartridge comprising:

a photosensitive drum rotatable about an axis thereof;

a developing roller rotatable about an axis thereof, the developing roller being configured to develop a latent image formed on the photosensitive drum with toner;

a coupling positioned at an end of the photosensitive drum and at a side of the process cartridge with respect to a direction of the axis of the photosensitive drum, the coupling being movable relative to the photosensitive drum in the direction of the axis of the photosensitive drum, and the coupling being operatively connected to the photosensitive drum and the developing roller so as to transmit a driving force to the photosensitive drum and the developing roller;

a charging roller configured to charge the photosensitive drum;

a first frame supporting the photosensitive drum, the first frame having a projection projecting from the side of the process cartridge in the direction of the axis of the photosensitive drum;

a first electrical contact positioned on the projection of the first frame, the first electrical contact being electrically connected to the charging roller;

a second frame supporting the developing roller; and a second electrical contact provided on the second frame at the side of the process cartridge, the second electrical contact being electrically connected to the developing roller, wherein, as viewed along the axis of the photosensitive drum, the first electrical contact and the second electrical contact are positioned on opposite sides with respect to a line that passes through the axis of the photosensitive drum and the axis of the developing roller.

2. A process cartridge according to claim 1, wherein, as viewed along the axis of the photosensitive drum, a surface of the first electrical contact faces the line and a surface of the second electrical contact faces away from the line.

3. A process cartridge according to claim 1, wherein, as viewed along the axis of the photosensitive drum, the projection of the first frame surrounds at least two sides of the first electrical contact.

4. A process cartridge according to claim 1, wherein the projection of the first frame is a first guide, and the first frame further includes a second guide projecting from the side of the process cartridge in the direction of the axis of the photosensitive drum, and wherein, as viewed along the axis of the photosensitive drum, (i) the first guide and the second guide are positioned on the same side of the line, and (ii) the first guide is positioned closer to the line than the second guide is to the line.

5. A process cartridge according to claim 1, further comprising a drum flange fixed to the end of the photosensitive drum, wherein the coupling is operatively connected to the photosensitive drum through the drum flange.

6. A process cartridge according to claim 1, wherein the coupling has a projection configured to receive the driving force from outside of the process cartridge.

7. A process cartridge according to claim 6, wherein the projection of the coupling has a triangular shape.

8. A process cartridge according to claim 1, wherein the coupling includes a projection having a chamfered surface.

9. A process cartridge according to claim 1, wherein the end of the photosensitive drum is a first end of the photosensitive drum, and the photosensitive drum has a second end that is opposite to the first end in the direction of the axis of the photosensitive drum, and wherein the process cartridge further comprises a shaft positioned at the second end of the photosensitive drum, with the shaft being electrically connected to the photosensitive drum.

10. A process cartridge comprising:

a photosensitive drum rotatable about an axis thereof;

a first gear positioned coaxially with the photosensitive drum;

a developing roller rotatable about an axis thereof, the developing roller being configured to develop a latent image formed on the photosensitive drum with toner;

a coupling positioned at an end of the photosensitive drum and at a side of the process cartridge with respect to a direction of the axis of the photosensitive drum, the coupling being movable relative to the first gear and the photosensitive drum in the direction of the axis of the photosensitive drum, and the coupling being operatively connected to the first gear and the photosensitive drum so as to transmit a driving force to the first gear and the photosensitive drum;

a second gear positioned coaxially with the developing roller, the second gear being operatively connected to the first gear and the developing roller so as to transmit the driving force to the developing roller;

a charging roller configured to charge the photosensitive drum;

a first frame supporting the photosensitive drum, the first frame having a projection projecting from the side of the process cartridge in the direction of the axis of the photosensitive drum;

a first electrical contact positioned on the projection of the first frame, the first electrical contact being electrically connected to the charging roller;

a second frame supporting the developing roller; and a second electrical contact provided on the second frame at the side of the process cartridge, the second electrical contact being electrically connected to the developing roller.

11. A process cartridge according to claim 10, further comprising a drum flange fixed to the end of the photosensitive drum, wherein the coupling is operatively connected to the photosensitive drum through the drum flange.

12. A process cartridge according to claim 11, wherein the end of the photosensitive drum is a first end of the photosensitive drum, and the photosensitive drum has a second end that is opposite to the first end in the direction of the axis of the photosensitive drum, and wherein the process cartridge further comprises a shaft positioned at the second end of the photosensitive drum, with the shaft being electrically connected to the photosensitive drum.

13. A process cartridge according to claim 10, wherein the first gear and the second gear are engaged with each other.

14. A process cartridge according to claim 10, wherein the coupling member includes a projection having a chamfered surface.

15. A process cartridge according to claim 14, wherein the projection of the coupling has a triangular shape.

16. A process cartridge comprising:

a photosensitive drum rotatable about an axis of thereof;

a developing roller rotatable about an axis thereof, the developing roller being configured to develop a latent image formed on the photosensitive drum with toner;

a coupling positioned at an end of the photosensitive drum and at a side of the process cartridge with respect to a direction of the axis of the photosensitive drum, the coupling being movable relative to the photosensitive drum in the direction of the axis of the photosensitive drum, and the coupling being operatively connected to the photosensitive drum and developing roller so as to transmit a driving force to the photosensitive drum and the developing roller;

a charging roller configured to charge the photosensitive drum;

a first frame supporting the photosensitive drum;

a first electrical contact positioned on the first frame, the first electrical contact being electrically connected to the charging roller, the first electrical contact projecting from the side of the process cartridge in the direction of the axis of the photosensitive drum;

a second frame supporting the developing roller; and a second electrical contact provided on the second frame at the side of the process cartridge, the second electrical contact being electrically connected to the developing roller, wherein, as viewed along the axis of the photosensitive drum, the first electrical contact and the second electrical contact are positioned on opposite sides with respect to a line that passes through the axis of the photosensitive drum and the axis of the developing roller.

17. A process cartridge according to claim 16, wherein, as viewed along the axis of the photosensitive drum, a surface of the first electrical contact faces the line and a surface of the second electrical contact faces away from the line.

18. A process cartridge according to claim 16, wherein the first frame has a projection projected from the side of the process cartridge in the direction of the axis of the photosensitive drum, and wherein, as viewed along the axis of the photosensitive drum, the projection of the first frame surrounds at least two sides of the first electrical contact.

19. A process cartridge according to claim 16, further comprising a drum flange fixed to the end of the photosensitive drum, wherein the coupling is operatively connected to the photosensitive drum through the drum flange.

20. A process cartridge according to claim 16, further comprising:

a first gear positioned coaxially with the photosensitive drum, the first gear being operatively connected to the coupling so as to receive the driving force from the coupling; and a second gear positioned coaxially with the developing roller, the second gear being operatively connected to the first gear and the developing roller so as to transmit the driving force from the first gear to the developing roller.

21. A process cartridge according to claim 16, wherein the coupling has a projection configured to receive the driving force from outside of the process cartridge.

22. A process cartridge according to claim 21, wherein the projection of the coupling has a triangular shape.

23. A process cartridge according to claim 16, wherein the coupling includes a projection having a chamfered surface.

24. A process cartridge according to claim 16, wherein the end of the photosensitive drum is a first end of the photosensitive drum, and the photosensitive drum has a second end that is opposite to the first end in the direction of the axis of the photosensitive drum, and wherein the process cartridge further comprises a shaft positioned at the second end of the photosensitive drum, with the shaft being electrically connected to the photosensitive drum.

25. A process cartridge comprising:

a photosensitive drum rotatable about an axis thereof;

a first gear positioned coaxially with the photosensitive drum;

a developing roller rotatable about an axis thereof, the developing roller being configured to develop a latent image formed on the photosensitive drum with toner;

a coupling positioned at an end of the photosensitive drum and at a side of the process cartridge with respect to a direction of the axis of the photosensitive drum, the coupling being movable relative to the photosensitive drum in the direction of the axis of the photosensitive drum, the coupling being operatively connected to the first gear and the photosensitive drum so as to transmit a driving force to the first gear and the photosensitive drum;

a second gear positioned coaxially with the developing roller, the second gear being operatively connected to the first gear and the developing roller so as to transmit the driving force to the developing roller;

a charging roller configured to charge the photosensitive drum;

a first frame supporting the photosensitive drum;

a first electrical contact positioned on the first frame, the first electrical contact being electrically connected to the charging roller, the first electrical contact projecting from the side of the process cartridge in the direction of the axis of the photosensitive drum;

a second frame supporting the developing roller; and a second electrical contact provided on the second frame at the side of the process cartridge, the second electrical contact being electrically connected to the developing roller.

26. A process cartridge according to claim 25, further comprising a drum flange fixed to the end of the photosensitive drum, wherein the coupling is operatively connected to the photosensitive drum through the drum flange.

27. A process cartridge according to claim 25, wherein the coupling member includes a projection having a chamfered surface.

28. A process cartridge according to claim 27, wherein the projection of the coupling has a triangular shape.

29. A process cartridge according to claim 25, wherein the end of the photosensitive drum is a first end of the photosensitive drum, and the photosensitive drum has a second end that is opposite to the first end in the direction of the axis of the photosensitive drum, and wherein the process cartridge further comprises a shaft positioned at the second end of the photosensitive drum, with the shaft being electrically connected to the photosensitive drum.

30. A process cartridge according to claim 25, wherein the first gear and the second gear are engaged with each other.

* * * * *